(12) United States Patent
Houck, II

(10) Patent No.: US 8,387,912 B2
(45) Date of Patent: Mar. 5, 2013

(54) LIFTING FOIL

(76) Inventor: Ronald G. Houck, II, Beavercreek, OH (US)

( * ) Notice: Subject to any disclaimer, the term of this patent is extended or adjusted under 35 U.S.C. 154(b) by 128 days.

(21) Appl. No.: 12/508,650

(22) Filed: Jul. 24, 2009

(65) Prior Publication Data

US 2010/0025541 A1 Feb. 4, 2010

Related U.S. Application Data

(60) Provisional application No. 61/085,904, filed on Aug. 4, 2008.

(51) Int. Cl.
*B64C 39/06* (2006.01)
(52) U.S. Cl. ............... 244/34 A; 244/45 R; 244/130
(58) Field of Classification Search ............ 244/34 A, 244/45 R, 130, 199.4, 36, 45 A, 35 A, 35 R, 244/123, 34 R, 199
See application file for complete search history.

(56) References Cited

U.S. PATENT DOCUMENTS

| | | | | | |
|---|---|---|---|---|---|
| 3,834,654 | A | * | 9/1974 | Miranda | 244/13 |
| 4,146,199 | A | * | 3/1979 | Wenzel | 244/45 R |
| 4,235,400 | A | * | 11/1980 | Haworth | 244/218 |
| 4,365,773 | A | * | 12/1982 | Wolkovitch | 244/45 R |
| 4,541,593 | A | * | 9/1985 | Cabrol | 244/45 R |
| 4,856,736 | A | * | 8/1989 | Adkins et al. | 244/45 R |
| D308,043 | S | * | 5/1990 | Butler | D12/342 |
| 5,119,748 | A | * | 6/1992 | Nishimura | 114/102.16 |
| 5,332,177 | A | * | 7/1994 | Boyle, Jr. | 244/34 A |
| 5,503,352 | A | * | 4/1996 | Eger | 244/45 R |
| 5,899,409 | A | * | 5/1999 | Frediani | 244/13 |
| 6,098,923 | A | * | 8/2000 | Peters, Jr. | 244/45 R |
| 6,474,604 | B1 | * | 11/2002 | Carlow | 244/198 |
| 6,607,162 | B2 | * | 8/2003 | Warsop et al. | 244/12.6 |
| 6,626,398 | B1 | * | 9/2003 | Cox et al. | 244/45 R |
| 6,659,396 | B1 | * | 12/2003 | August | 244/45 R |
| D526,951 | S | * | 8/2006 | Houck, II | D12/319 |
| 7,100,867 | B2 | * | 9/2006 | Houck, II | 244/34 A |
| 7,258,302 | B2 | * | 8/2007 | Carr et al. | 244/45 R |
| 7,410,122 | B2 | * | 8/2008 | Robbins et al. | 244/12.3 |
| D598,838 | S | * | 8/2009 | Carr et al. | D12/319 |
| 2007/0215746 | A1 | * | 9/2007 | Rieken et al. | 244/6 |

OTHER PUBLICATIONS

AFRL-RB-WP-TR-2008-3170 titled Unique Stealth Unmanned Aerial Vehicle (UAV) Houck Aircraft Design Programvol. 1: Program Overview Aaron Altman University of Dayton Nov. 2008.

* cited by examiner

*Primary Examiner* — Christopher P Ellis
*Assistant Examiner* — Medhat Badawi
(74) *Attorney, Agent, or Firm* — R. William Graham

(57) ABSTRACT

A lifting foil having a lower trailing course having a margins and an upper leading course margins connected in a manner to enhance lift of the foil.

9 Claims, 110 Drawing Sheets

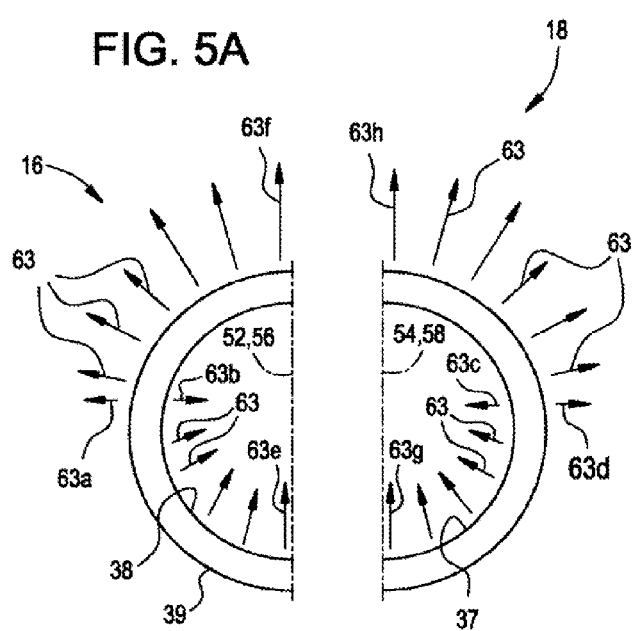

FIG. 6A
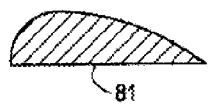
81
FIG. 6B
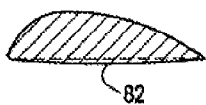
82
FIG. 6C
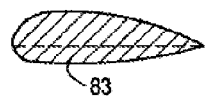
83
FIG. 6D
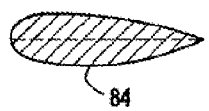
84
FIG. 6E
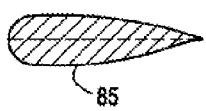
85
FIG. 6F
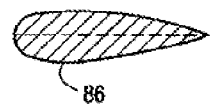
86
FIG. 6G
87
FIG. 6H
88
FIG. 6I
89
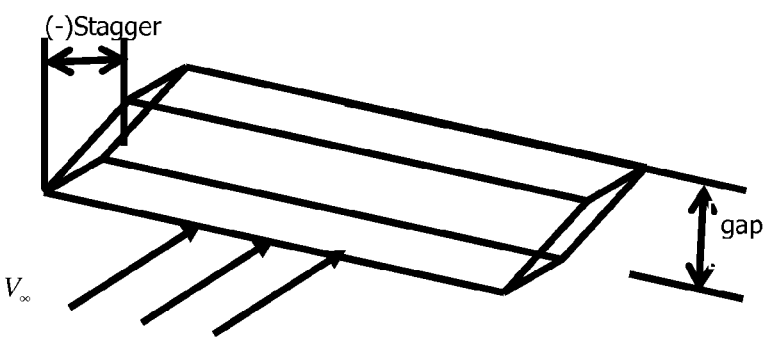
FIG. 7

Perspective View
Showing Camber Transitions

Top View

Front View

Hatch fill on lower blades used to clarify position

Slightly Turned

End View

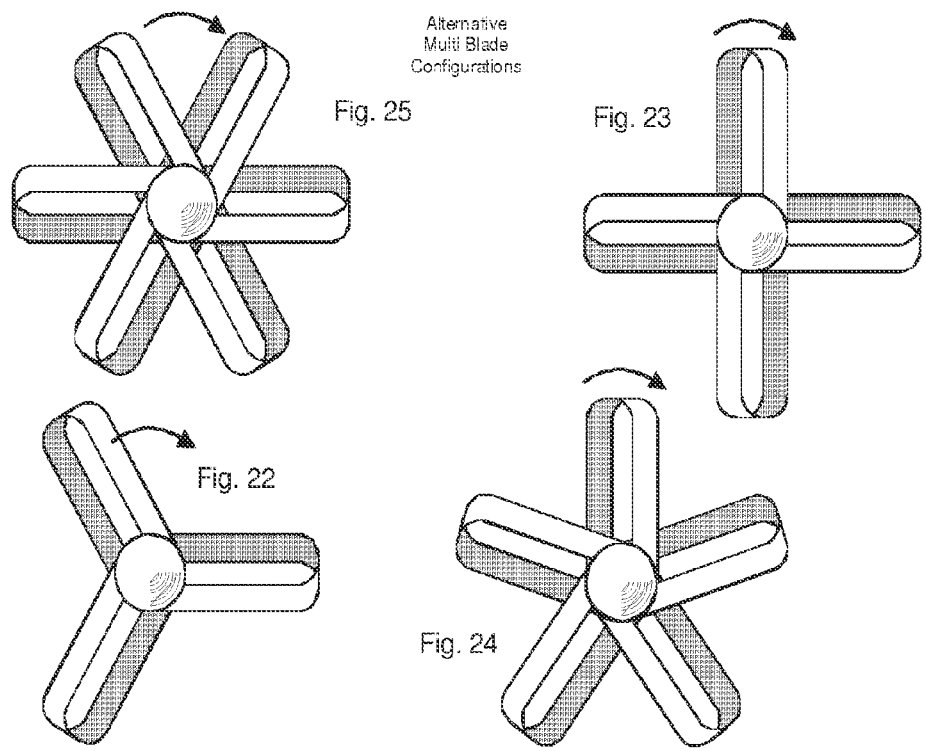
Fig.26(A)
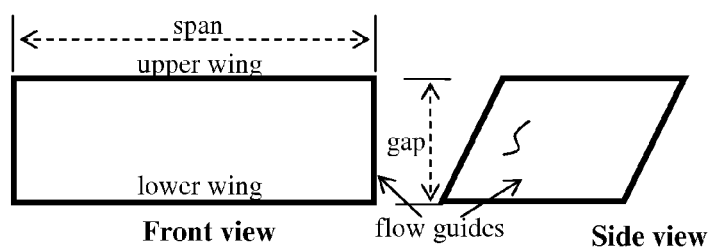

Fig.26(B)
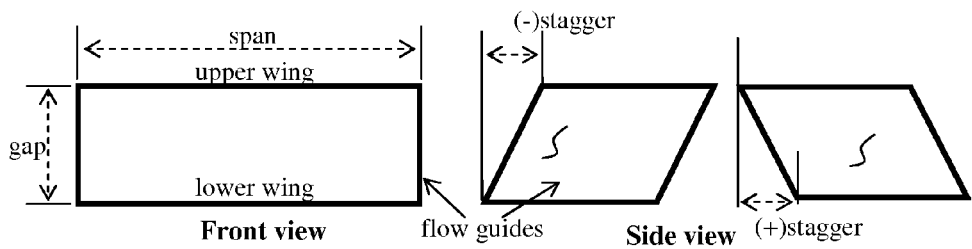
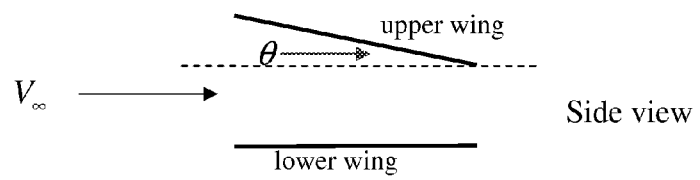
Fig.26(C)
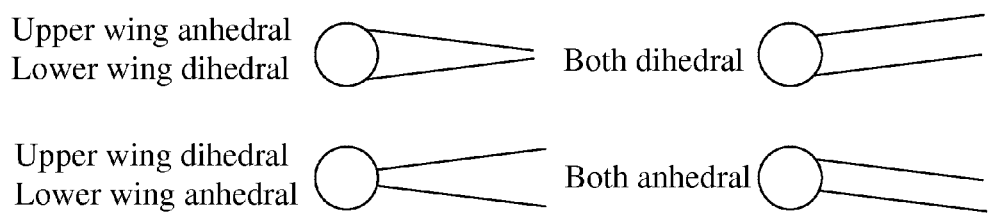
Fig.26(D)

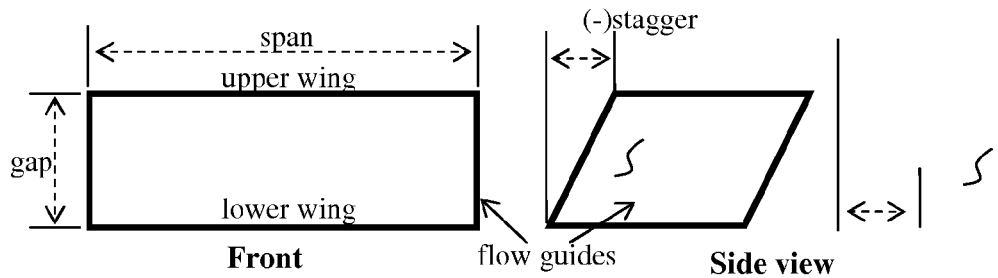
FIG. 34
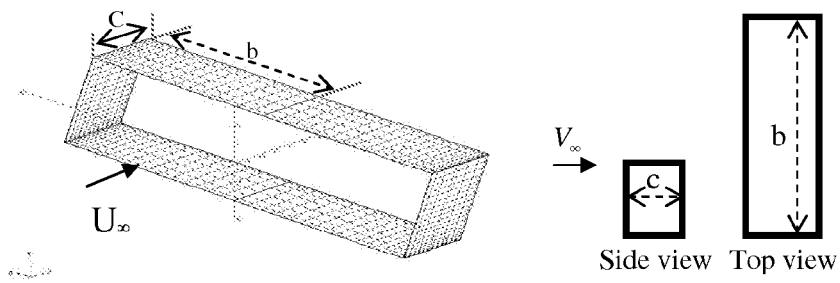
Fig. 35(A) Model #1 Gap 1.0C, Stagger 0.0C
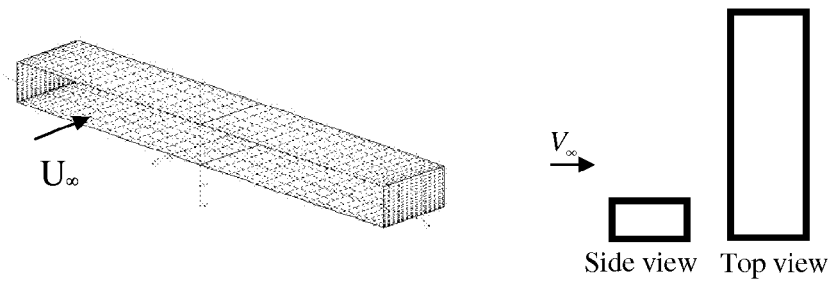
Fig. 35(B) Model #2 Gap 0.5C, Stagger 0.0C

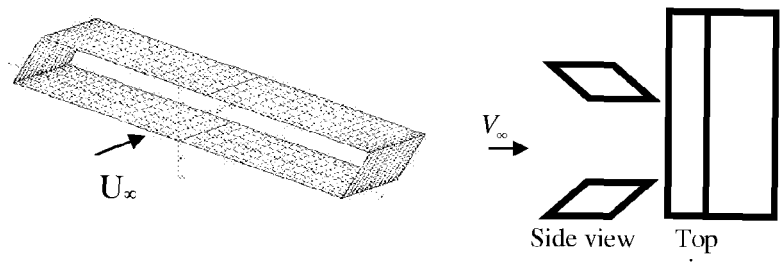
Fig. 35(C) Model #3 Gap 0.5C, Stagger 0.5C
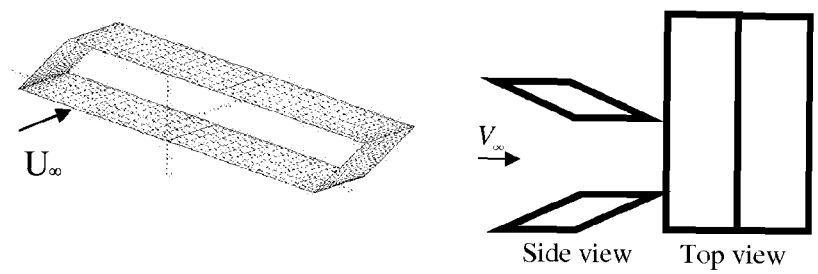
Fig. 35(D) Model #4 Gap 0.5C, Stagger 1.0C
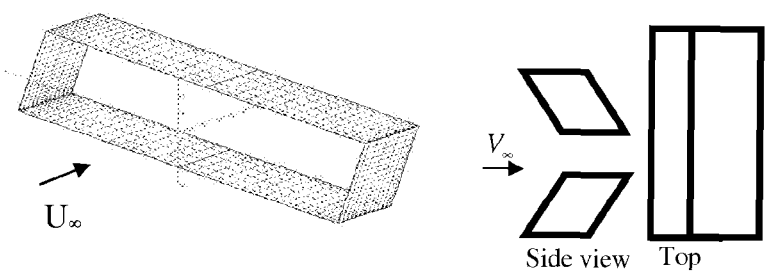
Fig. 35(E) Model #5 Gap 1.0C, Stagger 0.5C

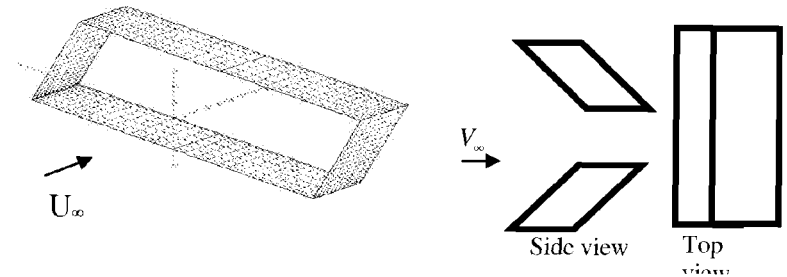
Fig. 35(F) Model #6 Gap 1.0C, Stagger 1.0C
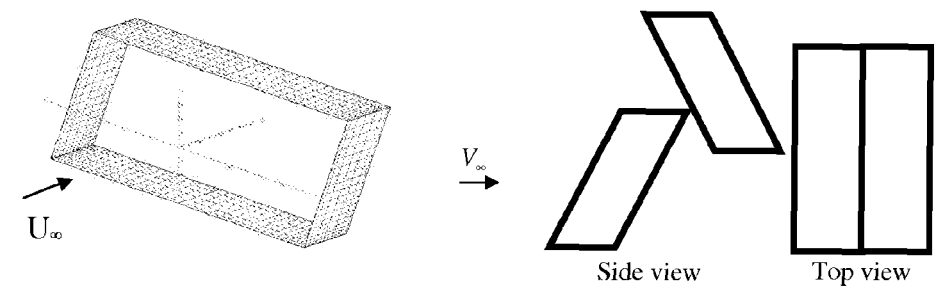
Fig. 35 (G) Model #7 Gap 2.0C, Stagger 1.0C
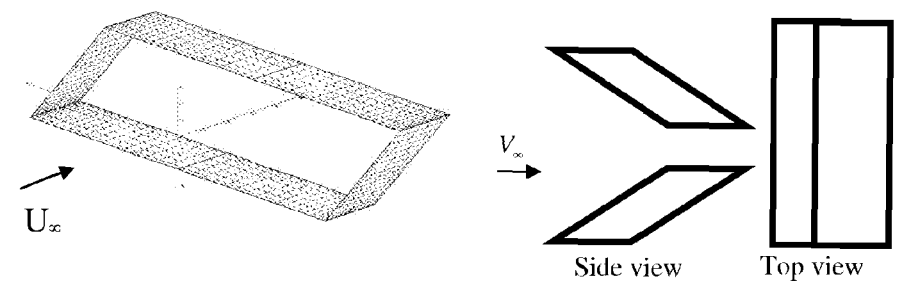
Fig. 35 (H) Model #8 Gap 1.0C, Stagger 1.5C

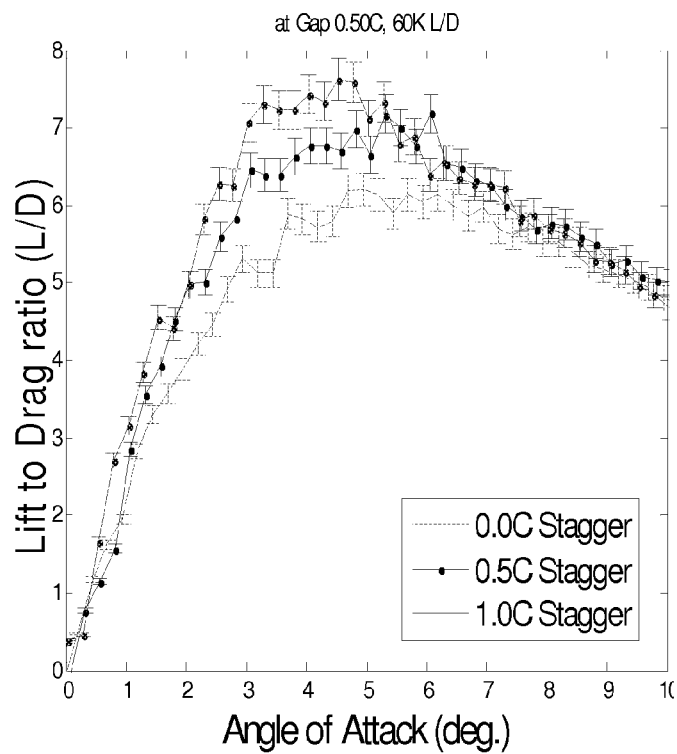
FIG. 40(A)
FIG. 40(B)
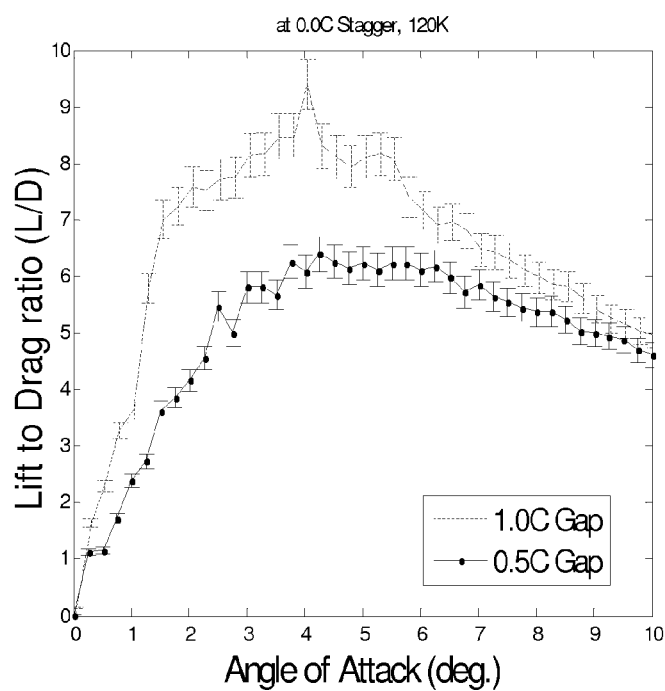

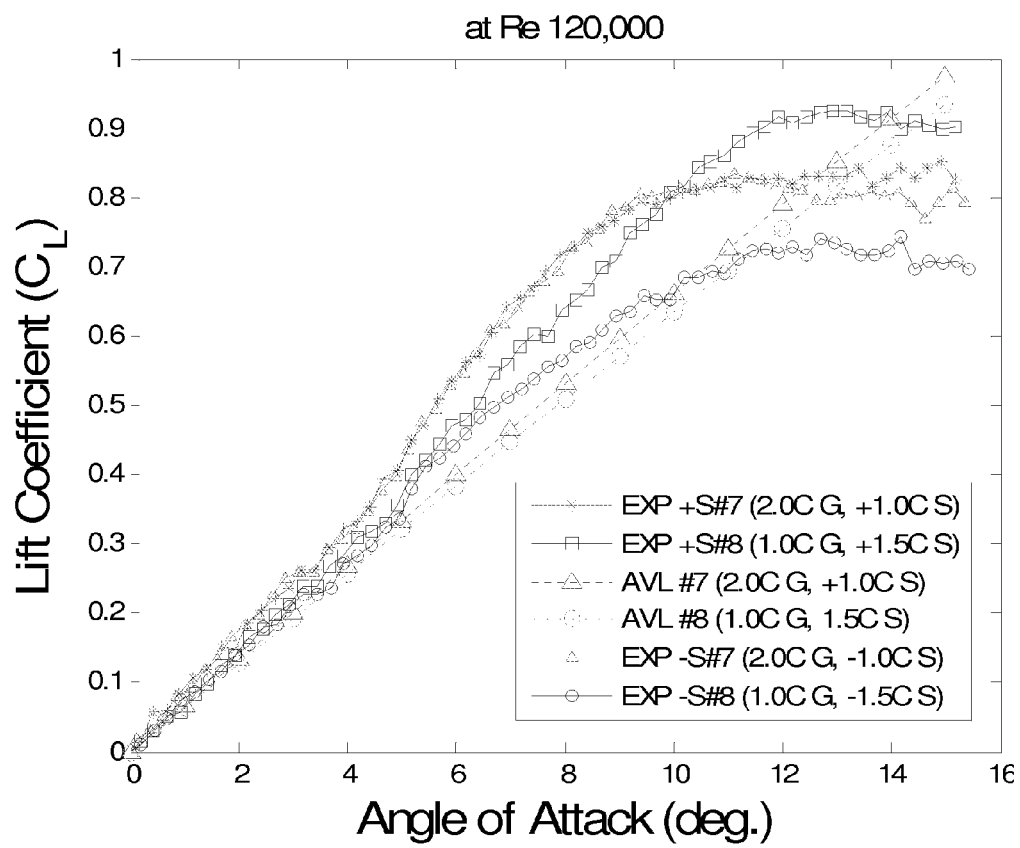
FIG. 56
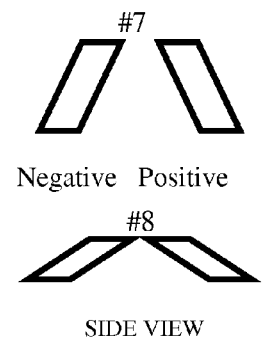

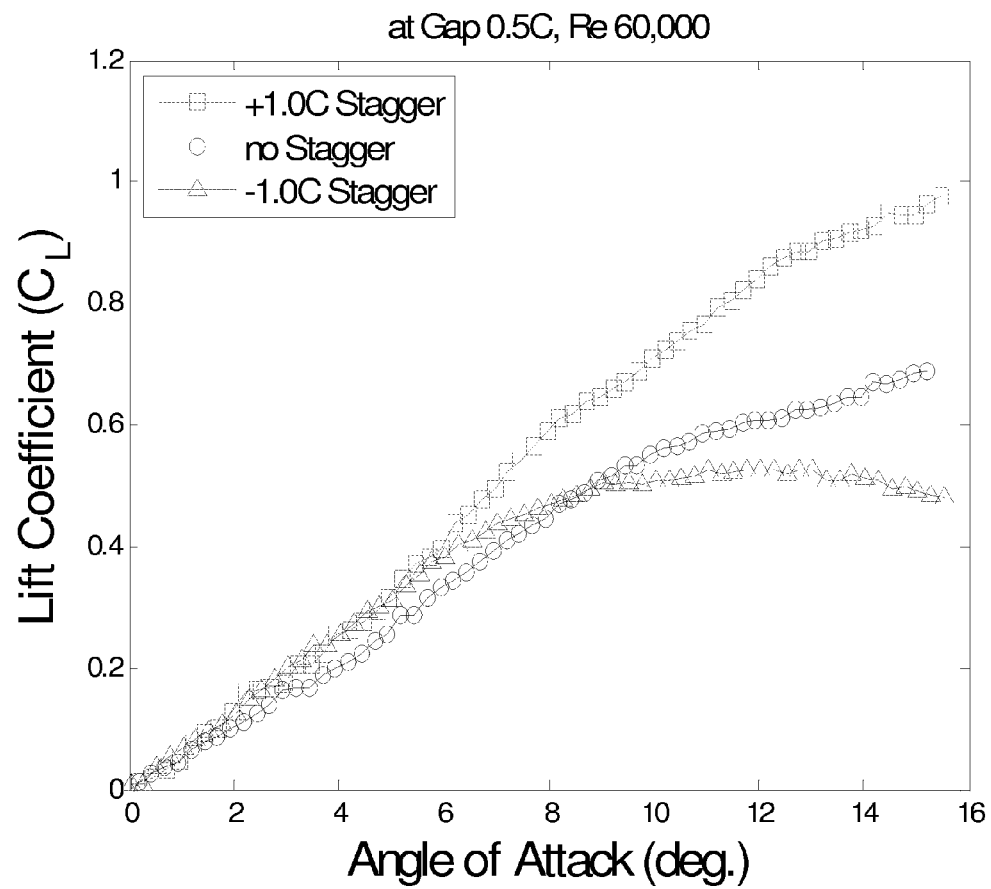
Fig. 57(A) Lift coefficient vs. AoA

FIG. 57(B) Drag Polar
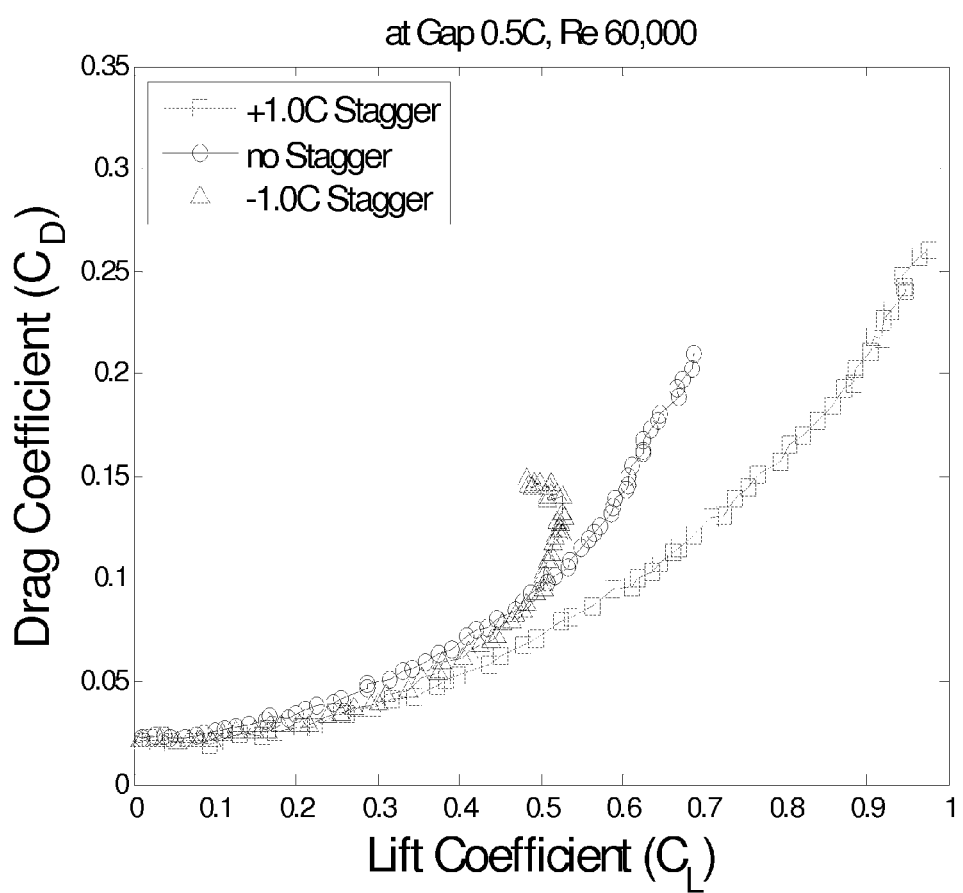

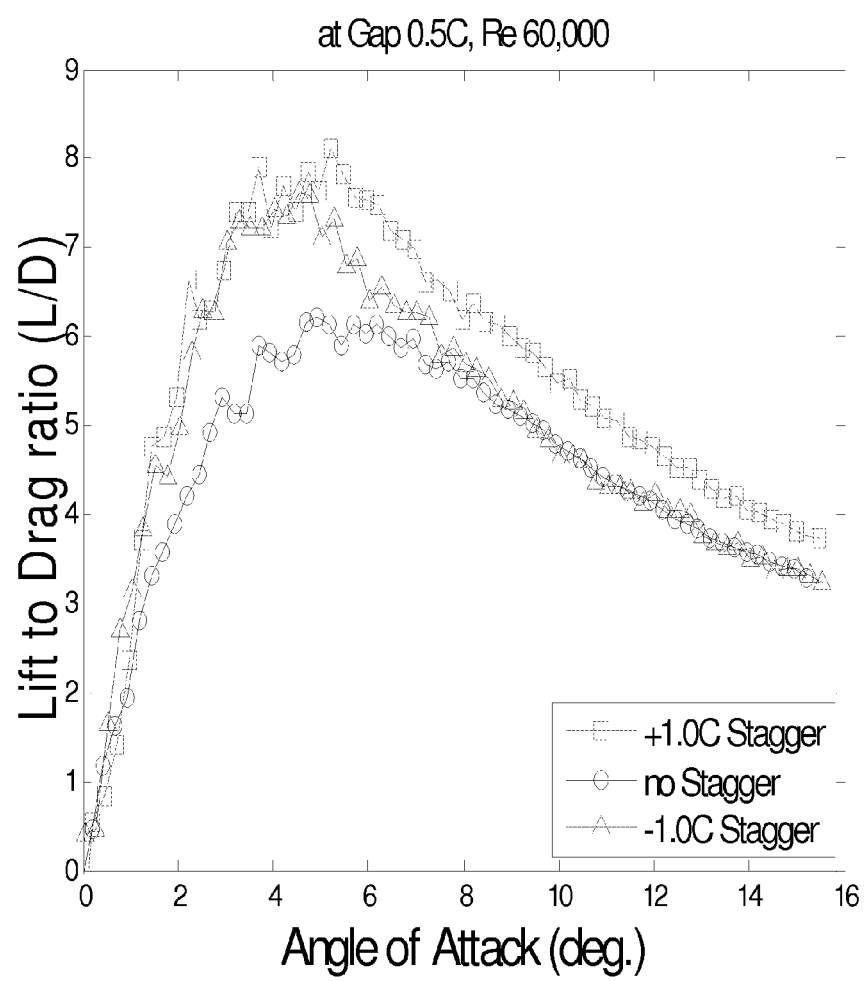
Fig. 57(C) L/D graph at Re 60,000 and 0.5C gap

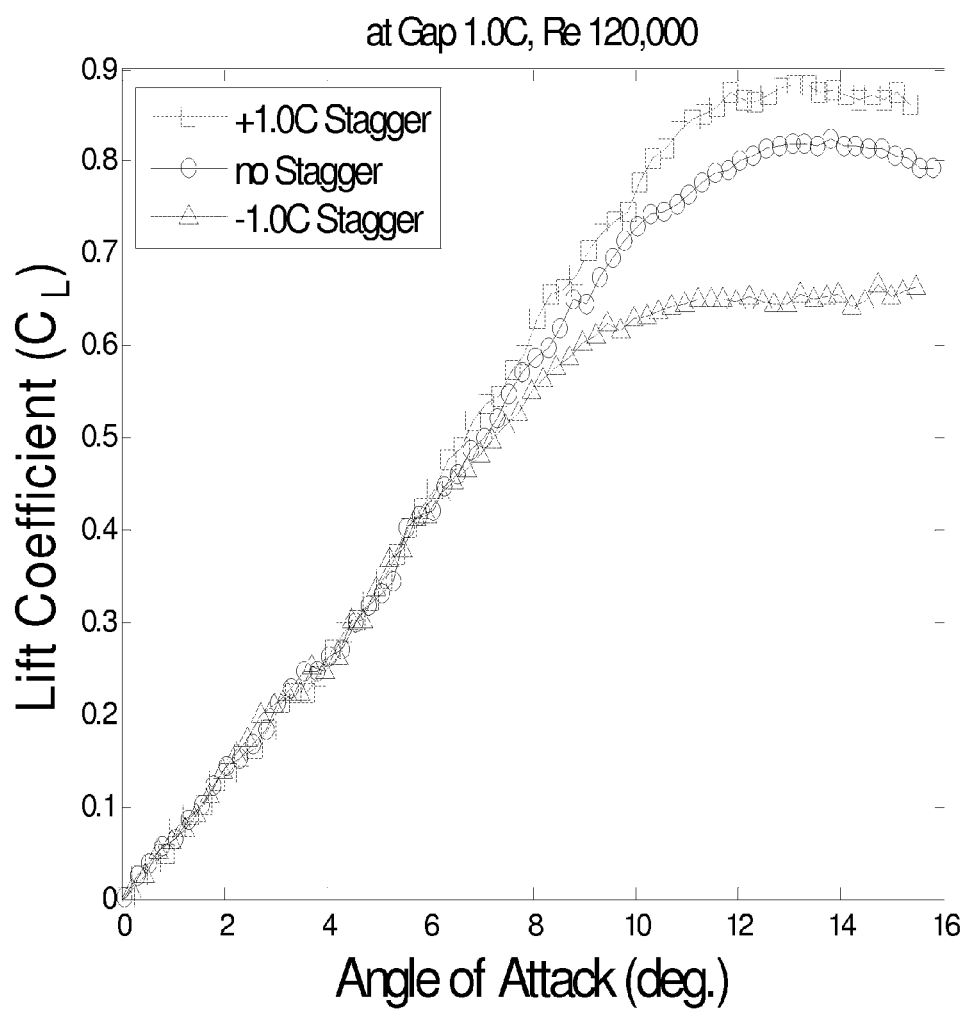
Fig. 58(A) Lift coefficient vs. AoA

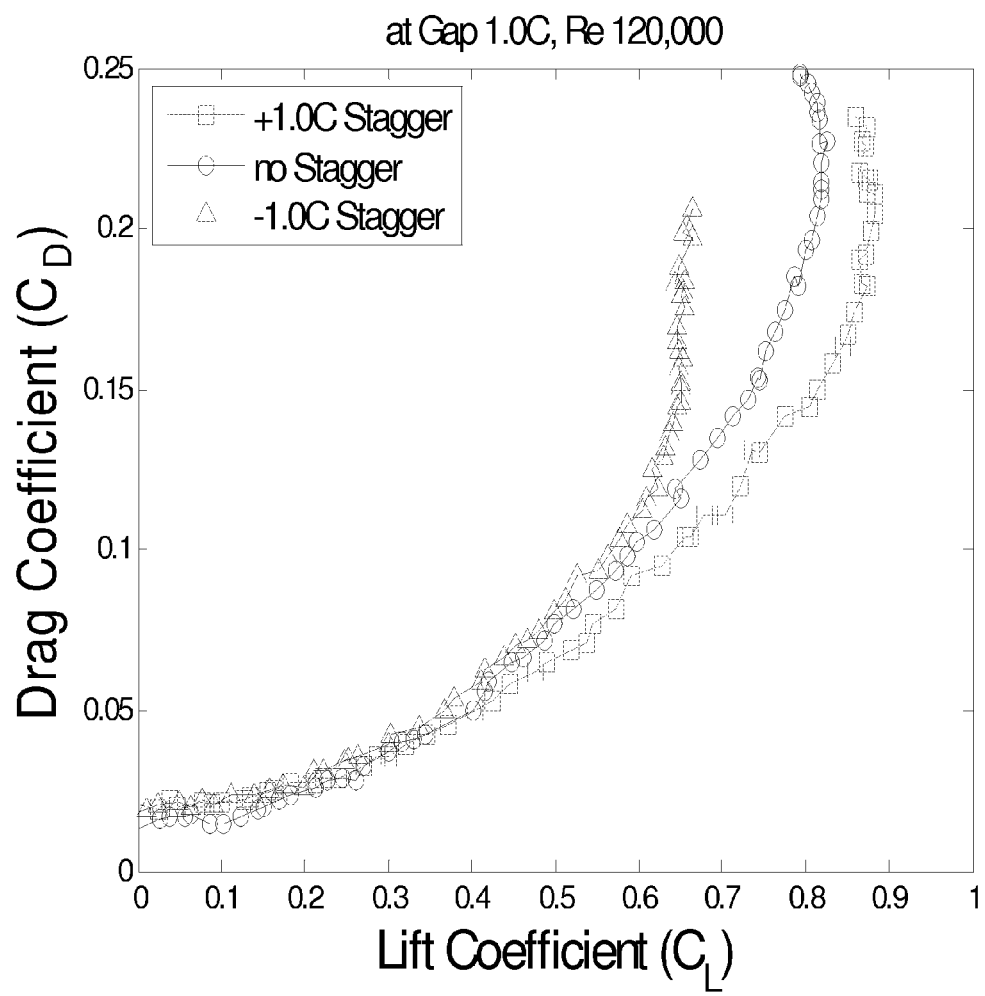
Fig. 58(B) Drag polar

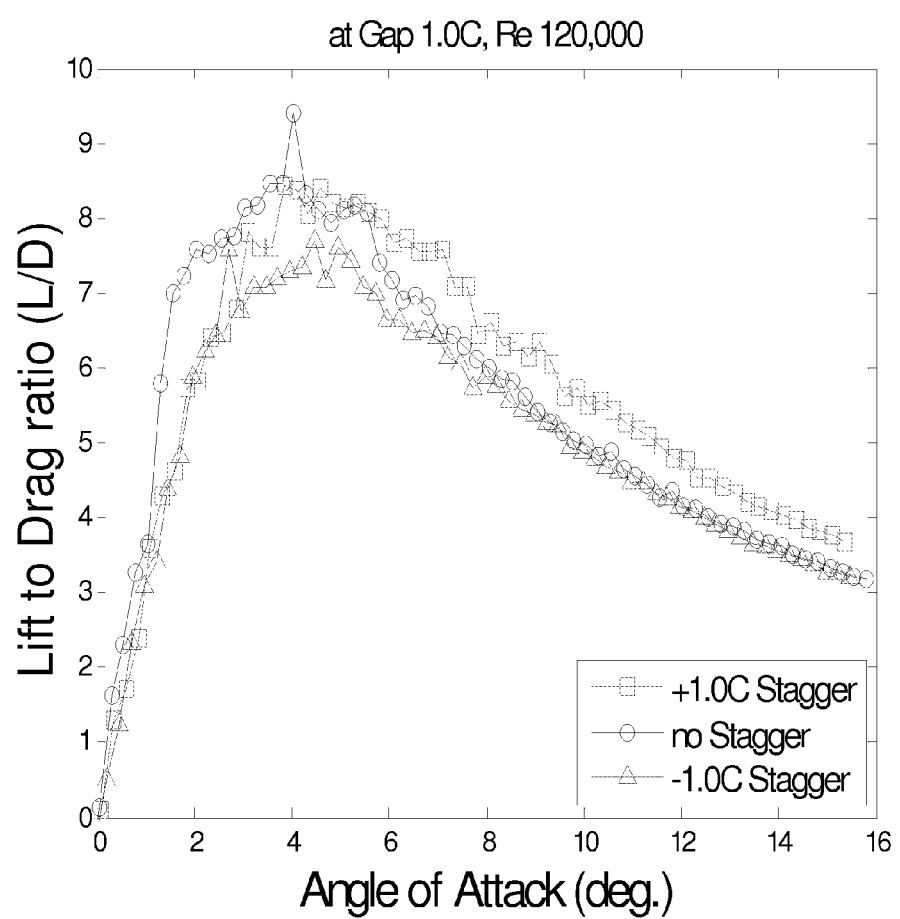
Fig. 58(C) L/D graph at Re 120,000 and 1C gap

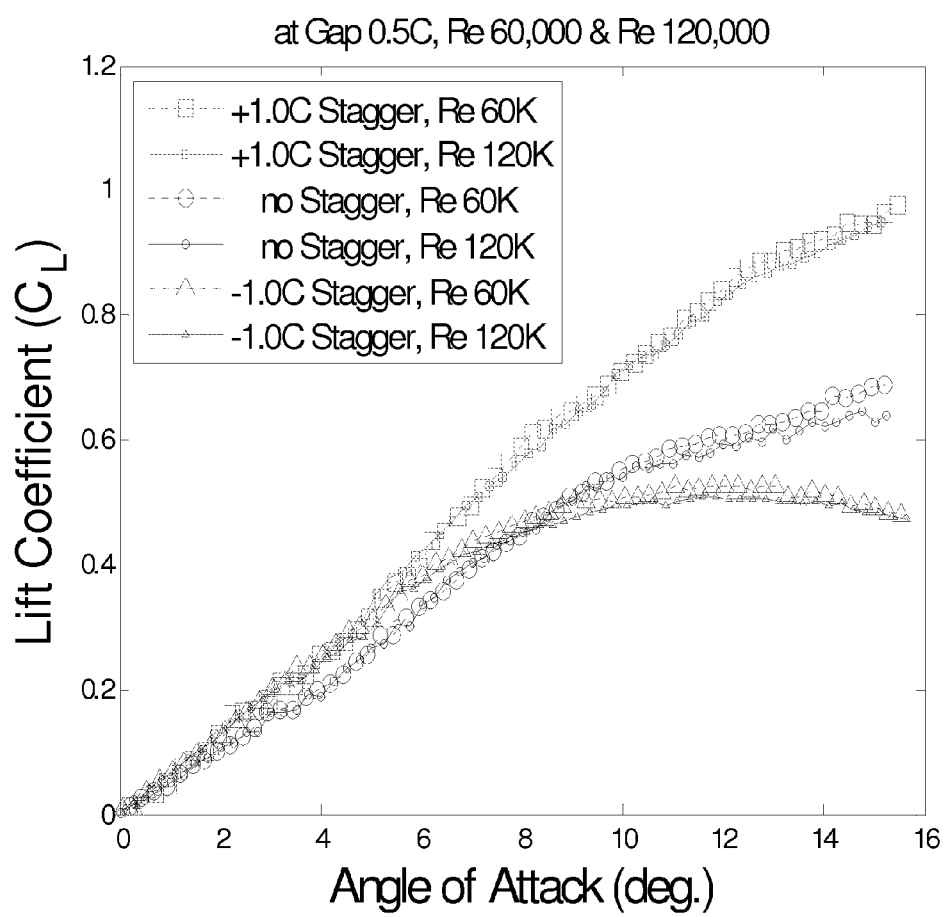
Fig. 58(D) Reynolds number effect

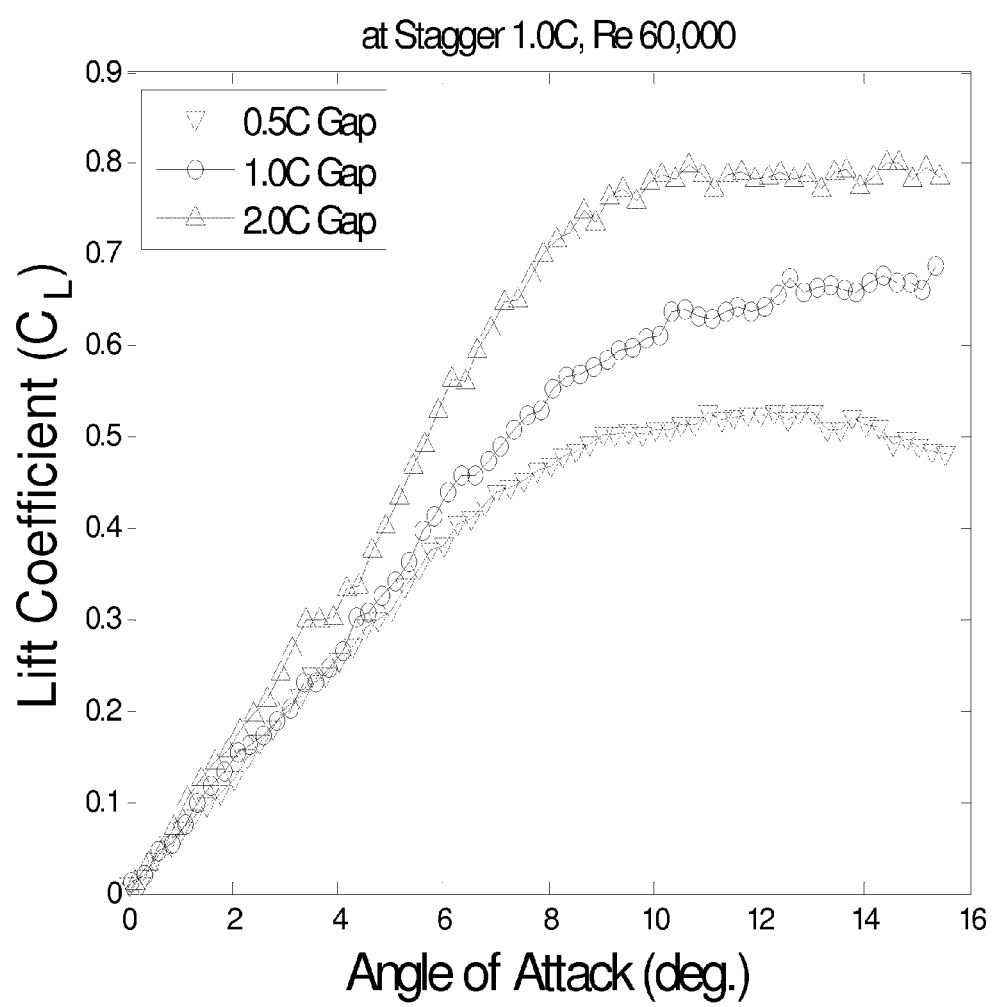
Fig. 59(A) Lift coefficient vs. AoA

Fig. 59(B) Drag polar
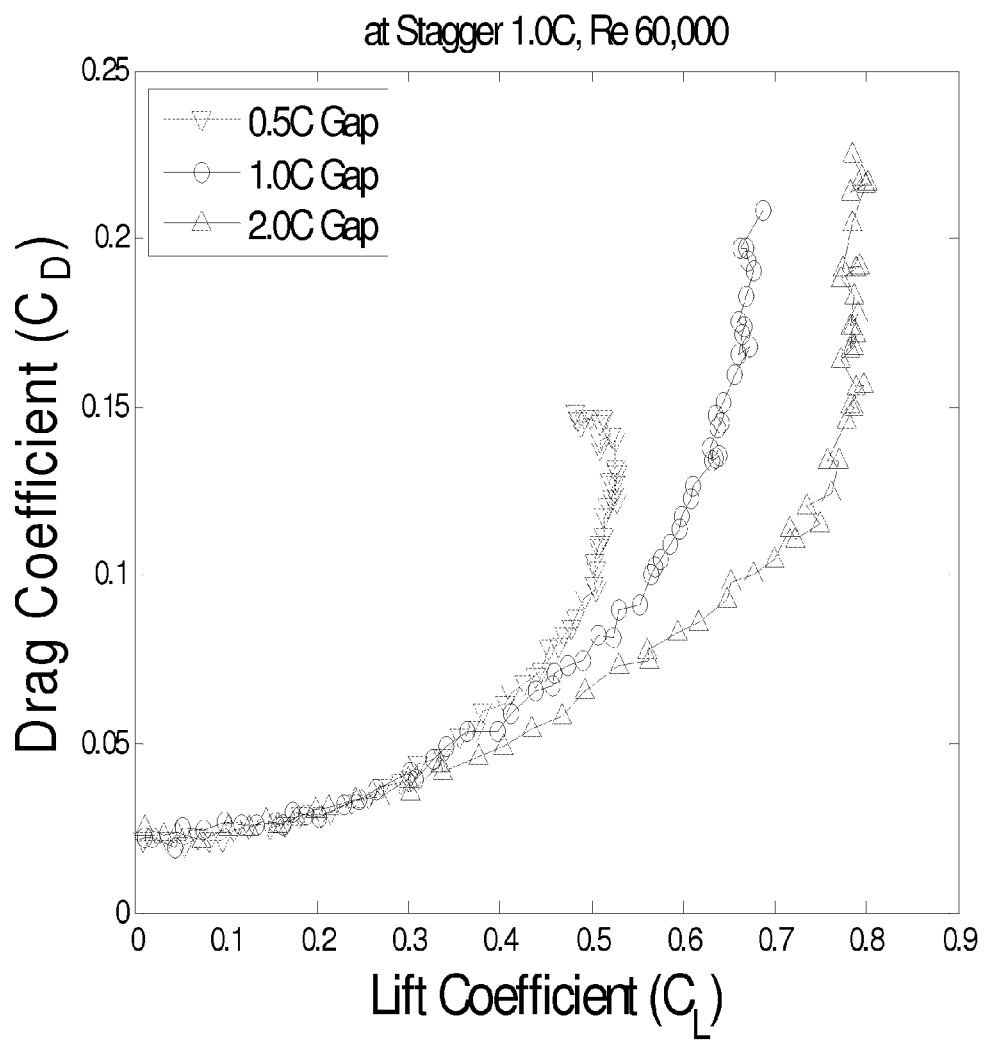

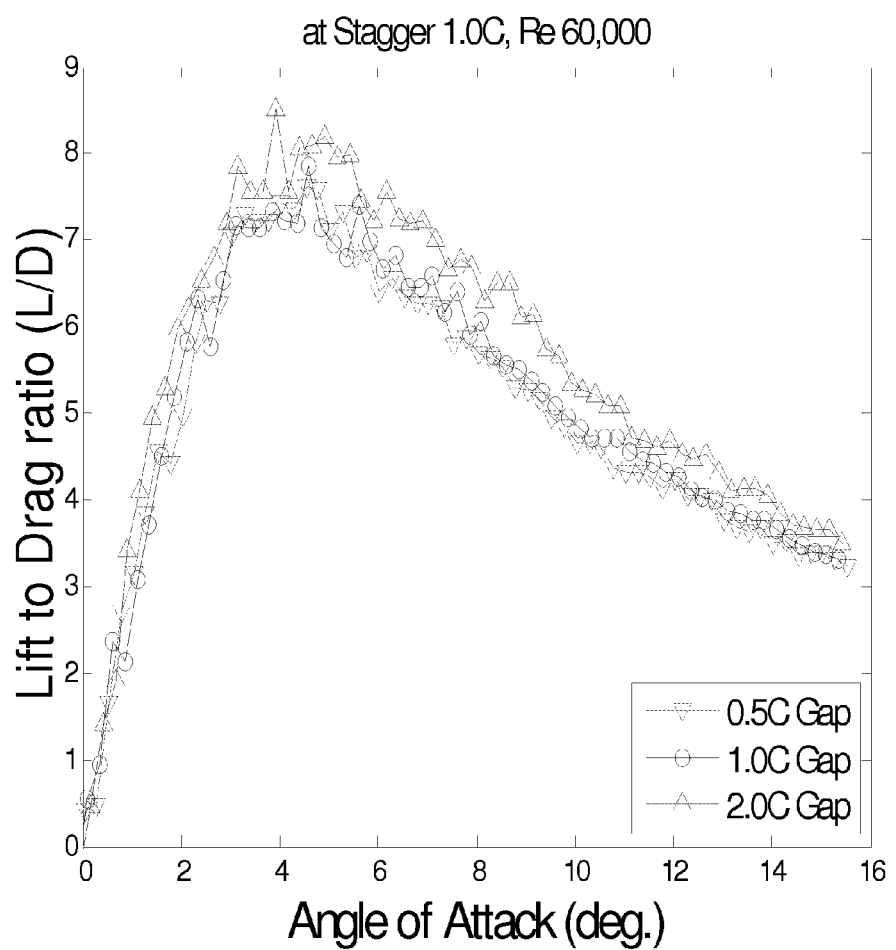
Fig. 59(C) L/D graph at Re 60,000 and 1.0C stagger

Fig. 60(A) Lift coefficient vs. AoA
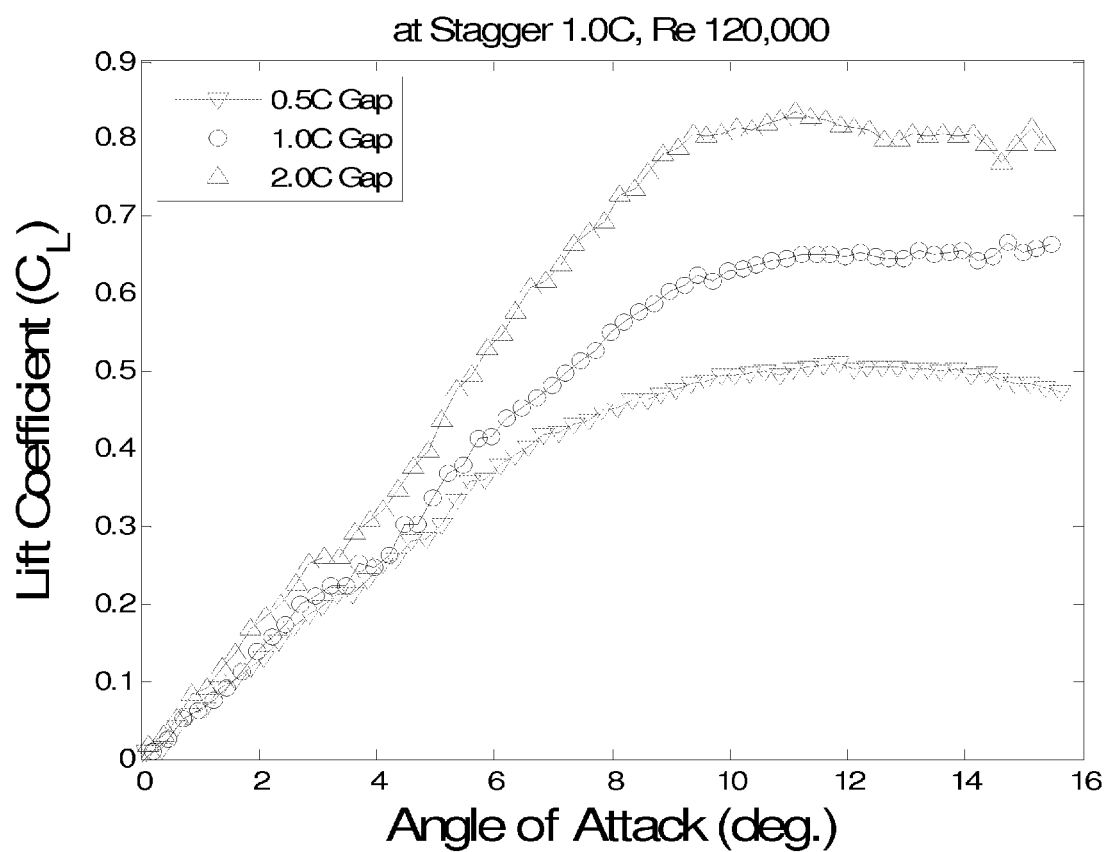

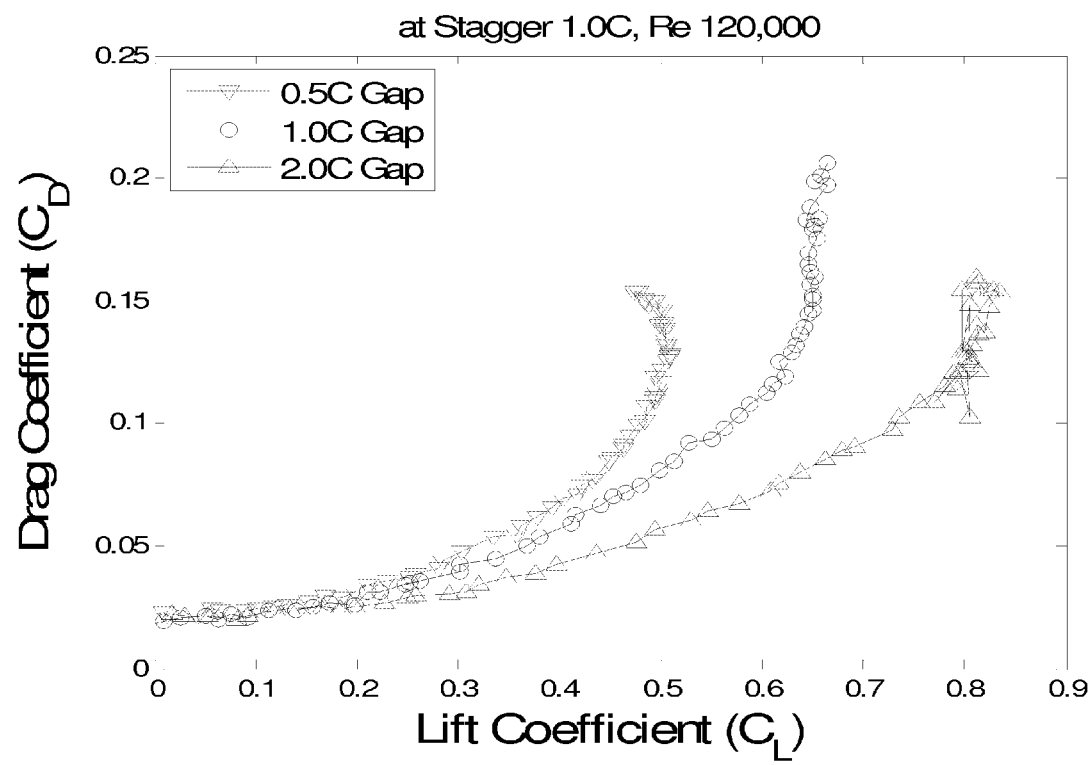
Fig. 60(B) Drag polar

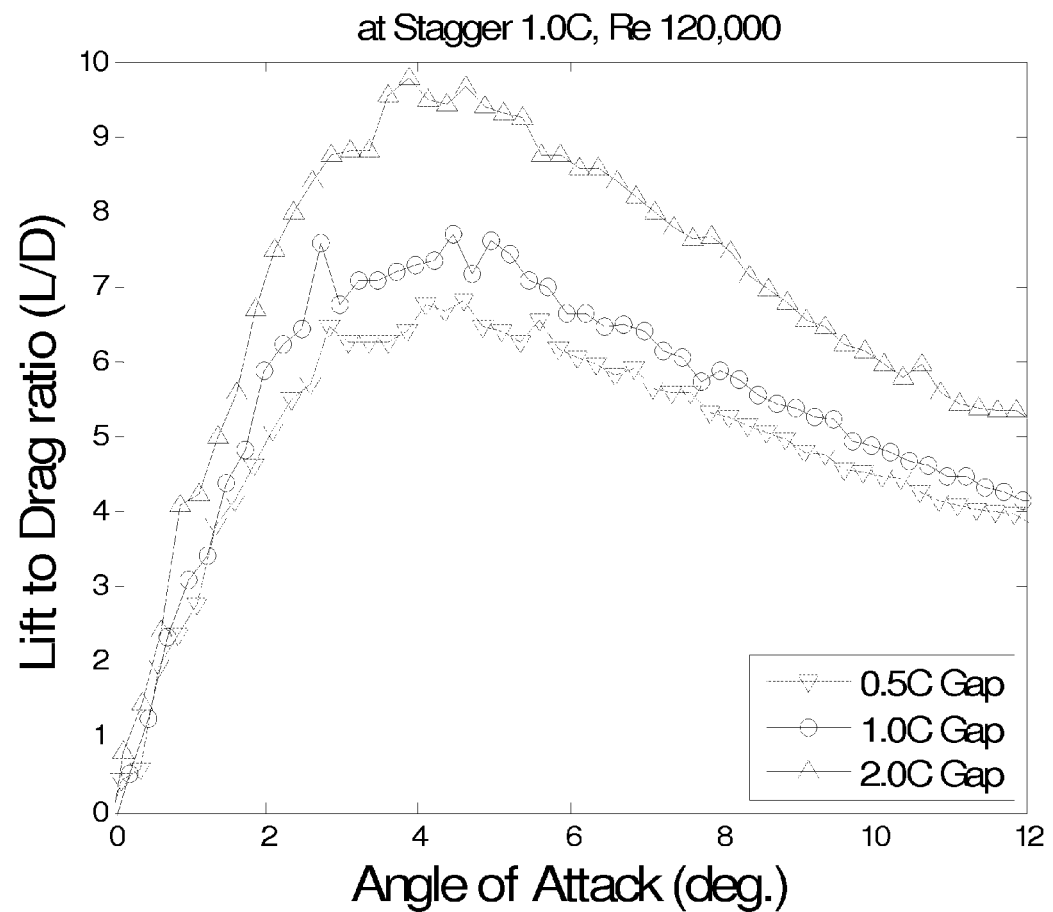
Fig. 60(C) L/D graph at Re 120,000 and 1C gap

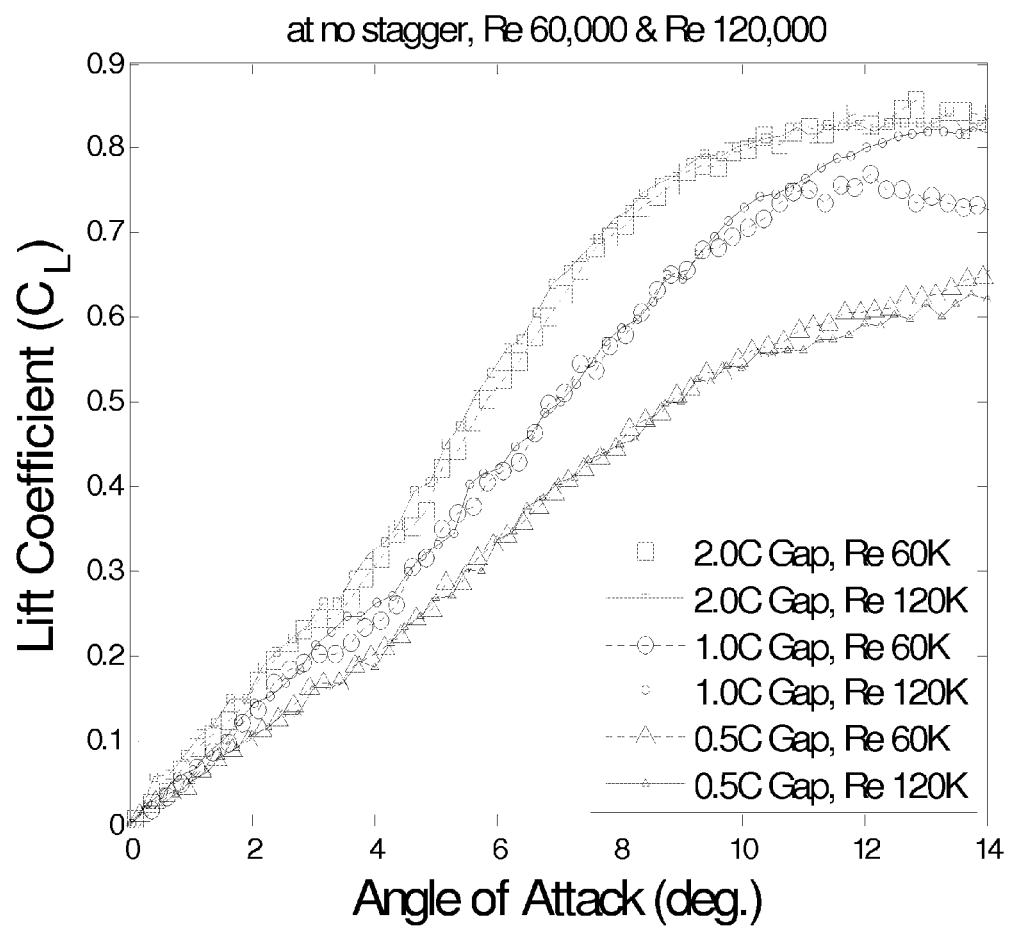
Fig. 60(D) Reynolds number effect

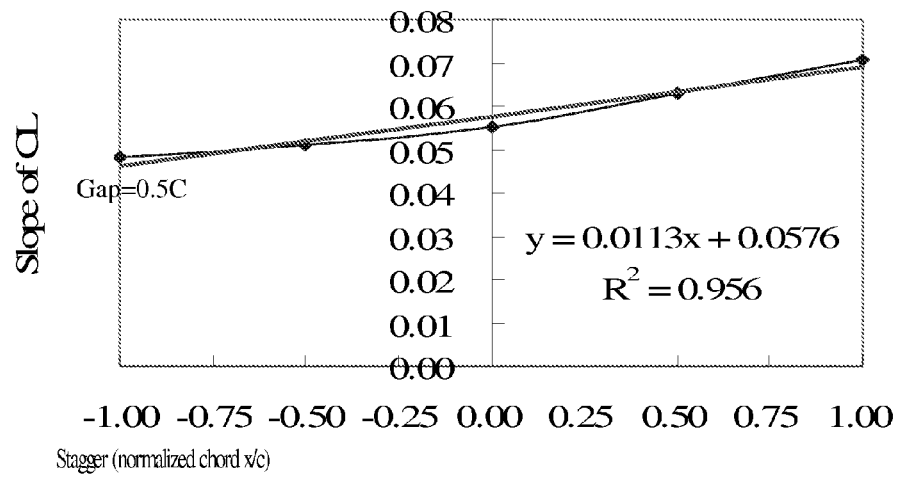
Fig. 61(A) At Gap = 0.5C
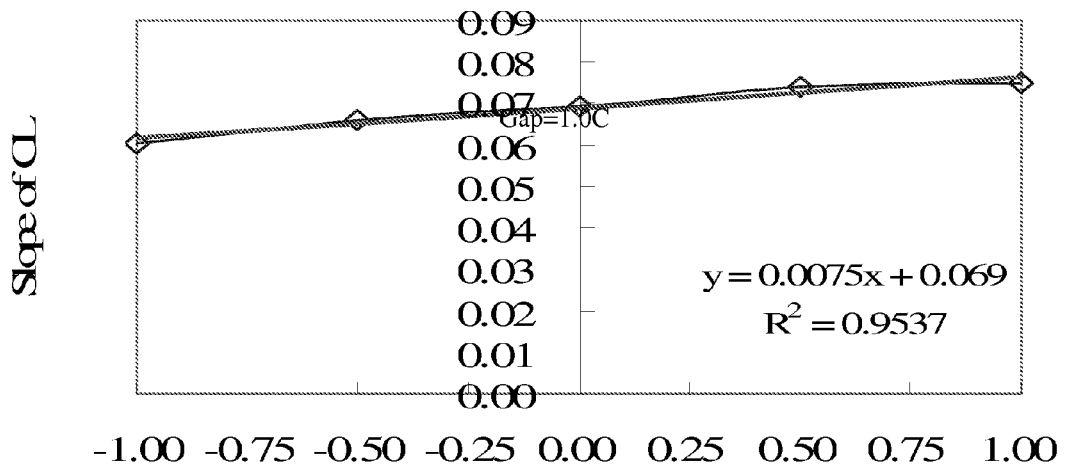
Fig. 61(B) At Gap = 1.0C

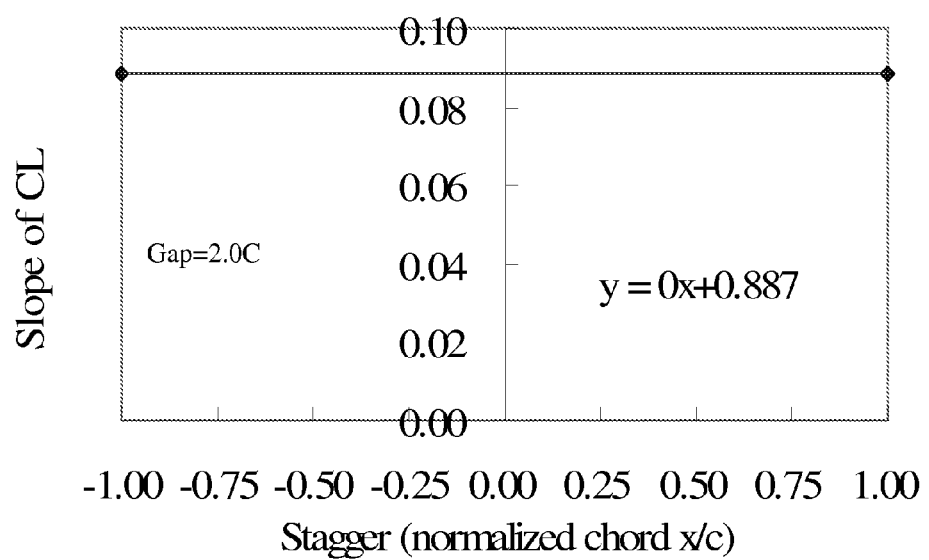
Fig. 61(C) At Gap = 2.0C

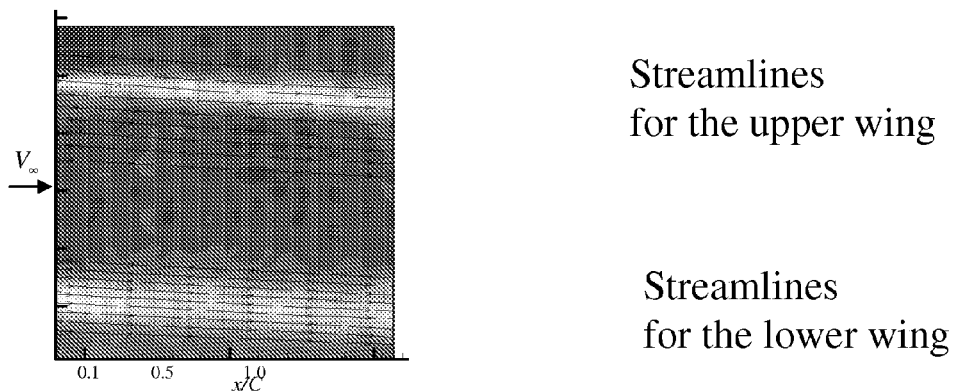
Streamlines for the upper wing
Streamlines for the lower wing
FIG. 66
(1) Model #4 (0.5C gap and (+) 1.0C stagger) at different angles of attack, Re 60,000.
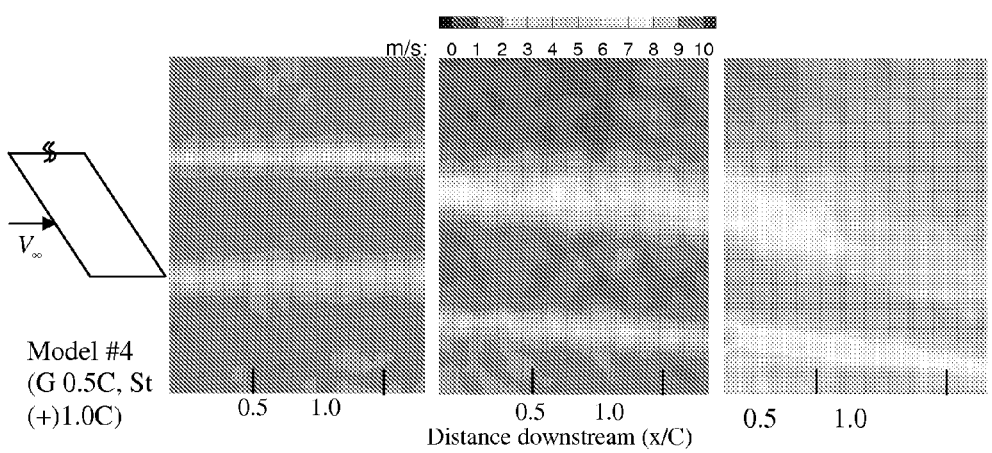
Fig. 67(A) at α= 0   Fig. 67(B) at α= 5   Fig.67(C) at α= 10

(2) Model #2 (0.5C gap and no stagger) at different angles of attack, Re 60,000.
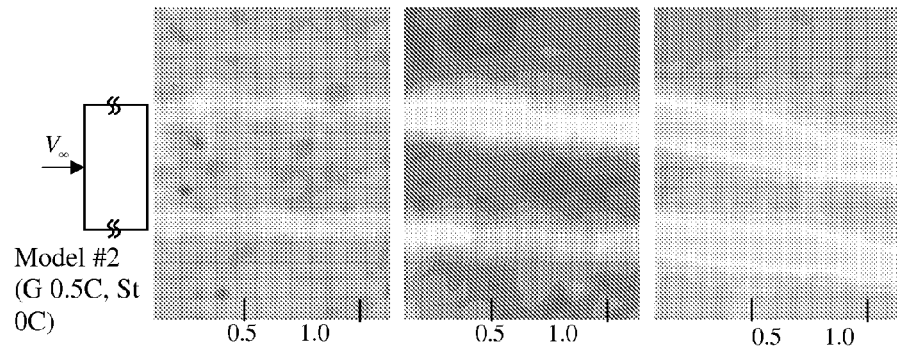
Fig. 68(A) at α= 0    Fig. 68(B) at α= 5    Fig.68(C) at α= 10
Distance downstream (x/C)
(3) Model #3 (0.5C gap and (-) 0.5C stagger) at different angles of attack, Re 60,000.
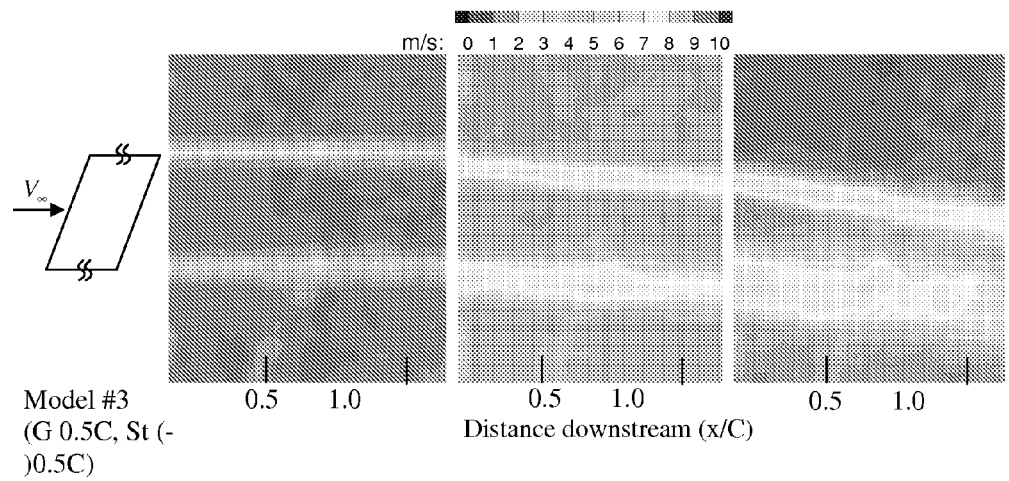
FIG. 69 (A) at α= 0    FIG. 69 (B) at α= 5    FIG. 69(C) at α= 10

(4) Model #4 (0.5C gap and 1.0C stagger) at different angles of attack, Re 60,000.
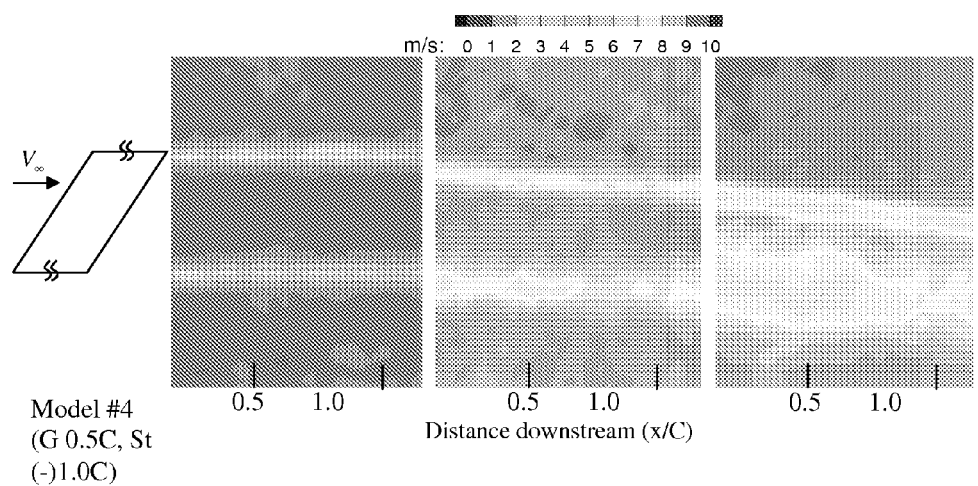
Fig. 70(A) at α= 0        Fig. 70(B) at α= 5        Fig.70(C) at α= 10

Fig. 73(A) (+) 1.0C stagger
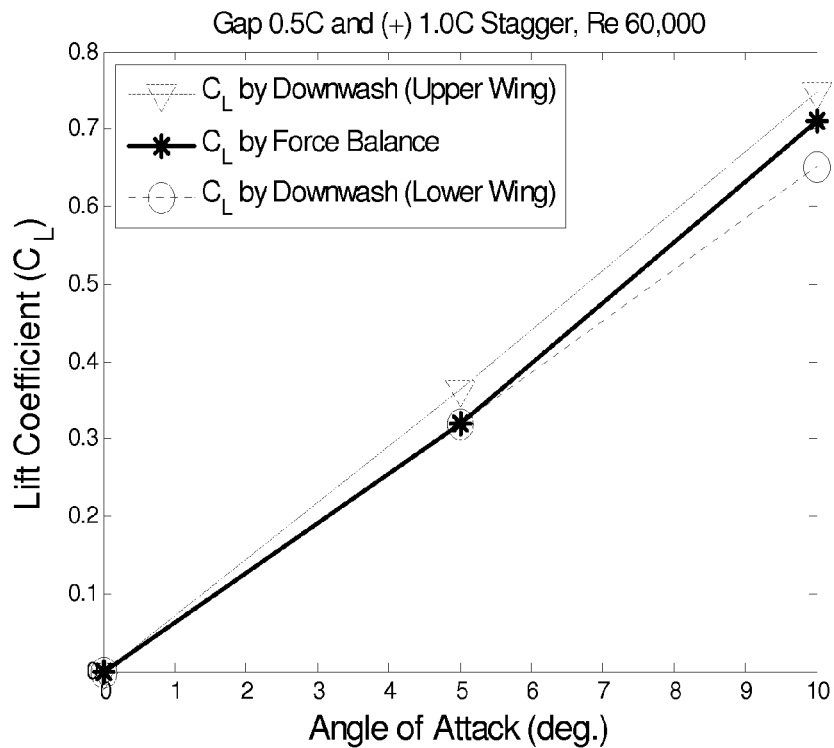
Fig. 73(B) (-) 0.5C stagger
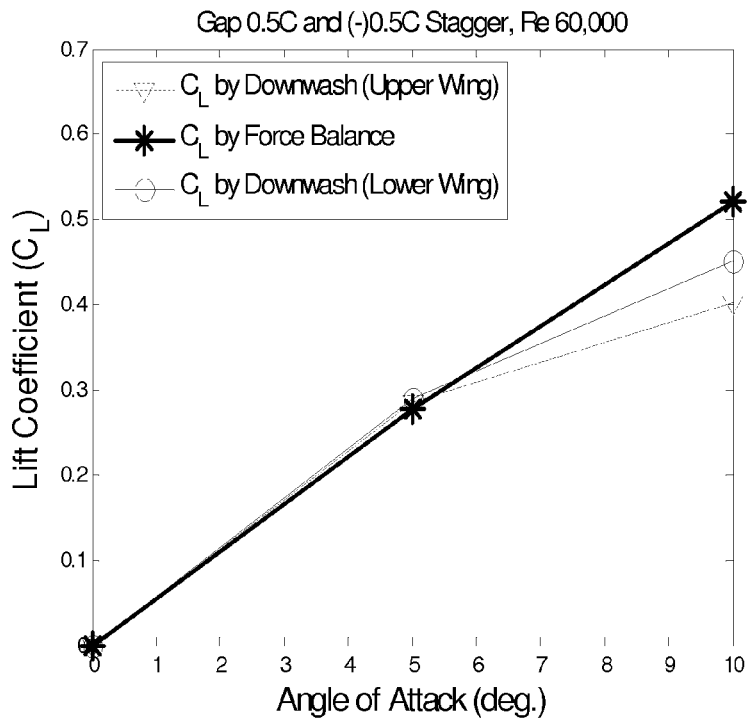

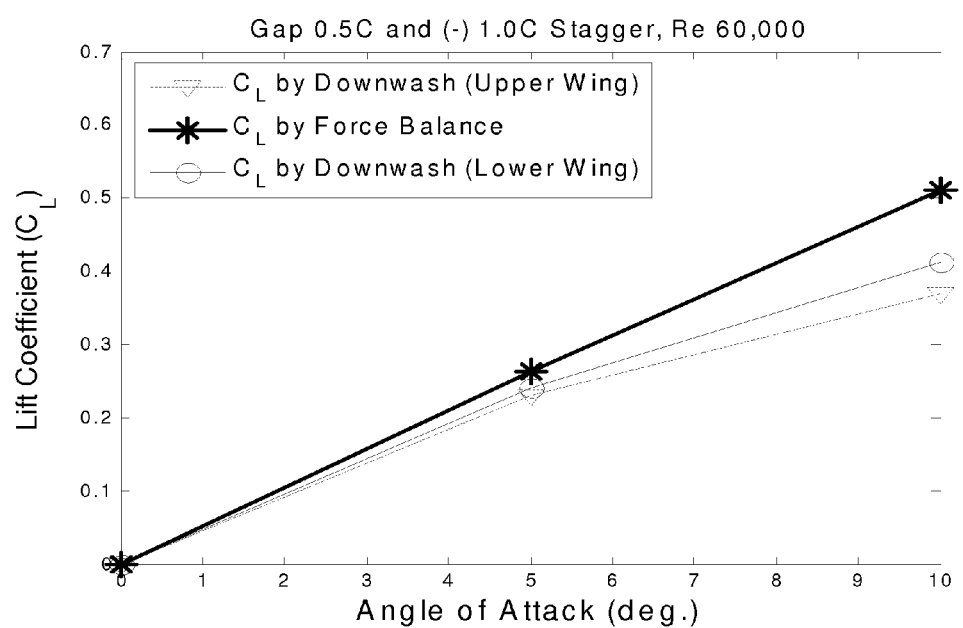
Fig.73(C) (-) 1.0Cstagger (1) Model #2 (0.5C gap and no stagger) at different angles of attack, Re 120,000.

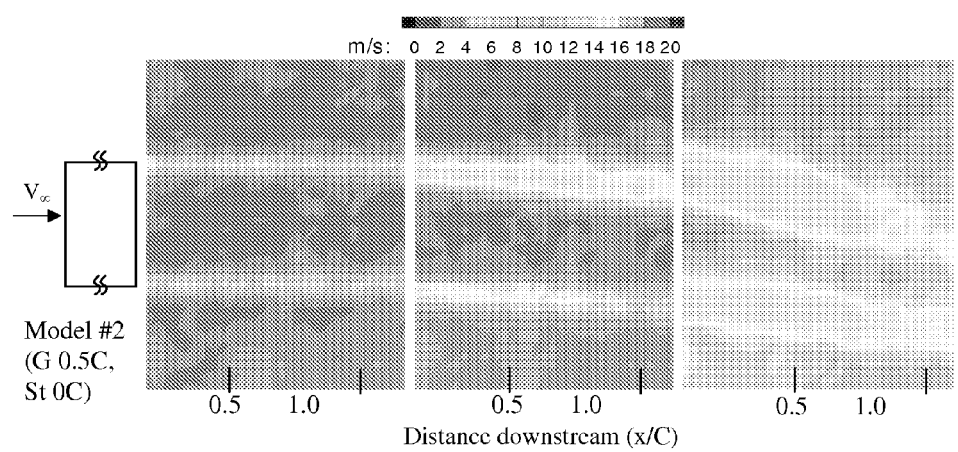
Fig. 76(A) at α= 0          Fig. 76(B) at α= 5          Fig.76(C) at α= 10

(2) Model #1 (1.0C gap and no stagger) at different angles of attack, Re 120,000.
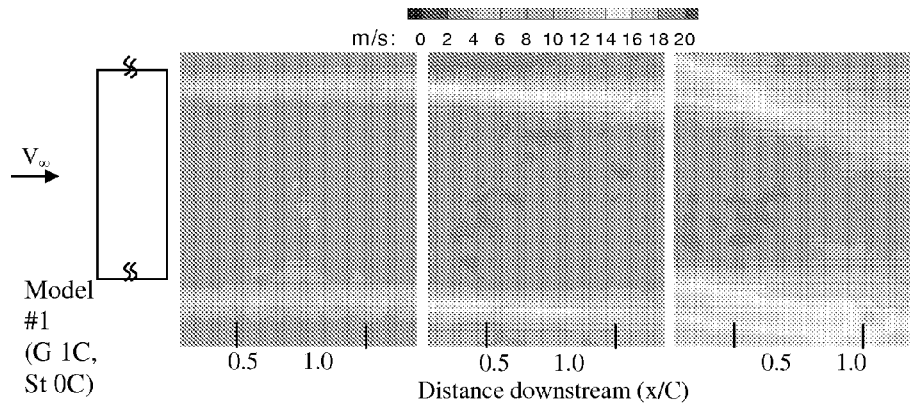
Fig. 77(A) at α= 0     Fig.77(B) at α= 5     Fig.77(C) at α= 10
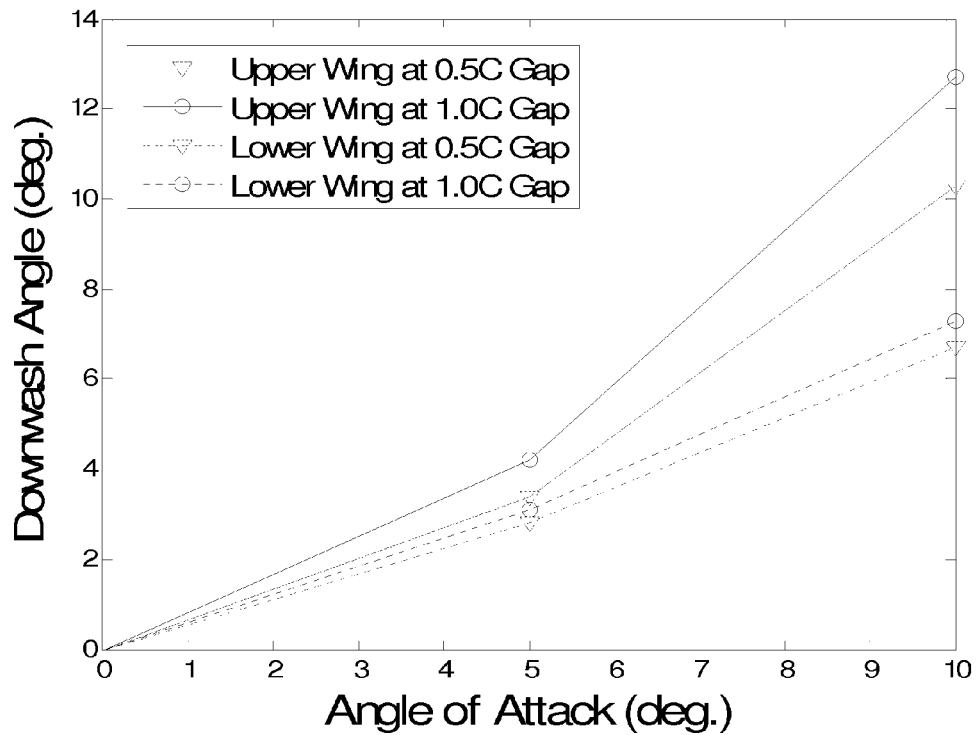
FIG. 78

(1) Model #4 (0.5C gap and (-) 1.0C stagger) at different angles of attack, Re 120,000.
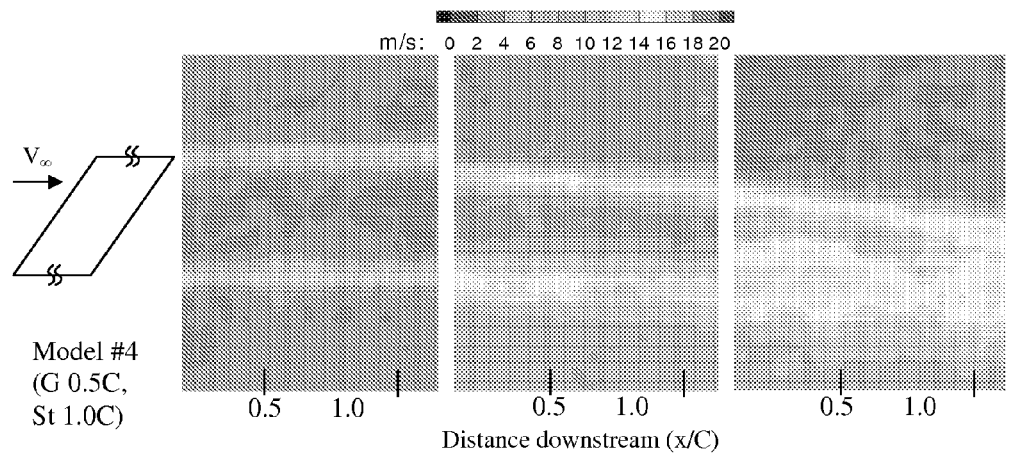
Fig.79 (A) at α= 0   Fig.79(B) at α= 5   Fig79 (C) at α= 10
(2) Model #6 (1.0C gap and (-) 1.0C stagger) at different angles of attack, Re 120,000.
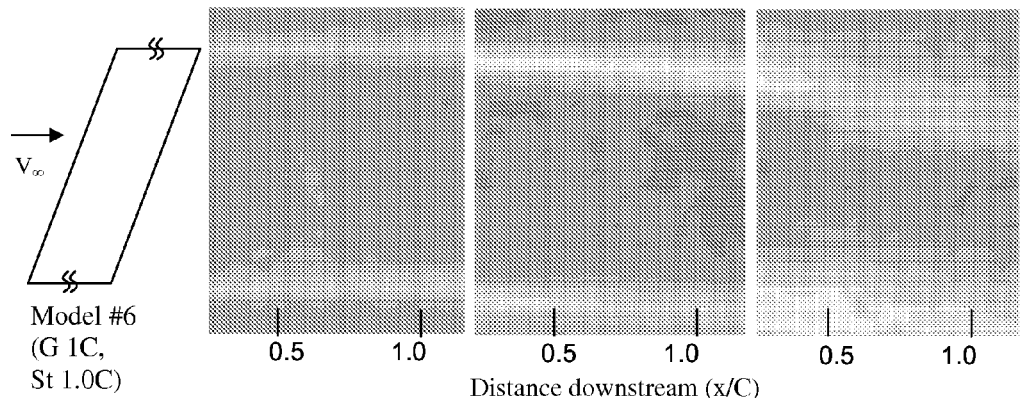
Fig.80(A) at α= 0   Fig.80(B) at α= 5   Fig.80(C) at α= 10

Fig. 84(A) Downwash angle vs. AoA
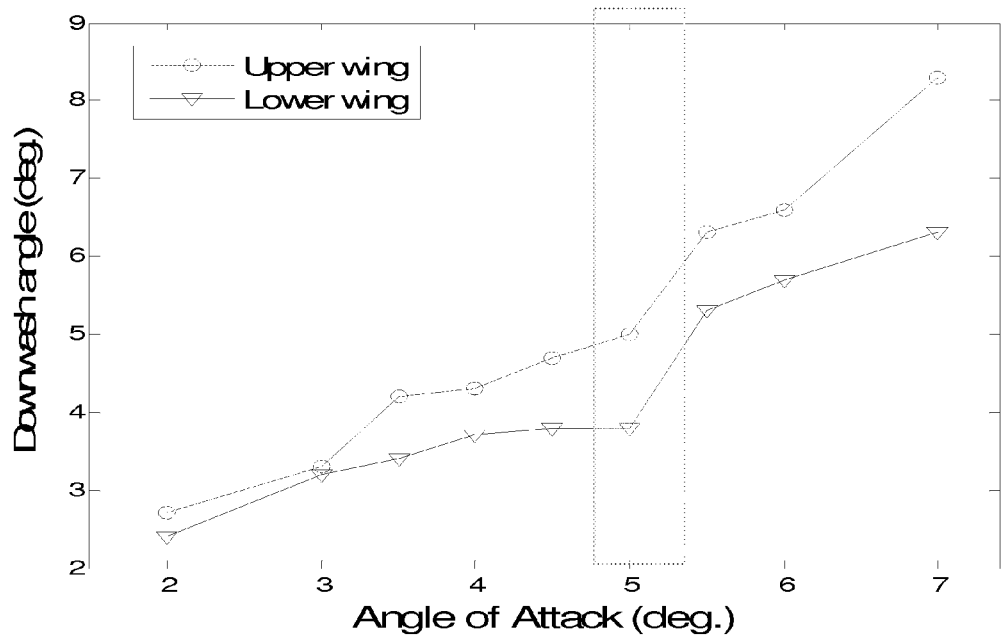
Fig. 84(B) Downwash angle gradient vs. AoA
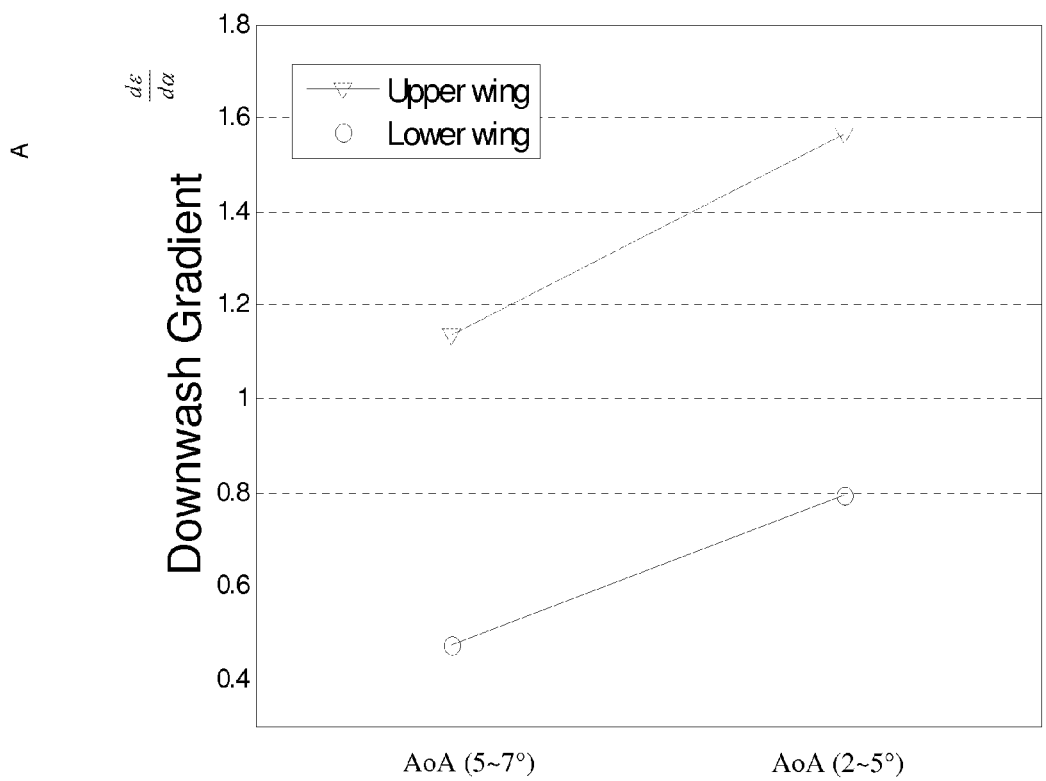

Fig. 87(A) CD vs. AoA for no stagger and 0.5C gap
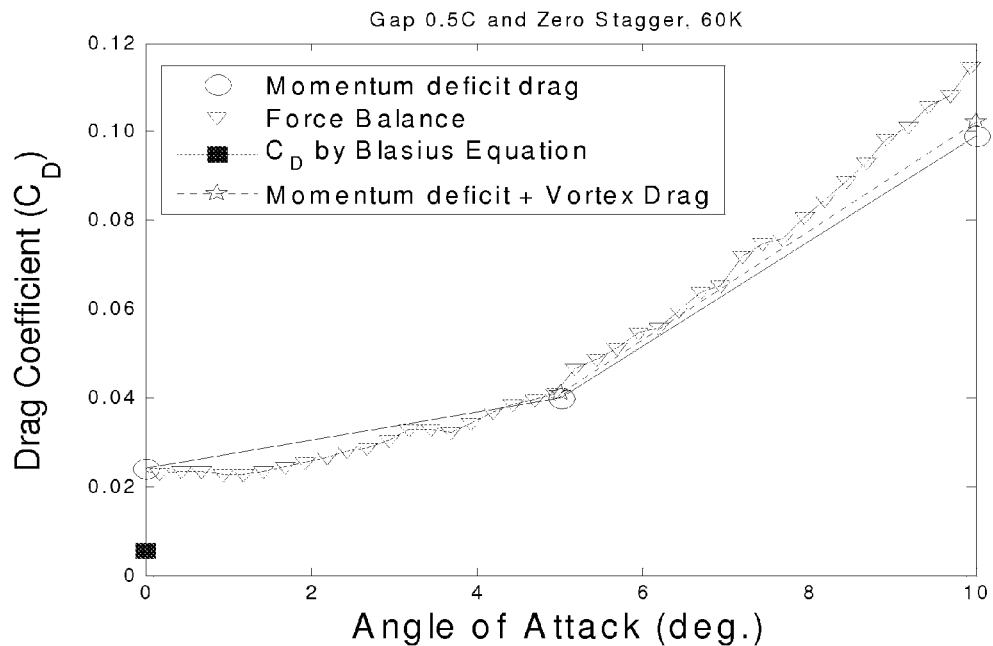
Fig. 87(B) CD vs. AoA for (-) 0.5C stagger and 0.5C gap
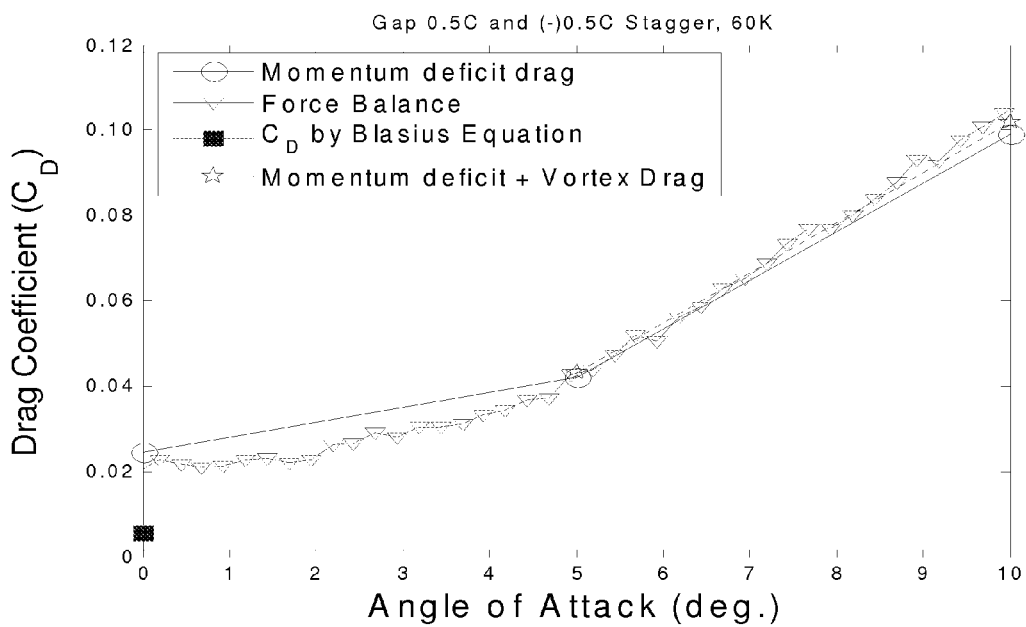

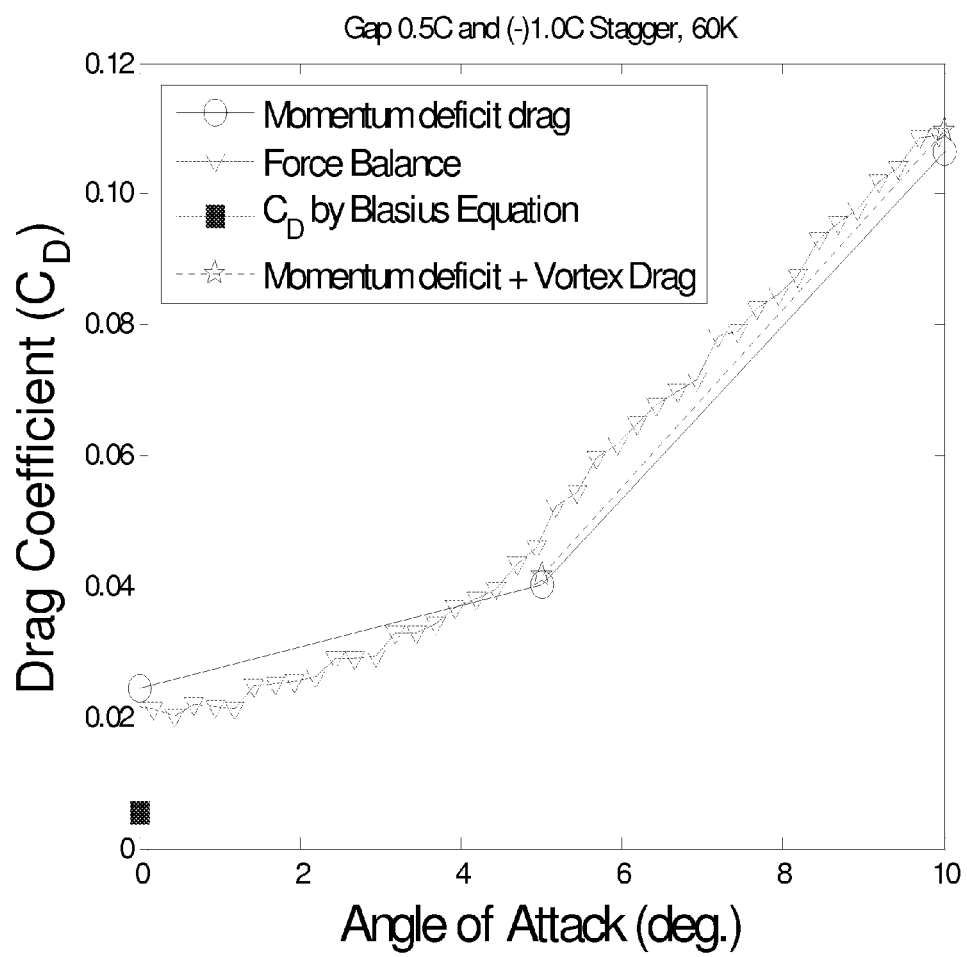
Fig. 87(C) CD vs. AoA for (-) 1.0C stager and 0.5C gap

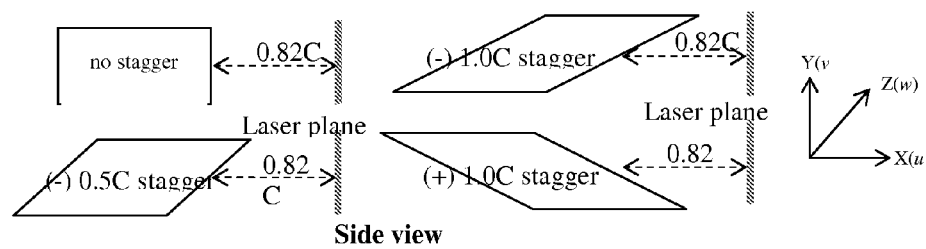
FIG. 89
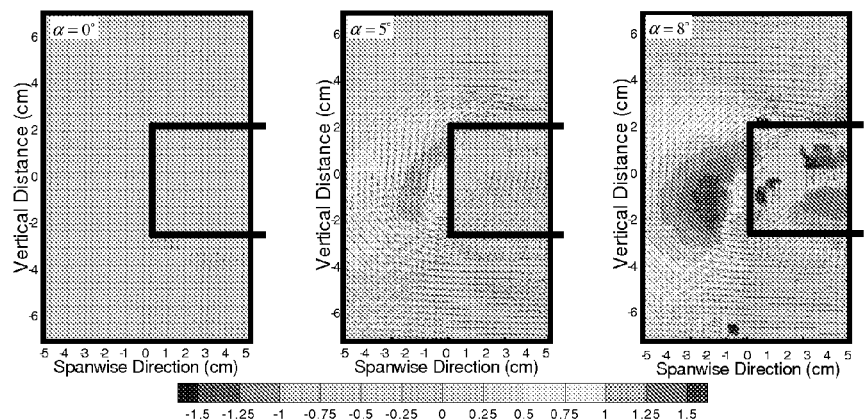
Fig. 90(A) Vertical velocity component with (-) 1.0C stagger, 0.5C gap configuration

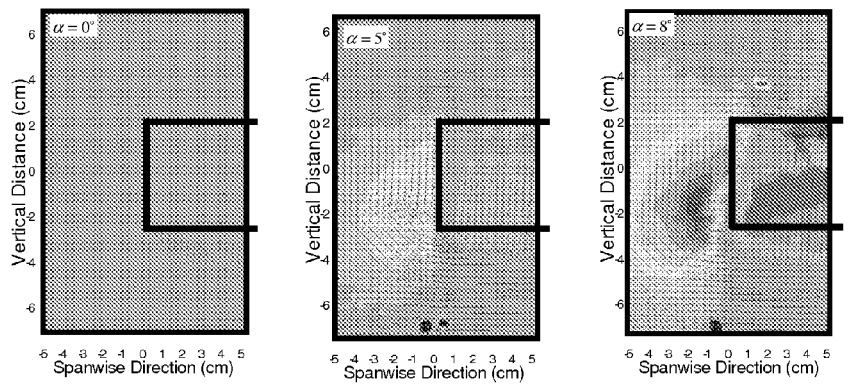
Fig. 90(B) Vertical velocity component with (-) 0.5C stagger, 0.5C gap configuration
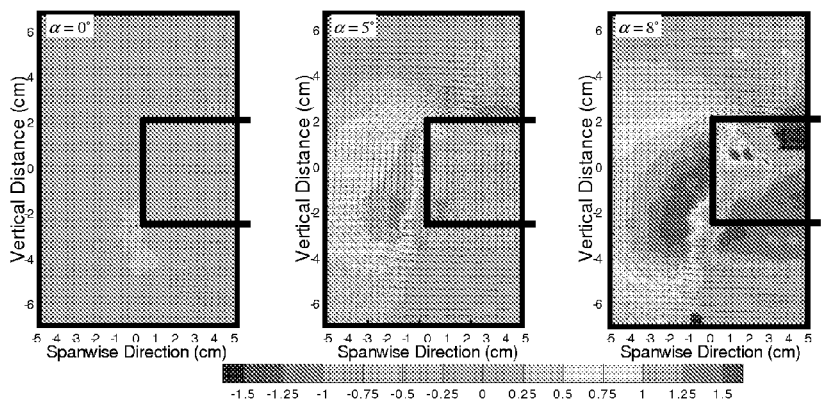
Fig. 90(C) Vertical velocity component with no stagger, 0.5C gap configuration

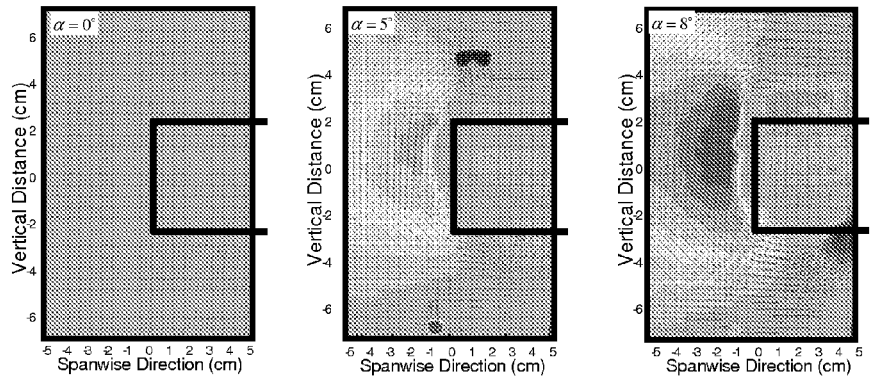
Fig. 90(D) Vertical velocity component with (+) 1.0C stagger, 0.5C gap configuration
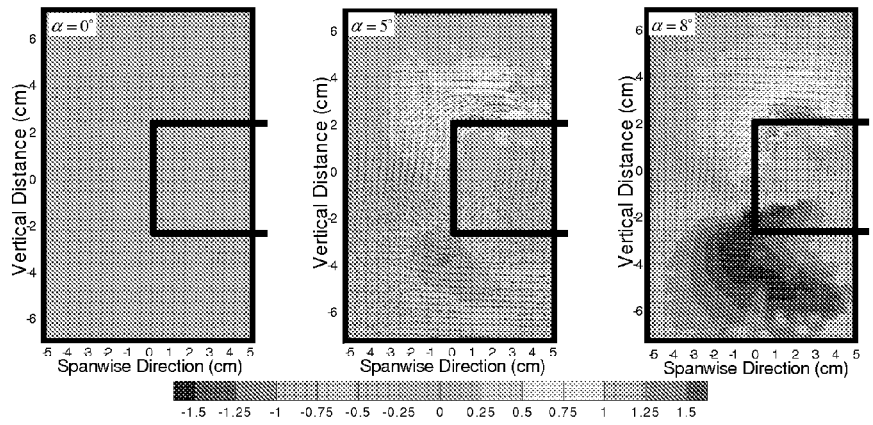
Fig. 91(A) Spanwise velocity component with (-) 1.0C stagger, 0.5C gap configuration

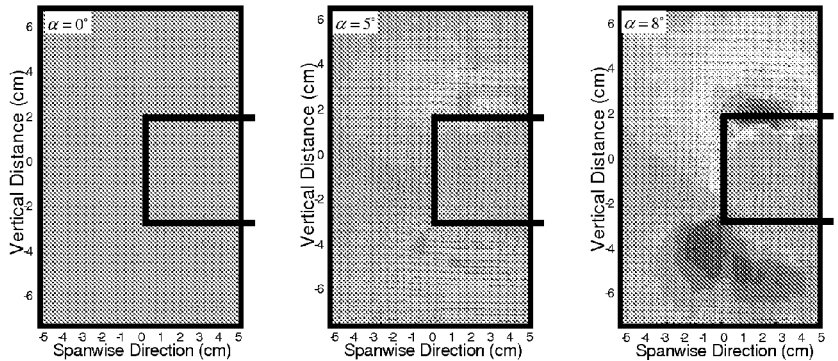
Fig. 91(B) Spanwise velocity component with (-) 0.5C stagger, 0.5C gap configuration
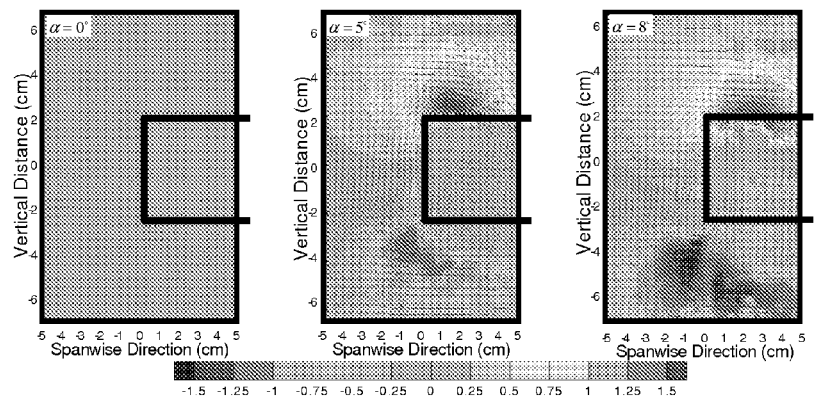
Fig. 91(C) Spanwise velocity component with no stagger, 0.5C gap configuration

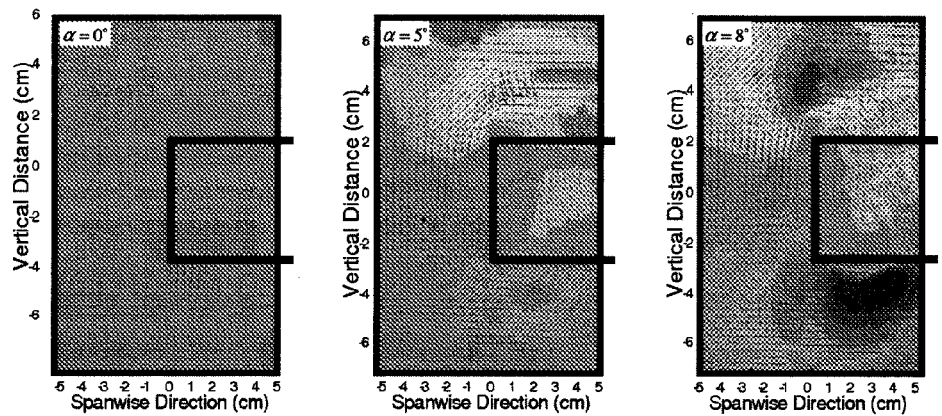
Fig. 91(D) Spanwise velocity component with (+) 1.0C stagger, 0.5C gap configuration
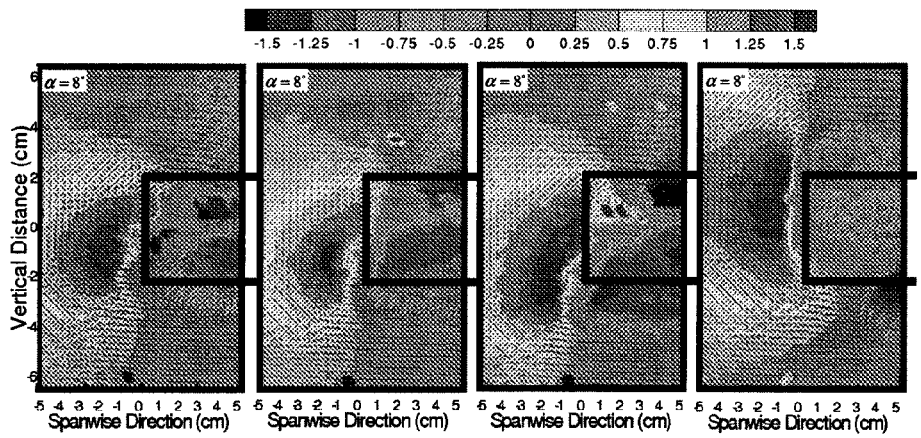
FIG. 92

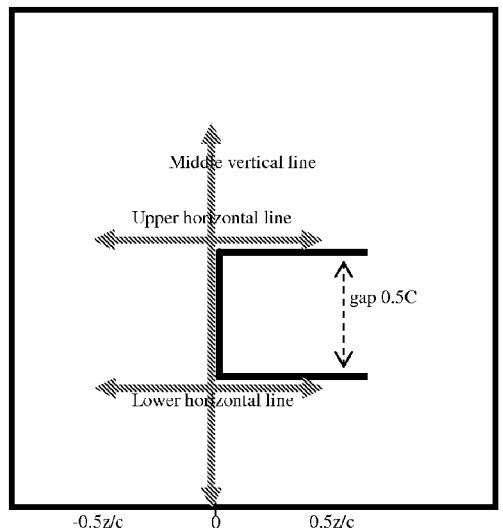
FIG. 94
FIG. 95
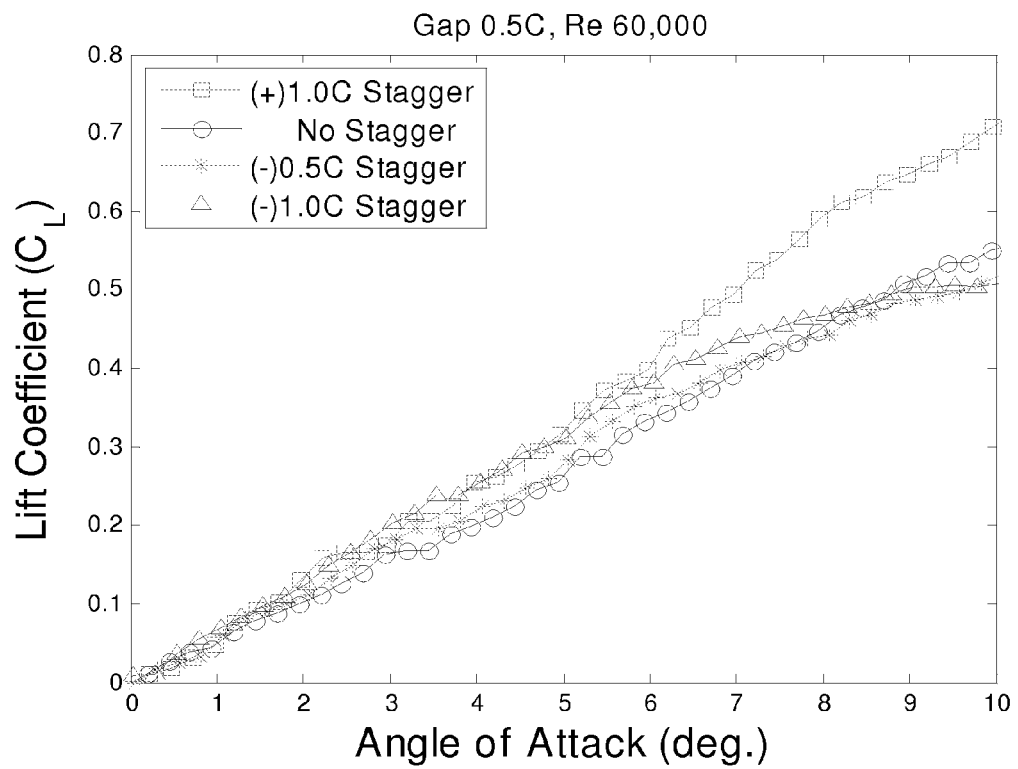

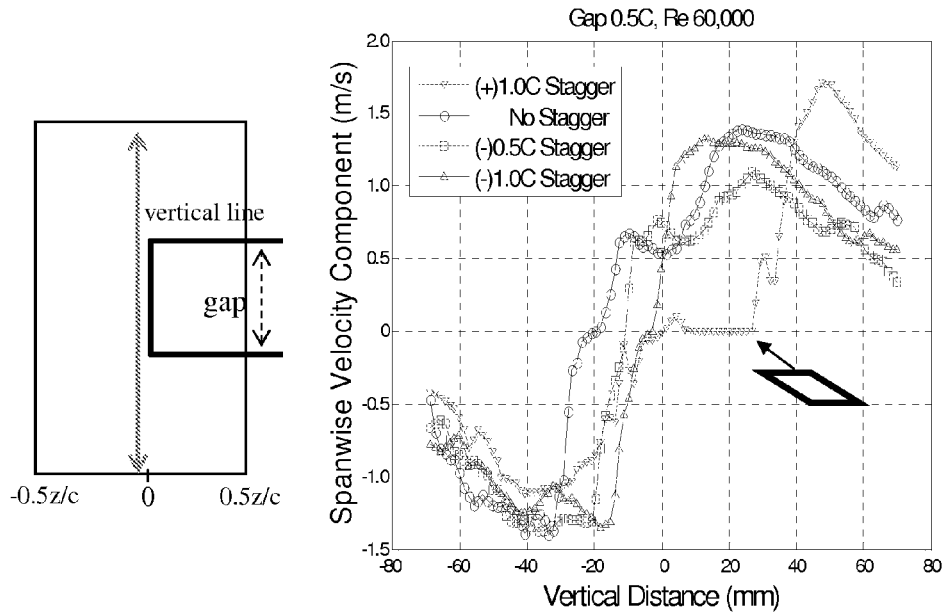
FIG. 99
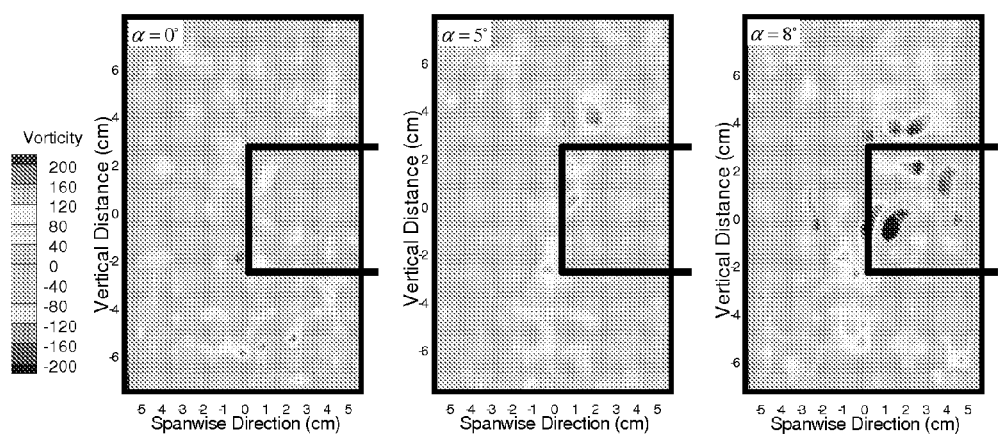
Fig. 100(A) Wingtip vortex structure with (-) 1.0C stagger, 0.5C gap configuration

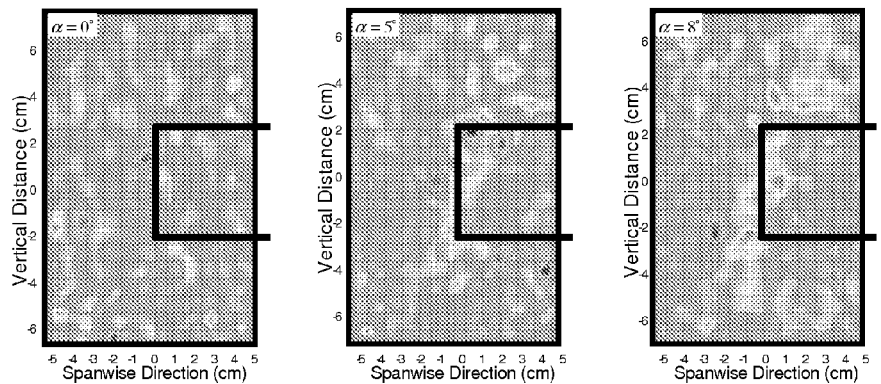
Fig. 100(B) Wingtip vortex structure with (-) 0.5C stagger, 0.5C gap configuration
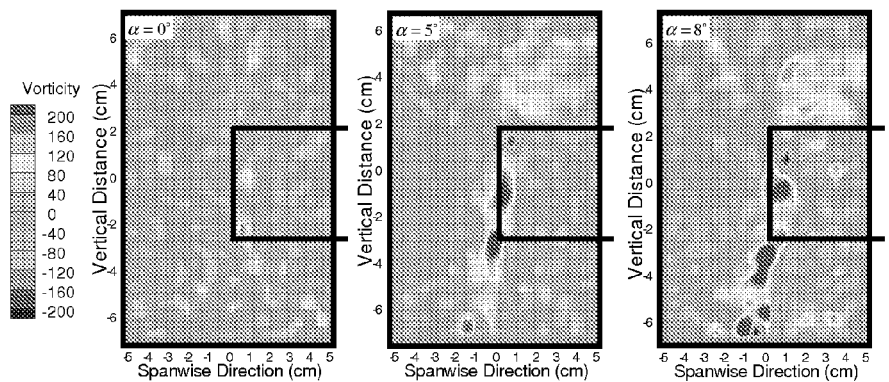
Fig. 100(C) Wingtip vortex structure with no stagger, 0.5C gap configuration

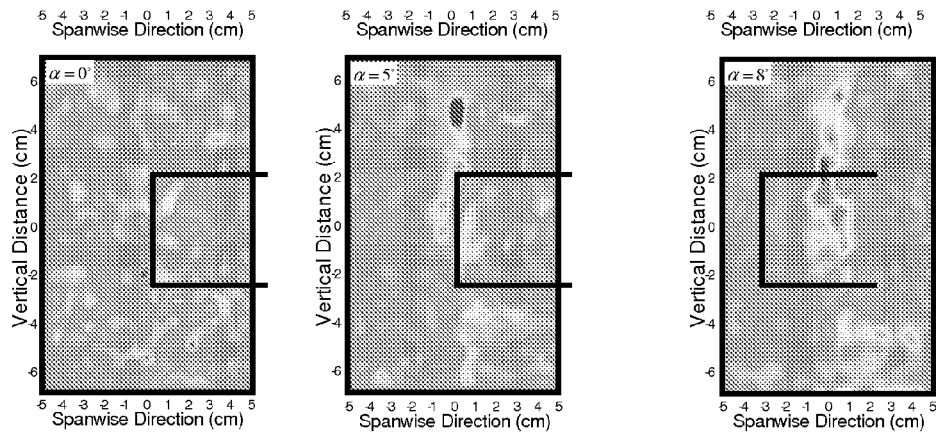
Fig. 100(D) Wingtip vortex structure with (+) 1.0C stagger, 0.5C gap configuration
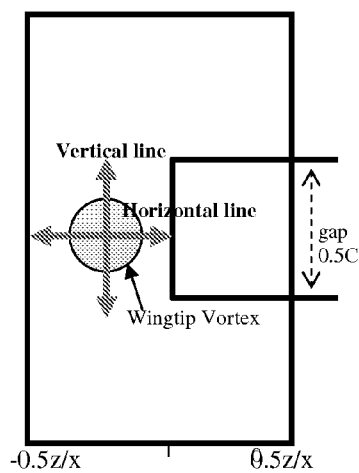
FIG. 101

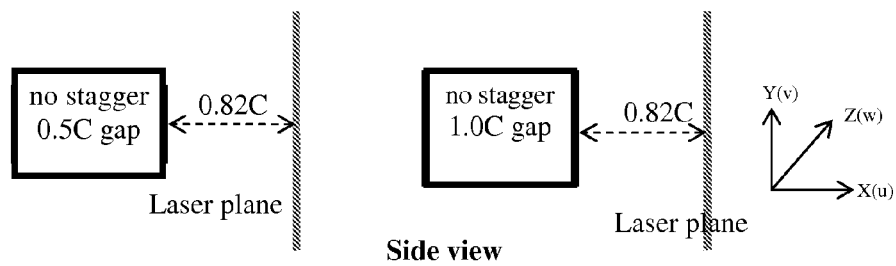
FIG. 104
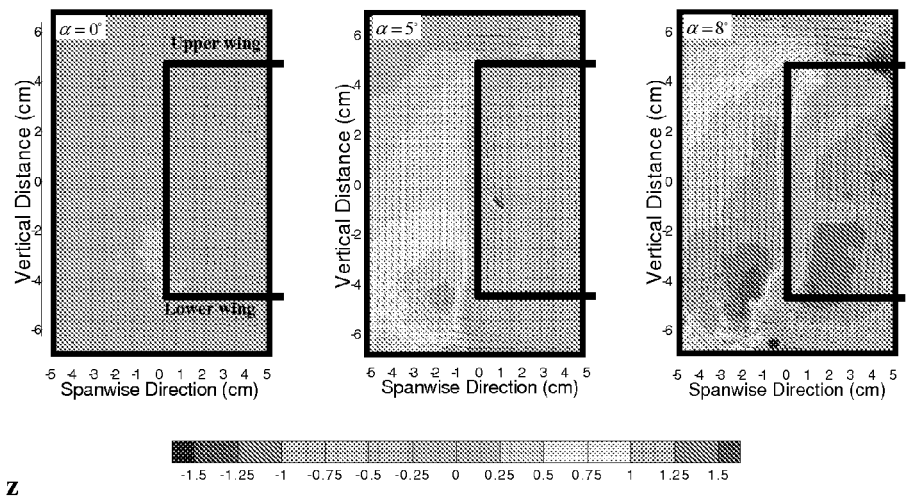
Fig. 105(A) Vertical velocity component with no stagger, 1.0C gap configuration

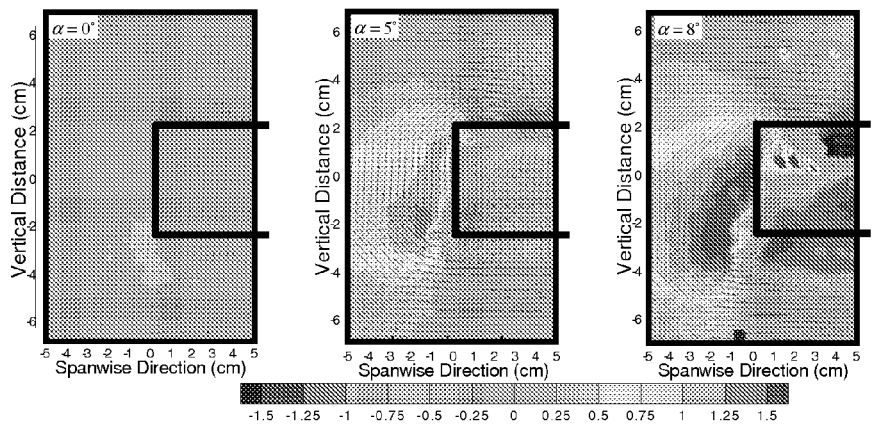
Fig, 105(B) Vertical velocity component with no stagger, 0.5C gap configuration
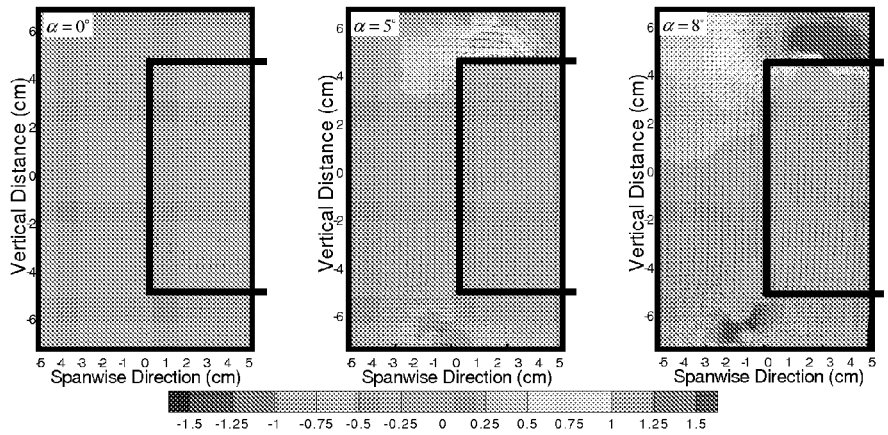
Fig. 106(A) Spanwise velocity component with no stagger, 1.0C gap configuration

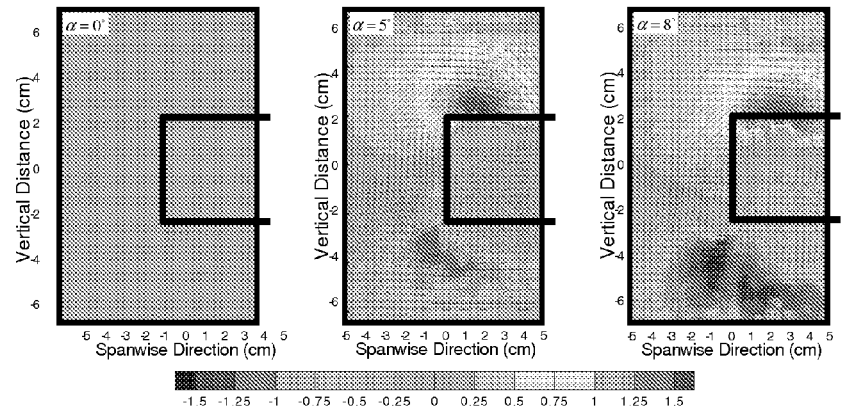
Fig. 106(B) Spanwise velocity component with no stagger, 0.5C gap configuration
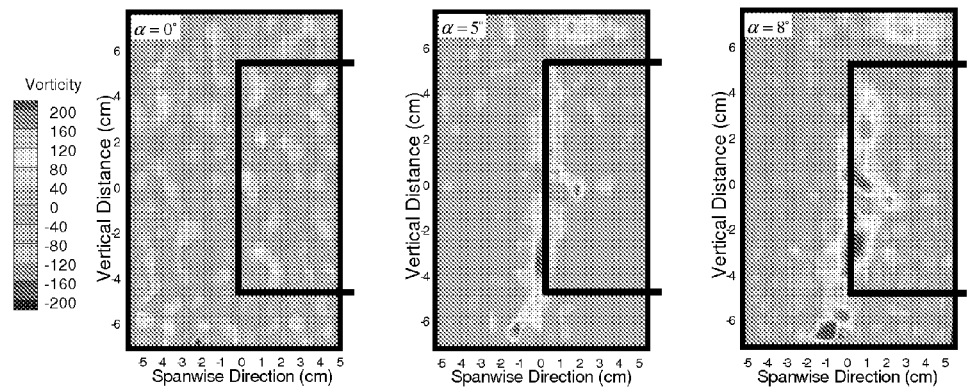
Fig. 107(A) Wingtip vortex structure with no stagger, 1.0C gap configuration

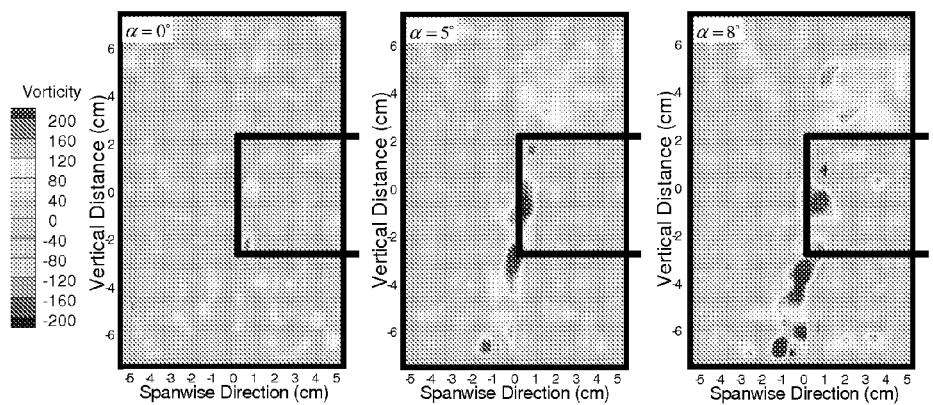
Fig. 107(B) Wingtip vortex structure with no stagger, 0.5C gap configuration FIG. 108
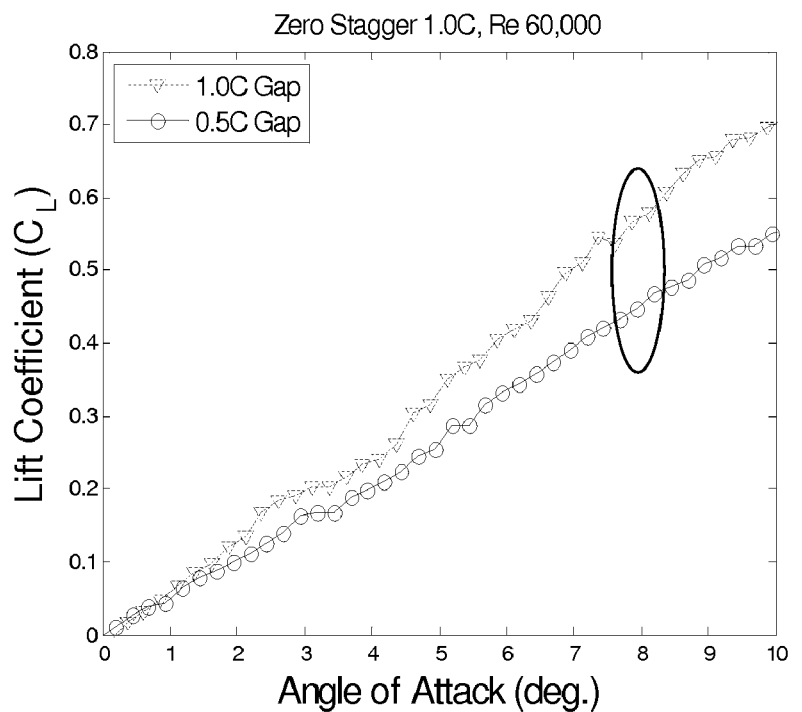
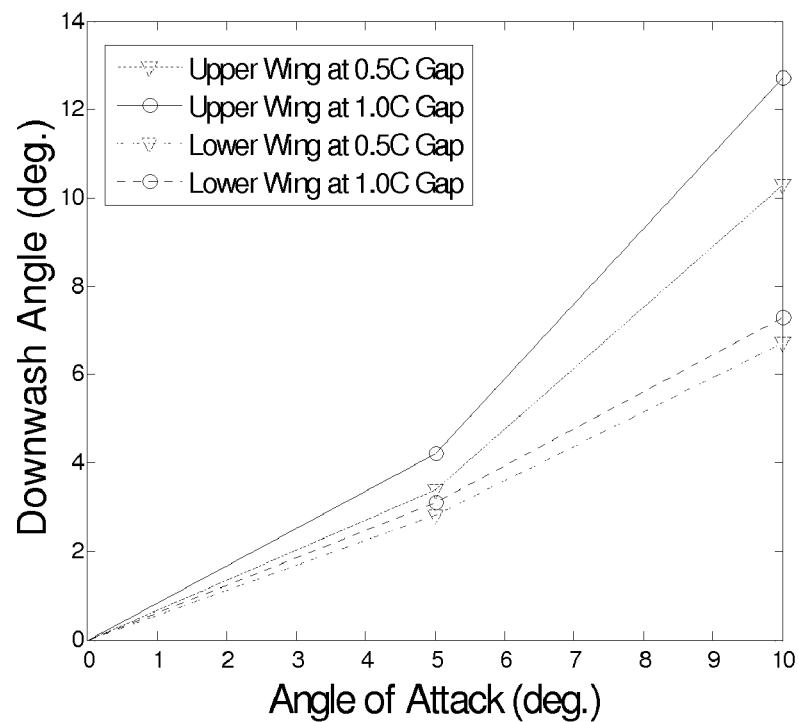

Fig. 109(A) at the upper line
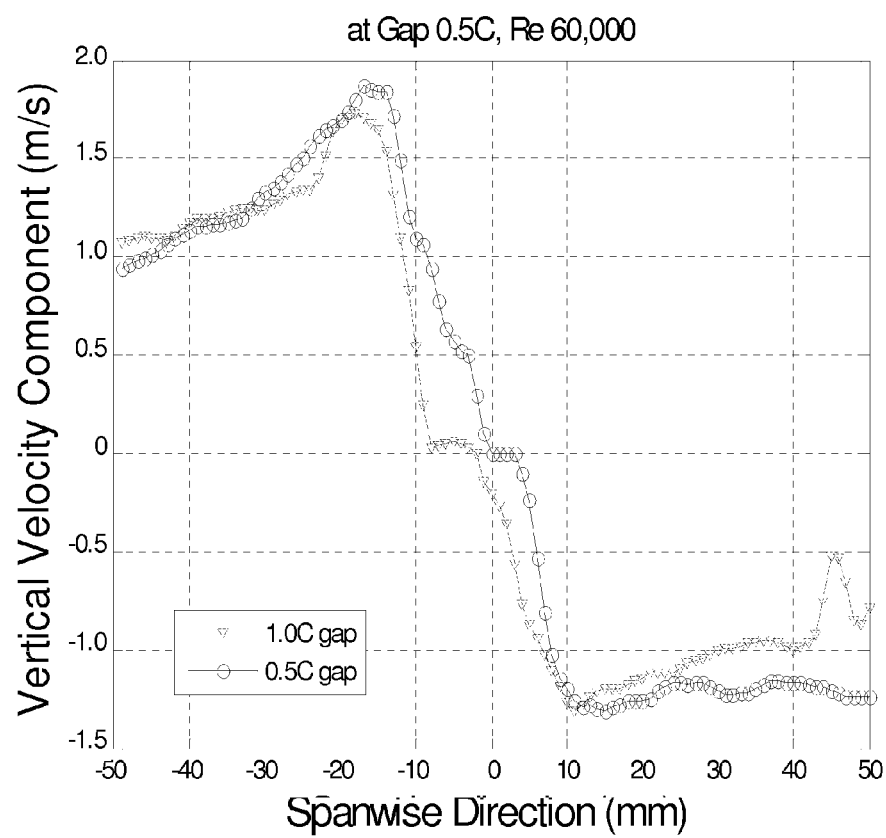

Fig. 109(B) at the lower line
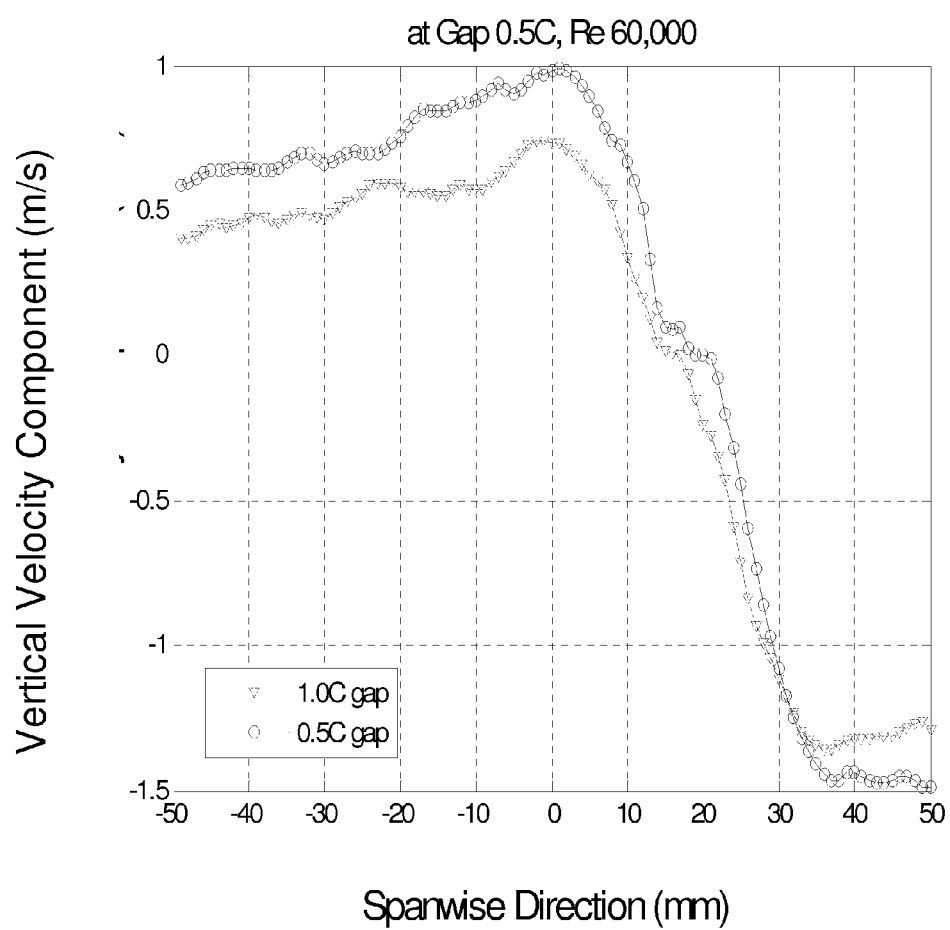

FIG. 112(A) No stagger
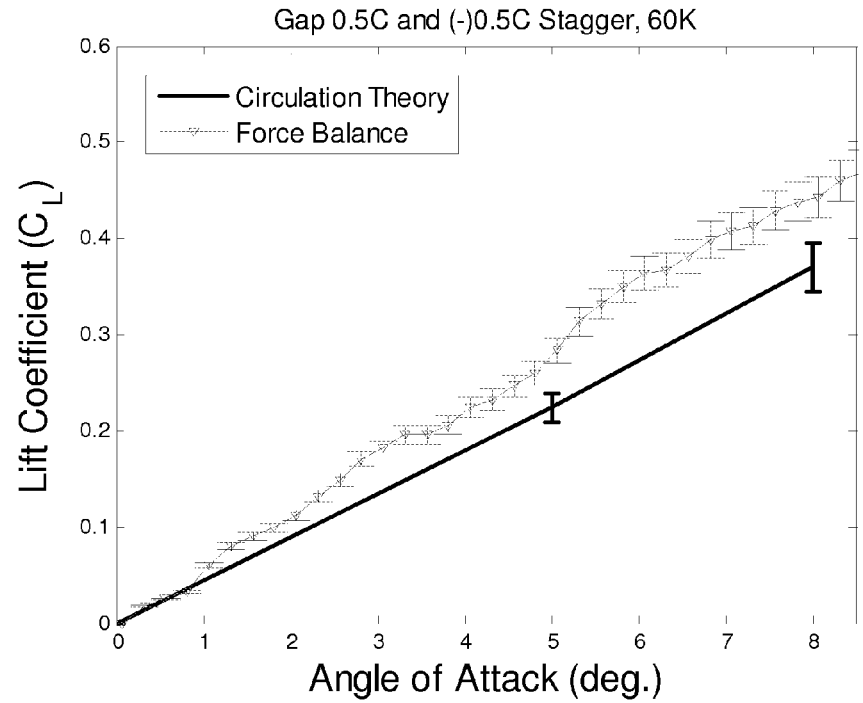
FIG. 112(B) (-) 0.5C stagger
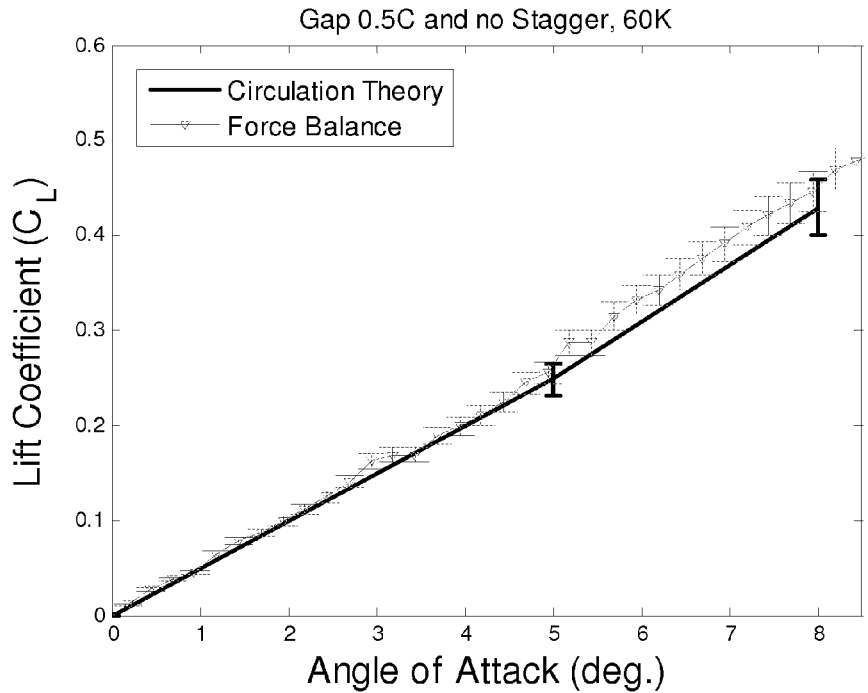

FIG. 112(C) (-) 1.0C stagger
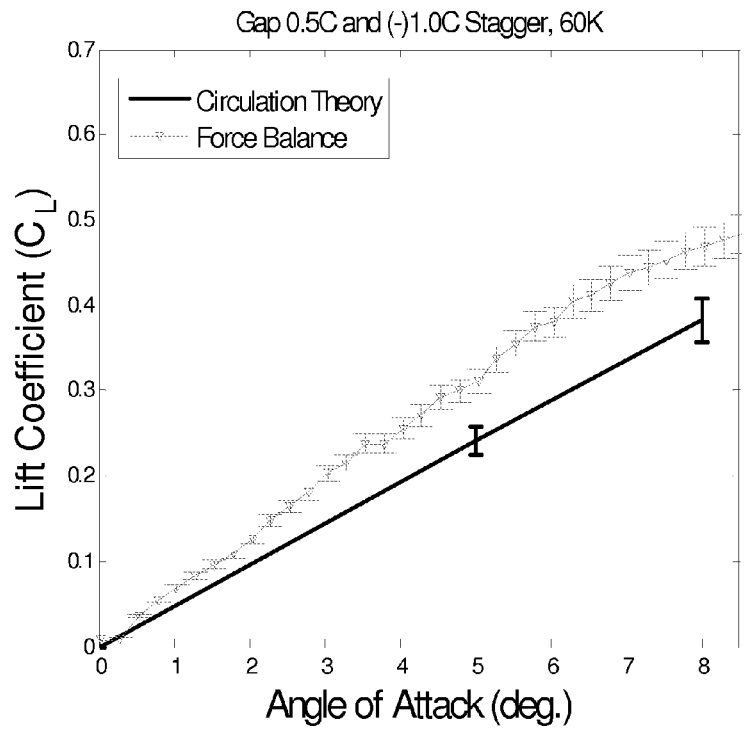
FIG. 112(D) (+) 1.0C stagger
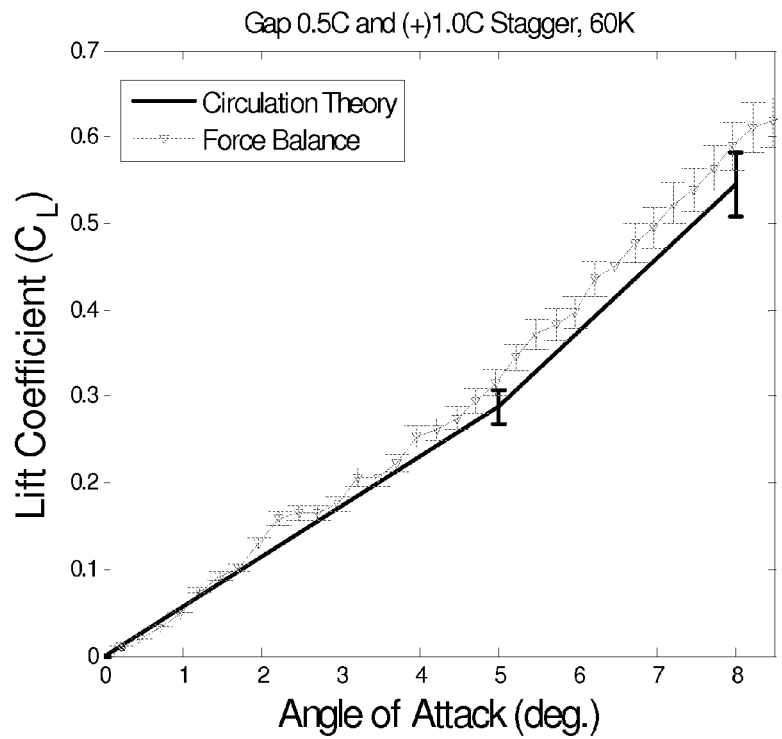

FIG. 114(A) 1.0C Gap
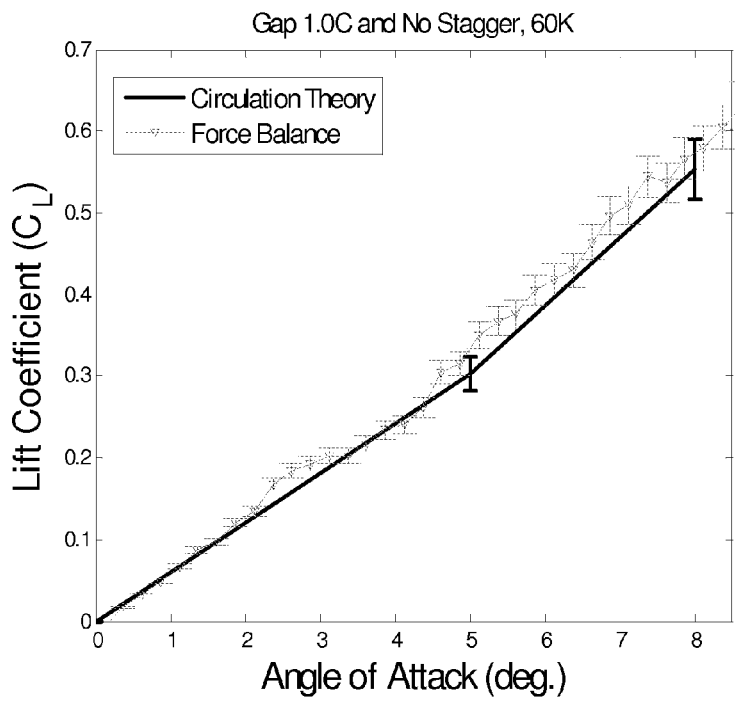
FIG. 114(B) 0.5C Gap
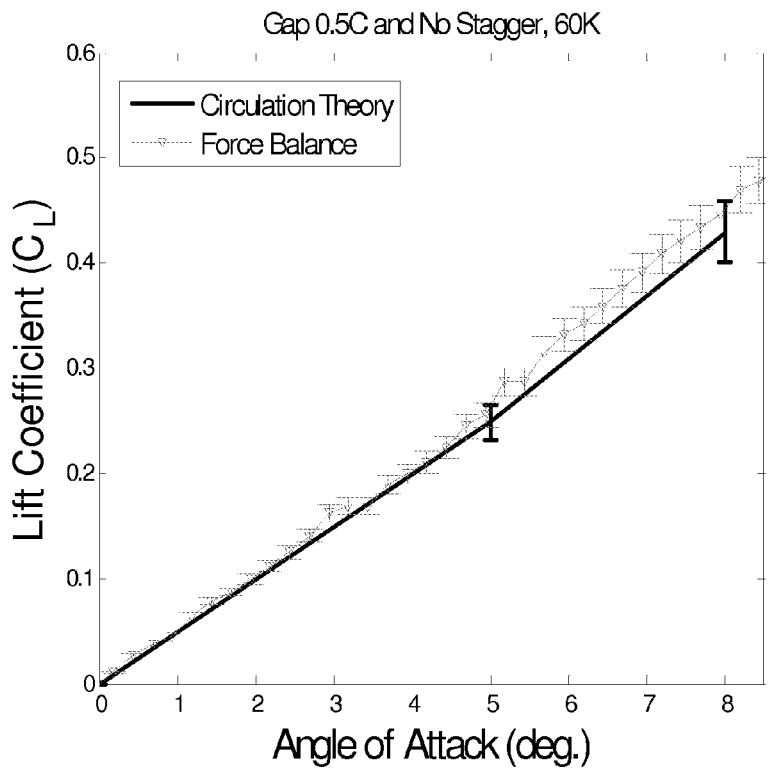

LIFTING FOIL

This application claims the benefit of earlier filed provisional application 61/085,904 filed Aug. 4, 2008.

BACKGROUND OF THE INVENTION

This invention relates generally to the field of fluid dynamics with emphasis on aerodynamic drag phenomena. A particular object of the invention is to reduce energy losses suffered by an aircraft in flight due to induced drag. It is known that this particular type of drag is accompanied by a shedding of vortices from the tips of the wings.

The present inventor discussed the details of drag issues surrounding wing tips in commonly owned U.S. Pat. No. 7,100,867 to Houck II. In that patent it was explained that these vortices result from a span-wise flow of air from a relatively high pressure condition on the lower wing surface to a relatively low pressure condition on the upper wing surface and that the prior art attempted to numerous techniques for dealing with induced drag, but none are fully satisfactory.

While inventor accomplished some significant results in reducing drag losses of lifting foils, continual improvement in field is critical given the increased commercial and governmental air transportation cost. Modern flow diagnostics applied to a very old aerodynamic problem has produced a number of intriguing new results and new insight into previous methodology and designs. Thus, any reductions in drag may on a craft provide savings.

SUMMARY OF THE INVENTION

This invention is different than that of the present inventor's prior disclosed design and yields an unexpected and improved stability and result. Similar to the present inventor's prior design, there is provided a lifting foil configured generally in the form of an endless band having a plurality of exposed surfaces which meet at common boundary lines. Here, however, the lifting foil comprises a generally horizontal and leading upper course, a generally horizontal and trailing lower course parallel to and spaced apart from the upper course and a pair of opposed, vertically extending flow guides. A first one of these flow guides joins a first end of the upper course to a corresponding first end of the lower course, while a second flow guide joins a second end of the upper course to a corresponding second end of the lower course. The lower course configured with a main fuselage compartment.

The joinder of the upper and lower courses to the flow guides occurs at four margins, referred to herein as an upper starboard margin, an upper port margin, a lower starboard margin and a lower port margin. The flow guides are blended into the courses at those margins to avoid discontinuities in the fluid flow across the inner and outer surfaces of the foil. In the use of the invention a working fluid, for example, but not limited to water, air or other fluid particulate which may include solids therein, flows from fore to aft through a large central passage and is first entrained by the leading upper course, where it exerts dynamic pressure outwardly against an exposed first surface of the foil. The working fluid also flows around the exterior of the foil, exerting dynamic pressure inwardly against a second surface thereof. The region between the first and second surfaces defines a cambered lifting body which reacts to the dynamic pressure on its first and second surfaces by generating a net upwardly directed lifting force. The lifting foil can include a third surface for dividing the large central passage into a pair of smaller, spaced apart, passages having generally elliptical cross-sections and a fuselage can be formed therewith.

With the leading upper course so positioned in connection with the flow guides angled to the rear to connect with the trailing lower course, there is diminished generation of initial spanwise fluid flow by balancing the pressure at the upper starboard margin against the pressure at the lower starboard margin, and concomitantly balancing the pressure at the upper port margin against the pressure at the lower port margin without any fluid interference caused by the trailing lower course housing the fuselage. The pressure balancing is accomplished by configuring the starboard flow guides to have a cross section which will reduce a dynamic pressure from a maximum value at the upper starboard margin to a midpoint value of zero, while simultaneously increasing the dynamic pressure from a midpoint value of zero to a maximum value at the lower starboard margin. A similar process is carried out on the port side of the foil. Another aspect of the invention is to provide a leading upper course and a trailing course wherein the courses can have a range from positive to negative camber.

The lifting foil is unexpectedly provided with increased stability and controllability in flight. It is believed that the performance of the foil is enhanced by virtue of a generally uniform upper leading course providing an initial fluid direction and further aided by flow guides configured to stabilize the dynamic pressure at the ends of the upper and lower courses. This new design enhances the ability to achieve reduced flow of fluid in the spanwise direction and reduces the generation of drag-producing vortices.

It is therefore an object of the present invention to provide an apparatus and method for improving the dynamic performance of a lifting foil.

It is another object of the invention to reduce induced drag vortices to zero.

A further object of the invention is to reclaim vortex energy while reducing tailplane aerodynamic balancing drag to zero.

A still further object of the invention is to enhance and increase lift while minimizing drag penalty.

Other objects of the invention are to enhance and increase lift and decrease drag for very low speed flight, to reduce spanwise fluid flow in a lifting foil, to decrease aircraft drag and improve aircraft stability, as well as other and further objects and advantages as will be apparent from the following description, the accompanying drawings and the appended claims.

BRIEF DESCRIPTION OF THE DRAWING

FIG. 5A is a schematic illustration of pressure forces against a pair of flow guides.
FIGS. 6A-6I are cross sections of ribs located at angularly displaced positions on FIG. 6.
FIG. 7 shows a parameterization of the model of FIG. 1 of the instant invention is provided which includes a simplified box-wing configuration, defined using gap and stagger.

FIG. 22 is an end view of FIG. 12.

FIG. 23 is a top view of another embodiment.

FIG. 24 is a top view of still another embodiment.

FIG. 25 is a top view of yet another embodiment.

FIG. 34 depicts a schematic of gap and stagger

FIG. 35(A-H) depict stagger and gap of an embodiment.

FIG. 40(A-B) depict Lift to Drag ratio Uncertainty Analysis at (a) at Re 60,000 (b) at Re 120,000.

FIG. 56 shows a CL comparison of AVL and UD Experiment with the Model #7 (2.0 C gap, (+) and (−) 1.0 C stagger) and Model #8 (1.0 C gap, (+) and (−) 1.5 C stagger): the highest gap configuration, Model #7 does not show any difference between the negative and positive configurations. The Model #8 shows a large variation of lift coefficient characteristics between the negative and positive stagger configurations.

FIG. 57(A-C) show a comparison of lift and drag with varying stagger and constant gap of 0.5 C at Re 60,000 shows that as stagger increases, the aerodynamic characteristics improve dramatically beyond an angle of attack of 6°.

FIG. 58(A-D) show a comparison of lift and drag with varying stagger and constant gap of 1.0 C at Re 120,000 shows that as stagger increases, the aerodynamic characteristics improve dramatically beyond an angle of attack of 4°.

FIG. 59(A-C) show that as gap increases, the lift coefficient also increases for a given angle of attack across all angles of attack tested.

FIG. 60(A-D) illustrate the highest L/D ratios for the highest gap for three cases showing the best balance between additional parasite drag area and reduced lift induced drag due to the endplates.

FIG. 61(A-C) show the slope of the linear curve fit equations for CL as a function of varying stagger used to determine a generalized equation for lift curve as a function of gap and stagger.

FIG. 66 show streamlines of the biplane in 2D streamwise PIV using TecPlot (at an angle of attack of 5°, (−) IC Gap).

FIG. 67(A-C) depict velocity distribution and downwash angle downstream of Model #4 (0.5 C gap and (+) 1.0 C stagger) at different angles of attack and a Reynolds number of 60,000.

FIG. 68(A-C) depict velocity distribution and downwash angle downstream of Model #2 (0.5 C gap and no stagger) at different angles of attack and a Re 60,000.

FIG. 69(A-C) depict velocity distribution and downwash angle downstream of Model #3 (0.5 C gap and (−) 0.5 C stagger) at different angles of attack and a Reynolds number of 60,000.

FIG. 70(A-C) depict velocity distribution and downwash angle downstream of Model #4 (0.5 C gap and (−) 1.0 C stagger) at different angles of attack and a Reynolds number of 60,000.

FIG. 73(A-C) show Lift coefficient estimation by downwash agrees well with the force balance measurement at the lower angles of attack and for the (+) 1.0 C stagger model.

FIG. 76(A-C) show velocity distribution and downwash angle downstream of Model #2 (0.5 C gap and no stagger) at different angles of attack and a Re of 120,000 shows increasing downwash angle with increasing angle of attack.

FIG. 77(A-C) show velocity distribution and downwash angle downstream of Model #1 (1.0 C gap and no stagger) at different angles of attack and a Reynolds number of 120,000 shows increasing downwash angle with increasing angle of attack.

FIG. 78 shows Downwash angles at different angles of attack, Re 120,000 with no stagger shows that the upper wing has a higher downwash angle than the lower wing.

FIG. 79(A-C) show the velocity distribution and downwash angle downstream of Model #4 (0.5 C gap and (−) 1.0 C stagger) at different angles of attack and a Reynolds number of 120,000 shows increasing downwash angle with increasing angle of attack.

FIG. 80(A-C) show the velocity distribution and downwash angle downstream of Model #6 (1.0 C gap and (−) 1.0 C stagger) at different angles of attack and a Reynolds number of 120,000 shows increasing downwash angle with increasing angle of attack.

FIG. 84(A-B) depict a comparison of downwash angle between upper and lower wing shows a significant downwash change in the shaded region.

FIG. 87(A-C) show a comparison of the integrated force measurement to the PIV derived momentum deficit drag for Model #2, 3 and 4. Blasius flat plate drag and vortex drag are included as a reference.

FIG. 89 shows a position of the models relative to the laser plane of illumination.

FIG. 90(A-D) show a comparison of vertical velocity component on the varying stagger configurations shows different velocity distribution at angles of attack of 0°, 5° and 8°.

FIG. 91(A-D) show a comparison of spanwise velocity component on the varying stagger configurations shows different velocity distribution at angles of attack of 0°, 5° and 8°.

FIG. 92 is a pattern of the vertical velocity component of four varying stagger configurations shows a large variation at an angle of attack 8°, and a Re of 60,000.

FIG. 94 shows a view of the Trefftz plane with thee lines used to highlight aspects of the flow structure around the wingtip and endplates FIG. 95 shows a lift curve with varying stagger and a constant gap of 0.5 C at a Re of 60,000 shows a significantly different lift coefficient characteristic of the (+) 1.0 C stagger configuration at an angle of attack 8°.

FIG. 99 shows a comparison of the spanwise velocity components with four different configurations at the vertical line at an angle of attack of 8° and a Re of 60,000 shows a different flow structure for the (+) 1.0 C stagger configuration than for other configurations.

FIG. 100(A-D) show a vortex structure with varying stagger shows that the biplane with endplates generates different patterns of vorticity at α=0°, 5° and 8°.

FIG. 101 shows the Trefftz plane with two velocity slices used to investigate the vortex structure.

FIG. 104 position of the models relate to the laser plane of illumination.

FIG. 105(A-B) show a vertical velocity component with varying gap shows that the biplane generates different patterns of vertical velocity distribution at α=0°, 5° and 8°.

FIG. 106(A-B) show spanwise velocity component with varying gap shows that the biplane generates different patterns of spanwise velocity distribution at α=0°, 5° and 8°.

FIG. 107(A-B) show a vortex structure with varying gap shows that the biplane with endplates generates different patterns of vorticity at α=0°, 5° and 8°.

FIG. 108 shows CL and downwash angle of the higher gap (1.0 C) configuration show higher CL than 0.5 C gap configuration.

FIG. 109(A-B) show a comparison of the vertical velocity components at two different gap spacings at the upper and lower slice of velocities at an angle of attack of 8° and a Re of 60,000

FIG. 112(A-D) show a comparison of the coefficients of lift determined through integrated force measurement and circulation theory shows a close agreement for the no stagger and positive stagger configurations, while somewhat difference for the negative stagger configurations.

DESCRIPTION OF THE PREFERRED EMBODIMENTS

Figure 1:
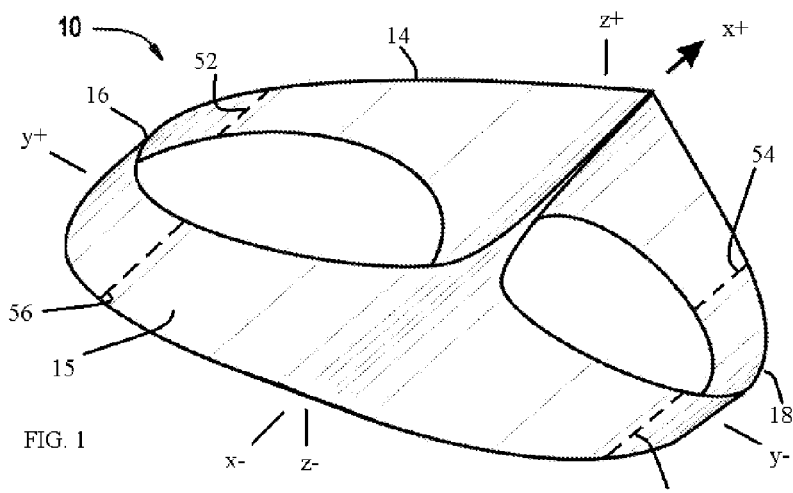
FIG. 1 is a perspective view of a lifting foil.

Nomenclature/Abbreviation
AP barometric pressure in mmHg
AR aspect ratio
a slope of lift curve
acc acceleration
$a_0$ two dimensional lift-curve slope
b length of semi-span
$C_{L_U}$ lift coefficient on the upper surface of a biplane
C mean chord length
CD coefficient of drag
CDo drag coefficient at zero lift
CL lift coefficient
$C_{L_L}$ lift coefficient on the lower wing of a biplane
$C_{L_U}$ lift coefficient on the upper wing of a biplane
Cf skin friction coefficient
$D_{end\_plates}$ plates endplates drag
$D_{form}$ form drag
Di induced drag
$D_{interface}$ interference drag
$D_{parasite}$ parasite drag
$D_{skinfriction}$ skin friction drag
$D_{total}$ total Drag force
$D_{wings}$ wing drag
$d_P$ diameter of the particle
di image diameter of the particle
e span efficiency factor
f" number of lens
g gap ratio to the chord
h perpendicular distance
L lift force
L/D lift to drag ratio
l the length of the panel in the flow direction
M magnification factor of the lens
Ni image density
RH relative humidity
Re Reynolds Number
S wing area
SVP saturation vapor pressure for a given temperature T
St stagger ratio to the chord
$U_P$ particle velocity
u freestream velocity
ū mean velocity
$u_{rms}$ root-mean-square velocity
u(t) instantaneous velocity
V freestream velocity
v vertical component of the airflow
w horizontal component of the airflow
α angle of attack
$α_i$ lift induced angle of attack
Γ circulation strength
$Γ_z$ circulation about z-axis
$ΔC_{L_U}$ additional lift coefficient on the lower surface of a biplane
Δt time interval
ΔAz0 thickness of light sheet
ΔH manometer reading
$ΔC_{L_U}$ additional lift coefficient on the upper surface of a biplane
ε downwash angle
λ wavelength of light source
μ dynamic viscosity of the fluid
ρ density of the fluid
$ρ_P$ density of the tracer particles
$ρ_{red\ oil}$ density of the red colored oil in the manometer in kg/m3
$τ_w$ surface shear stress
φ velocity potential (scalar)
$ω_z$ vorticity vector in two dimensional flow about z-axis
∇× curl
∇· divergence
∇ gradient
U upper wing span b
L lower wing span c chord
CD total drag coefficient
CDi induced drag coefficient
CDiEM Munk's induced drag coefficient
CDiOB Prandtl's induced drag coefficient
CL lift coefficient LLC lower wing lift coefficient
CLmax maximum lift coefficient
ULC upper wing lift coefficient
αLC lift curve slope e span efficiency factor
EM Equivalent Monoplane
g gap
I electrical current
k equivalent monoplane span factor
L/D lift to drag ratio
n load factor
OB Orthogonal Biplane
Oh Overhang Ratio (bU/bL)
P power
R A Distance Used in Calculating Downwash
Re Reynolds Number
s stagger
S Reference Planform Area
T thrust v induced velocity
V induced velocity for a vortex segment
V flow speed
Vstall stall velocity
W takeoff weight
δ coefficient of mutual influence
ρSL sea level air density
σ angle of stagger
σ stress Referring now to the drawings, the present invention may have a form as generally illustrated by lifting foil 10 in FIGS. 1-4. FIGS. 8-11 also show an embodiment of the invention and generally illustrated by the numeral 10'. FIGS. 12-21 show alternative design propeller designs incorporating the novelties of the instant invention generally designated by the numeral 100. To these novel configurations it will be understood that the pitch of the courses can be similarly varied as depicted in prior U.S. Pat. No. 7,100,867 incorporated herein by reference.

Using modern flow diagnostics applied to a very old aerodynamic problem has produced a number of intriguing new results and new insight into previous results. The aerodynamic performance and associated flow physics of the biplane with endplates as a function of variation in gap and stagger were analytically and experimentally investigated. A combination of vortex lattice method, integrated force measurement, streamwise (Particle image Velocimetry) PIV, and Trefftz plane Stereo PIV were used to better understand the flowfield around the biplane with endplates. A study was performed to determine the configuration with the optimal aerodynamic performance and to understand the fluid mechanics behind optimal and suboptimal performance of the configuration.

FIG. 7 depicts a parameterization of the model of FIG. 1 of the instant invention is provided which includes a simplified box-wing configuration, defined using gap and stagger.

The parametric study was performed using a Vortex Lattice code (AVL) for six parameters of the biplane with endplates which equates to flow guides as used in the present invention gap, stagger, decalage, dihedral, sweep and overhang as seen in FIG. 26.

Gap is defined as the distance measured between the leading edges of the two wings perpendicular to the freestream (FIG. 26a). Stagger is defined as the distance measured between the leading edges of the upper and lower wings measured parallel to the freestream (FIG. 26b) when the upper wing was offset in the forward direction, it has a positive stagger, according to the conventional definition. Positive and negative stagger configurations were considered.

Decalage on a biplane is the acute angle between the mean chord lines of the biplane as seen in FIG. 26c. There are two different decalage definitions used: Aerodynamic decalage is the angle difference between the zero lift lines of the two wings especially for cambered wings, Geometric decalage is the angle difference between the chord lines of the two wings without camber. In this study, since a symmetrical airfoil (NACA 0001) was used, geometric decalage is applied. Five different cases with decalage, ranging from −4 to +4 with 2-degree increments, are considered in the AVL study.

Dihedral is defined as the upward angle from horizontal in a fixed-wing aircraft from root to tip, as shown in a front view in FIG. 26d. Downward angled wings have negative dihedral, or anhedral.

Four different configurations were considered based on the shape of the wings:
Upper and lower wings in a dihedral position
Both in an anhedral position
Upper wing in a dihedral position and the lower wing in an anhedral position
Lower wing in a dihedral position and upper wing in an anhedral position.

For each configuration, three different dihedral or anhedral angles are applied with 2-degree intervals.

Figure 26E:
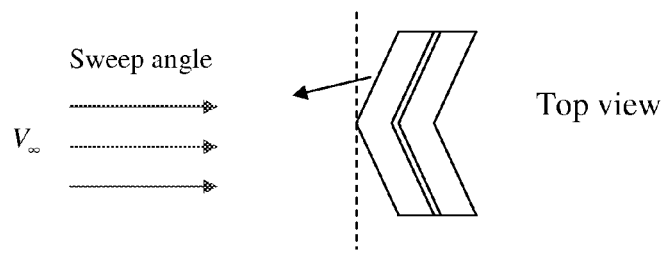
FIG. 26(A-F) depict gap, stagger, decalage, dihedral, sweep and overhang.

Wing sweep angles were considered for both wings of the simplified Houck configuration (FIG. 26e). Three different cases, with sweep angles ranging from 0 degrees to 60 degrees with 30-degree intervals, were evaluated.

Figure 26F:
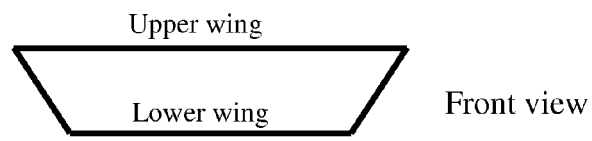

Overhang ratio for a biplane is defined as the ratio of the span of the lower wing to the span of the upper wing. This is shown in FIG. 26f. Overhang is written as:

$$\text{Overhang ratio} = \frac{\text{lower wing span}}{\text{upper wing span}}$$

Six different cases with overhang ranging from 0.8 to 1.2 were evaluated.

AVL results show that the gap and stagger have the most dramatic effects out of the six parameters studied for the biplane with endplate when aspect ratio and the total wing area are held constant.

Other parameters considered for their influence on the aerodynamic performance of the biplane configuration included dihedral, decalage, sweep and overhang. The effect of these parameters was observed to be either negative or negligible. Decalage and dihedral under certain conditions could have a positive effect on the performance of the biplane; however, these effects are comparatively small and were neglected for the purposes of this study. Variation of overhang and sweep had a negative effect on the performance. An increase or decrease in overhang has a negative effect on the lift coefficient. From the various biplane configuration results obtained in AVL, the parameters for wind tunnel testing were reduced to gap and stagger.

The difference in lift coefficients between positive and negative stagger configurations was just 0.01% through AVL analysis. Although this is a non-physical result, it leads to the belief based on the AVL results and Munk's theoretical results that negative and positive staggered configurations with the same gap have the same aerodynamic characteristics. To better understand positive and negative stagger effects, different model configurations were investigated through wind tunnel testing.

The specific results were obtained from force balance measurement. Fourteen biplane configurations with different gaps and staggers were tested in the wind tunnel at both Re 60,000 and 120,000. The force balance measurements show that as stagger increases in the positive direction, the lift coefficient also increases. From the drag polar, there is a visible change in CDi across gaps with increasing gap providing decreasing CDi. For the largest gap configuration, the highest L/D ratio is obtained near an angle of attack of 4°. As gap increases, the lift coefficient also increases for a given angle of attack across all angles of attack tested.

A large variation in lift behavior was found between the positive and negative staggered configuration. A positive stagger can produce a CL 47% higher than a negative stagger configuration for a 0.5 C gap, which was the largest variation. The lift coefficient has a weak dependence on Reynolds number (the lift coefficient difference is less than 2.5% between Reynolds numbers 60,000 and 120,000).

A generalized empirical method for the prediction of lift coefficient as a function of gap, stagger and angle of attack has been determined and validated when combined with existing relations for CL-$\alpha$ adjustments for AR and taper effects. The resulting empirical approach allows for a rapid determination of CL for a biplane having different gap, stagger, AR and taper without the need for a complete flowfield analysis.

Detailed insight into the fluid mechanical justification for the unique characteristics of the biplane with endplates was determined in the experiments through the use of the PIV method. Two Dimensional PIV results show a distinctive pattern in the downwash angle for the different gap and stagger configurations tested.

The downwash angle increases with increasing stagger. The positive stagger configuration has a higher downwash angle within the range of angles of attack tested, while the negative stagger configuration has a lower downwash angle. It is also evident that the change in downwash angle is directly proportional to the change in lift coefficient as would be expected. Increasing gap spacing increases the downwash angle as well. A higher gap configuration has a higher downwash angle than the lower gap configuration. Like the stagger, the gap is proportionally related to downwash angle. It is very important to note that the downwash angles for the upper and lower wings were only the same at 0° angle of attack. The upper wing has a higher downwash angle than the lower wing for the all models tested at both Re 60,000 and 120,000. This downwash angle variation between upper and lower wings increased with increasing angle of attack. Based on the concept of downwash angle, it is appears that the upper wing in the biplane is responsible for a greater portion of the lift across a wide range of gap and stagger.

The downwash angle change was used to compute the additional lift coefficient since the downwash angle is directly proportional to lift force. This variation in downwash agrees well with the lift coefficient obtained through the force balance. These results differ greatly from those resulting from Munk's method for the calculation of additional CL.

Perhaps the most interesting behavior observed is that the lift slope for an angle of attack range from 5° to 10° is greater than the slope of the lift coefficient for an angle of attack range from 0° to 5°. The change in the lift curve slope has been observed in the linear regime (−2°<$\alpha$<8°) for all models tested in the University of Dayton Laboratory (UD LSWT). When increasing the stagger in the positive direction, the biplane model experiences a positive change in the slope of the lift coefficient. The lift slope for 5°<$\alpha$<8° for the positive stagger configuration was significantly greater than for the negative stagger configurations. Downwash angle measurements using 2D PIV also show a dramatic change in downwash angle in the angle of attack range between 5° and 5.5° at a Re of 60,000.

The momentum deficit method was applied for the purpose of measuring the components of drag force and parasite drag. The accuracy of this method was comparable to the force balance measurements; close agreement was found across the entire range of angles of attack tested, even though the drag force by the momentum deficit method is a little lower.

According to Kutta-Joukowski theorem, the vorticity is proportionally related to the lift force. The Stereo PIV analysis shows that the positive stagger configuration has significantly different wake characteristics compared to the others. This implies that the endplates of the biplane configurations control spanwise and vertical flow around the wingtip differently. If the upper surface is positively staggered, the endplates can interfere with the flow field at the wingtip to reduce the spanwise flow over the upper wing. These spanwise induced velocities from the endplates oppose and thereby cancel those generated by the upper wing. Therefore, the spanwise and vertical velocity components can be largely manipulated by the presence of the endplates and the stagger condition of the upper wing.

Stereo PIV analysis show how the wingtip vortex is formed for the different stagger and gap configurations of the biplane with endplates. The stagger effect produces a large variation with respect to the velocity components and the wingtip vortex structure. The negative stagger configurations show several vortices separated and spread out at the lower wingtip and behind the upper wing. When the upper wing is positively staggered, the biplane generates well-formed vortices. This creates an upwash outboard of the endplates as well as a vortex at the trailing edge of the wing and endplates.

From the observation of the vortex core location, the positive stagger configuration produces higher downwash and therefore, the lift force obtained was higher than that obtained with the other configurations. The combination of force balance results for lift and downwash angle verify this flow behavior. For the gap effect, as gap increases, this wingtip vortex roll-up behavior is similar but the magnitude of the vorticity for the larger gap configuration was higher. Therefore, as the gap increases for a given stagger condition a higher lift coefficient is obtained. When viewed at the same location the effect of gap did not change the vortex morphology as much as the change in stagger.

Therefore, positive and negative stagger configurations produce a significant difference in effective angle of attack for both the upper and the lower wings in the biplane. Different downwash angles were observed in terms of varying configurations for the upper and lower wing surfaces in the biplane. The resulting measured integrated lift force is proportionally related to the observed downwash angles. This implies that one of the underlying assumptions in Munk's biplane analysis of the additional lift force for upper and lower surface is invalid. A dramatic lift slope change ($C_{L_\alpha}$) was found at an angle of attack around 5°. Clearly, positive stagger and larger gap configurations produce higher lift slopes than negative stagger and smaller gap configurations since lift efficiency increased with increasing stagger and gap.

Figure 2:
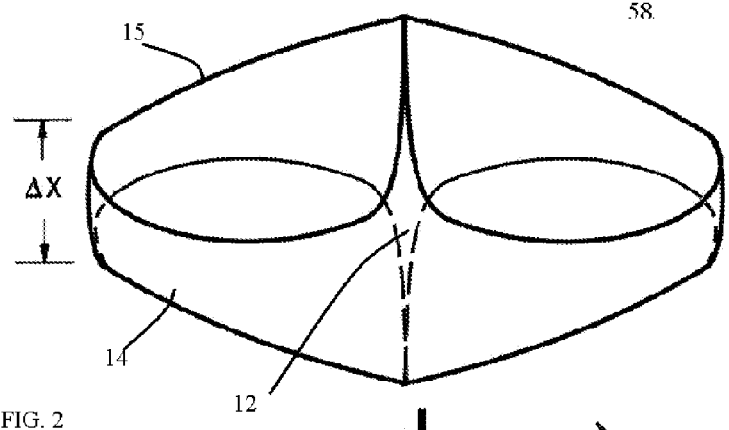
FIG. 2 is a top view of the lifting foil of FIG. 1.
Figure 3:
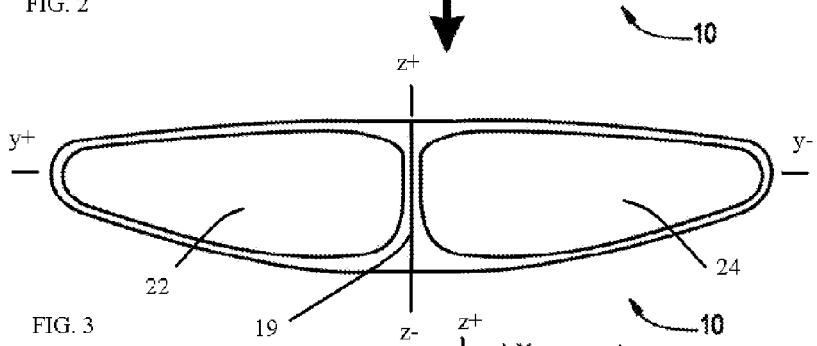
FIG. 3 is a front view of the lifting foil of FIG. 1.

FIG. 1 is a perspective drawing of the lifting foil with a coordinate system attached. The coordinate system has its origin at the center-of-gravity of foil 10. It is right-handed and employs conventional 3-axis, X, Y, Z Cartesian coordinate designations. Directions may also be referred to as "starboard" (+Y), "port" (−Y), "fore" (+X), "aft" (−X), "up" (+Z) and "down" (−Z). The term "spanwise" is used to refer to sideward motion in either the +Y or −Y direction. The lifting foil 10 is preferably laterally symmetrical across the X-Z vertical plane. FIG. 2 is a top view of lifting foil 10 while FIGS. 3 and 4 are front and side views respectively.

Lifting foil 10 comprises at least four basic elements, blended end-to-end to form a closed loop surrounding an open interior. These elements are an upper leading course 14, a lower trailing course 15, a starboard flow guide 16 and a port flow guide 18. Upper leading course 14 is positioned generally in an X-Y plane and has an upper starboard margin 52 and an upper port margin 54. Lower course 15 is geometrically similar to upper course 14 and is situated parallel thereto. Lower course 15 has a lower starboard margin 56 and a lower port margin 58. Margins 52, 54, 56, and 58 are best shown by phantom lines in FIG. 1. It is understood that foil 10' is similarly formed in these respects.

Starboard flow guide 16 is joined to upper course 14 at upper starboard margin 52 and is joined to lower course 15 at lower starboard margin 56. Port flow guide 18 is joined to upper course 14 at upper port margin 54 and is joined to lower trailing course 15 at lower port margin 58. It should be understood that the margins 52, 54, 56 and 58 merely define the geometric limits of the four principal elements and do not have any particular structural significance. Upper leading course 14 and lower trailing course 15 generate lift in the +Z direction when traveling in the +X direction through a surrounding fluid or when held stationary against a surrounding fluid moving in the -X direction as depicted in FIG. 4. Flow guides 16, 18 are configured in the form of an arc having a center portion 69 of substantially circular curvature and end portions 68, 70 of a curvature which causes a blending with the surfaces of upper course 14 and lower course 15. (See FIG. 6).

Figure 4:
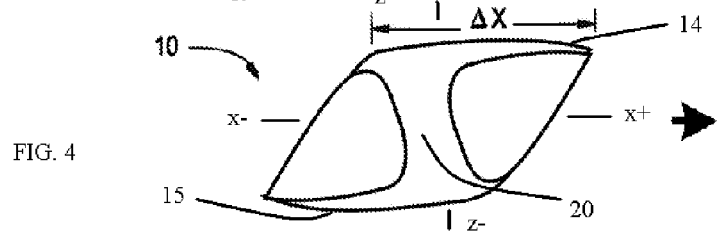
FIG. 4 is a side view of the lifting foil of FIG. 1.
Figure 8:
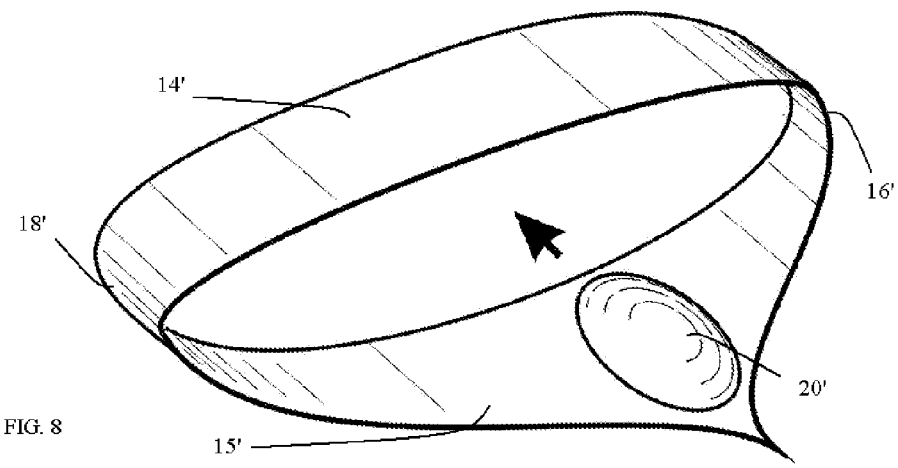
FIG. 8 is a perspective view of an alternative embodiment of the invention.

Preferably upper course 14 is forwardly offset by a distance ΔX from lower trailing course 15, as illustrated in FIGS. 2 and 4. As recently discovered, this particular offset is a design feature which provides a cargo carrying capability in or adjacent the lower trailing course 15 appropriate for the intended use of the lifting foil 10. By way of example, FIG. 4 shows a side view of a cargo carrier 19 having a somewhat extended offset ΔX'. FIGS. 2 and 3 are a top view and a front view, respectively of cargo carrier 19. The lower trailing course 15 can incorporate a fuselage 20 into the structure. As illustrated in FIG. 8, fuselage 20' may be positioned midway between flow guides 16' and 18' and extend upwardly from lower course 15' to upper course 14'. Fuselage 20' may house a suitable power supply, controls and one or more passenger compartments. Most conveniently a cockpit and crew quarters may be located in a fore area designated by reference numeral 12 in FIG. 2 (20' in FIG. 8). Ample space is available for placement of aerodynamic control surfaces. The entire surface of lifting foil 10 is preferably smooth, and its four principal elements are blended together so as to minimize vortex generation. In a preferred embodiment lifting foil 10 has a fuselage 20 within an interior region extending rearwardly and upwardly from reference point 12 (in FIG. 2) and exteriorly bounded by the surfaces of the lower trailing course 15 in a central region thereof.

In the embodiment of FIGS. 1-4, lifting foil 10 has a starboard flow passage 22 and a port flow passage 24, as best illustrated in FIG. 3. These flow passages are generally symmetrical. As fluid flows through passages 22, 24, it experiences point-to-point variations in the magnitude and direction of the velocity. These velocity variations cause variations in dynamic pressure (commonly called "q") throughout the moving fluid. According to the well known Bernoulli equation, $q=\frac{1}{2}\rho V2$ where: $\rho$ is the density of the fluid, and V is the fluid velocity.

Lifting foil 10 experiences a net force having a magnitude and direction depending upon the size of its wetted area and the variations in dynamic pressure thereacross. FIG. 5A illustrates a pattern of incremental forces 63A-63H applied against the surfaces of flow guides 16, 18 as a result of dynamic pressure variations. Incremental forces 63A-63H are represented by vectors oriented normal to the surfaces of flow guides 16, 18 and having lengths corresponding to the magnitudes of the incremental forces being represented. For ease of illustration vectors 63A-63H represent vector sums of incremental forces operating at the same aspect angle against second surface 38 and third surface 39. As used herein, reference numeral 63 applies generally to any of the illustrated vectors, specific ones of vectors 63 being designated 63a through 63g. The total force exerted by the fluid against flow guide 16 is given by the expression: $F=\Sigma q\Delta A$ where $\Delta A$ is an elemental area wetted by the fluid. The vertical component of the vector F is the lift.

Still referring to FIG. 5A, attention is directed at vectors 63a and 63b. These vectors are of equal magnitude, horizontal and oppositely directed. Vectors 63a and 63b are therefore self-cancelling. Other vectors 63 have vertical components in addition to any horizontal component. The horizontal components are self-cancelling, but the vertical components of these vectors are commonly directed. Therefore the vertical components are additive, and lift-contributing. Similarly port flow guide 18 is subjected to pressure forces represented by vectors 63c and 63d having self-cancelling horizontal components. Vectors 63e 63f represent pressure forces at margins 52, 56 of flow guide 16, for example and have no horizontal component.

As indicated previously, the inboard boundaries of starboard flow guide 16 are delineated by upper starboard margin 52 and lower starboard margin 56. These two margins are shown schematically in FIG. 5A by a single, vertical phantom line. Similarly, a single vertical phantom line represents upper port margin 54 and lower port margin 58, the inboard boundaries of port flow guide 18. It will be understood that upper course 14 extends between upper starboard margin 52 and upper port margin 54 and has a uniform pressure pattern shown by the length of pressure vectors 63f and 63h. Similarly lower course 15 extends between lower starboard margin 56 and lower port margin 58 and has a uniform pressure indicated by vectors 63e and 63g.

Starboard and port flow guides 16, 18 create blended bridges between upper course 14 and lower course 15. And while their operation is not yet fully understood, it is believed that Starboard and port flow guides 16, 18 connect courses 14, 15 together in such a way as to cause each to function as a terminator for the other. It appears that they provide equalizing fluid flows which balance out spanwise pressure variations, thereby making courses 14, 15 behave like virtual two-dimensional wings. However, regardless of the precise process taking place within starboard and port flow guides 16, 18, the lifting foil of this invention inherently obtains remarkable results, as hereinafter described.

Figure 5B:
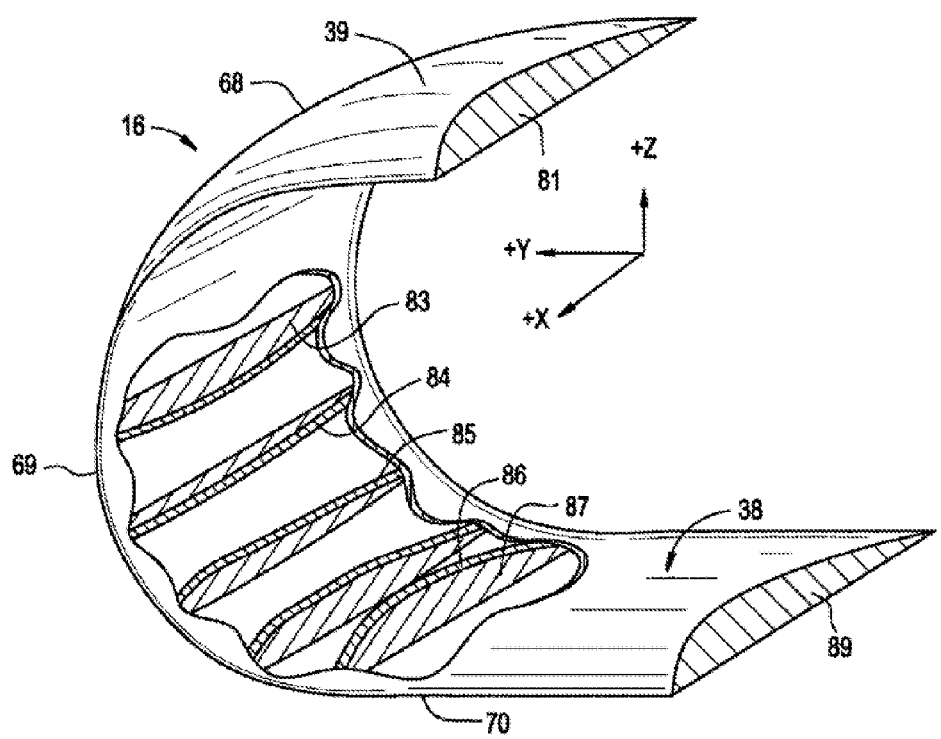
FIG. 5B is a partially cut away perspective drawing of a flow guide.

FIG. 5B illustrates a structure for a starboard flow guide 16. The structure of a port flow guide 18 would be identical, except for left and right hand parts differences. Referring now to FIG. 5B, flow guide 16 is seen to comprise a series of stiffening ribs secured between second surface 38 and third surface 39. For additional stiffness, the illustrated ribs may be tied together by one or more spars (not illustrated). Surfaces 38 and 39 have been introduced above and serve as covering for a large area of lifting foil 10. By way of example, surfaces 38 and 39 may be fabricated from thin aluminum sheet material.

FIG. 5B illustrates flow guide 16 with second surface 38 partially cut away to reveal five typical ribs 83, 87. Two end ribs 81 and 89 are also exposed. These latter two ribs are welded or otherwise secured to structure (not illustrated) at margins 52, 56. This creates blended connections between starboard flow guide 16 and adjoining ends of courses 14, 15. Two more ribs 82 and 88 are not illustrated in FIG. 5B but will be discussed below in connection with the description of FIGS. 6B and 6H. Port flow guide 18 is similarly joined to courses 14, 15 at margins 54, 58 respectively.

Figure 5C:
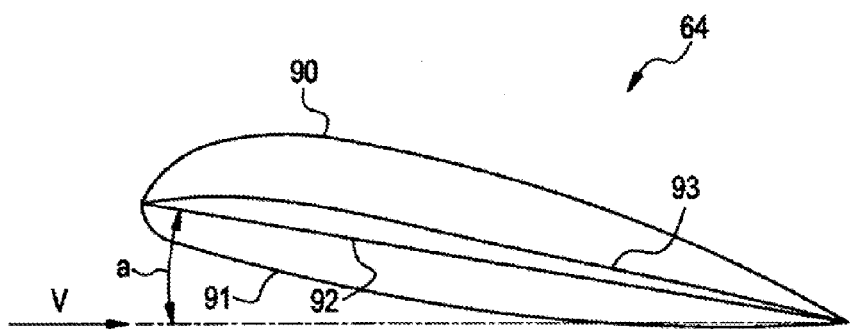
FIG. 5C is a diagram of a cambered airfoil.

FIG. 5C serves as an aid in understanding the geometry involved in the achievement of coordinated lift at both upper and lower ends of flow guide 16. Shown there is a side view of a rib, being generic in nature and labeled for identification with reference numeral 64. Rib 64 has an upper surface 90, a lower surface 91, a chord line 92 and a mean camber line 93. The chord line runs between the ends of the rib 64, while the mean camber line 93 follows a locus of positions midway between upper surface 90 and lower surface 91. The area between chord line 92 and mean camber line 93 represents the lift available from a surface wrapped around the rib 64. That lift may be increased by changing the curvature of surfaces 90 and/or 91 to increase or decrease the area between chord line 92 and mean camber line 93. The lift may also be changed by modifying the angle of attack, "a", the angle between chord line 92 and the relative fluid velocity "V".

Figure 6:
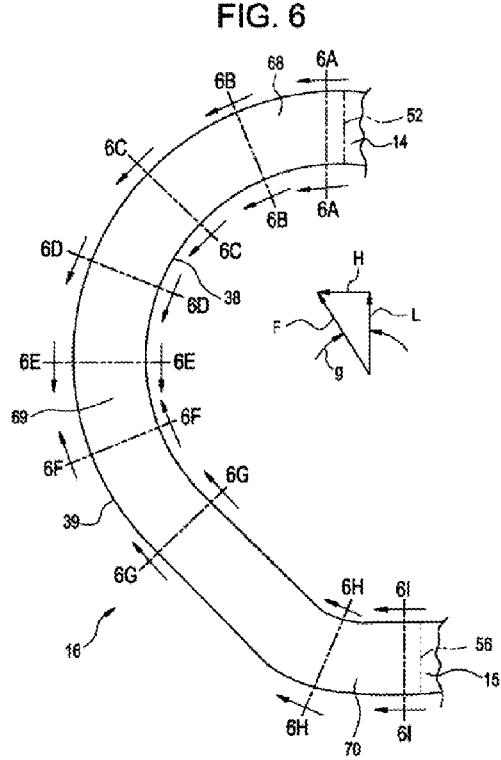
FIG. 6 is a schematic side view of a lifting foil according to the invention.

The operation of flow guide 16 is explained diagrammatically in FIG. 6. That figure has nine placement lines, 6A-6A through 6I-6I, indicating the locations and viewing directions for nine cuts across flow guide 16. Sketches of those nine cuts are appear on FIGS. 6A-6I, as indicated by reference numerals 81-89. Similarly, cross cuts across flow guide are represented by a, b, c in FIG. 13 and cross cuts across flow guide are represented by b, c, d in FIG. 15 and cross cuts across flow guide are represented by e in FIG. 17.

It is desired to produce substantially uniform lift along the lengths of courses, for example courses 14, 15 of FIG. 1 between their respective margin pairs 52, 54, 56 and 58. It is also desired to have that lift drop substantially to zero at the course margins 63a, 63b, 63c and 63d. Those desires substantially are met by placing flow guides 16, 18 between courses 14, 15, at margins 52, 54, 56 and 58 as described above. The flow guides have cambered cross-sections which provide lift ranging from a maximum value down to a minimum value, preferably zero, and then increasing from the minimum value back to the maximum. The maximum value for the lift is the same as the value of the lift at margins 52, 54, 56 and 58 of courses 14, 15. For present purposes it should be understood that the term "lift" is being used loosely as shorthand for "lift per unit span".

FIG. 6 assumes that lifting foil 10 is moving in the +X direction, thereby creating an apparent fluid motion in the -X or aft direction and producing lift in the -Z direction of FIG. 5B and +Z of FIG. 1, for example. Also appearing on the figure is a vector diagram. Shown there are the above-described net force vector, F, a lift vector, L and a horizontal vector, H. V and L meet at an angle, "g". H is perpendicular to L, so the three vectors define a right triangle. L is always vertical and is the vertical component of F. F may be positioned such that g may have any value between 0 and $\pi$ radians. The camber of the cross-sections illustrated in FIGS. 6A 6E may be made proportional to COS(g), so that the lift generated by the first $\pi/2$ rad. goes from max to 0. However, the camber of the cross-sections illustrated in FIGS. 6E 6I should be made proportional to COS($\pi$-g), so that the lift over that angular range goes from 0 to max. This matches the terminating pressure conditions at margins 52, 56. In a similar manner the pressure conditions at margins 54, 58 are matched by flow guide 18. In this manner the present invention is able to avoid a negatively directed lift by either of courses 14, 15. This invention provides flow guides in matching pairs such that each member views a termination of the other as a continuation of itself, thereby reducing pressure imbalances in the spanwise direction.

Referring now to FIGS. 6A 6I there are shown, by way of example, nine rib cross-sections 81 89. Ribs 81, 89 are substantially identical and are cambered to provide the above described maximum lift. Rib 85 (FIG. 6E) is perfectly symmetrical about a horizontal plane and generates no lift. Ribs 82 84 ramp the lift from the maximum down to zero, while ribs 86 88 ramp the lift from zero back to the maximum.

Figure 12:
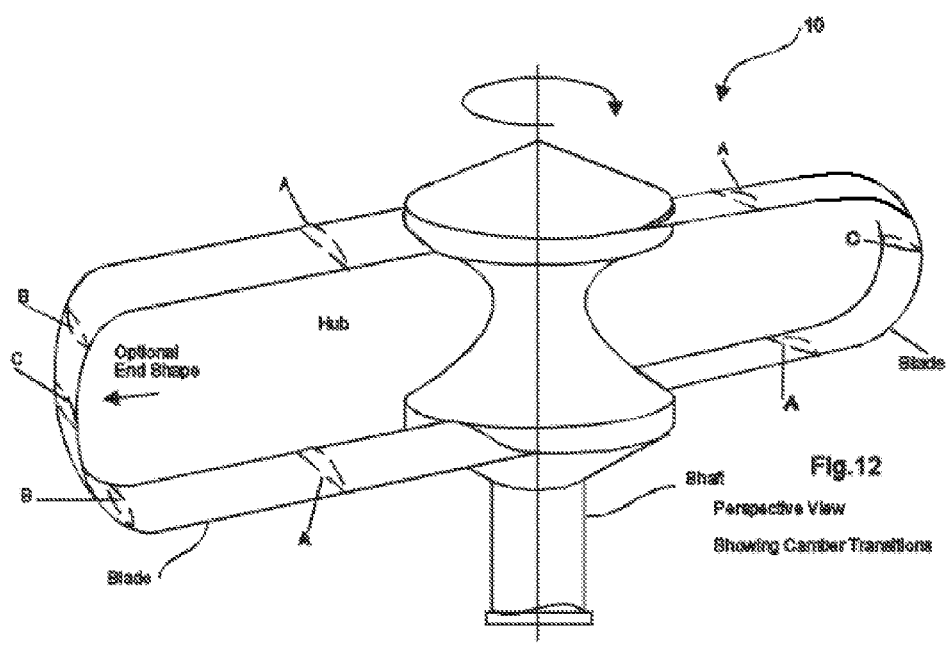
FIG. 12 is a perspective view of yet another alternative embodiment of the invention.
Figure 13:
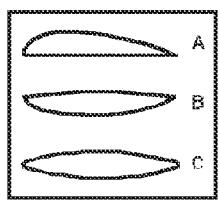
FIG. 13 depicts cross sections A-C of ribs located at angularly displaced positions on FIG. 12.

Similarly, FIG. 12 shows multiple rib cross-sections a, b, c. Ribs "a" are substantially identical and are cambered to provide the above described maximum lift. Rib "c" is perfectly symmetrical about a horizontal plane and generates no lift. Ribs "b" ramp the lift from the maximum down to zero and ramp the lift from zero back to the maximum.

Figure 14:
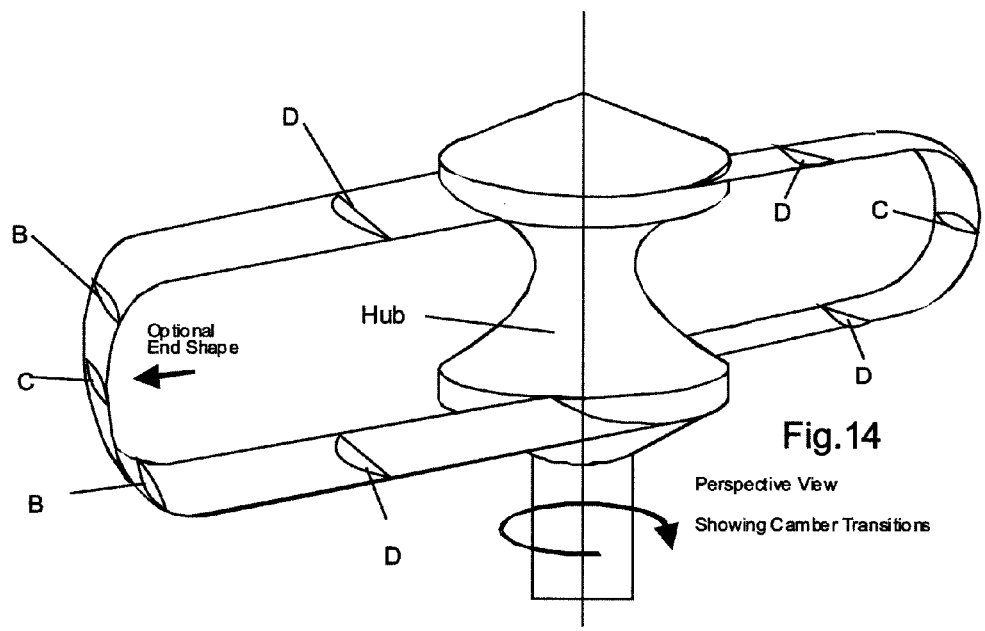
FIG. 14 is a perspective view of yet another alternative embodiment of the invention.
Figure 15:
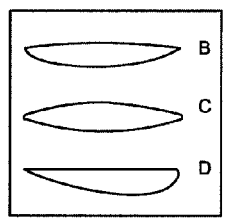
FIG. 15 depicts cross sections B-D of ribs located at angularly displaced positions on FIG. 14.
Figure 16:
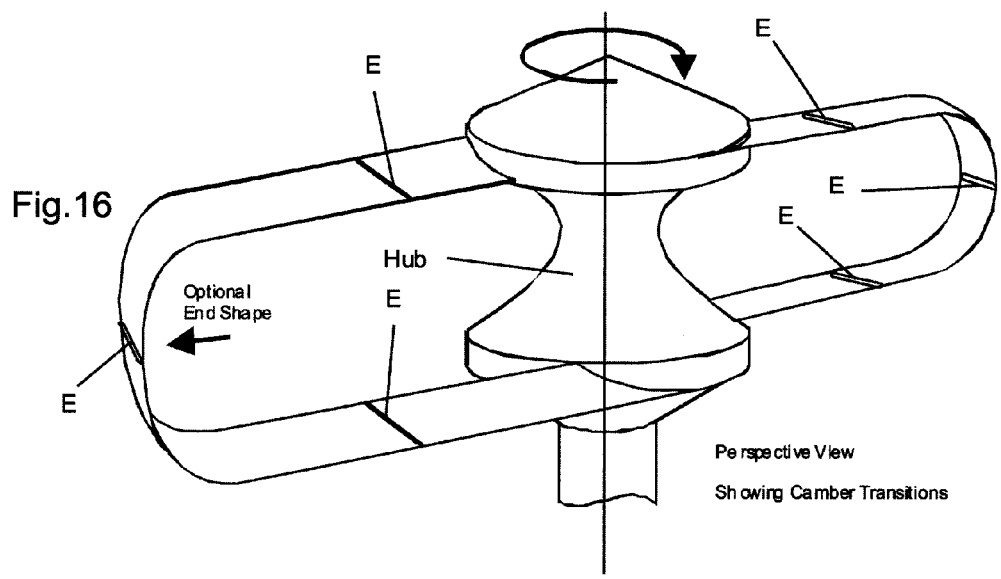
FIG. 16 is a perspective view of yet another alternative embodiment of the invention.
Figure 17:
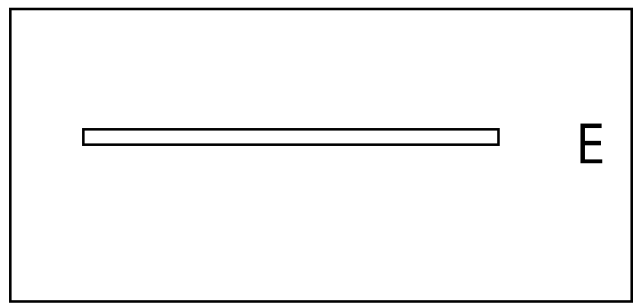
FIG. 17 depicts cross section E of ribs located at angularly displaced positions on FIG. 16.
Figure 18:
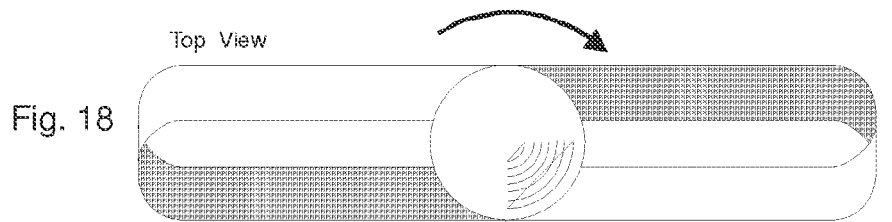
FIG. 18 is a top view of FIG. 12.
Figure 19:
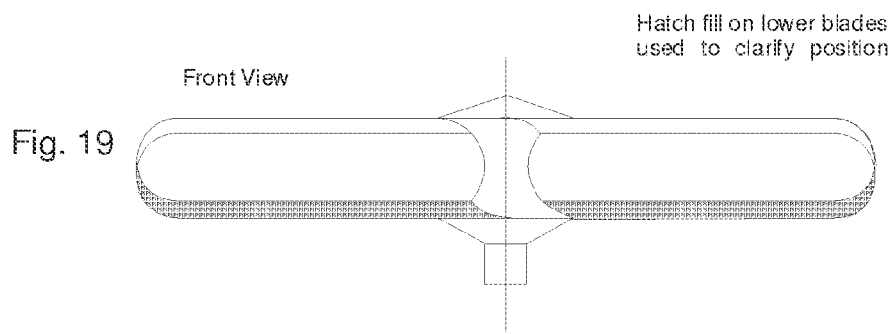
FIG. 19 is a side view of FIG. 12.
Figure 20:
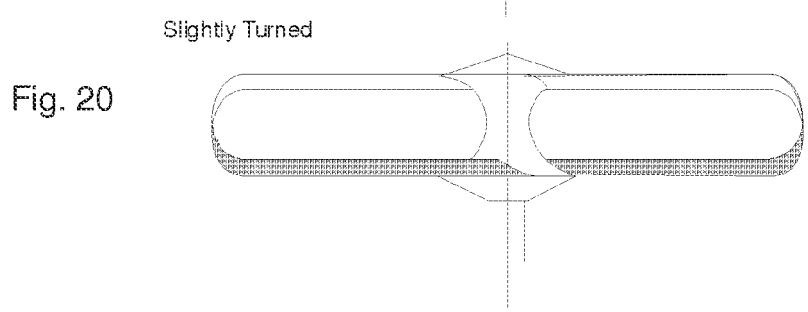
FIG. 20 is a slightly turned side view of FIG. 12.
Figure 21:
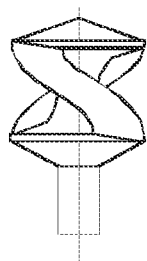
FIG. 21 is an end view of a propeller of FIG. 12.

Alternative embodiments of the foil design of the instant invention can be seen in FIGS. 12-26. Similarly, there are provided, by way of example, rib cross-sections a-e in FIGS. 13, 15, 17 which correspond to FIGS. 12, 14, 16, respectively. FIGS. 14 and 16 provide comparative embodiments to illustrate the invention.

It will be observed in FIG. 5C that the underside of lifting foil 10 is keel-shaped, extending symmetrically upward at an angle "a" on both sides of a baseline extending in the X-direction through reference point 12. This provides a small dihedral for minimizing adverse effects of sideslip. For embodiment as illustrated in FIG. 3, a suitable dihedral angle may be about 5 degrees, applied symmetrically to passages 22, 24. One of ordinary skill in the art may easily determine an appropriate dihedral angle for other embodiments of the invention. Cross sections of lifting foil 10 which are taken across the Y-Z plane have a generally elliptical appearance. The elliptical shape seems to play a beneficial role in the performance of the lifting foil. However, it is not known how much of the benefit is attributable to the elliptical shape and how much is due to other factors, such as flow guides 16, 18.

Figure 9:
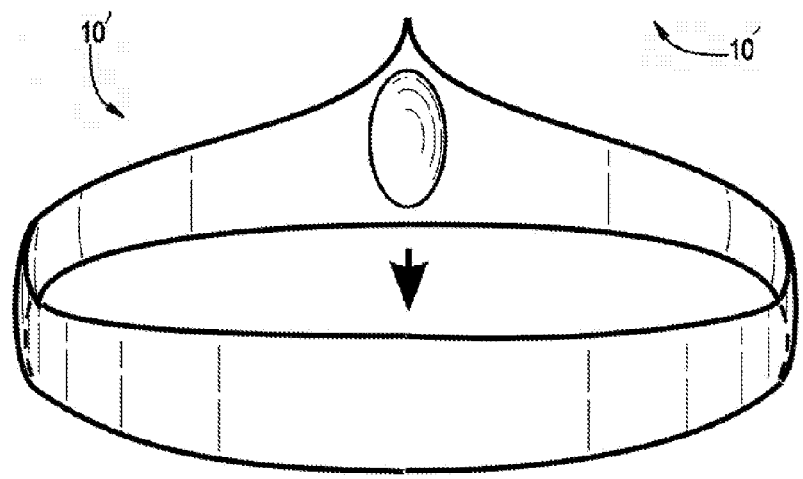
FIG. 9 is a top view of the embodiment of FIG. 8.
Figure 10:
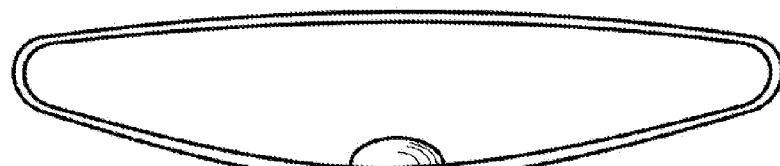
FIG. 10 is a front view of the embodiment of FIG. 8.
Figure 11:
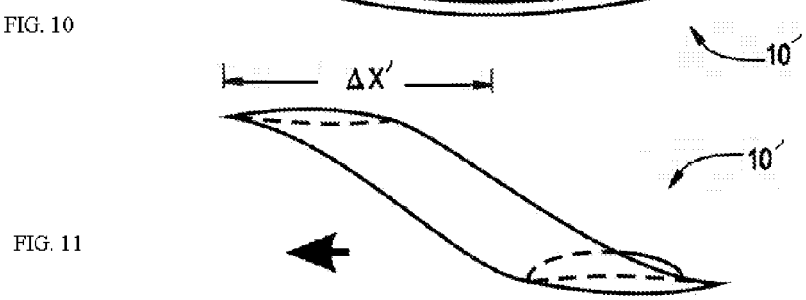
FIG. 11 is a side view of the embodiment of FIG. 8.

FIGS. 8-10 are top, front and side views respectively of a first alternative embodiment of the invention, a cargo-carrying "stretch" version. This version is identical to the version of FIGS. 2-4, except for the offset distance which has been increased from $\Delta X$ to $\Delta X'$.

Referring now to FIG. 1, 8, 12, the empirical study discussed herein indicates that the lifting foil of this invention is a substantial improvement over the standard wing. In particular, there is a significant improvement in span efficiency, in lift coefficient, in moment coefficient and a stability margin.

Quite unexpectedly, the instant invention and configurations provided herein have provided a new insight to traditional understandings of biplane theory operation. The instant invention has been empirically tested and is now the subject of a dissertation entitled "Gap and Stagger Effects on the Aerodynamic Performance and the Wake behind a Biplane with Endplates" by Hantae Kang University Dayton, Ohio August 2008. Part of the findings of Kang are incorporated herein in support the unexpected results and novel findings of increased aerodynamics achieved by the instant invention.

A combination of vortex lattice method, integrated force measurement, streamwise Particle image velocimetry (PIV), and Trefftz plane Stereo PIV were used to better understand the flowfield around the biplane with endplates. The Vortex Lattice code (AVL) shows that the gap and stagger have the most dramatic effects out of the six parameters studied: gap, stagger, dihedral, decalage, sweep and overhang which runs in contrast to previously accepted aerodynamic performance and associated flow physics.

Force balance measurements obtained with fourteen biplane configurations of different gaps and staggers show that as gap and stagger increase, the lift efficiency also increases at all angles of attack tested at both Re 60,000 and 120,000. Using the force balance data, a generalized empirical method for the prediction of lift coefficient as a function of gap, stagger and angle of attack was been determined and validated when combined with existing relations for CL-α adjustments for AR and taper effects. The resulting empirical approach allows for a rapid determination of CL for a biplane having different gap, stagger, AR and taper without the need for a complete flowfield analysis.

Per the study, Two Dimensional PIV results show a distinctive pattern in the downwash angle for the different gap and stagger configurations tested. The downwash angle increases with increasing gap and stagger. It is also evident that the change in downwash angle is directly proportional to the change in lift coefficient. Increasing gap spacing increases the downwash angle as well. Based on the concept of downwash angle, the upper wing in the biplane is responsible for a greater portion of the lift across a wide range of gap and stagger.

Stereo PIV analysis show that the positive stagger configuration has significantly different flow characteristics compared to the others. The spanwise and vertical velocity components can be largely manipulated by the presence of the endplates and the stagger condition of the upper wing. When the upper wing is positively staggered, the biplane generates well-formed vortices. This creates an upwash outboard of the endplates as well as a vortex at the trailing edge of the wing and endplates.

Therefore, positive and negative stagger configurations produce a significant difference in effective angle of attack for both the upper and the lower wings in the biplane. Different downwash angles were observed in terms of varying configurations for the upper and lower wing surfaces in the biplane. The resulting measured integrated lift force is proportionally related to the observed downwash angles.

A finding was made that the instant invention defies one of the underlying assumptions in Munk's biplane analysis (Munk's 1923 paper "General Biplane Theory") of the additional lift force for upper and lower surface is invalid. A dramatic lift slope change ($C_{L_g}$) was found at an angle of attack around 5°. Clearly, positive stagger and larger gap configurations produce higher lift slopes than negative stagger and smaller gap configurations since lift efficiency increased with increasing stagger and gap.

The integrated force study resulted in the conclusion that there is a substantial difference between positive and negative stagger. This result is a direct contradiction to the long standing predicted results of Munk. The integrated force study also exposed a "kink" in the lift curve of the biplane with endplates. Apparently this "kink" has been in the literature for over 75 years, yet no direct reference to it or its source has been found.

Results from 2-dimensional and 3-dimensional flow diagnostic techniques were used to explain the differences uncovered in the force study in positive and negative stagger, as well as the "kink" in the lift curve. The potential flow results do not show similar behavior; however, there is very little dependence of the behavior of the "kink" on Reynolds number in the range tested (60,000 to 120,000). Since the lift curve is linear with one slope before the kink, and again linear with a different slope after the kink, suction lift is not suspected. In addition, 2-dimensional streamwise momentum deficit drag accounts for the vast majority of the 3-dimensional drag measured by the force balance indicating the unlikelihood of significant rotational effects.

It was notable that the source of the "kink" in the lift curve is still not fully understood. It appears to always occur around the point of maximum lift to drag ratio. Therefore it is believed that whatever is at the source of the kink increases lift faster than it increases drag. Many successful connections are made, nevertheless, between the integrated force results and the flowfield results (using Kutta-Joukowski Integration of Lift, Momentum Deficit Drag, Downwash angle related to lift), and some related back to Munk's equivalent monoplane and Prandtl's orthogonal biplane theorems.

As part of the empirical study, a model known now as the "Houck Configuration" as generally depicted in FIGS. 1-4 was used for the study. The Houck Configuration is a type of biplane joined at the tips with endplates or cambered flow guides 16, 18 designed to combine the individual wingtip vortices into a single vortex that is more widespread as displayed in FIGS. 5A and 5B. The study bears out the asserted design.

As noted in applicant's prior patent the described configuration asserted an improvement in the aerodynamic performance of the lifting foil by reducing the induced drag through the reduction of spanwise fluid flow over the wings. If endplates reduce the lift induced drag more than the associated increase in parasite drag then the L/D can be improved as it is anticipated that the presence of endplates generates positive interactions between the wings by capturing the tip vortices or reducing their deleterious effects.

An analytical and experimental examination of the aerodynamic characteristics of the biplane with endplates as a function of changes in several parameters commonly used to describe the biplane configuration such as gap and stagger included:

Reducing the experimental parametric space of the biplane with endplate configuration through computational analysis using AVL (Athena Vortex Lattice Method, http://web.mit.edu/drela/Public/web/avl/); A large number of biplane related parameters varied using AVL and a set of models will be chosen for experiments where large gradients in the aerodynamic performance were observed.

Measuring the integrated forces on the biplane configurations from wind tunnel experiments to determine the aerodynamic effects of the relative proximity of the second wing. Two dimensional velocity data in the wake of the wing is generated using PIV; This is used to calculate the total drag on the biplane using the momentum deficit method to compare to the integrated force. Three dimensional Stereo PIV was performed in the Trefftz plane in order to determine lift via Kutta-Joukowski integration of circulation (a fundamental theorem of aerodynamics), which is compared to the integrated lift force measurement.

Lift Induced Drag was also examined and induced drag is mainly created by the vortices at the tip of an aircraft's wing. It is the "least understood type of drag, but it is the most important, especially in the low-speed region of flight".

Induced drag increases proportionally as angle of attack increases. The high pressure on the lower wing causes the airflow at the tips of the wing to curl around from bottom to top in a circular motion. This results in a trailing vortex behind the wing tips. The circular motion at the wing tip creates a change in the angle of attack causing an increase in drag. The more the angle of attack is increased, the greater the amount of lift developed and the greater the induced drag.

The lift slope for a finite wing decreases as the AR decreases. As the AR decreases, the flow effects over the wing due to the tip vortices are stronger. It was mentioned that wings with AR less than four have poor aerodynamic characteristics because they must be modeled by a large number of spanwise vortices. When the AR is increased it reduces the effect of wing tip vortices. Therefore, wing tip vortices are an important factor that must be considered to improve the aerodynamic performance of any finite wing configuration.

One explanation for the physical mechanism for generating lift is the existence of high pressures on the bottom surface and a low pressure on the top surface of the wing. The net imbalance of the pressure distribution creates the lift force and the induced drag results as a by-product. The airflow near the wing tips curls around the tips as it moves from high to the low pressure regions. This circular motion is called wing tip vortices.

Figure 27:
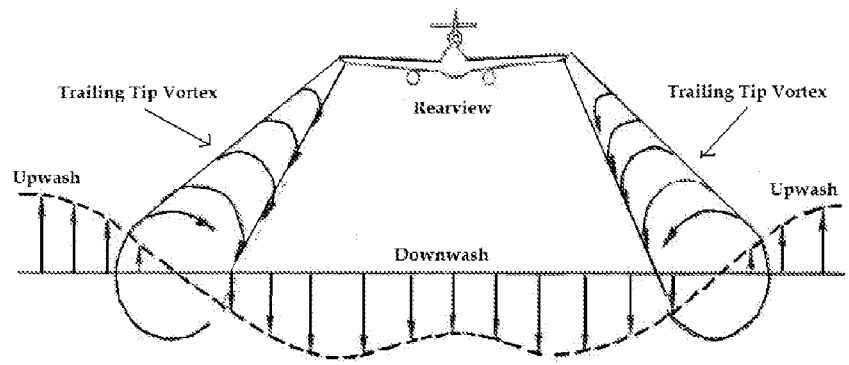
FIG. 27 depicts the effect of trailing tip vortex and curl.

These wingtip vortices then cause a downward airflow in the wake of the aircraft at the trailing edge of the wing. This downward flow displayed in FIG. 27, acts the strongest toward the wing tip while losing strength towards the aircraft body assuming an elliptical distribution of lift.

Figure 28:
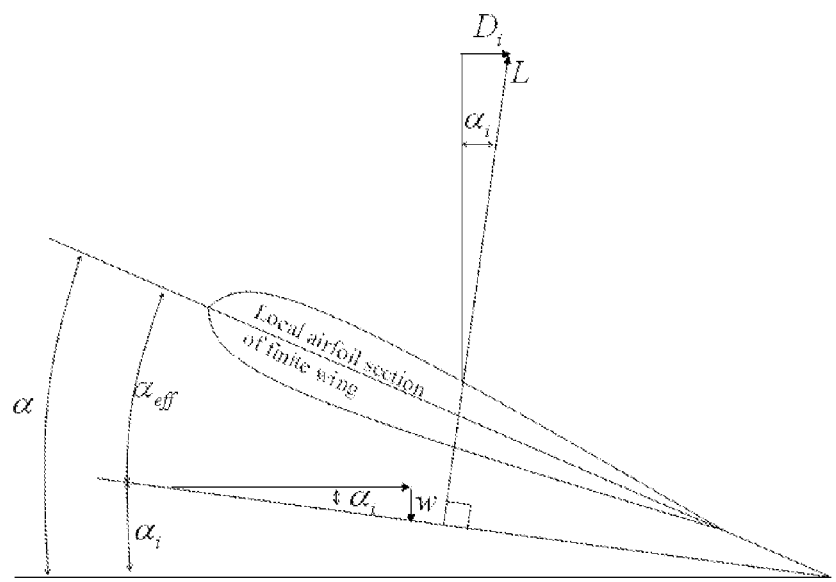
FIG. 28 depicts the downwash, w, that decreases the geometric angle of attack to the effective angle of attack, $\alpha_{eff}$, resulting in a drag component called induced drag denoted by $D_i$.

Therefore, if wing tip vortices are controlled, the aerodynamic efficiency of the wing configuration will be improved. Wingtip vorticies induce a small downward component of air velocity at the trailing edge called downwash, w. FIG. 28 shows an inclined local airflow below the freestream direction, $V_\infty$ by the induced angle of attack, $\alpha_i$. Downwash has two important effects on the wing performance: a reduced effective angle of attack that reduces the lift, a portion of the lift that acts as a drag force. A portion of the wing tip vortices cause a rotation of the lifting force called induced drag, or drag due to lift. FIG. 28 also shows downwash, w, that decreases the geometric angle of attack to the effective angle of attack, $\alpha_{eff}$, resulting in a drag component called induced drag denoted by $D_i$.

On the other hand, one way of trying to understand the amount of downwash produced by a wing surface is called the 'momentum' theory of lift. In this theory, the lift produced by a wing is equal to the downward 'push' it gives to the air that it passes through. By deflecting the air downwards, the wing is lifted. This downwash angle is the flow angle with respect to the relative wind (far field velocity).

Figure 29:
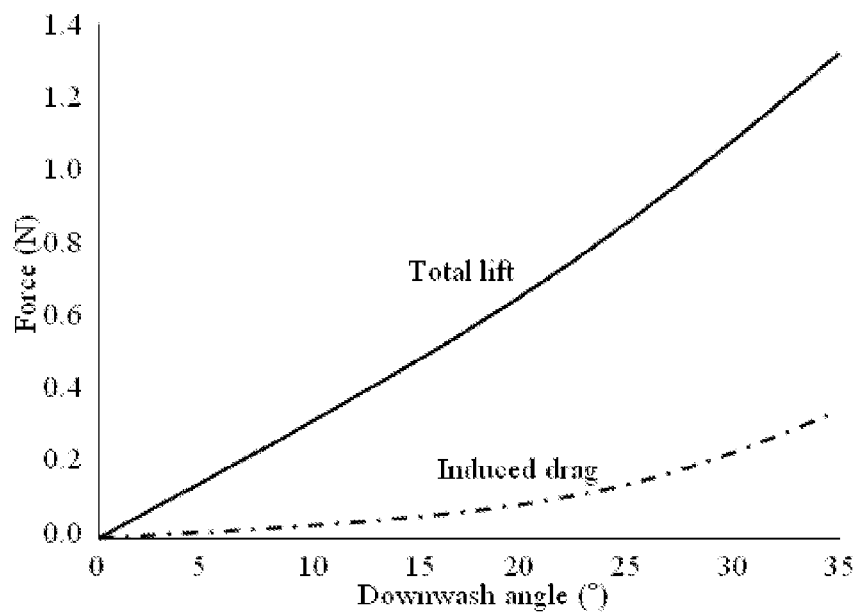
FIG. 29 depicts the effect of the downwash angle on lift.

From this relation it is observed that the downwash angle grows with increasing lift coefficient. FIG. 29 shows a total lift force that gradually increases with the downwash angle. Because this induced drag is a by-product of lift force, downwash angle at the tail is linearly proportional to the lift force for the wing.

Figure 30:
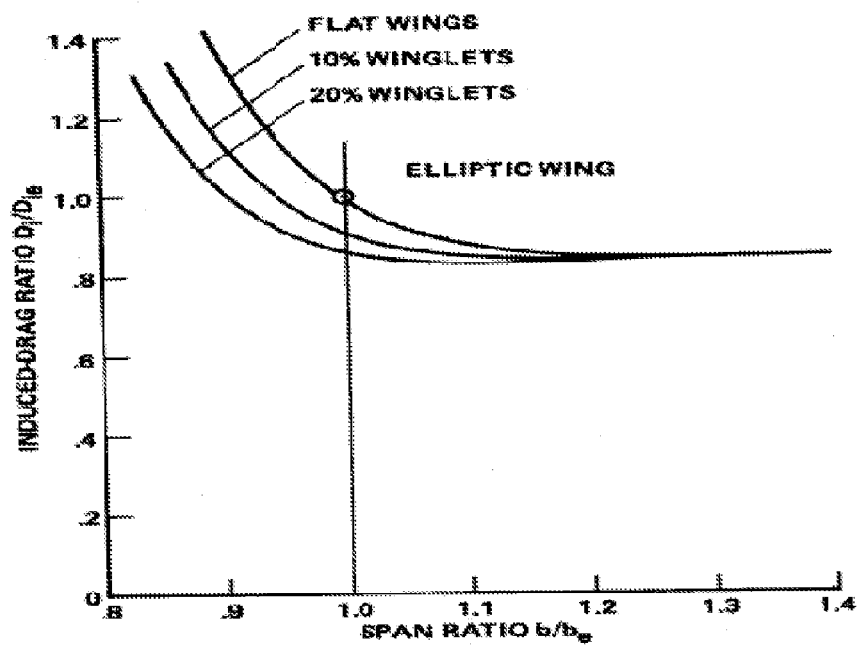
FIG. 30 depicts a graph showing that increasing size winglets reduce lift induced drag in comparison to flat wings.

An elliptic wing with a 10% to 20% span extension winglet has a maximum induced drag reduction of about 11% as compared with an elliptically loaded planar wing (see FIG. 30).

Munk in the General Biplane Theory derived some useful formulas using theoretical and experimental data. According to him, the additional lift coefficient of staggered wing is:

$$\Delta C_L = \pm 2 C_L \frac{S}{b^2}\left(\frac{1}{k^2} - 0.5\right)\frac{b}{R}\frac{st}{b}$$

Figure 31:
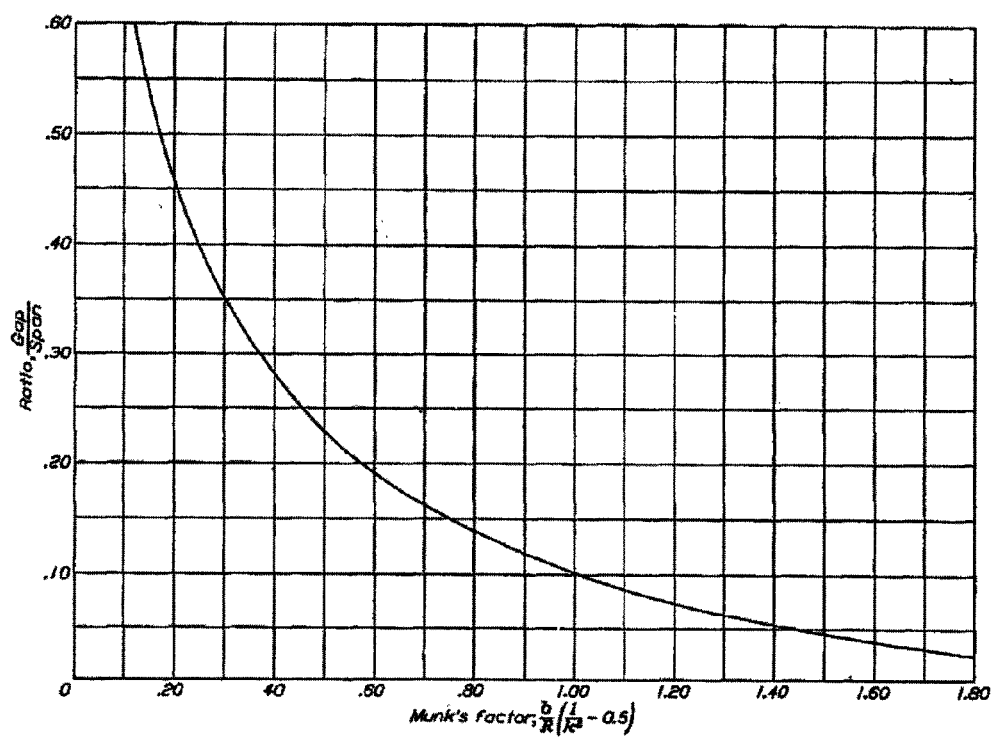
FIG. 31 depicts a graph showing that when the gap increases (holding span constant) Munk's factor decreases and, consequently, CL decreases.

Where, S is the total area, st the stagger, b the span, k the equivalent monoplane span factor, and R a distance used in calculating the induced downwash. He gives $$\left(\frac{1}{k^2} - 0.5\right)\frac{b}{R}$$

as a function of the ratio of gap to span G/b, which is called 'Munk factor'. (see FIG. 31).

Figure 32:
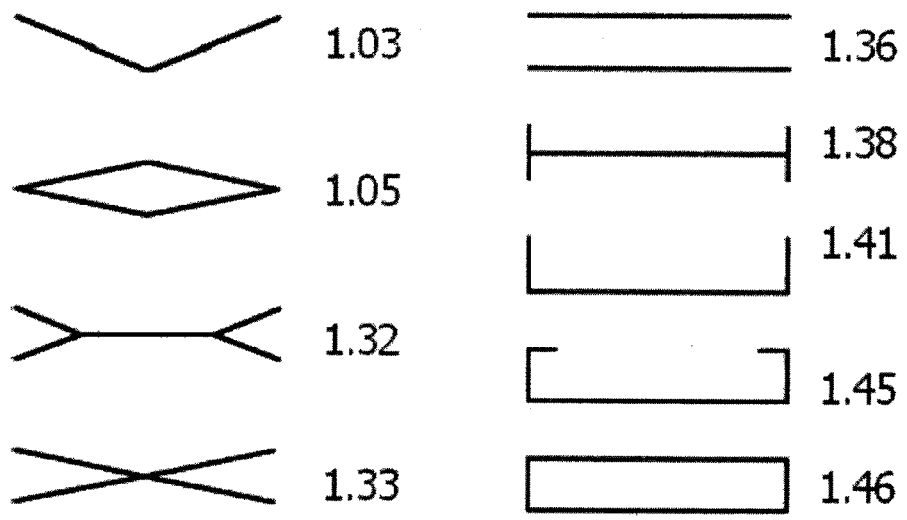
FIG. 32 depicts a graph showing span efficiencies for various optimally loaded nonplanar systems.

It was noted that the span efficiency based on different nonplanar wings shown in FIG. 32 denote the wake affects the minimum drag by illustrating the maximum span efficiencies for a range of concepts with fixed height and span. It is clear that the vertical extent of the system near the tips is the critical parameter.

Figure 33:
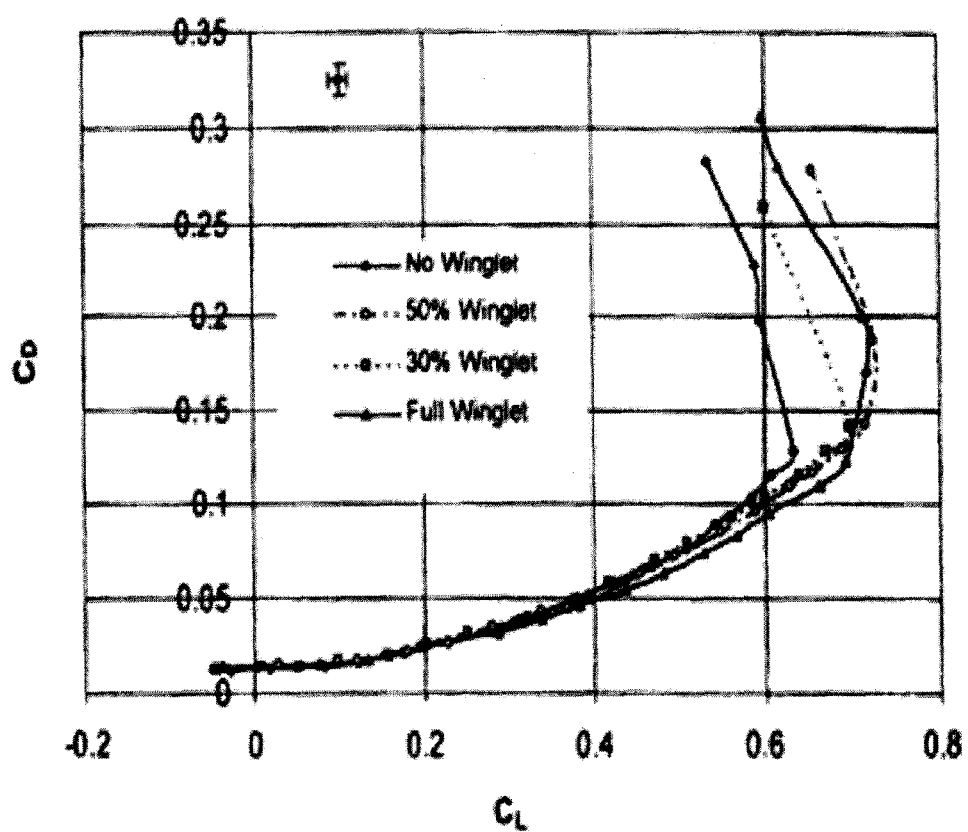
FIG. 33 depicts a graph showing span efficiency.

A reduction of vortex drag may have a significant effect on fuel consumption. Furthermore, vortex drag is even more significant at low speeds where vortex drag typically accounts for 80%-90% of the aircraft's climb drag at critical take-off conditions. The span efficiency factor for the full endplate configuration (FIG. 33 was 22% improved over the nonendplate configuration). In addition, the 30% of endplate also obtained around 10% drag reduction at CL=0.6 and more than 22% span efficiency factor compared to nonendplate configuration. Interestingly, at CL>0.7, the 30% of endplate obtained a little higher aerodynamic characteristic than the full endplate configuration.

Kang describes aerodynamic forces acting on a biplane wing requires the combination of several methods of analysis to explain the three-dimensional characteristics of the flow with a focus on the vortex behind a simplified Houck configuration. A simplified box-wing configuration, defined using gap and stagger, was used wherein Gap and Stagger were varied. Gap is defined as the distance measured between the leading edges of the two wings perpendicular to the freestream. Stagger is defined as the distance measured between the leading edges of the upper and lower wings measured parallel to the freestream. When the upper wing was offset in the forward direction, it has a positive stagger, according to the conventional definition. The positive and negative stagger configurations were considered.

Further, decalage, dihedral, anhedral, sweep were considered. Five different cases with decalage, ranging from −4 to +4 with 2-degree increments, are considered in the AVL study. Four different configurations were considered based on the shape of the wings: Upper and lower wings in a dihedral position; Both in an anhedral position; Upper wing in a dihedral position and the lower wing in an anhedral position; and Lower wing in a dihedral position and upper wing in an anhedral position. For each configuration, three different dihedral or anhedral angles are applied with 2-degree intervals.

Wing sweep angles were considered for both wings of the simplified Houck configuration. Three different cases, with sweep angles ranging from 0 degrees to 60 degrees with 30-degree intervals, were evaluated.

Overhang ratio for a biplane is defined as the ratio of the span of the lower wing to the span of the upper wing. Overhang is written as:

$$\text{Overhang ratio} = \frac{\text{lower wing span}}{\text{upper wing span}}$$

Six different cases with overhang ranging from 0.8 to 1.2 were evaluated.

Particle Image Velocimetry (PIV) was used to empirically measure aspects of the Houck configuration.
  a. Indirect velocity measurement; PIV measures the velocity of a fluid element indirectly by means of the measurement of the velocity of tracer particles within the flow.
  b. Whole field technique; PIV method records images of large parts of flow fields in a variety of applications in gaseous and liquid media. Instantaneous image capture and high spatial resolution allow the detection of special structures in unsteady flow fields.

c. Velocity lag; this method requires us to check whether the particles will faithfully follow the motion of the fluid elements. Basically, smaller particles will follow the flow better.
d. Illumination; a high power light source for illumination is required such that the light scattered by the tiny tracer particles will be recorded by the CCD camera sensor.
e. Duration of illumination pulse; the duration of the illumination light pulse must be short enough to avoid blurring of the image.
f. Time delay between illumination pulses; the time delay must be long enough to be able to determine the displacement of the tracer particles between two images and short enough to avoid loosing particles with an out-of-plane velocity component, leaving the light sheet between subsequent illuminations.
g. Distribution of tracer particles in the flow; A homogeneous distribution of medium density is desired for high quality PIV recordings in order to obtain optimal evaluation.
h. Density of tracer particles on the PIV recording; particle density must be sufficient enough, so any loss of correlation due to insufficient seeding is avoided.
i. Number of illuminations per recording; it should be distinguished whether it is possible to store images of the tracer particles on different frames for each illumination or whether all particle images due to different illuminations are stored on a single frame.
j. Size of interrogation area; this size must be small enough that velocity gradients have no significant influence on the results. It determines the number of independent velocity vectors and the maximum spatial resolution of the velocity map.
k. Repeatability of evaluation; PIV recordings can easily be exchanged for evaluation and post processing with others employing different techniques.

A Neodym-Yttrium-Aluminum-Garnet (Nd:YAG) lasers laser wavelength, λ=532 nm) solid-state lasers for PIV were used in which the beam is generated by Nd3+ ions for PIV. Talc was used for seeding in this experiment, which is one type of magnesium. A medium particle image density was used for standard statistical PIV evaluation techniques.

The image density in an interrogation area is a result of the number of particles found in a circle diameter that has an area equal to an interrogation area that is projected back into the airflow a distance equal to the thickness of a laser sheet. It is thought that the required image density that needs to be present to generate a high-validated vector result in PIV expressed in particles per mm3, Ni.

Using the results of the AVL computational parametric study, two defining factors for the aerodynamic characteristics of the biplane were chosen; gap and stagger. Eight different models were selected for experimental wind tunnel testing based on these parameters. The models were fabricated according to the following gap and stagger variations. Each wing has a 12 inch semi-span and a chord of 4 inches with a flat plate profile and a thickness to chord ratio of 1.18%. Six models (Model #3~#8) can be reoriented to produce positive or negative stagger allowing fourteen configurations to be obtained with eight models.

Parametric variation of stagger and gap by model number

| Model # | Gap | Stagger |
|---|---|---|
| 1 | 1.0 C | 0.0 C |
| 2 | 0.5 C | 0.0 C |
| 3 | 0.5 C | (+)0.5 C, (−)0.5 C |
| 4 | 0.5 C | (+)1.0 C, (−)1.0 C |
| 5 | 1.0 C | (+)0.5 C, (−)0.5 C |
| 6 | 1.0 C | (+)1.0 C, (−)1.0 C |
| 7 | 2.0 C | (+)1.0 C, (−)1.0 C |
| 8 | 1.0 C | (+)1.5 C, (−)1.5 C |

* C: chord length (4 inches), AR = 6, total wing area = 192 $in^2$ for full span model Semi-span models were used in a sidewall mount for greater force and moment measurements to reduce error. Each model constructed was actually a semi-span wing with bolts through the endplate for attachment. This allowed force measurements at this endplate.

The eight models have an average chord length (C) of 4", a semi-wingspan (b) of 12". The wings are based on a flat plate profile. They have a rectangular planform with an area (S) of 192 $in^2$. The following are the Schematics of the full-scale models drawn in AVL (see FIG. 35A-H show eight models with different gaps and staggers).

Numerous experiments were performed in an Eiffel type low speed wind tunnel at the University of Dayton (the UD LSWT). The wind tunnel is an open circuit with the test section, 30 inches (width) by 30 inches (height) by 90 inches (length). The contraction ratio of the tunnel is 16:1 and capable of continuous operation at velocities of over 120 mph. Aerodynamic forces and moments were measured at Reynolds number (Re) 60,000 and 120,000 with a turbulence intensity of ~0.035%. All models were mounted at the longitudinal mid-chord.

A six-component Gamma Sensor (ATI Industrial Automation) was used in a sidewall mount configuration in the floor of the tunnel to measure the aerodynamic forces generated on each model. The maximum forces and moments are listed in the following Table.

Table of Maximum Allowable Forces and Moments for the Balance

| Component | Maximum Load |
|---|---|
| Lift - FX | ±235 lb |
| Drag - FY | ±235 lb |
| Side - FZ | ±736 lb |
| Yaw - TX | ±618 in-lb |
| Roll - TY | ±618 in-lb |
| Pitch - TZ | ±727 in-lb |

The related sensing ranges and resolutions are listed in the following Table. The calibration process for force and moment measurements was performed.

Table of Sensing ranges and Resolution (9-25 Calibration)

| Component | Rated Sensing Ranges | Resolution |
|---|---|---|
| Lift - FX | ±7.5 lb | 1/2560 lb |
| Drag - FY | ±7.5 lb | 1/2560 lb |
| Side - FZ | ±25 lb | 1/1280 lb |
| Yaw - TX | ±25 in-lb | 1/1280 in-lb |
| Roll - TY | ±25 in-lb | 1/1280 in-lb |
| Pitch - TZ | ±25 in-lb | 1/1280 in-lb |

On top of the force transducer, a rotary stage RM-5-100 from Newmark Systems was placed for variation of the angle of attack. In order to obtain the data for a model, the test models are mounted on a rotary stage which is placed on the top of the force transducer. The force transducer and rotary stage were placed underneath the tunnel. The accuracy of the rotary stage is 72 arc seconds. All models were connected to the rotary stage by an aluminum cylinder through the floor of the tunnel.

The specifications of the rotary stage are listed in the following Table.

| Table of Rotary Stage Specifications | |
|---|---|
| Repeatability | 5 arc-seconds |
| Resolution | 0.36 arc-seconds |
| Accuracy | 72 arc-seconds |
| Gear Ratio | 72:1 |
| Max. Load | 275 lbs |
| Moment | 260 in-lb |
| Max. Speed | 1200 RPM |
| Travel | 360° Continuous |

After the mounting mechanisms were installed in the wind tunnel, the aerodynamic forces and moments were measured before installing a model at the desired wind tunnel speed. These are known as tare. The net aerodynamic forces and moments on the model wingspan sections are determined by subtracting the aerodynamic tare from the measured forces and moments in the transducer.

Figure 36:
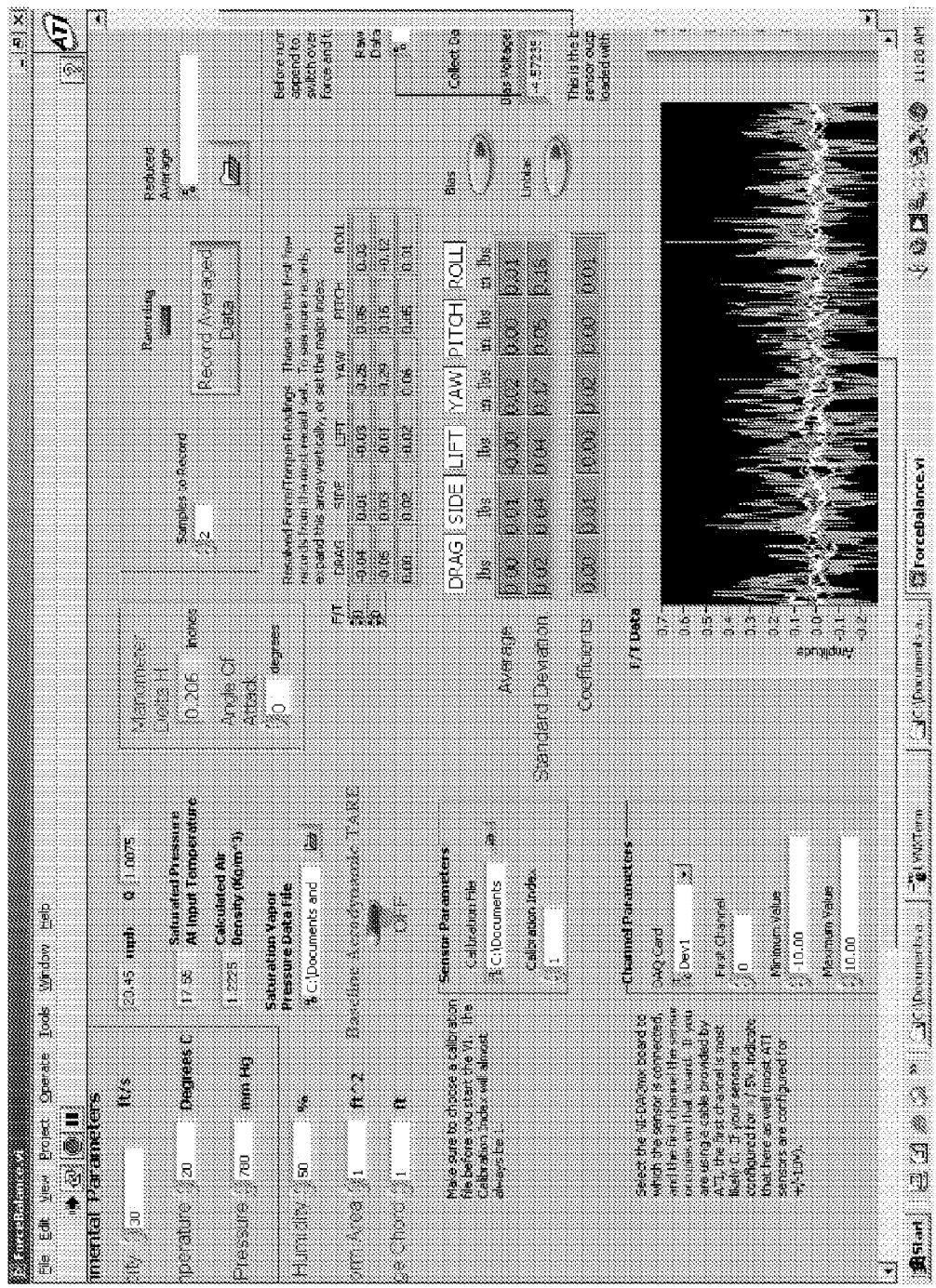
FIG. 36 is a screen capture of a window that was developed for the force balance application.

Force Acquisition Software under the trademark LabView™ 8.0 was used for data acquisition. FIG. 36 is a screen capture of a window that was developed for the force balance application in the UD LSWT.

The net forces and moments on the wing section were observed indirectly by changes in voltage in strain gages. The strain gage values are the input to the calibration matrix to obtain forces in lbf and moments in in-lbf. The sampling rate used was 1000 data samples per second. Data were collected over two seconds in nonconsecutive one second time intervals.

Determination of Freestream Velocity

Before any data were collected, atmospheric conditions at the tunnel inlet were obtained to normalize values collected at different times in the study. The barometric pressure, humidity, and temperature in the room were determined by barometer, hygrometer, and thermometer.

Two UAV relevant Reynolds numbers were selected, 60,000 and 120,000. Testing used angles of attack from −2° to 10°. The wind tunnel test section velocity is set using a pitot-static tube and a manometer in the following manner. The pitot tube is first placed in the freestream in the inlet to the test section. The air density was calculated from Equation for ΔH, where ρ is the air density, T is the room temperature in Celsius, AP is the barometric pressure in mmHg, SVP is the saturation vapor pressure for a given temperature T, and RH is the relative humidity.

$$\rho = 1.2929 \frac{273.13}{T+273.13} \frac{[AP-(SVP*RH)]}{760}$$

Substituting temperature, pressure and humidity into equation ρ yields the local air density. The equation used to determine the delta H in inches needed for a given velocity is shown in the following Equation. V is velocity in m/s, $\rho_{air}$ is the air density in kg/m3, $\rho_{redoil}$ is the density of the red colored oil in the manometer in kg/m3, and g is gravity in m/s2, and the constant 39.37 is the conversion factor from meters to inches.

$$\Delta H = 39.37 \frac{V^2 \rho_{air}}{2\rho_{redoil} g}$$

The Reynolds number equation was used for computing the freestream velocity with Reynolds numbers of 60,000 and 120,000. The velocities obtained from the Reynolds number equation were then used in equation 3.2 to determine the manometer reading ΔH. This is how wind tunnel velocity was set in all tunnel experiments.

Hysteresis and Repeatability

Figure 37:
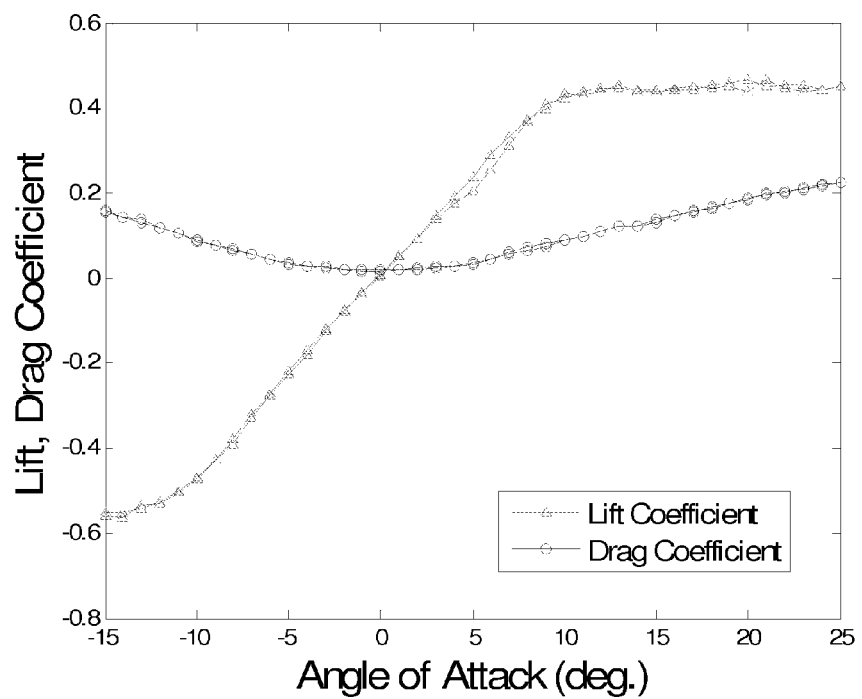
FIG. 37 depicts a graph of the level of hysteresis seen in the lift and drag data with a model (gap 0.5 C, stagger (−) 0.5 C) at Re 60,000.
Figure 38:
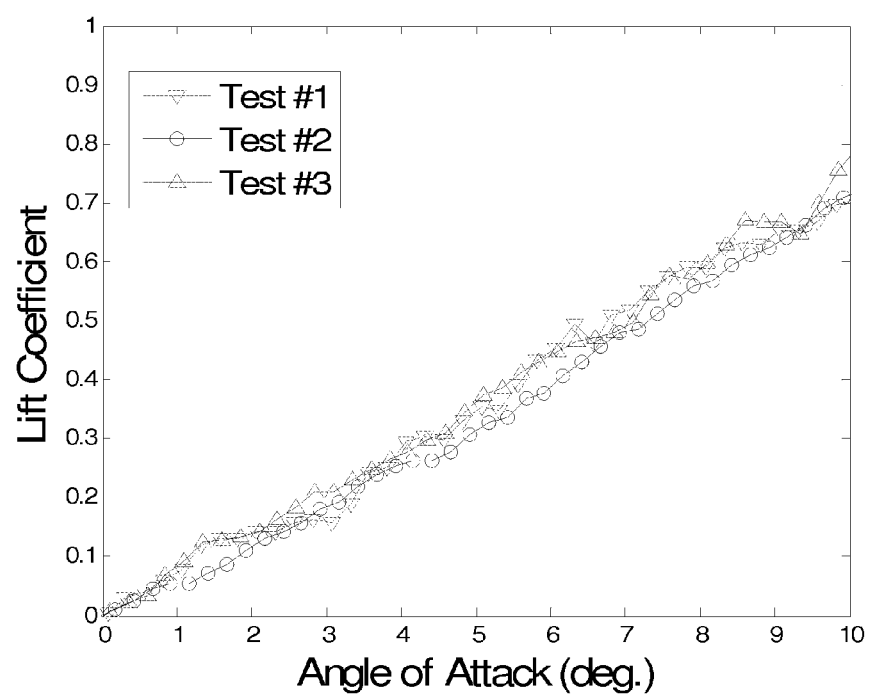
FIG. 38 depicts a graph showing a low level of Repeatability seen in the lift coefficient vs. angle of attack with a model (gap 0.5 C, stagger 0.5 C) at Re 60,000.
Figure 39:
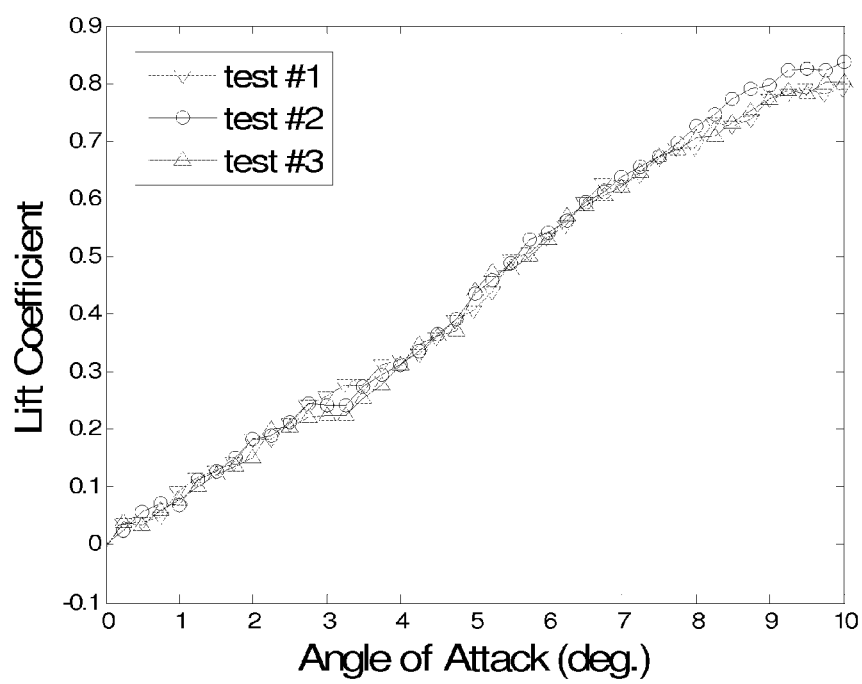
FIG. 39 depicts a graph showing an example of the level of Repeatability seen in the lift coefficient vs. angle of attack with a model (gap 2.0 C, stagger 1. C) at Re 120,000.

To verify the quality of the measured data, the models were tested for both repeatability and directionality (hysteresis). An example of this can be seen in FIG. 37. At a 5° angle of attack, a mild hysteresis can be seen in the lift data. This amount of hysteresis was indicative throughout the tests at 5° angle of attack. 96.7% repeatability for Re 60,000 and 95.3% repeatability for Re 120,000 were obtained in the measured data FIG. 38 and 39.

An aerodynamic tare is subtracted from the force balance measurement to obtain the net aerodynamic forces and moments. This tare is obtained by measuring the loads on the test mount without the models installed.

The turbulence level of the freestream was measured spatially using PIV. The intensity of turbulence is computed with the following equations;

$$\text{Turbulence Intensity} = \frac{u_{rms}}{\bar{u}}, u_{rms} = \sqrt{\frac{1}{N}\sum_{i=1}^{N}(u_i(t)-\bar{u})^2}$$

Where u(t), is instantaneous velocity, $u_{rms}$ is the root-mean-square of the turbulent velocity fluctuation, and $\bar{u}$ is the mean velocity. The turbulence intensity for the test area was found to be ~0.035%.

Uncertainty Analysis

The uncertainty associated with the wind tunnel test measurement comes from a variety of components. This uncertainty arises from inaccuracies inherent in the measuring tools and repeatability of measurements. A component of error generally comes from two main sources: precision error (Px) and bias error (Bx). Precision error is the repeatability of a measurement with a single part at the same environmental conditions. The precision of a testing device is therefore determined by taking multiple measurements and determining the repeatability in the measurements.

Uncontrollable effects, such as ambient temperature, humidity, and pressure, affect measurements with most instruments. This is bias error that shifts the measured value away from the true value. When all data points are shifted in one direction from the true value, bias error is present. Bias error is repeatable and is corrected by using a constant offset value. Bias error remains constant when measurements are taken under similar environmental conditions. In general, the uncertainty of a measurement is expressed as a sum of precision and bias error as shown in the following Equation.

$$U=(B_x^2+P_x^2)^{1/2}$$

The total uncertainty of wind tunnel force measurements were calculated by estimating the range of error resulting from both bias and precision error. This range of error is graphically displayed in Lift to Drag ratio graphs.

The bias error was obtained from three different tunnel tests with the same model. Although environmental conditions were manually checked every minute using a barometer, thermometer and hygrometer based on the procedure herein, most experimental measurements can have uncontrollable error factors. True values were estimated for each angle of attack as the mean value calculated from the measurements recorded during three tunnel tests performed at different times.

The bias error was found for two cases: Re 60,000 and Re 120,000. CL differences in Table below represent the average difference of lift coefficients measured in the three tunnel tests with the true CL value (mean value of the three test runs) for each angle of attack. Bias error (Bx) is the percentage of the CL difference to the true value for each angle of attack.

Table for Bias error table for Re 60,000 and Re 120,000

| AoA (Deg.) | Re 60,000 | | Re 120,000 | |
|---|---|---|---|---|
| | CL difference | bias error | CL difference | bias error |
| 1 | 0.0070 | 12.3% | 0.0098 | 11.4% |
| 2 | 0.0086 | 6.5% | 0.0059 | 3.4% |
| 3 | 0.0101 | 4.9% | 0.0036 | 1.4% |
| 4 | 0.0116 | 4.2% | 0.0048 | 1.4% |
| 5 | 0.0131 | 3.7% | 0.0079 | 1.9% |
| 6 | 0.0146 | 3.4% | 0.0111 | 2.2% |
| 7 | 0.0161 | 3.2% | 0.0142 | 2.4% |
| 8 | 0.0176 | 3.1% | 0.0176 | 2.6% |
| 9 | 0.0191 | 3.0% | 0.0215 | 2.8% |
| 10 | 0.0206 | 2.9% | 0.0254 | 3.0% |

The Gamma ATI F/T force balance was used to determine the forces on each model. Precision error (Px) was computed using the standard deviation of voltage output from the force transducer. In general, standard deviation tells how much the data varies from the mean. 2000 samples were collected during a nonsequential two second time period using a calibrated weight on the transducer with no wind tunnel airstream flowing. The true value was considered as the mean value of 2000 samples, which for this example is 4.358 and the standard deviation is 0.003654 for the strain gage #1. In the same manner, Voltage differences for the other 5 strain gages were computed as displayed in the following Table and the average precision error for all cases was computed as 0.73%.

Table for precision error for each strain gage of Gamma sensor

| | St.* #1 | St. #2 | St. #3 | St. #4 | St. #5 | St. #6 | average |
|---|---|---|---|---|---|---|---|
| Volt. mean | 4.35 | −2.26 | 4.54 | 2.16 | −7.53 | 0.47 | |
| Volt. diff | 0.0036 | 0.0060 | 0.0029 | 0.0058 | 0.0020 | 0.023 | |
| Precision error | 0.37% | 0.61% | 0.30% | 0.59% | 0.20% | 2.31% | 0.73% |

*St.: strain gage

Substituting bias and precision error into Equation for uncertainty of the tunnel testing data yields FIG. 40A-B which show the lift-to-drag ratio plotted for Reynolds numbers 60,000 and 120,000 with error bars.

2-D PIV and 3D stereoscopic PIV systems were used to quantify the velocity field around the models. To generate the instantaneous velocity fields the PIV system used included a high-resolution PCO 1600 CCD (charged-coupled device) camera, Nd:YAG laser (NewWave, 120 mJ/pulse), a delay generator (Quantum Composer), a laptop computer and a set of optics to generate the laser sheet in the test section at the desired position.

The experimental setup for the stereoscopic imaging system used to record the PIV data. An angular displacement configuration (Scheimpflug condition) has been used for the stereoscopic cameras. The Delay generator in the system generates two pulses in tandem with a specific interval (typically 85 μs at Re 60,000) between the two pulses at a repetition rate of 10 Hz. The PCO 1600 camera used in the experiment has an array size of 1600×1200 pixels. To generate 3D PIV, Scheimpflug adapters were used.

A powder seeder was used as a particle generator in the experiment. The powder seeder disperses the particles of talcum powder with an average size of about 1~5 μm. Post-processing was performed on the 2D and 3D PIV data using DPIVB version 2.1 developed by Innovative Scientific Solutions, Inc. (ISSI). The following are details of the subsystems for this PIV setup.

High resolution of the camera determines the useful resolution of the PIV data. PCO.1600 Camera from The Cooke Corporation was used. It has a 1600×1200 pixel monochrome CCD array with 1 GB of onboard memory. The system features thermo-electric cooling (down to −50° C. vs. ambient) and noise level (down to 10 e-rms). The available exposure times range from 5 μs to 49 days with 500 ns optional (see Table below).

Table showing Technical data of PCO1600 CCD camera

| | Unit | Setpoint | PCO 1600 |
|---|---|---|---|
| Resolution (hor × ver) | pixel | normal | 1600 × 1200 |
| | | extended mode | 1648 × 1214 |
| Pixel Size (hor × ver) | μm2 | | 7.4 × 7.4 |
| Peak quantum efficiency | % | At 500 nm typical | 55 |
| Full well capacity of CCD | e- | | 40,000 |
| Readout noise | e-rms | At 10/40 MHz | 12/21 |
| Image frequency, frame rate | fps | At full frame | 30 |
| Exposure time | s | | 5 μs~49 days (500 ns~49 days opt.) |

One Nikon AF Micro Nikkor 55 mm lens for 2D PIV and two Nikkor 85 mm lenses for Stereo PIV were used with the cameras. The aperture was set at 3.5 and the magnification factor was 6.6. A field of view (FOV) with this lens was varied based on focal distance, for example, at a focal distance 80 cm with 55 mm lens, the FOV was around 13 cm.

Quantum efficiency is a quantity defined for the CCD as the percentage of photons hitting the photoreactive surface that will produce an electron-hole pair. It is an accurate measurement of the device's sensitivity. This figure indicates that the CCD sensors of the PCO.1600 camera is most sensitive at a wavelength of around 500 nm that corresponds to the same wavelength of light from the Spectra Physics Nd:YAG laser used for this study.

A dual laser-head system named "Solo PIV 120(made by Newwave)", designed to provide a green light source for Particle Image Velocimetry (PIV) applications, is used in this study seen in FIG. 3.16. Two laser heads with 1064 nm output wavelength are mounted on a single base plate. The beams generated by these laser heads are combined and then enter a second harmonic generator to produce green (532 nm) laser pulses. The output of the second harmonic generator impinges on dichroic mirrors which transmit the residual 1064 nm energy to metal absorbers and reflect the 532 nm green energy to the laser exit port. The laser is pulsed from an external trigger source (Model 9614+ Digital Delay-Pulse Generator) through a rear panel BNC connector. Each externally supplied pulse flashes the laser once at a repetition rate up to the maximum for the model. Q-switch was controlled by means of an external trigger source (from the CCD camera control box) allowing precise trigger control of the laser energy pulse.

A Digital Delay-Pulse Generator (Quantum Composers, Model 9614) was used to synchronize the Nd:YAG laser and CCD cameras. This provides four precisely timed logic transitions or two independent pulse outputs. The time interval, $\Delta t$, between laser pulses was controlled with the delay generator. During the time interval, $\Delta t$, particles move in and out of the laser light plane. Therefore, it is necessary to adjust the thickness of the laser light plane appropriately; 1 mm laser thickness for 2D PIV and 6 mm for 3D PIV were used in this study. The time interval depends on both the maximum particle displacement in the interrogation area and the freestream velocity.

A powder seeding system designed by ISSI was employed in the study. This system consists of 4 main components: body, spray tube, control box and an air compressor. Air pressure is adjusted by the control box to disperse seeding material, which was set higher than 20 PSI. Talcum powder is put in the powder container that is placed in the body. The powder seeder is placed in front of the wind tunnel screens. This placement of the powder seeder produces less interference than placement in or after the convergent section of the tunnel.

In PIV, a time interval ($\Delta t$) between two images depends on the freestream velocity and the size of field of view. It is important to set a time interval because this significantly affects the measurement accuracy. The Table below shows an example of a setup condition used to determine the time interval. The figures show a freestream velocity of 16 m/s and a field of view selected at 20.7 cm in the streamwise direction. The time interval between laser pulses is set to 53 µs. From this time interval, a 20% particle movement is observed across one interrogation area to achieve a high detection rate.

Table for Time interval example table

| Items | Set | Unit |
|---|---|---|
| Pixels per a interrogation area | 32 | pixel |
| the number of vector arrows | 50 | on the axis |
| freestream velocity | 16 | m/s |
| ROI (region of interest) | 1600 | pixel |
| FOV (field of view) | 20.7 | Cm |
| physical length of an interrogation area | 0.3 | Cm |
| delta T | 53 | µs |

Delta T: 53 microsecond–Particles moving: 10.5 pixels at 16 m/s provided (20% of the interrogation area 32×32 pixels)

Time sequences are coordinated to trigger by an external delay generator (Quantum Composers, Model 9614). Four independent timing signals between time intervals, T0, T1, T2, T3 and T4, are required for the best performance and maximum flexibility. Descriptions of each timing signal are in the Table below.

Table for Time set on the Delay-Pulse Generator

| Output of Delay Generator | Description |
|---|---|
| T0 | Time zero |
| T1 | T0 + 0 µs    Flashlamp delay of the first laser |
| T2 | T1 + 122 µs    Q-Switch delay of the first laser |
| T3 | T0 + 53 µs    Flashlamp delay of the second laser |
| T4 | T3 + 122 µs    Q-Switch delay of the second laser |

The strength of the Nd:YAG laser is controlled via the Q-switch settings. If Q-switch mode is selected, the Nd:YAG laser delivers very high power. An example of a time sequence to generate a $\Delta T$ of 53 µs shows, after time zero signal, T0, the flashlamp of the first laser beam, delays for the time interval, T1 (0 µs).

The Q-switch pulse follows the first laser beam after 122 µs. In the same manner, the flashlamp of the second laser operates after 53 µs. The Q-switch pulse of the second laser operates after 122 µs. Camera exposure time is coordinated using this time sequence to capture two images with the time interval desired. The time sequence to get dual images is checked by the combination of a photodiode (Thorlabs DET200) and an oscilloscope.

The Digital Particle Image Velocimetry (DPIVB) software developed by ISSI was used for post-processing and analyzes the velocity fields. Post processing was performed with an image correlation by adaptive multi-pass on 32×32 pixels for an interrogation area with an overlap of 50%. Because square-shaped interrogation areas were applied, a total of 1813 displacement vectors (49 columns×37 rows) are obtained from 1600 pix.×1200 pix. CCD array. With this setting, the physical length of an interrogation area is 3 mm2 for a field of view 20 cm×15 cm. TecPlot360 was used for vector display in color and additional post processing, such as plotting velocity distribution, vorticities, streamlines and contour plots.

With the PIV method, seed particles influence how faithfully they represent the local flow velocity. It is stated that there are two types of error introduced into the PIV displacement fields. The first type of error (type 1) is a completely random error. The amount of deviation for both the vector direction and the magnitude are determined randomly, and the locations of the outliers are also randomized throughout the entire PIV vector field. This type of error typically results in outliers that are mostly surrounded by good vectors. It is asserted this type of error usually occurs in a practical PIV flow if the noise on a correlation plane is erroneously identified as the signal peak. Another thought suggests that the number of spurious vectors properly acquired in PIV data should be around 5% of the total number of vectors in the field. The second type of error (type 2) is designed to produce clustered outliers. This type of error happens in a practical PIV flow mostly because of imperfections in the PIV image or low seed density. Type 2 error is usually observed at the edges of the PIV frame.

For this study, more than 70 image pairs were collected to confirm the cross correlation method in obtaining the velocity vectors. This minimizes the PIV error factors. Outlier error vectors were eliminated by filtering functions in the DPIVB software, such as: 'Nearest neighbor', 'Log Linear LookUp (LUT)'. The 'Nearest neighbor' function compares and corrects each velocity vector with its nearest neighbors computing the relative deviations in both magnitude and direction. The 'Log LUT' function eliminates 'blinking' problems of particles as they pass by the periphery of the light sheet. When there is a brighter particle among others in interrogation area, this particle affects near neighbor particles. This function removes this effect. The standard deviation from the PIV data in the freestream condition was 3.3%.

The calibration process is important for stereoscopic PIV because the imaging geometry generally causes significant aberrations and error vectors. The calibration procedure will output a space and calibration coefficient map across the image where the calibration coefficients are related to the spatial distortion of the image. This distortion becomes significant when imaging inside a wide fluid layer. Complex stereoscopic equations are used to output the calibration coefficients embedded in the PIV software.

For calibration of the 2 cameras, a calibration target developed by Dantec was placed in the center of the light sheet or object plane as shown in FIG. 3.22. The calibration target consists of 12×9 dots; each dot has a 5 mm diameter and the depth of the concave semicircle is 4 mm which is used to calibrate x-direction movement measurement.

This girdded target allowed alignment of the camera positions in the x plane (freesteam direction) with a grid origin so that both cameras were imaging a common object plane. Displacing the 3D calibration target in the x-direction, allows the x, y, and z coordinate vectors to be calibrated with respect to the target. The calibration is accomplished with the two PCO1600 camera images with the target at two positions along the x-axis. Each camera in the real set-up acquires its image (FIG. 3.23), and then the calibration images are used to generate the velocity vector distribution in the x, y and z axes in order to construct three-dimensional vectors through the DPIVB 2.1.

From the camera perspective, there is an image distortion difference from the left side of the image as compared to the right side in each image. The uniform, symmetrical calibration grid appears slanted, with a decreased vertical distance between rows on the inner sides of both images. Image alignment and distortion are corrected using polynomial equation mapping functions created using a least-squares method and the calibration grid points using computer software (DPIVB). Each of the two cameras collects two-dimensional images in the wing wake that allow calculation of two-dimensional velocity vectors. The two-dimensional vectors from each image for each particle are compared for distortion to determine a three-dimensional flow field (scaled in m/s). Vector color in C indicates the magnitude of w (the lateral or z velocity component). The boxes connected by broken lines represent the same position in the calibration images A, B, and C. Two-dimensional velocity vectors calculated from DPIVB images are seen in images (B) and the final three-dimensional velocity vectors are viewed in the Trefftz plane in (C). The velocity vectors calculated for the image area are identified by the magnitude of their U, V and W components where U is the velocity vector in the streamwise direction, V is the velocity vector vertical component of the airflow, and W is the horizontal component of the airflow. These values are used to calculate aerodynamic forces, such as circulation, lift force, and lift induced drag.

Results of numerous tests conducted on different variations of the biplane with endplates are provided. These results will be divided into three main sections. The first part will show the results of the vortex lattice code (AVL) for six parameters of the biplane with endplates, which were described above: gap, stagger, dihedral, decalage, sweep and overhang. This section uses the vortex lattice method to explain which factors have the greatest effect on the aerodynamic characteristics of the biplane configuration.

The second part will present the force balance data obtained in the UD LSWT. Based on the findings from the parametric study from the first part, fourteen biplane configurations with different gaps and staggers were tested in the wind tunnel at Re 60,000 and 120,000. The results of the aerodynamic testing of Houck or Houck similar configurations performed by the Air Force Institute of Technology (AFIT), the University of Maryland, the US Air Force Academy and NACA are compared with the UD flat plate profile biplane with endplates results.

The third section will offer fluid mechanical justification for the unique characteristics of the biplane with endplates determined in the aforementioned experiments. This detailed insight will be provided through the use of the PIV method. Total drag force computed by the momentum deficit method and the downwash angle for the biplane configurations measured using 2D PIV will be shown. The 3D PIV data will be presented showing the wing-tip vortex flow structure morphology in the Trefftz plane. The lift force from vortices in the wake will be calculated using Kutta-Joukouski circulation theory.

Generalized dimensions were used for the computational analysis of the box-wing configurations. The absolute dimensions used for experimentation are a wingspan of 24 inches for each wing with a total wing area of 192 in2 for both wings combined. This gave an AR=6 [monoplane] for each wing. The AVL test conditions also included the density of air at sea level.

Figure 41:
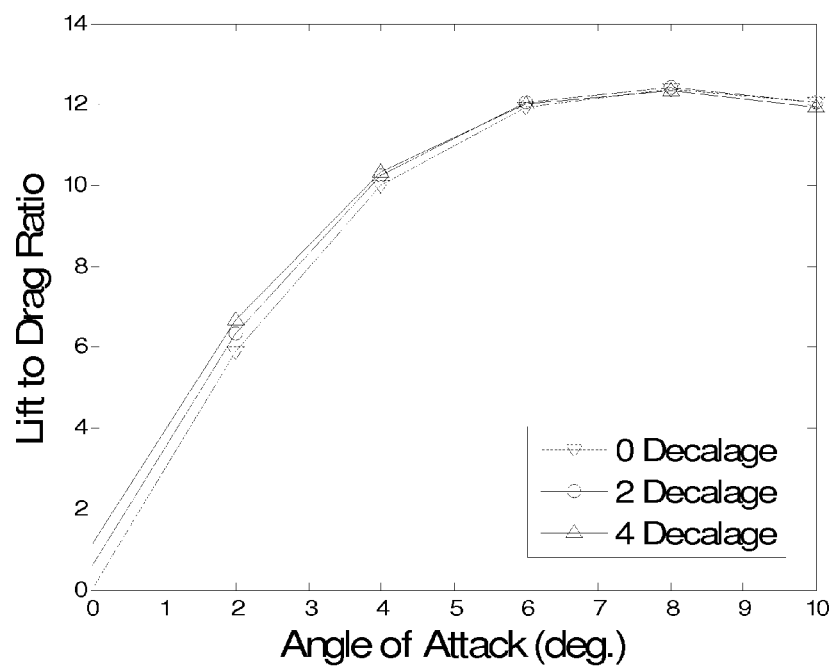
FIG. 41 depicts a graph of L/D vs. Decalage (at an angle of attack 5) and shows a small variation of the lift to drag ratio at varying decalage angles.

Decalage on a biplane is defined as the acute angle between the mean chord lines of the two lifting surfaces. Five different decalage angles varying from −4 to +4 with a 2-degree interval are considered. FIG. 41 shows the results from AVL with increasing angle of attack. Results show that L/D, for higher decalage angles, is also higher at lower angles of attack.

Figure 42:
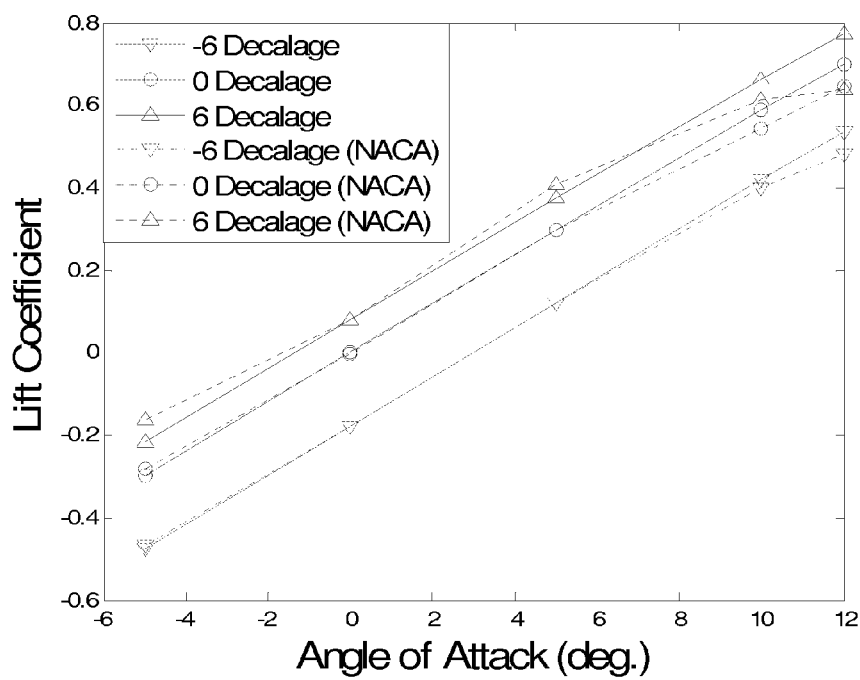
FIG. 42 depicts a graph of comparison of the Decalage effect between the AVL and NACA results show good agreement up until stall inception in the experimental results.

These results were corroborated using the wind tunnel test results from a NACA Technical Report by Knight and Noyes published Wash. D.C., DTIC (Defense Technical Information Center) where good agreement was found at lower angles of attack. At higher angles of attack, results from AVL deviate from the wind tunnel tests FIG. 42.

Results from AVL show a constant lift curve slope, whereas the slope of the lift curve from wind tunnel tests decrease as the stall angle is approached, which is expected when viscosity is present. According to Munk's theory the effect in CL is observed as a result of a shift in the CL alpha curve with increase in decalage.

Dihedral Effect

Figure 43:
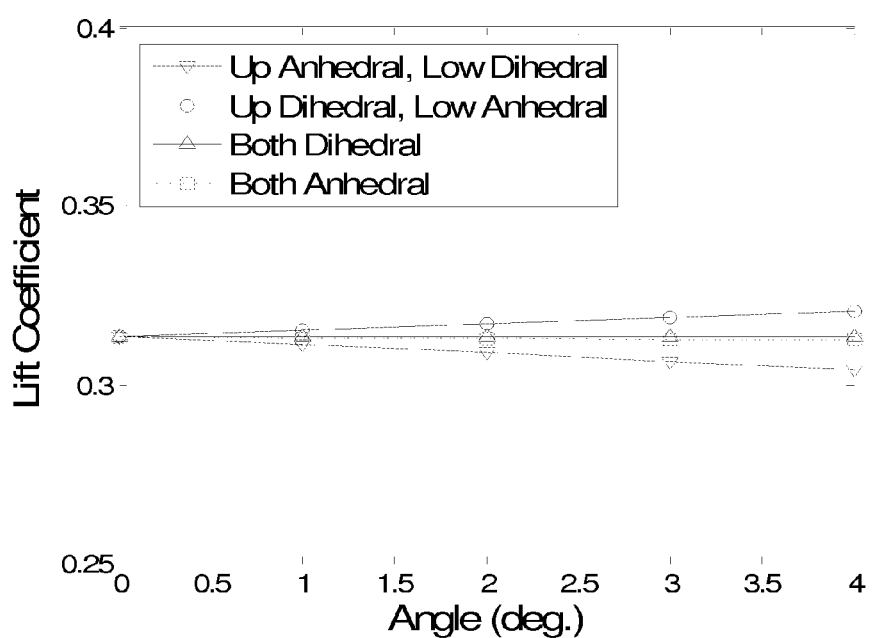
FIG. 43 shows a graph of lift coefficients vs. Dihedral (at an angle of attack 5) show comparatively little variation across a wide range of values.

The effect of Dihedral on the CL as a function of angle of attack is plotted in FIG. 43. Three of the four configurations tested resulted in either no advantage or a disadvantage in the generation of lift from the wing configuration. A positive effect and the highest lift coefficient were obtained for the biplane configuration with dihedral on the upper wing and anhedral on the lower wing. The total change in lift coefficient found in variation of dihedral/anhedral was less than 6% and is insignificant compared to the changes due to other parameters evaluated.

Figure 44:
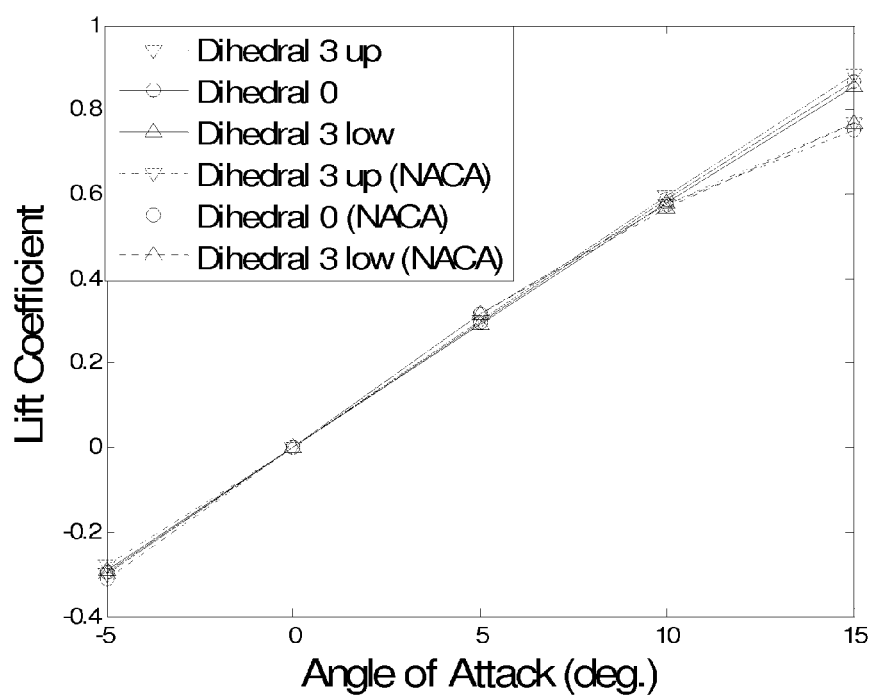
FIG. 44 shows a comparison of Dihedral effect between AVL and NACA results shows good agreement.

A comparison of the wind tunnel tests and the results from AVL is shown in FIG. 44. For a large portion of the curves, the results are in good agreement. Disagreement is observed when the assumptions behind the vortex method fail to consider the viscous effects in the flow, near the onset of stall.

Sweep Angle Effect

Figure 45:
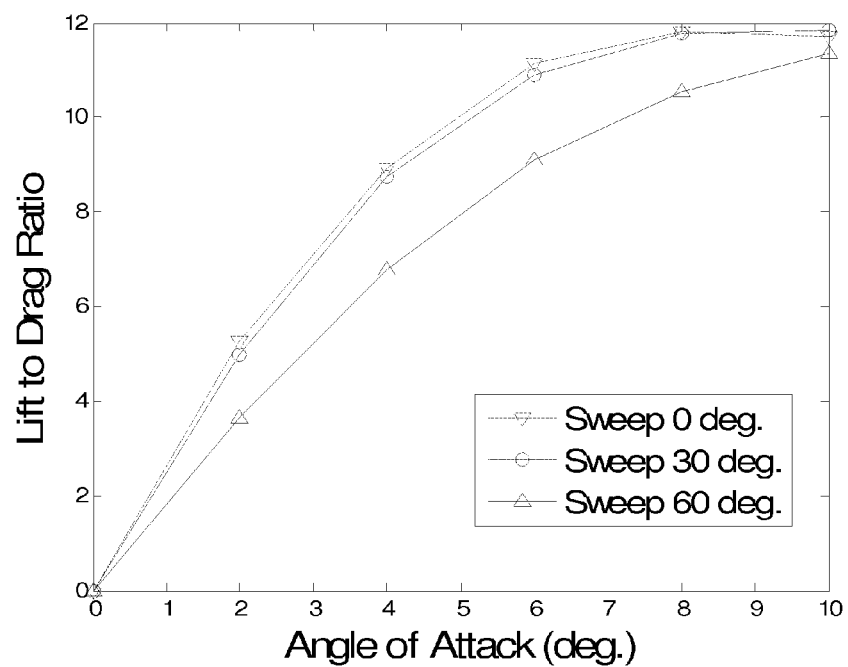
FIG. 45 shows a graph of L/D vs. Sweep Angle (at an angle of attack 5) for different staggers shows adverse effects for the lift to drag ratio as sweep angle increases.

FIG. 45 shows L/D vs. angle of attack curves with varying sweep angles. Adverse effects on the performance of the biplane wing configuration with increasing sweep angle are observed. These adverse effects increase nonlinearly as sweep angle is increased.

Overhang Effect

Figure 46:
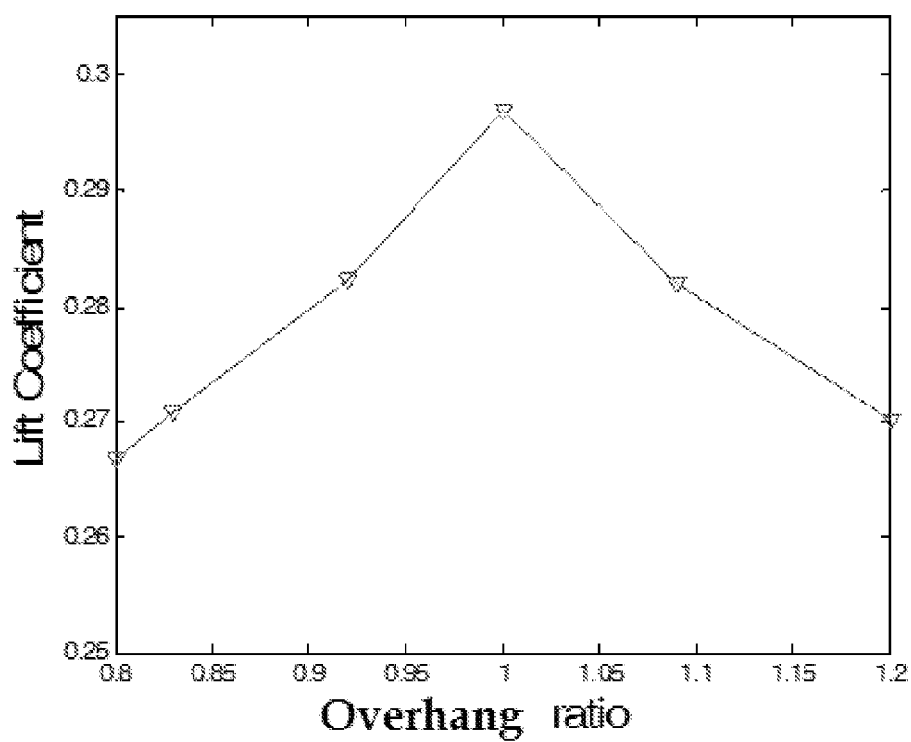
FIG. 46 shows CL vs. Overhang (at an angle of attack 5) shows adverse effects for the lift coefficient as overhang ratio increases or decreases.

The overhang ratio for a biplane is defined here as the ratio of the span of the upper wing to the span of the lower wing. FIG. 46 shows CL as a function of overhang ratio from AVL with varying overhang ratios. Lift coefficient results show a bell curve where the maximum CL is obtained at an overhang ratio equal to 1.

An increase or decrease in overhang ratio causes a decrease in L/D as displayed in the figure. A change in overhang ratio causes the endplates to close in on one of the main wing surfaces, which in turn causes the overall effective gap to be reduced. This effective decrease in the gap causes the lift of the wing configuration to be reduced. As mentioned, it has thus far previously theoretically been described that the box shaped wing configuration as the best configuration where the overhang ratio of the wing is 1. One prior result shows that the highest aerodynamic efficiency is obtained from the box shaped wing.

Figure 47:
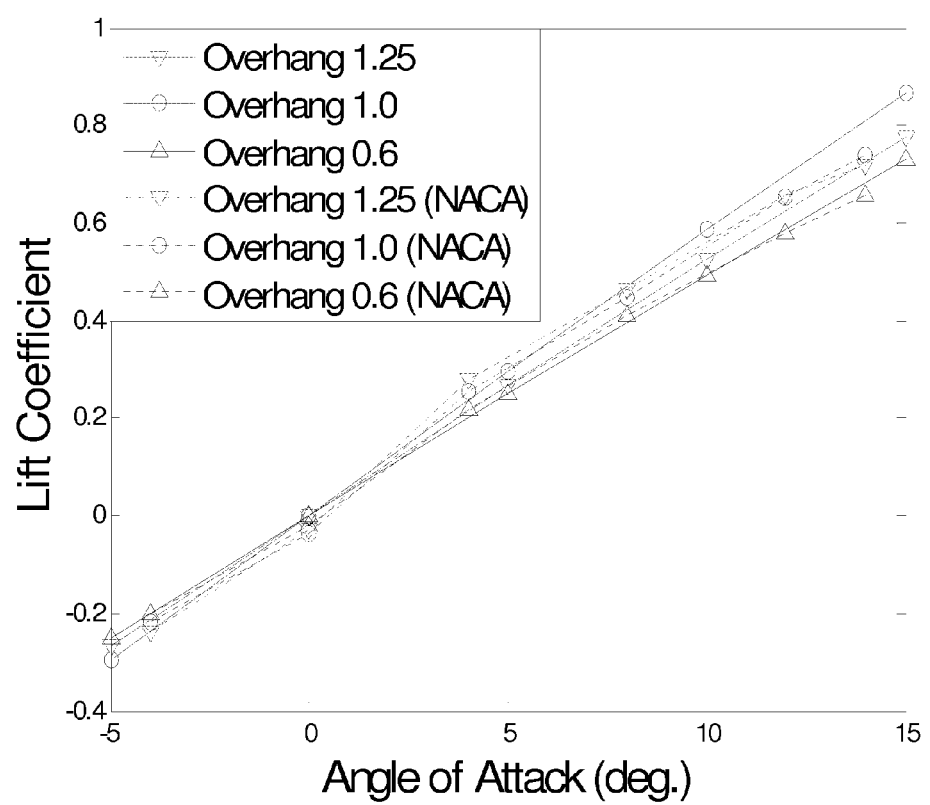
FIG. 47 shows a comparison of Overhang effect between AVL and NACA results shows good agreement.

FIG. 47 shows a comparison of the data from AVL to the wind tunnel data. The wind tunnel results show good agreement when superimposed over the AVL results. The slight variation can be attributed to the presence of viscosity in the NACA wind tunnel results.

The Effect of Stagger

Figure 48:
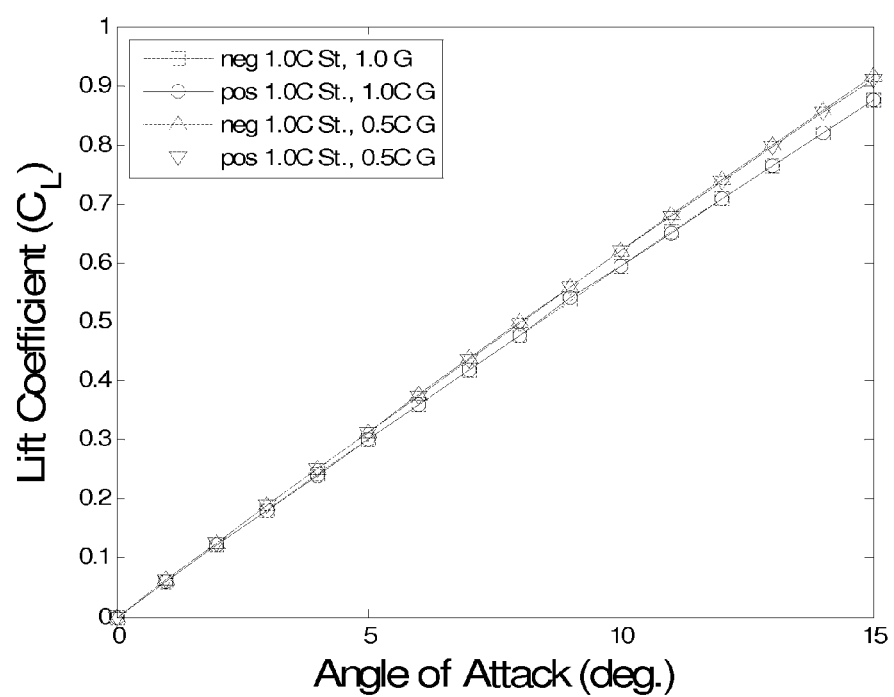
FIG. 48 shows a comparison of AVL results shows no visible differences between negative and positive stagger with Model #4 (1.0 C stagger, 0.5 gap) and #6 (1.0 C stagger, 1.0 C gap).

FIG. 48 shows a comparison between the negative and positive stagger configuration of two models using AVL. Lift coefficients at positive and negative stagger can be seen to have very similar values. The difference was just 0.01%. Although this is a non-physical result, it leads to the belief based on the AVL results and Munk's theoretical results that negative and positive stagger configurations with the same gap have the same aerodynamic characteristics. Clearly, AVL has some limitations in discerning the measured differences in positive and negative stagger. To better understand positive and negative stagger effects, different model configurations were investigated through wind tunnel testing.

For the parametric study across the variables, 90 cases are selected based on a gap and stagger increment of 0.25 chord lengths as displayed in Table 4.1. Based on the AVL results of the negative and positive stagger configuration, these two stagger configurations were considered as the same configuration in this AVL analysis.

Figure 49:
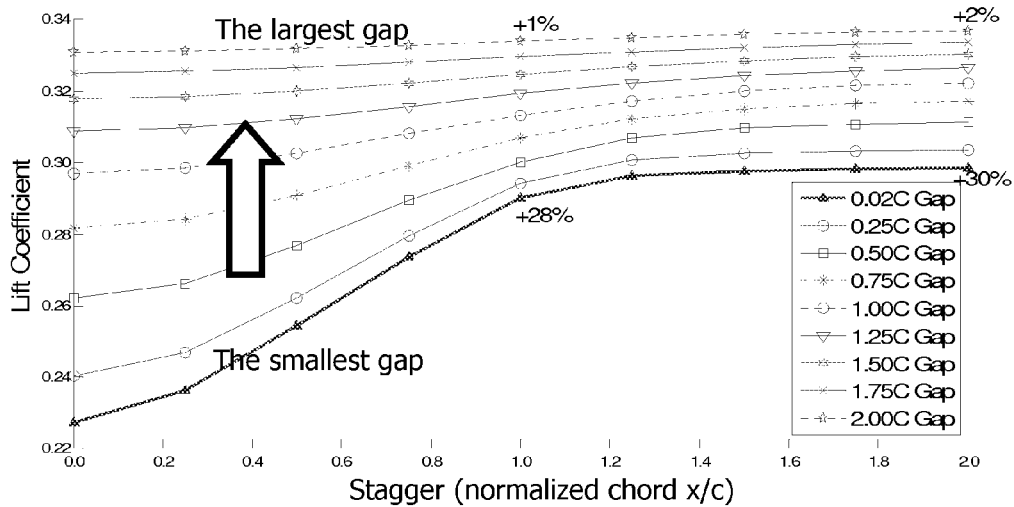
FIG. 49 shows the variation of Lift coefficient with varying stagger (at a 5 degree angle of attack), the greatest variation is seen within 1 chord length stagger with a sharp drop-off in variation beyond that value of stagger.

To study the effect of stagger, values of stagger between 0 and 2 chord lengths at increments of 0.25 C are considered. Results in FIG. 49 are plotted at values of constant gap for an angle of attack at 5 degrees. This graph shows the variation in lift coefficient with varying stagger at a 5 degree angle of attack.

This angle of attack was chosen as representative of all below stall angles of attack. In addition, 5 degrees angle of attack was selected since it is near the maximum lift to drag ratio angle of attack where lift induced and parasite drag should be equal. The x-axis in the figure represents varying stagger from 0 to 2 chord length. The y axis shows lift coefficient. The bottom solid line with triangular symbols is the smallest gap and it shows the largest deviation. The highest line is the largest gap and it shows the smallest deviation across the range of staggers. Also, it is clear that large variations continue up to 1 C, and very small changes occur beyond 1 C.

Munk's theory said that the change in lift due to stagger is proportional to the square of the stagger, and he stated this relation is exact enough up to ⅓ C stagger. For greater values of stagger equal to multiples of the chord, the dependence of lift on stagger is quite different. At these values of stagger, however, some would consider these to be no longer biplane configurations but more like tandem configurations. The change in lift of the upper and the lower wing is directly proportional to stagger, as long as it is stagger is small.

The Effect of Gap

Figure 50:
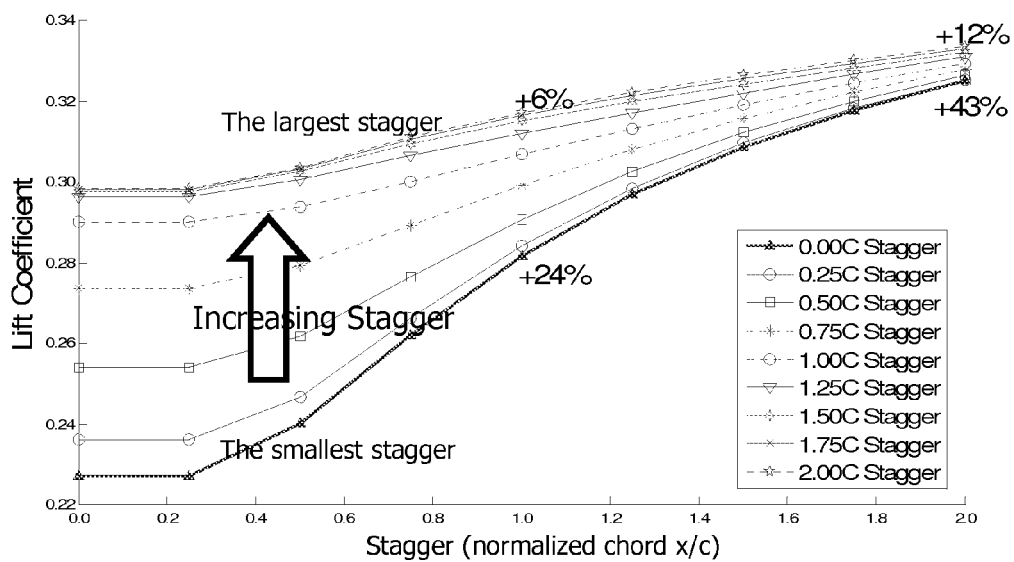
FIG. 50 is a graph which shows the variation of Lift coefficient with varying gap (at a 5 degree angle of attack), clearly the greatest variation occurs within one chord length gap for most staggers.

The results of the computational study of the effect of gap on the lift generated are plotted in FIG. 50. It is observed that the lift coefficient, at 5 degrees angle of attack, is a stronger function of the gap between the two wings of a biplane. Increasing the gap between the two lifting surfaces of a biplane will result in an increase in the total lift coefficient. A greater rate of increase in lift coefficient as a function of increasing gap is observed until the gap reaches approximately 1 chord length distance. Above one chord length gap, the rate of change of lift coefficient decreases with increasing gap. Further increases in the gap result in minimal interaction between the wings and leads to the lifting surfaces acting individually. Thus, from an air vehicle design perspective, any gap greater than a 1 chord length distance between the individual wings of the box-wing configuration would likely not merit consideration unless there were other design constraints that drove the gap to a larger value.

Figure 51:
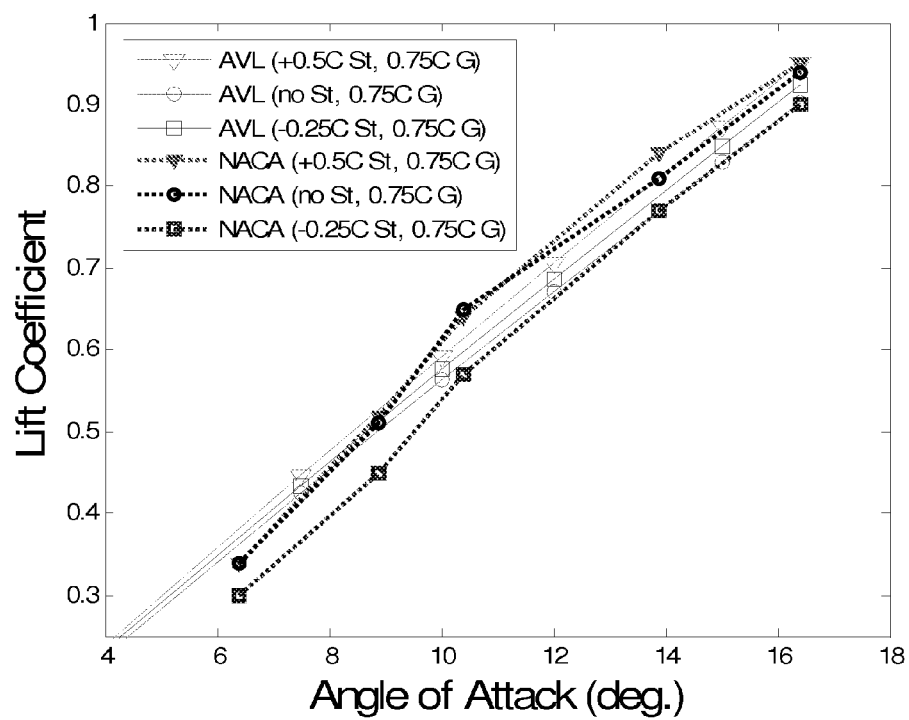
FIG. 51 shows a comparison of gap and stagger effect between AVL and NACA results shows a similar result on biplanes

FIG. 51 shows a comparison of the data from AVL to the wind tunnel data by another model. A gap of 0.75 C and three varying stagger ((−) 0.25 C, no stagger, (+) 0.50 C) were Table of Case numbers with stagger and gap with 0.25 chord length intervals

| | | Gap | | | | | | | | |
|---|---|---|---|---|---|---|---|---|---|---|
| | | 0 C | 0.25 C | 0.5 C | 0.75 C | 1 C | 1.25 C | 1.5 C | 1.75 C | 2 C |
| Stagger | 0 C | 1 | 2 | 3 | 4 | 5 | 6 | 7 | 8 | 9 |
| (Positive | 0.02 C | 10 | 11 | 12 | 13 | 14 | 15 | 16 | 17 | 18 |
| or | 0.25 C | 19 | 20 | 21 | 22 | 23 | 24 | 25 | 26 | 27 |
| Negative) | 0.5 C | 28 | 29 | 30 | 31 | 32 | 33 | 34 | 35 | 36 |
| | 0.75 C | 37 | 38 | 39 | 40 | 41 | 42 | 43 | 44 | 45 |
| | 1 C | 46 | 47 | 48 | 49 | 50 | 51 | 52 | 53 | 54 |
| | 1.25 C | 55 | 56 | 57 | 58 | 59 | 60 | 61 | 62 | 63 |
| | 1.5 C | 64 | 65 | 66 | 67 | 68 | 69 | 70 | 71 | 72 |
| | 1.75 C | 73 | 74 | 75 | 76 | 77 | 78 | 79 | 80 | 81 |
| | 2.0 C | 82 | 83 | 84 | 85 | 86 | 87 | 88 | 89 | 90 |

C: chord length considered. The results from the wind tunnel show good agreement with the results from AVL for the (+) 0.50 C and no stagger configurations. The negative stagger configuration, however, has a different result: the CL of this configuration is the lowest from the NACA report. As mentioned, AVL has a restriction in generating stagger. Therefore, the inviscid limitation is expected to be responsible for the difference between the two stagger configurations.

Selecting Two Parameters: Gap and Stagger

Figure 52:
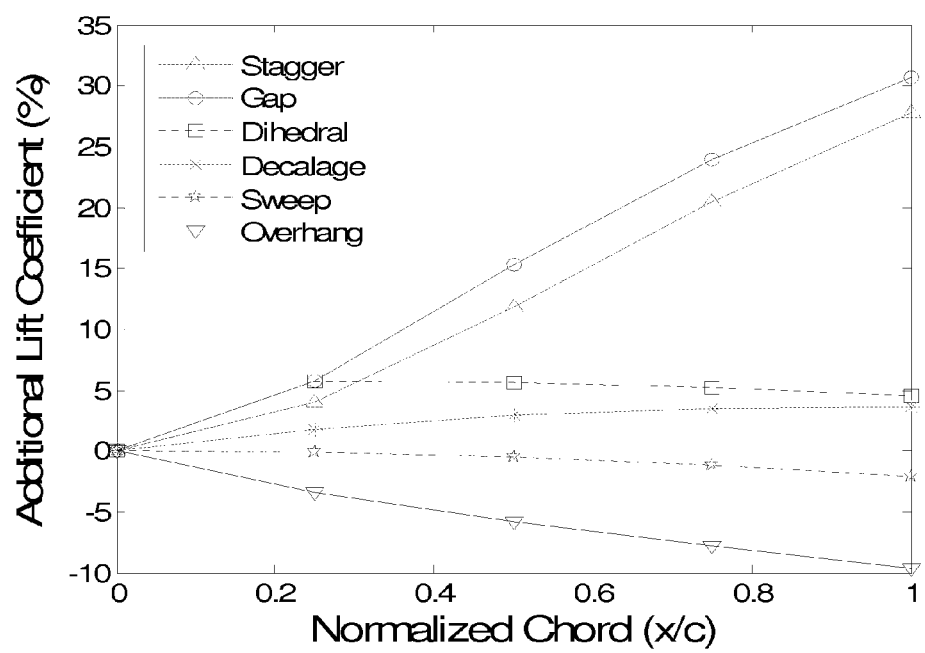
FIG. 52 shows a comparison of the AVL results of six parameters shows that the gap and stagger have the most major effects out of the six parameters.

FIG. 52 displays a comparison of the AVL results of six parameters in the generalized chord. This AVL results show that the gap and stagger have the most major effects out of the six parameters studied for the biplane with endplate configuration when aspect ratio and the total wing area are held constant.

This AVL results show that the gap and stagger have the most major effects out of the six parameters studied for the biplane with endplate configuration when aspect ratio and the total wing area are held constant. Other parameters considered for their influence on the aerodynamic performance of the biplane wing configuration include dihedral, decalage, sweep and overhang. The effect of these parameters was observed to be either negative or negligible. Decalage and dihedral under certain conditions could have a positive effect on the performance of the box wing configuration; however, these effects are comparatively small and were neglected for the purposes of this study.

Variation of overhang and sweep had a negative effect on the performance at the Reynolds numbers tested. An increase or decrease in overhang caused the effective gap between the two wings to decrease. This resulted in a negative effect on the lift coefficient. From the various biplane configuration results obtained in AVL, the parameters for wind tunnel testing were reduced to gap and stagger.

Wind Tunnel Test Results

CL Comparison of AVL and UD LWST Force Balance Measurement

Force balance data were obtained through UD LSWT testing. FIGS. 53, 54, 55 and 56 compare lift coefficient variation with angle of attack measured during tunnel testing with the results from the Vortex Lattice code (AVL) for eight models in fourteen configurations at Re 120,000. Six models (Model #3~#8) can be reoriented to produce positive or negative stagger allowing fourteen configurations to be obtained with eight models. The AVL results for negative and positive stagger configurations are essentially the same (99.9%) as mentioned in the previous section.

Figure 53:
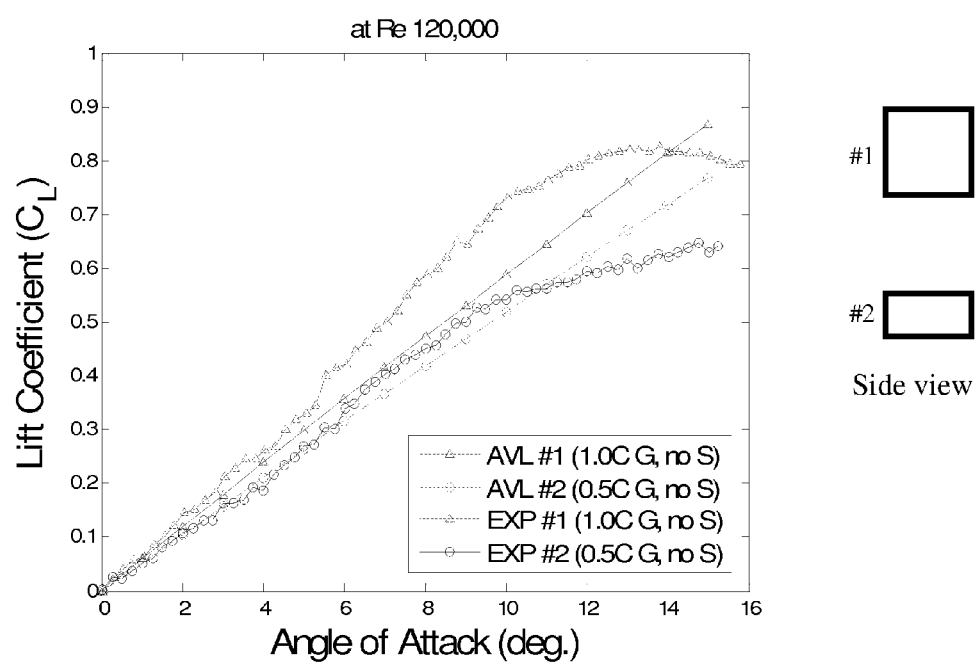
FIG. 53 shows a CL comparison of AVL and UD Experiment with Model #1 (1.0 C gap, no stagger) and Model #2 (0.5 C gap, no stagger) shows significant variation between the experimental and AVL results; Model #2 shows force balance measurements close to the AVL results.

FIG. 53 presents CL as a function of angle of attack for Model #1 (1.0 C gap, no stagger) and Model #2 (0.5 C gap, no stagger). CL MAX was obtained at an angle of attack 13° for model #1 and 14° for Model #2. For Model #1, experimental data show significant variation from the AVL results; measured CL from the force balance was higher than predicted by AVL across the range of angle of attack until stall. Model #2 shows force balance measurements close to the AVL results with gradual stall characteristics after 10° angle of attack. From the figure, increasing gap shows an overall improvement in lift performance.

Figure 54:
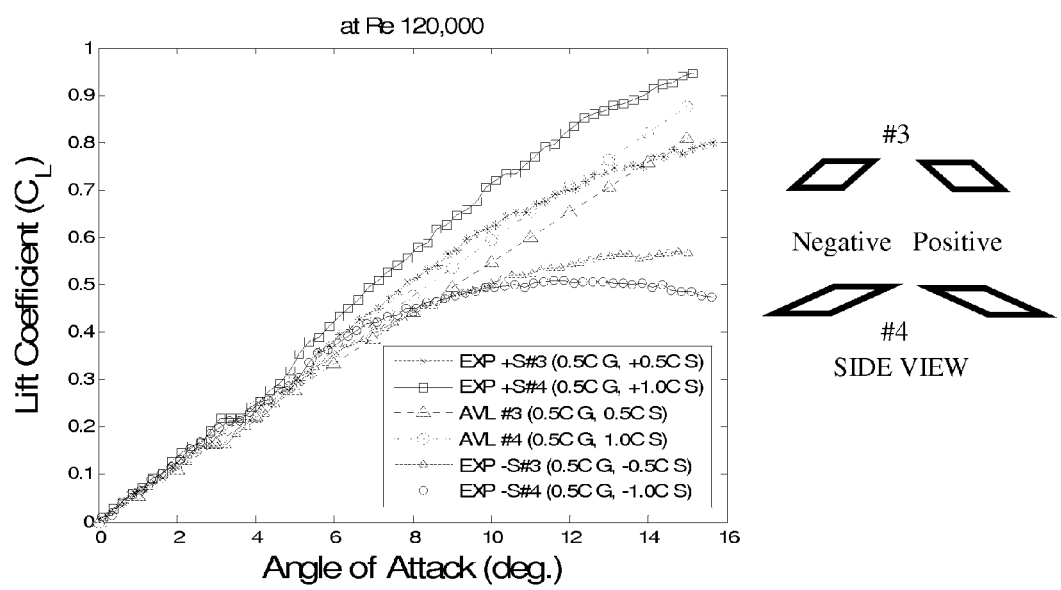
FIG. 54 shows CL comparison of AVL and UD Experiment with the Model #3 (0.5 C gap, (+) and (−) 0.5 C stagger) and Model #4 (0.5 C gap, (+) and (−) 1.0 C stagger) shows a large variation of lift coefficient characteristics between the negative and positive stagger configurations.

FIG. 54 displays wind tunnel results for lift coefficient, CL, vs. α for Model #3 with 0.5 C gap oriented with positive (+) and negative (−) 0.5 C stagger and Model #4 with 0.5 C gap oriented with (+) and (−) 1.0 C stagger. In this plot, a strong dependence on stagger is clearly observed in lift coefficient. For the positive stagger configuration, both models have higher lift coefficient values than the AVL results. For the negative stagger models, the CL values are much lower than the AVL results. The lift slopes for both models in the negative stagger configuration drop significantly earlier than the models in the positive stagger configuration. The difference in the lift coefficient between positive and negative stagger was most pronounced in Model #4 (49% at an angle of attack 15°). Model #4 in a positive stagger configuration produces the most gradual stall characteristic for the angle of attack range studied.

Figure 55:
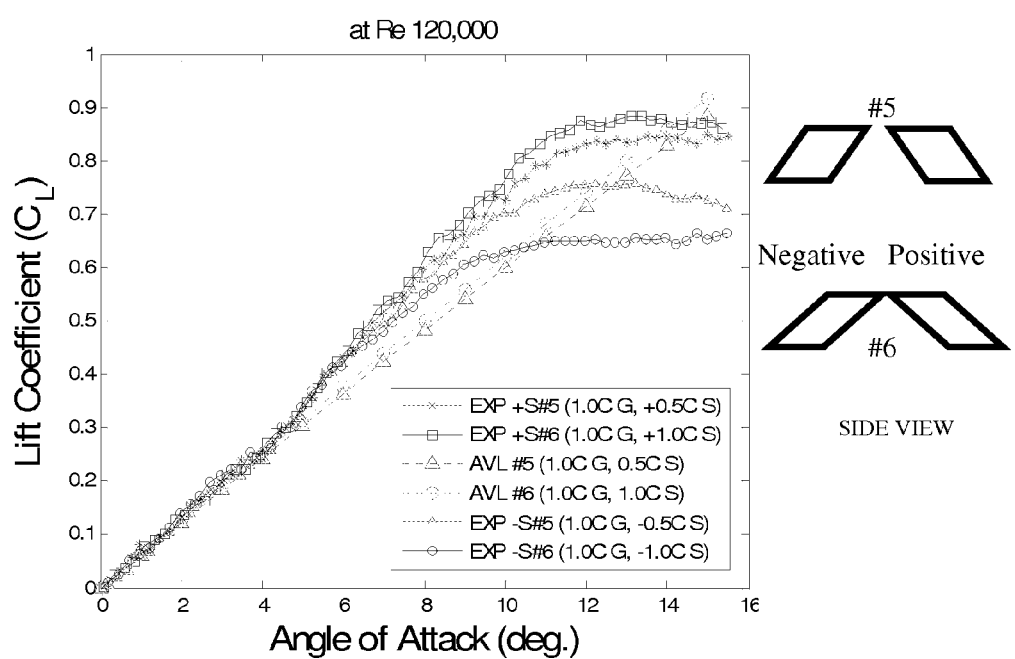
FIG. 55 shows CL comparison of AVL and UD Experiment with the Model #5 (1.0 C gap, (+) and (−) 0.5 C stagger) and Model #6 (1.0 C gap, (+) and (−) 1.0 C stagger) shows a large variation of lift coefficient characteristics between the negative and positive stagger configurations.

FIG. 55 shows the wind tunnel results for CL vs. α for Model #5 with 1.0 C gap oriented with positive (+) and negative (−) 0.5 C stagger and Model #6 with 1.0 C gap oriented with (+) and (−) 1.0 C stagger. In this plot, a strong relationship between stagger and lift coefficient is once again observed. For the positive stagger configuration, both models have higher lift coefficient values than the AVL results. For the negative stagger model configurations, the CL values are only slightly higher than the AVL results until stall. The lift slopes for both models in the negative stagger configuration drop significantly earlier than the models in the positive stagger configuration. The difference in the lift coefficient between positive and negative stagger was most pronounced in Model #5 (26% at an angle of attack 13°). Model #6 in positive stagger configuration produces the most gradual stall characteristic CL plot for the angle of attack range studied.

In the same manner, FIG. 56 shows CL vs. α for the Model #7 with 2.0 C gap oriented with positive (+) and negative (−) 1.0 C stagger and Model #8 with 1.0 C gap oriented with (+) and (−) 1.5 C stagger. Unlike the previous configurations, there is no visible difference observed until stall between the negative and positive stagger configurations. It means that changing stagger no longer visibly affects CL for a gap of 2.0 C.

For Model #8, the positive stagger configuration has higher lift coefficient values than the AVL results. For the negative stagger model configurations, the CL values are only slightly higher than the AVL results. Stall is approached more quickly for Model #8 in the negative stagger configuration than the model in the positive stagger configuration. For a better explanation of the stagger and gap effects, detailed analysis will be described in the following section.

Stagger Effects

Two sets of models with different gap and stagger were specifically selected for further wind tunnel investigation. One set of models had a constant gap of 0.5 C with varying stagger of (−) 1.0 C, no stagger, and (+) 1.0 C and all were tested at a Re 60,000. The other set of models had a constant gap of 1.0 C with varying stagger of (−) 1.0 C, no stagger and (+) 1.0 C and all were tested at Re 120,000. The results from the integrated force measurements are plotted in FIG. 57(A-C). FIG. 57(a) is a plot of CL as a function of angle of attack. This indicates that as stagger increases in the positive direction, the lift coefficient also increases with diverging results at an angle of attack >3°. The maximum lift coefficient, CL max was observed at an angle of attack of 10° with the model in a negative stagger configuration. When stagger was zero or positive, a maximum CL max was not achieved before an angle of attack of 15°. Very subtle differences in CL were observed at an angle of attack <5°, while significant differences were found as the angle of attack increased above 5°. A positive stagger configuration produces a CL 47% higher than the negative stagger configuration at an angle of attack of 11°. This is seen in the CL max of the negative stagger configuration. FIG. 57(b) is a plot of CD as a function of CL. From this figure, the minimum drag coefficient, CDo-0.022 for three biplane configurations is observed. When the gap is held constant, as for the three models observed in this study, similar CD values are expected. From the drag polar, there is a visible change in CDi across staggers with decreasing stagger providing increasing CDi.

FIG. 57(c) shows the lift to drag ratios corresponding to FIGS. 57(a)-(b). As stagger increases, the aerodynamic characteristics improve dramatically beyond an angle of attack of 6°. In the plots the highest L/D ratio is obtained around an angle of attack of 5°.

The second set of models had a constant gap of 1.0 C with varying stagger of (−) 1.0 C, no stagger and (+) 1.0 C tested at Re 120,000. FIG. 58(a) is a plot of CL as a function of angle of attack. These results indicate that as stagger increases in the positive direction, the lift coefficient also increases with diverging results at an angle of attack >6°. The maximum lift coefficient, CL max was observed at an angle of attack of 11° with the model in a negative stagger configuration. When stagger was zero or positive CL max was not obtained up to an angle of attack of 15°. Very subtle differences in CL were observed at an angle of attack <6°, while significant differences were found as angle of attack increased above 6°. A positive stagger configuration produces 26% higher CL than the negative stagger configuration at an angle of attack of 12°. This is seen in the CL max for the negative stagger configuration. FIG. 58(b) is a plot of CD as a function of CL. From this figure, the minimum drag coefficient, CDo≅0.0182 for the three biplane configurations is observed. Also from the drag polar, there is a visible change in CDi across staggers with increasing stagger providing decreasing CDi. According to the Munk's first theorem, the induced drag of a multiplane lifting system is unaltered if any of the lifting elements are moved in the direction of motion. However, the tunnel testing of the biplane with endplates shows that increasing the stagger in the positive direction produces a positive change in the slope of the lift coefficient and reduced lift induced drag. This is a noticed empirical result.

FIG. 58(c) shows the lift to drag ratios corresponding to FIGS. 58(a)-(b). As stagger increases, aerodynamic characteristics improve dramatically beyond an angle of attack of 4°. In the plots the highest L/D ratio is obtained around an angle of attack of 4°. Based on the force balance measurements at Reynolds number 60,000 and 120,000, it was found that Reynolds number effects in this range were small. The difference between two Reynolds numbers was less than 2% as seen in FIG. 58(b).

Gap Effects

Three models with 1 C of stagger were selected in an effort to isolate the effect of varying gap: 0.5 C, 1.0 C, 2.0 C. These models were tested at Re 60,000 and Re 120,000. The results from the integrated force measurements are plotted in FIG. 59.

In FIG. 59(a) CL vs. angle of attack, the results indicate that as gap increases, the lift coefficient also increases for a given angle of attack across all angles of attack tested. FIG. 59(b) shows CD as a function of CL. From this figure, the minimum drag coefficient, CDo≅0.023 for all three configurations can be seen. Although each model has different gap spacing, there is no visible difference in the minimum drag coefficient. The drag coefficient reduces as gap increases at a given lift coefficient; the 2 C and 1 C gap configurations obtained more than 29% and 17% drag reduction respectively compared to 0.5 C gap configuration at a CL=0.5 which is the maximum lift coefficient for the negative stagger tests. From the drag polar, there is a visible change in CDi across gaps with increasing gap providing decreasing CDi. FIG. 59(c) shows the lift to drag ratios. In these plots, the highest L/D ratio is obtained near an angle of attack of 4°.

The same models were tested at Re 120,000. FIG. 60(a) CL vs. angle of attack indicates that as gap increases, the lift coefficient also increases across all angles of attack tested. FIG. 60(b) shows CD as a function of CL. From this figure, the minimum drag coefficient, CDo≅0.02 for all three configurations is seen. Although all models have different gap spacing, there is no visible difference in the minimum drag coefficient indicating little contribution to the increased endplate drag as endplate area increases with increasing gap. The drag coefficient reduces as gap increases for a given lift coefficient; the 2 C and 1 C gap configurations obtained more than 51% and 30% drag reduction respectively compared to 0.5 C gap at CL max for negative stagger. FIG. 60(c) shows the lift to drag ratios. In these plots, the highest L/D ratio is obtained near an angle of attack of 4°. From the tunnel testing, it is obvious that increasing the gap on the biplane with endplates increases the lift force and reduces the lift-induced drag, improving the lift-to-drag ratio. Based on the force balance measurements of Reynolds number 60,000 and 120,000, it was found that Reynolds number effects for the varying gap were small across the range tested. The difference between two Reynolds numbers was less than 2.5% as seen in FIG. 60(d).

A Generalized Method for the Prediction of Lift Coefficient

A generalized method for the prediction of lift coefficient as a function of gap, stagger, aspect ratio and angle of attack has been determined empirically and subsequently validated. The development of the generalized equation begins with a linear curve fit for CL based on varying stagger. Then varying gap was considered in the same manner. The pre-stall CL data measured by force balance were used to create the generalized equation, to describe the linear lift curves. As explained earlier, lift coefficient has a weak dependence on Reynolds number (the difference is less than 2.5% between Reynolds numbers of 60,000 and 120,000 tested). Thus it was considered unnecessary to include the effect of Reynolds number in the generalized equation. Gap and stagger were found to be the most relevant factors in the calculation of the lift curve.

FIG. 61 shows curve fits for CL as a function of stagger from (−) 1.0 C stagger to (+) 1.0 C stagger in 0.5 C increments at different gaps. FIGS. 61(a) and (b) display a linear trend between stagger and lift coefficient. As stagger increases, CL also increases. However, there is no difference observed between the negative and positive stagger configurations at a gap of 2.0 C, so the polynomial curve fit has no slope (see FIG. 61(c)). Thus at a gap of 2.0 C changing stagger no longer affects CL.

Figure 62A:
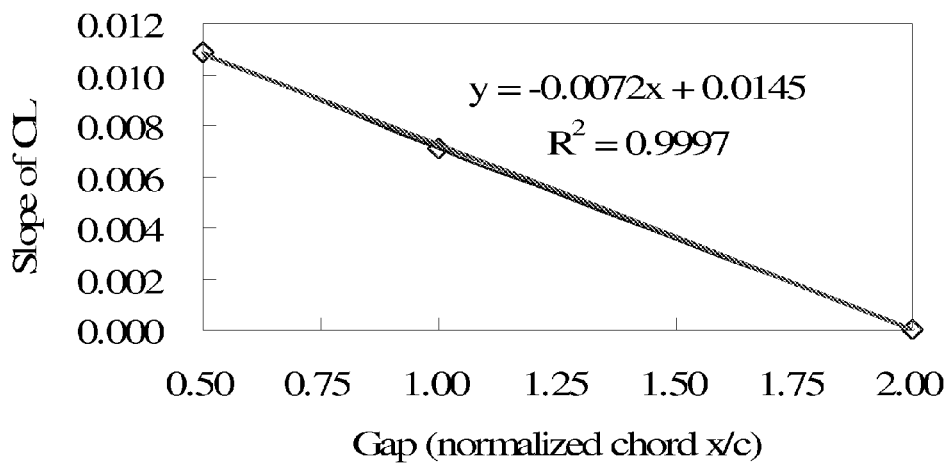
FIG. 62(A-B) show the collective lift curve slopes and Y-intercepts of the linear curve fits for the lift curve at three representative gaps to determine a generalized equation.
Figure 62B:
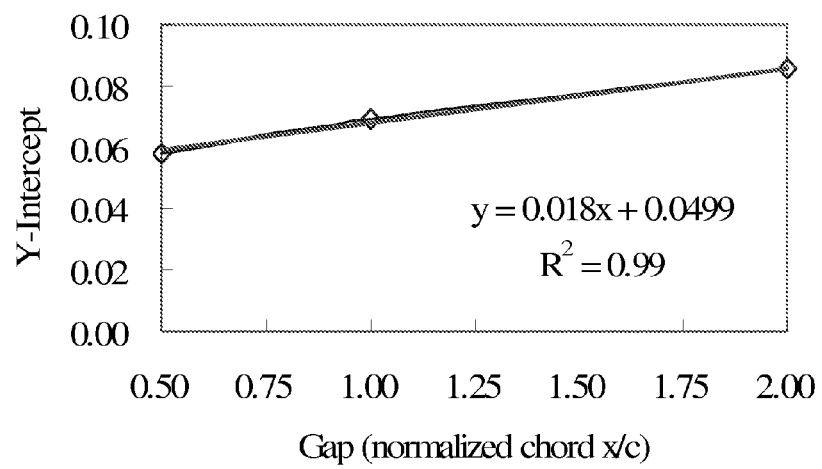

FIG. 62 shows two examples of curve fits for CL as a function of varying gap, for gap spacing of 0.5 C, 1.0 C and 2.0 C. The slopes and Y-intercepts of the lift curves in FIG. 62(a) are obtained from FIG. 61. As gap increases the lift curve slope decreases. At a gap of 2.0 C, however, the slope is 0. These slopes and intercepts are used in the formulation of a generalized equation as shown in FIGS. 62(a) and 62(b).

The resulting equations for the curve fits are $((-0.0072 \cdot St + 0.0145) \cdot g)$ for the slope and $((0.018 \cdot St + 0.0499)) \cdot \alpha$ for the Y-intercept. The two equations can be combined to create a generalized equation for the lift as a function of angle of attack for a biplane with endplates as a function of gap and stagger:

$$C_{L_{GEN}} = ((-0.0072 \cdot St + 0.0145) \cdot g + (0.018 \cdot St + 0.0499)) \cdot \alpha$$

Considering aspect ratio effect, this equation can be rewritten as follows:

$$C_{L_{GEN}} = (((-0.0072 \cdot St + 0.0145) \cdot g + (0.018 \cdot St + 0.0499)) \cdot \alpha) \cdot (-0.0045 \cdot AR + 0.0698 \cdot AR + 0.7542)$$

where, St is the stagger, g is the gap and α represents angle of attack. Taper has a positive effect for lift; however, this effect is comparatively small (2% difference for the entire range of taper from 0.2 to 1) and was neglected. The resulting empirical approach allows for a rapid determination of CL for a biplane having different gap and stagger without a more extensive analysis. As validation of the accuracy of this equation, the agreement between the CL obtained by the force balance and the CL from the generalized equation is within ±7%.

Two Dimensional PIV Results

Three sets of models were selected to investigate the effect of gap and stagger using the 2D PIV method as represented in the Table below since the configurations have different gap and stagger. For stagger, set #1 had varying stagger of 0C, (−) 0.5 C and (−) 1.0 C all with a (−) 0.5 C gap. For gap, set 2 and 3 considered a gap of 0.5 C and 1.0 C with 0 C and (−) 1.0 C stagger respectively.

| Table for test conditions for 2D streamwise PIV | | | | | | |
|---|---|---|---|---|---|---|
| | For Stagger effect | | | | For Gap effect | |
| Set No. | #1 | | | | #2 | #3 |
| Gap | 0.5 C | | | | 0.5 C   1.0 C | 0.5 C   1.0 C |
| Stagger | (+)1.0 C | 0.0 C | (−) 0.5 C | (−) 1.0C | 0.0 C | (−)1.0 C |
| Re | 60,000 | | | | 120,000 | 120,000 |

Figure 63:
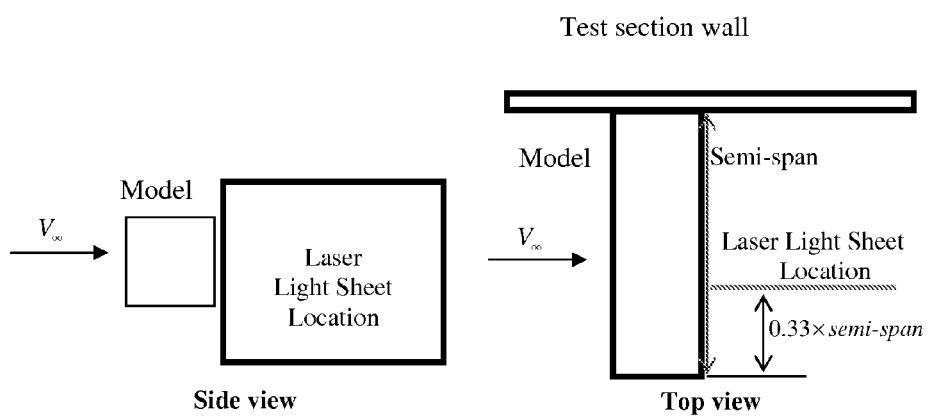
FIG. 63 shows the position of the model (1.0 C gap and no stagger) relative to the laser plane of illumination.

Downwash angles were measured with 2D streamwise PIV techniques, 0 to 2 C downstream from the trailing edge. All of the downwash angles were measured in a plane located at 33% semi-span in from the wing-tip on a semi-span direction to avoid the interference from the wing-tip and corner intersection as seen FIG. 63.

Figure 64:
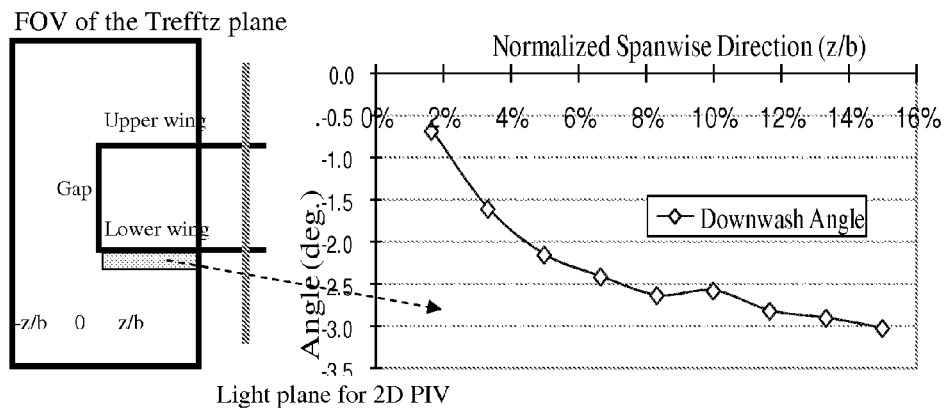
FIG. 64 shows the downwash angle distribution in the spanwise direction shows that the biplane starts to produce a uniform downwash distribution at 12% of semi-span from the wing-tip.

FIG. 64 shows the downwash angle distribution in the spanwise direction from the wingtip to 16% of the semi-span wing for the lower wing of the 0.5 C gap configuration. This stereo PIV result from the Trefftz plane shows that this rectangular planform biplane starts to produce a near uniform downwash distribution at 12% of semi-span from the wingtip. This is validated by the fact that the downwash angle from streamwise 2D PIV for this configuration was 2.90 at the same angle of attack of 5°. Hence, the 33% semi-span location used for streamwise PIV should be at a relatively uniform lift distribution location. To increase the data accuracy, more than 70 image pairs of 2D PIV images were used in calculating any averaged values.

Downwash Angle Calculation

This calculation is based on the downwash angle equation, $$\varepsilon = \frac{a\tan(v/u) \cdot 180}{\pi}.$$

Figure 65:
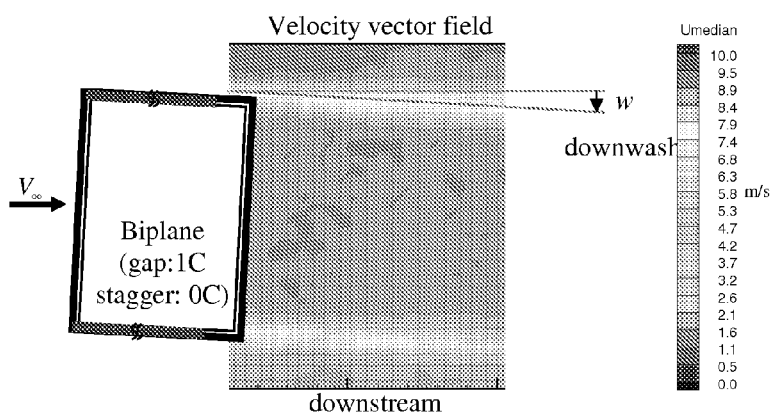
FIG. 65 shows a schematic showing Downwash in a PIV velocity vector field.

TecPlot360™ software was used to calculate this angle. It is important to understand that downwash generally varies along the span of the wing and the measurements found in this study do not represent the average downwash angle across the entire wing span of each model. However, because all models have the same dimensions except the gap and stagger, this downwash angle is a representative value to understand flow physics downstream of the wing (see FIG. 65).

FIG. 66 shows a schematic of Downwash in a PIV velocity vector field. In this field, streamlines are parallel everywhere to the instantaneous vector field with two assumptions: 1) The flow is in a steady state 2) Particles follow the airflow faithfully.

The Stagger Effect on Downwash Angle

The stagger effect on the downwash angle was evaluated. Stagger was varied, 0C, (−) 0.5 C and 1.0 C lengths with a constant 0.5 C gap at a Re 60,000. FIGS. 67, 68, 69 and 70 show the velocity distribution and downwash angle in the wake of the models with different staggers and a constant gap of 0.5 C at angles of attack of 0°, 5° and 10°. The downwash angles were computed from the velocity vectors and are shown in the Table below.

| Table depicting Downwash angles at different angles of attack, 0.5C constant gap, and a Re of 60,000 | | | | | | |
|---|---|---|---|---|---|---|
| | Downwash Angle | | | | | |
| | At AoA 0 deg. | | At AoA 5 deg | | At AoA 10 deg | |
| | upper | lower | upper | lower | upper | lower |
| Model #4 ((+) 1.0 C stagger) | 0 deg. | 0 deg. | 4.6 deg. | 3.3 deg. | 13.4 deg. | 9.8 deg. |
| Model #2 (no stagger) | 0 deg. | 0 deg. | 3.9 deg. | 3.2 deg. | 9.9 deg. | 8.3 deg. |
| Model #3 ((−) 0.5 C stagger) | 0 deg. | 0 deg. | 3.6 deg. | 3.0 deg. | 7.2 deg. | 6.8 deg. |
| Model #4 ((−) 1.0 C stagger) | 0 deg. | 0 deg. | 2.9 deg. | 2.5 deg. | 6.6 deg. | 6.2 deg. |

Figure 71:
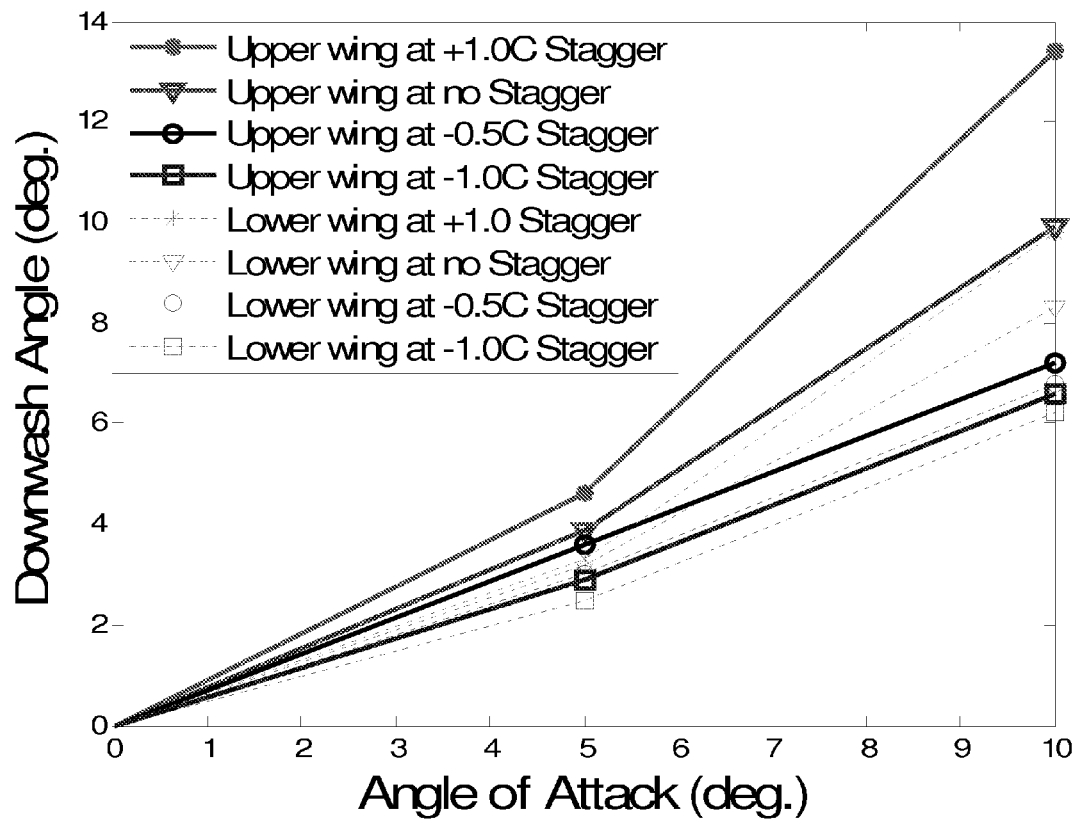
FIG. 71 depicts Downwash angles at different AoA, 0.5 C constant gap, Re 60,000 shows clear differences in upper and lower wing lift and clear functional dependency on stagger.

As seen in FIG. 71, these results show a distinctive pattern of the downwash angle for different angles of attack. Downwash angle increases with increasing stagger. Model #4 with positive stagger ((+) 1.0 C stagger, 0.5 C gap) has the highest downwash angle within the range of angles of attack tested and Model #4 with negative stagger ((−) 1.0 C stagger, 0.5 C gap) has the lowest. It was found that stagger is related, proportionally, to downwash angle. It is also evident that the change in downwash angle is directly proportional to the change in lift coefficient.

From the analysis, downwash angles for the upper and lower wings were only the same at 0 degrees angle of attack. This difference occurs since the lower wing is immersed in the induced downwash of the upper wing; hence, the lower wing operates at a lower effective angle of attack. According to Munk's theoretically based statement, if two wings of a biplane are identical, parallel, and unstaggered, the downwash produced by each wing is the same. He also described that "the condition of minimum drag for biplanes calls for equal induced downwash over both wings. That is the case only if the lift which produces the downwash is equal at both wings."

However, the results of the present invention indicate different downwash angles for the upper and lower wings, regardless of the stagger condition. These differences become more pronounced at angles of attack around 10 degrees. For all configurations, the difference in downwash angle between the upper and lower wing are small at an angle of attack of 5°. At an angle of attack of 10° a significant difference is seen.

Figure 72:
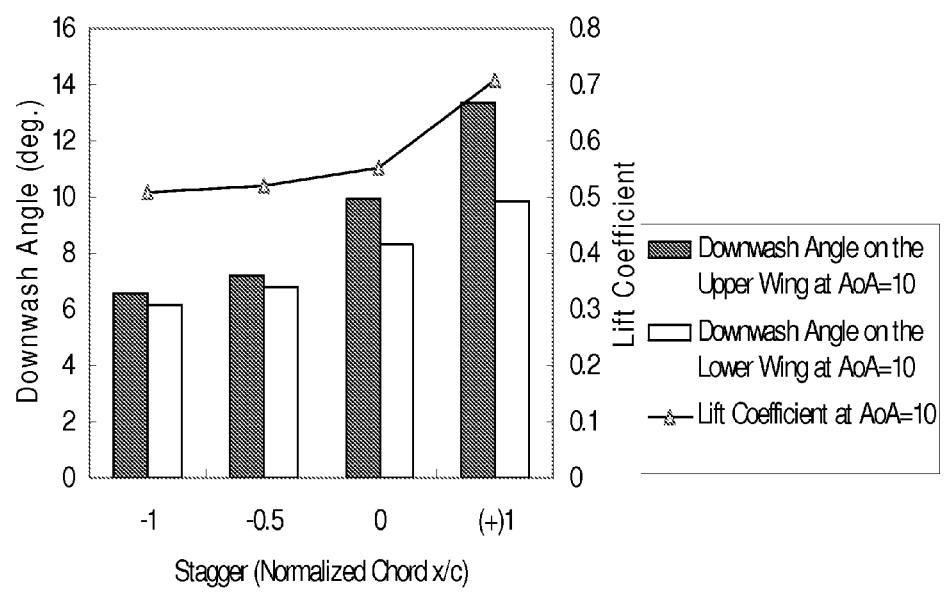
FIG. 72 depicts Downwash angle change and CL change at an angle of attack of 10° as a function of stagger shows the change in downwash angle is proportional to the change in CL.

FIG. 72 shows the comparison between the change in downwash angle and the change in lift coefficient for the same models at a Re of 60,000. As seen in the figure, as expected the change in downwash angle is proportional to the change in lift coefficient.

Using Munk's definition, the additional lift coefficient of staggered wings is $$\Delta C_L = \pm 2 C_L \frac{S}{b^2}\left(\frac{1}{k^2} - 0.5\right)\frac{b}{R}\frac{st}{b}$$

where, S is the total area, st is the stagger, b is the span, $$\left(\frac{1}{k^2} - 0.5\right)\frac{b}{R}$$

is known as Munk's factor. According to Diehl, for the simplest biplane in which the wings are of same chord and span, the lift efficiency of the upper wing (or lower wing) differs from that of the biplane by an amount depending directly on the biplane lift coefficient. That is, $$C_{L_U} = C_L \pm \Delta C_L$$

or $$C_{L_L} = C_L \mp \Delta C_L$$

hence, $$C_{L_U} + C_{L_L} = 2C_L, \quad C_L = \frac{C_{L_U} + C_{L_L}}{2}$$

where, $C_L$, $C_{L_U}$ and $C_{L_L}$ are the lift coefficients for the biplane, the upper wing, and the lower wing, respectively. When the upper and lower wings are of equal area, the increments $\Delta C_{L_U}$ and $\Delta C_{L_L}$ are equal and of opposite sign. The Table below presents the additional lift coefficient for the four different stagger configurations based on Munk's definition. Munk factors for the four configurations are all 0.68 for the purposes of this comparison since $$\frac{gap}{span}$$

is constant. This Table shows that the lift coefficient change for the upper and lower surfaces is the same, but with opposite sign. Also, for the no stagger configuration, there is no change of lift coefficient on the upper and lower wings.

Table showing Additional lift coefficient based on Munk's definition.

| | At AoA 10° | | | | |
|---|---|---|---|---|---|
| | $C_L$ | St (stagger) | Munk | $\Delta C_{LU}$ | $\Delta C_{LL}$ |
| Model #4 ((+) 1.0 C stagger) | 0.71 | 4 in. (63.4°) | 0.68 | +30% | −30% |
| Model #2 (no stagger) | 0.552 | 0 in. (0°) | 0.68 | 0% | 0% |
| Model #3 ((−) 0.5 C stagger) | 0.52 | −2 in | 0.68 | +15% | −15% |
| Model #4 ((−) 1.0 C stagger) | 0.51 | −4 in. (−63.4°) | 0.68 | +30% | −30% |

However, the experimental downwash analysis shows significantly different results when compared to Munk's definition for the additional lift coefficients. This section addresses stagger effects on lift with respect to the downwash angle. Model #2 with no stagger is used as a baseline to compare all other configurations.

In Equation 1.8, the lift coefficient is directly proportional to the downwash angle, $$\frac{d\varepsilon}{d\alpha} = \frac{2C_{L_\alpha}}{\pi \cdot AR};$$

where, AR is constant for the four different stagger configurations. Therefore, the increments $\Delta C_{L_U}$ and $\Delta C_{L_L}$ can be estimated with downwash angle increments based on the Equation above.

$$C_{L_U} \approx C_L \pm \Delta \varepsilon_U, \quad C_{L_L} \approx C_L \mp \Delta \varepsilon_L$$

where, $\Delta \varepsilon_U$, $\Delta \varepsilon_L$ represent the downwash angle change on the upper wing and lower wing respectively. The Table below shows the increments $\Delta C_{L_U}$ and $\Delta C_{L_L}$ of the above models based on the results of the downwash angle change in the zero stagger configuration. Based on Munk's definition, for the zero stagger model there would be no difference between $\Delta C_{L_U}$ and $\Delta C_{L_L}$. However, the downwash angle at the upper surface is higher than the lower surface for the zero stagger configuration.

The Table shows the increments or decrements of $\Delta \varepsilon_U$ and $\Delta \varepsilon_L$ of the models when varying stagger based on the zero stagger configuration. For the (+) 1.0 C stagger configuration, the $\Delta \varepsilon_U$ and $\Delta \varepsilon_L$ were 35.4%, 18.1% respectively. As stagger moves to the negative direction, the $\Delta \varepsilon_U$ and $\Delta \varepsilon_L$ were significantly decreased. This trend of variation is in good agreement with the lift coefficient obtained through the force balance. As displayed on the Table 4.4, the lift coefficient of the (+) 1.0 C stagger configuration is 28% higher than the no stagger configuration. The negative stagger configurations show lower CL than the no stagger configuration. These results are clearly in direct conflict with those generated using Munk's definition for the additional CL, explained in the Table immediately above.

Table showing Increments of $\Delta \varepsilon_U$ and $\Delta \varepsilon_L$ with varying stagger and a fixed gap of 0.5C

| | | $\varepsilon$ at $\alpha = 0°$ | $\varepsilon$ at $\alpha = 5°$ | $\varepsilon$ at $\alpha = 10°$ | $\Delta \varepsilon$ at $\alpha = 0°$ | $\Delta \varepsilon$ at $\alpha = 5°$ | $\Delta \varepsilon$ at $\alpha = 10°$ |
|---|---|---|---|---|---|---|---|
| Model #4 ((+) 1.0 C stagger) | upper | 0° | 4.6° | 13.4° | 0% | +18% | +35.4% |
| | lower | 0° | 3.3° | 9.8° | 0% | +3% | +18.1% |
| Model #2 (no stagger) | upper | 0° | 3.9° | 9.9° | 0 | 0 | 0 |
| | lower | 0° | 3.2° | 8.3° | 0 | 0 | 0 |
| Model #3 ((−) 0.5 C stagger) | upper | 0° | 3.6° | 7.2° | 0% | −7.7% | −27.3% |
| | lower | 0° | 3° | 6.8° | 0% | −6.3% | −18.1% |

-continued

Table showing Increments of $\Delta\epsilon_U$ and $\Delta\epsilon_L$ with varying stagger and a fixed gap of 0.5C

| | | $\epsilon$ at $\alpha = 0°$ | $\epsilon$ at $\alpha = 5°$ | $\epsilon$ at $\alpha = 10°$ | $\Delta\epsilon$ at $\alpha = 0°$ | $\Delta\epsilon$ at $\alpha = 5°$ | $\Delta\epsilon$ at $\alpha = 10°$ |
|---|---|---|---|---|---|---|---|
| Model #4 ((−) 1.0 C stagger) | upper | 0° | 2.9° | 6.6° | 0% | −25.6% | −33.2% |
| | lower | 0° | 2.5° | 6.2° | 0% | −21.9% | −25.3% |

FIG. 73 shows the estimated change in lift coefficient based on the change in downwash on the upper wing and lower wing with varying stagger. The lift curve obtained from the force balance is compared to this estimate. These downwash angles were measured at '0.33×semi-span' in from the wing-tip as mentioned earlier. It was therefore assumed that downwash distributions are similar at the same point along the wing span when models have the same aspect ratio and same wing shape. As seen in the figure, this estimate agrees well with the (+) 1.0 C configuration at the angles of attack tested and for the other models at lower angles of attack. Under this assumption, the downwash angle increases as stagger increases.

In addition, the downwash angle change also increases as the stagger increases towards positive values. This shows that the lift coefficient estimated by downwash agrees well in general to the force balance measurement at the lower angles of attack and for the (+) 1.0 C stagger model.

The upper wing has a larger downwash angle than the lower wing. Model #4 with positive stagger ((+) 1.0 C stagger, 0.5 C gap) has the biggest difference in the downwash angle between its upper and lower wings at an angle of attack of 10°: 36%. The differences for Model #2, #3 and #4 (negative stagger) were 20%, 7.5%, 11% respectively at an angle of attack of 10°.

Figure 74:
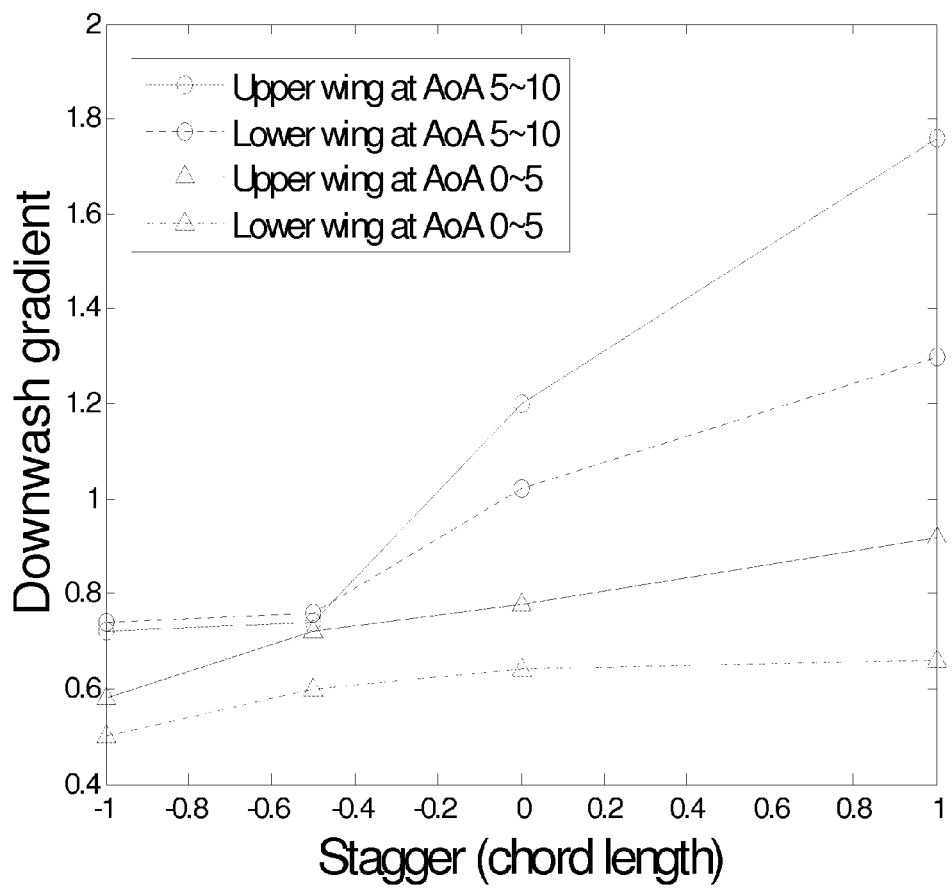
FIG. 74 shows an increase in Downwash gradient with increasing stagger and shows clear differences in slope before and after 5 degrees angle of attack.

FIG. 74 represents the downwash angle gradient, $$\left(\frac{d\varepsilon}{d\alpha}\right),$$

as a function of stagger. It is clearly observed that as the stagger increases, the downwash gradient increases. Based on the concept of downwash explained earlier, the upper wing in a biplane is responsible for a greater portion of the lift force than the lower wing. In addition, interesting behavior was found in the downwash gradient. The slope of the downwash variation with angle of attack was higher for an angle of attack range from 5° to 10° than the slope of the downwash angle variation with angle of attack for an angle of attack range from 0° to 5°. This behavior corresponds to a kink observed in the lift curve slope determined through integrated force and will be explained further in the following section.

Video footage was taken with tufts at a Re of 166,000 across a range of angle of attack from −6° to 10°. Results were zero lift angle shifted in order to compare with test data, which was at an angle of attack of −2.14 at a Re of 125,000.

Figure 75:
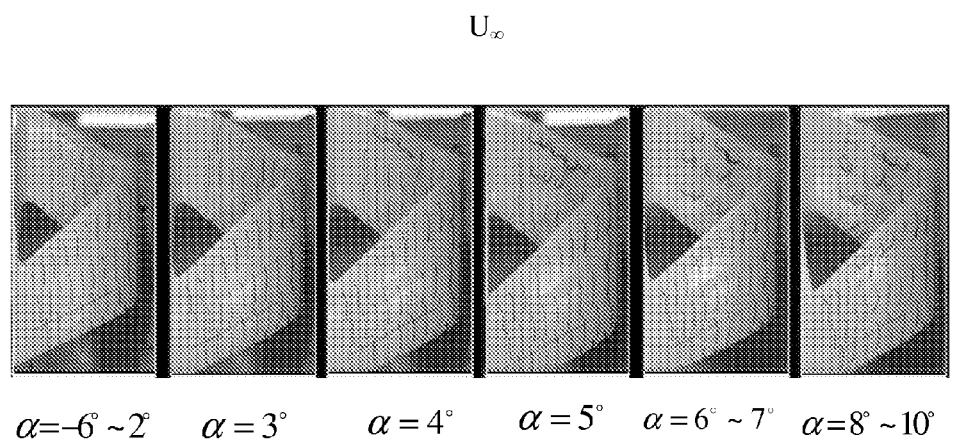
FIG. 75 shows flow visualization of 24" Configuration of an embodiment of the instant invention at 50 mph (Re 215,000): Progression of Separation (reproduced from the reference with zero lift shifted angle of attack).

FIG. 75 shows when and where flow separation occurs on the wings. It starts first on the lower wing at an angle of attack of 4°. At an angle of attack between 8° and 10°, flow separation is observed on the upper wing. The tufts, at angles of attack from 5° to 10° are in random orientations on the lower wing surface thereby demonstrating flow separation. This observation supports that the upper wing in the biplane with endplates is more responsible for generating lift force than the lower wing.

The Effect of Gap on the Downwash Angle
Downwash Angle with Zero Stagger Configurations The effect of gap on the downwash angle will be explored in these sections. Two different gap spacings with zero stagger were considered, 0.5 C and 1.0 C at a Re of 120,000. FIGS. 76 and 77 show the velocity distribution and downwash angle at angles of attack of 0°, 5° and 10°. In the same manner as in the previous section, downwash angles were computed from the velocity vectors and are shown in the Table below. As seen in the Figures, these results show a different relationship for the downwash variation with angle of attack than that seen with variation in stagger. Increasing gap spacing increases the downwash angle. Model #1 (no stagger, 1.0 C gap) has a higher downwash angle than Model #2 (no stagger, 0.5 C gap) in the range of angles of attack tested. As with stagger, the change in gap is proportional to the change in downwash angle.

As seen in Table below and in FIG. 78, it is very important to note that the downwash angles for the upper and lower wing were only the same at 0 degrees angle of attack. Otherwise, the upper wing consistently has a higher downwash angle than the lower wing; Model #1 (no stagger, 1.0 C gap) has a larger variation in the angle between the upper and lower wings than Model #2. The upper wing of Model #1 produces a 43% higher downwash angle than the lower wing. Model #2 (no stagger, 0.5 C gap) has a 35% difference in downwash angle between the upper and lower wings. This downwash angle variation between upper and lower wings was increased with angle of attack.

Table showing Downwash angles at different angles of attack, at no stagger, Re 120,000

| | | Downwash Angle | | |
|---|---|---|---|---|
| | | At $\alpha = 0°$ | At $\alpha = 5°$ | At $\alpha = 10°$ |
| Model #2 (no Stagger, 0.5 C gap) | upper | 0 deg. | 3.4 deg. | 10.3 deg. |
| | lower | 0 deg | 2.8 deg. | 6.7 deg. |
| Model #1 (no Stagger, 1.0 C gap) | upper | 0 deg. | 4.2 deg. | 12.7 deg. |
| | lower | 0 deg. | 3.1 deg. | 7.3 deg. |

According to Munk's theoretically based statement, for two parallel and equal wings without stagger, the downwash angles of both upper and lower wing should be the same. However, for all configurations tested, the upper and lower wing downwash angles were not the same. This implies that one of the underlying assumptions in Munk's biplane analysis for the additional lift force for upper and lower surface is invalid.

Downwash Angle with (−) 1.0 C Constant Stagger Configurations at Re 120,000

Two different Gaps, 0.5 C and 1.0 C with constant (−) 1.0 C stagger were considered at a Re of 120,000. FIGS. 79 and 80 show the velocity distribution and downwash angle at angles of attack of 0°, 5° and 10°. Similar to previously discussed, downwash angles were computed from the velocity vectors and are shown in Table below.

Figure 81:
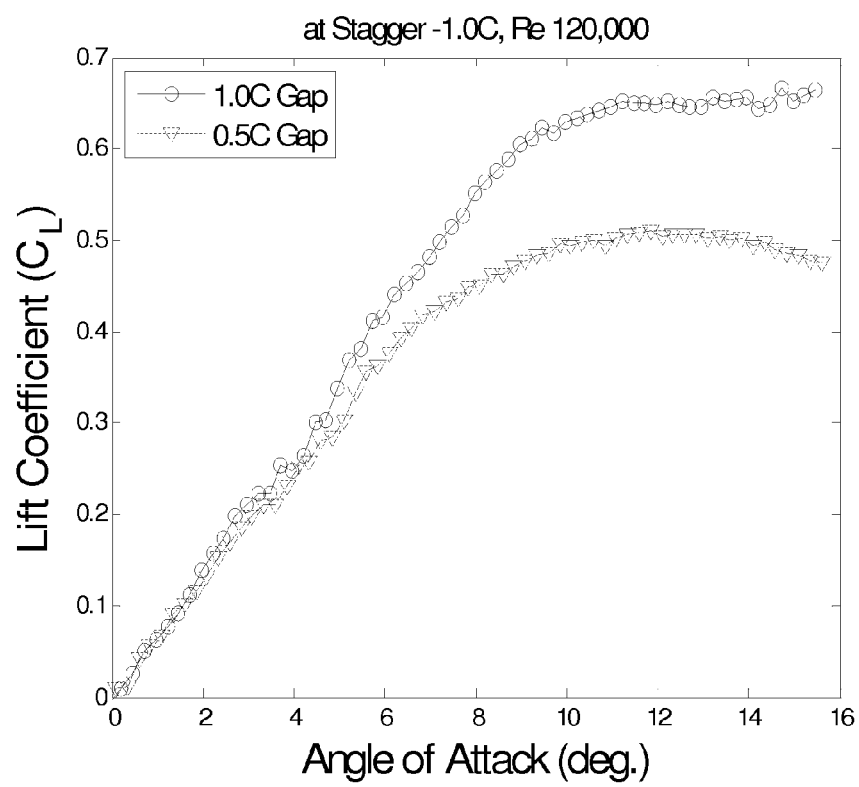
FIG. 81 depicts a comparison of force measurement with Model #4 and #6 shows a large CL variation at the angle of attack tested.

As seen in the Table below, the downwash angles for the upper and lower wing for models #4 ((−) 1.0 C stagger, 0.5 C gap) and Model #6 were only the same at 0 degrees angle of attack. Otherwise, the upper wing has a greater downwash angle than the lower wing; Model #6 ((−) 1.0 C stagger, 1.0 C gap) has a larger downwash angle than Model #4, which was 28% larger than Model #4. This difference is very close to the difference in measured CL (25%), as seen in FIG. 81.

Table showing Downwash angles at different angles of attack, at (−) 1.0 C constant stagger, Re 120,000

|  |  | Downwash Angle | | |
| --- | --- | --- | --- | --- |
|  |  | At α = 0° | At α = 5° | At α = 10° |
| Model #4 | upper | 0 deg. | 3.4 deg. | 6.4 deg. |
| ((−) 1.0 C Stagger, 0.5 C gap) | lower | 0 deg | 2.9 deg. | 6.4 deg. |
| Model #6 | upper | 0 deg. | 3.9 deg. | 8.3 deg. |
| ((−) 1.0 C Stagger, 1.0 C gap) | lower | 0 deg. | 3.6 deg. | 6.6 deg. |

From the three sets of downwash angle results, it is obvious that the downwash angle of upper wing is larger than the angle of lower wing at both Re 60,000 and 120,000. The downwash angle variation with angle of attack of the upper wing is larger than the variation of the lower wing. Thus for the biplane with endplates, the upper wing generates more lift. Based on the concept of downwash angle, it appears that the upper wing in the biplane is responsible for a greater portion of the lift across a wide range of gap and stagger.

Change in Downwash Angle Slope

Figure 82:
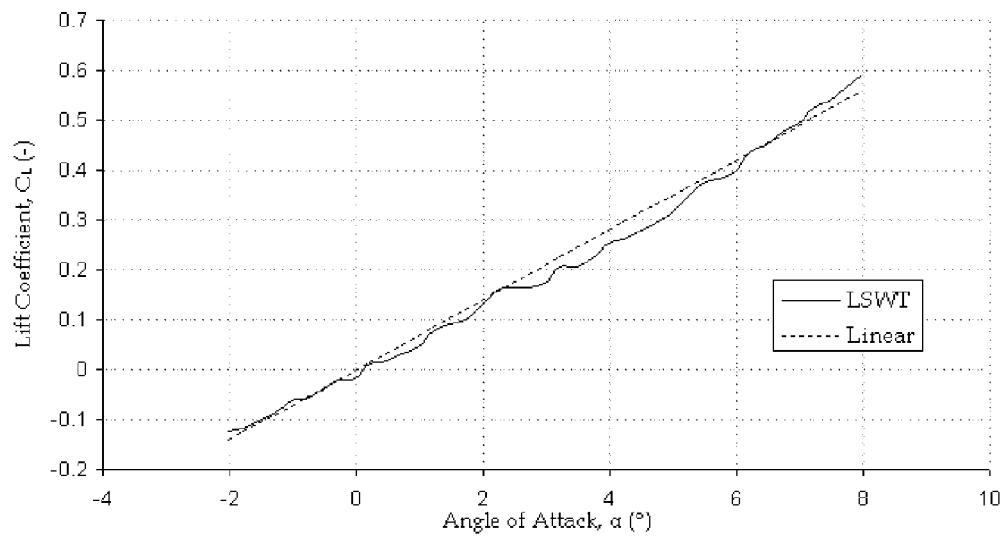
FIG. 82 depicts a Lift Coefficient at G=0.5 C, St=1 C, Re=60,000 specifically shows a distinct change in lift curve slope.

A distinct change in the lift curve slope has been observed in the linear regime (−2°<α<8°) for all models tested in the UD LWST (see FIG. 82). This slope change occurred in other studies on the configuration of the instant invention.

Figure 83:
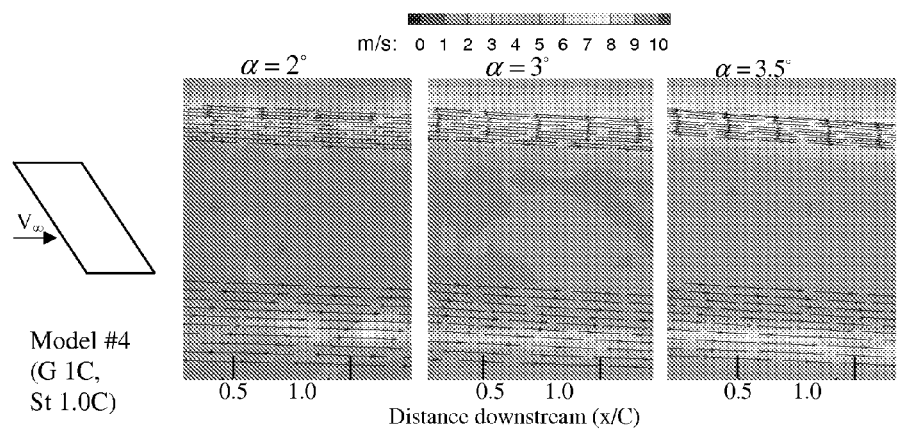
FIG. 83(A-C) depict Downwash angle variation with increasing angle of attack (0.5 C Gap, (+) 1.0 Stagger) and Re 60,000 shows a gradual increment of downwash angle as angle of attack increases.
Figure 83:
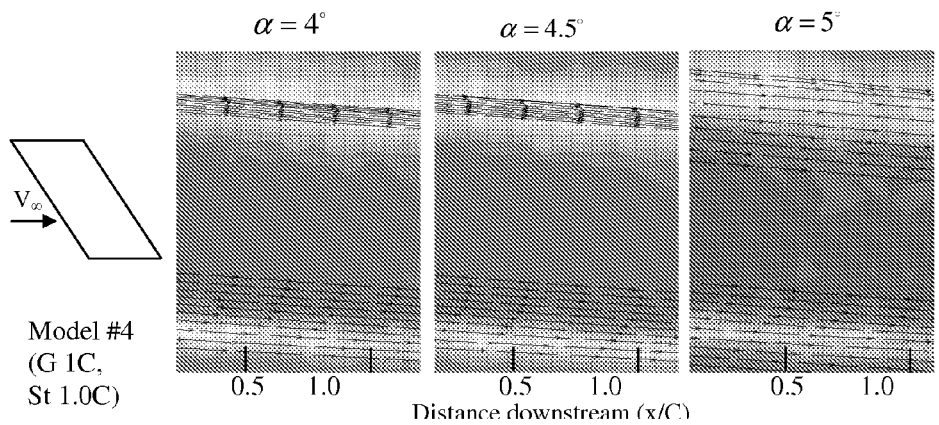
Figure 83:
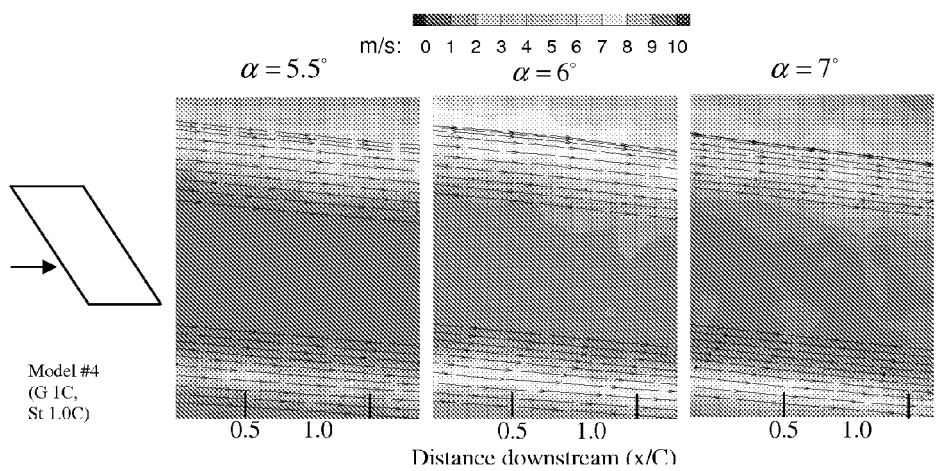

When increasing the stagger in the positive direction, the biplane model experiences a positive change in the slope of the lift coefficient. The lift slope for 5°<α<8° for the positive stagger configuration was significantly greater than for the negative stagger configurations. The downwash angle was investigated using the PIV method to better understand this behavior using a smaller increment in angle of attack previously performed with Model #4 (gap 0.5 C and stagger 1.0 C). This model has the greatest change in lift curve slope and it is hoped that any change in the wake morphology would be easier to identify as a result. FIG. 83 shows the velocity distribution and downwash angle at angles of attack ranging from 2° to 7° at a Re of 60,000. Between an angle of attack of 5° and 5.5° a dramatic change in downwash angle is seen which correlates to the measured lift coefficient change. During wind tunnel testing on this model, the highest L/D was achieved at this same angle of attack.

The Table below displays the downwash angles for the upper and lower wings for Model #4 (0.5 C Gap, (+) 1.0 C) as a function of angle of attack at a Re of 60,000.

Table showing Downwash angles at different angles of attack with (+) 1.0 C stagger, 0.5 C gap at a Re of 60,000 shows a significant downwash change in the angle of attack 5.5°.

|  | Angle of attack | | | | | | | | |
| --- | --- | --- | --- | --- | --- | --- | --- | --- | --- |
|  | 2° | 3° | 3.5° | 4° | 4.5° | 5° | 5.5° | 6° | 7° |
| Downwash angle at the upper wing | 2.7 | 3.3 | 4.2 | 4.3 | 4.7 | 5 | 6.3 | 6.6 | 8.3 |
| Downwash angle at the lower wing | 2.4 | 3.2 | 3.4 | 3.7 | 3.8 | 3.8 | 5.3 | 5.7 | 6.3 |

As the angle of attack increases, the downwash gradient increases as well, especially, at angles of attack >5° (see FIG. 84).

These results correlate the force balance measurement explained in the previous section well. In the plots of force measurement, the highest L/D ratio is obtained around an angle of attack of 5°. In addition, the lift coefficient also increases at roughly the same angle of attack. These results indicate that the angle of attack of 5° is a point of inflection for a visible change in lift curve slope on the biplane wing with endplates. Especially, since this configuration has positive stagger, the endplates can effectively interfere with the flow field at the wing-tip to reduce the spanwise flow over the upper wing. This effect of interference causes a dramatic increase of downwash angle at the angle of attack of roughly 5°. This is also strongly related to the higher lift force obtained from the tunnel test.

From the force balance measurements and streamwise PIV analysis, the gap and stagger have a substantial effect on the lift. One potential explanation for the lift variation based on the stagger could be the manner in which the different endplates act on the upwash around the wingtips of the biplane.

The effect of decreasing the endplate planform area is strongly related to the biplane wing efficiency. The endplates maintain their effectiveness quite well until approximately 70% of the original planform area is removed. This means that the efficiency of the overall configuration for the cases of 100% and 30% endplate planform area is the same. Therefore, in order to minimize skin friction drag and maximize wing efficiency, the planform area of the endplates should be resized to 30% of its original chord.

Figure 85:
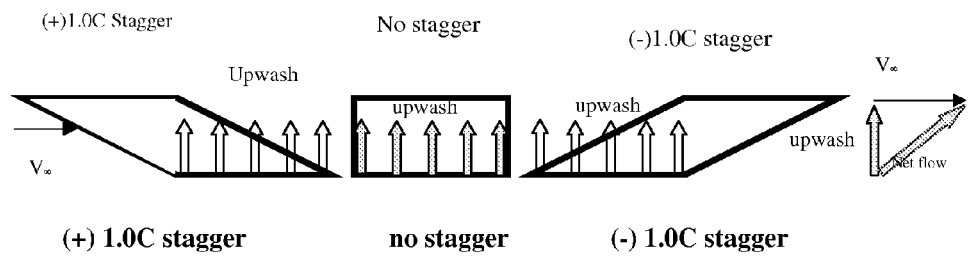
FIG. 85 depicts a side view of different stagger configurations shows different planform area of the endplates acting upwash flow.

FIG. 85 shows the side view of different stagger configurations: the positive and negative 1.0 C stagger and the no stagger configurations. From the figure the planform area of the endplates extending upward from the lower wing is 50% of the endplate area for the (+) and (−) 1.0 C stagger and 100% for the no stagger configuration. When a biplane is placed in a freestream with an angle of attack, high pressure air rolls up from the lower wing to the upper wing. If the area of the endplate is decreased, the skin friction drag acting on the upwash traveling along the surface of the endplates will be decreased as well. Therefore, the (+) 1.0 C configuration can have higher wing efficiency than the no stagger configuration. For the (−) 1.0 C stagger configuration, however, the last 50% of endplates area is placed downstream of the lower wing. Hence, there will be no endplate effect increasing the upwash magnitude for the (−) 1.0 C stagger configuration.

One more potential explanation for different lift based on the stagger could be the wing-wing interaction between two wings of the biplane with endplates. From the force balance measurements, it was found that as gap increases, the CL difference between the negative and positive stagger configuration decreases; Model #7 (2.0 C gap) sees almost no CL change as a function of angle of attack between the positive and negative configurations. When both wings are staggered, the fore wing reduces the wing efficiency of the aft wing because the aft wing is immersed in the induced downwash of the fore wing; hence, the aft wing operates at a lower effective angle of attack. Based on the concept of downwash explained earlier, the upper wing in a biplane is responsible for a greater portion of the lift force than the lower wing. For the positive stagger configuration, the upper wing generates lift with less interaction from the lower wing but the lower wing will be subjected to this interaction/interference effect. The downwash angle from PIV proves this behavior. For the negative stagger configuration, the upper wing, which is the aft wing here will be affected by the lower wing, so the lift force generated will be lower than the positive stagger configuration. The PIV results prove that the downwash angle for the upper wing of the negative stagger configuration was smaller than the with the positive stagger configuration. Therefore, because of the wing-wing interference effect, the positive stagger configuration can generate higher lift force than the negative stagger configuration.

Drag Force from 2D PIV Using the Momentum Deficit Method

Figure 86:
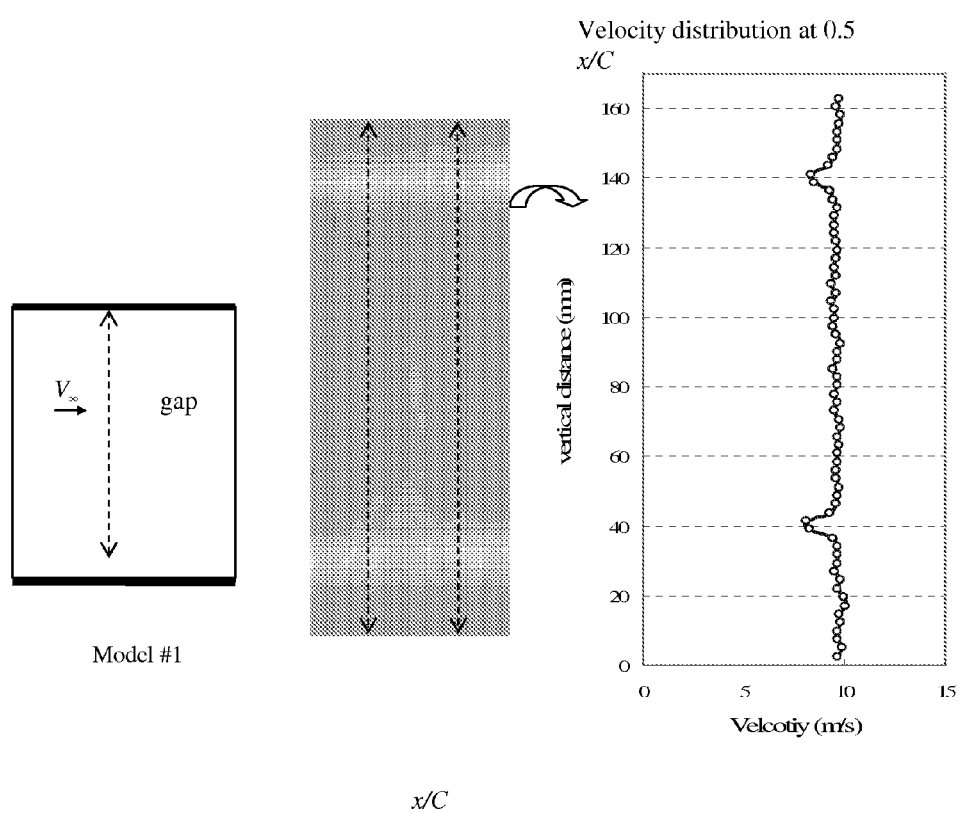
FIG. 86 depicts a DPIV image at 1 chord length downstream with a 9 m/s (Re 60,000) freestream velocity at 0 deg. angle of attack.

Computation of the drag force is an important characteristic that can validate the PIV data generated during testing as well as correlate the integrated force results. To measure the total drag force on the models at Re 60,000 and 120,000 with angles of attack of 0, 5 and 10 degrees, 2-dimensional velocity field data were obtained using the 2D PIV method. The [non lift induced] drag for the biplane with endplates consists of three drag components: wing parasite drag, endplate parasite drag and interference drag from the corner of the wing and endplate. As discussed, the Momentum Deficit Method was applied to calculate the drag on both wings and the endplate. The averaged velocity field in the streamwise direction between a half-chord length and one chord length downstream was used in computing the wing drag force as displayed in FIG. 86.

Approximately 7% of the wing drag estimates the amount of interference drag and this was the technique used here. The range of the velocity field in the streamwise direction between a half-chord length and one chord length downstream was used in computing the total drag force using the aforementioned momentum deficit method. Matlab software was used to calculate the three components of total drag force. The total drag force computed with Matlab is comparable to the drag force found from tunnel testing thereby validating PIV results. The frictional resistance coefficient of the models was obtained using a Blasius method for laminar flow. This was included to consider the skin friction drag of the endplates due to the inability of the PIV method to account for these factors.

Two sets of models were used to compute and compare drag coefficients as shown in the Table herein. These three models consist of varying stagger of 0 C, (−) 0.5 C and (−) 1.0 C with constant 0.5 C gap. No significant difference in total drag force is observed when comparing these models. Model #2 (no stagger and 0.5 C gap) has a slightly higher CD than the other two models but the difference was subtle.

Table showing Drag and CD with 3 models at Re 60,000

| | Model #2 (stagger 0 C, gap 0.5 C) | | | Model #3 (stagger (−) 0.5 C, gap 0.5 C) | | | Model #4 (stagger (−) 1.0 C, gap 0.5 C) | | |
|---|---|---|---|---|---|---|---|---|---|
| | AoA (deg.) | | | | | | | | |
| | 0 | 5 | 10 | 0 | 5 | 10 | 0 | 5 | 10 |
| Wing Drag (N) | 0.062 | 0.105 | 0.235 | 0.068 | 0.102 | 0.267 | 0.065 | 0.102 | 0.257 |
| Endplate Drag (N) | 0.003 | 0.003 | 0.003 | 0.003 | 0.003 | 0.003 | 0.003 | 0.003 | 0.003 |
| Interference Drag (N) | 0.005 | 0.008 | 0.017 | 0.005 | 0.007 | 0.019 | 0.005 | 0.007 | 0.018 |
| Total Drag (N) | 0.070 | 0.116 | 0.255 | 0.076 | 0.113 | 0.289 | 0.073 | 0.112 | 0.279 |
| CD | 0.024 | 0.040 | 0.099 | 0.023 | 0.042 | 0.098 | 0.025 | 0.040 | 0.106 |

FIG. 87 shows the PIV derived drag data with the force balance drag data at three different angles of attack. Vortex drag computed from Stereo PIV data is plotted at angles of attack of 5° and 10°. The vortex-momentum deficit contribution is 3.1% of the total drag. In addition, the Blasius equation for flat plate skin friction drag is plotted at the zero degree angle of attack for reference. This value is included due to the inability of the PIV method to take into consideration the flat plate drag of the endplates. Very close agreement can be found at the observed angles of attack when the endplate flat plate drag estimate is taken into consideration.

Figure 88:
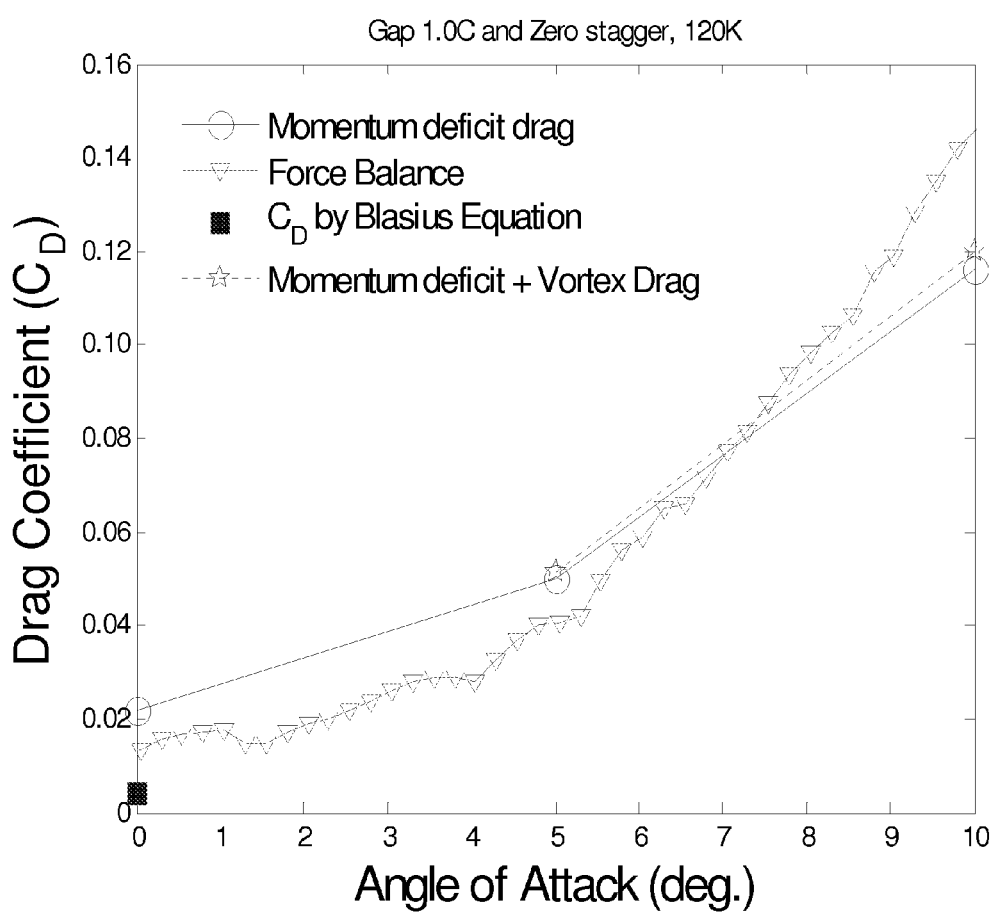
FIG. 88(A-B) show a comparison of the integrated force measurement to the PIV derived momentum deficit drag for Model #1 (no stagger, 1.0 C gap) and 6 ((−) 1.0 C stagger, 1.0 C gap) at Re 120,000. Blasius flat plate drag and vortex drag are included as a reference.
Figure 88:
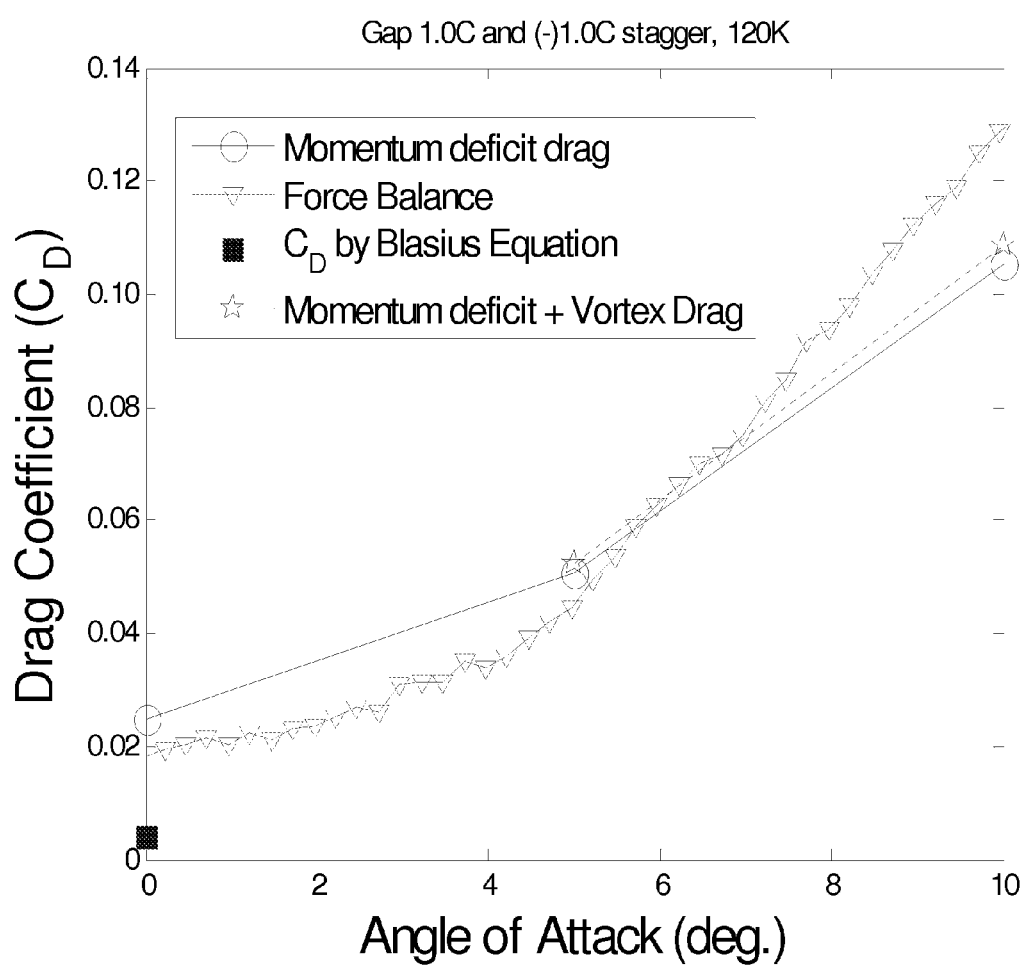

In the same manner, FIG. 88 shows the PIV derived drag data with the force balance drag data at different angles of attack for the higher Reynolds number case. Close agreement can be found at the observed angles of attack between two methods when the endplate flat plate drag is taken into consideration.

Table showing Drag and CD with 2 models at Re 120,000

| | Model #1 (stagger 0 C, gap 1.0 C) | | | Model #6 (stagger (−) 1.0 C, gap 1.0 C) | | |
|---|---|---|---|---|---|---|
| | AoA (Deg.) | | | | | |
| | 0 | 5 | 10 | 0 | 5 | 10 |
| Wing Drag (N) | 0.229 | 0.538 | 1.235 | 0.270 | 0.551 | 0.987 |
| Endplate Drag (N) | 0.006 | 0.006 | 0.006 | 0.006 | 0.006 | 0.006 |
| Interference Drag (N) | 0.017 | 0.038 | 0.087 | 0.019 | 0.039 | 0.070 |
| Total Drag (N) | 0.252 | 0.582 | 1.328 | 0.295 | 0.596 | 1.062 |
| CD | 0.022 | 0.050 | 0.116 | 0.025 | 0.051 | 0.105 |

The momentum deficit method was applied for the purpose of measuring the components of drag force, parasite drag. The agreement between the two methods was well within the degree of uncertainty, even though the drag force by the momentum deficit method is a little lower for an angle of attack of 10° for the 1.0 C gap configuration. Observing the velocity field image at 100 angle of attack in FIG. 77 (for Model #1 (no stagger, 1.0 C gap) and 80 (for Model #6 (−) 1.0 C stagger, 1.0 C gap), a potential source of error can be seen with part of the velocity field cut off at the bottom of the figures.

Wing-Tip Vortex Structure of the Biplane with Endplates Using 3D PIV

Stereo PIV was used to study the flow physics in the Trefftz plane behind the biplane with endplates. To investigate the effect of gap and stagger from flow characteristics, two sets of models were selected for PIV testing with respect to the different gap and stagger as represented in the following Table.

| Table showing test sets for 3D PIV | | | | | |
|---|---|---|---|---|---|
| | For Stagger effect | | | For Gap effect | |
| Set No. | #1 | | | #2 | |
| Gap | 0.5 C | | | 0.5 C | 1.0 C |
| Stagger | (+)1.0 C | 0.0 C | (−) 0.5 C | (−) 1.0 C | 0.0 C |
| Re | 60,000 | | | 60,000 | |
| AoA | 0°, 5°, 8° | | | 0°, 5°, 8° | |

Investigation of the Flow Structure with Varying Stagger.

To observe the structure of the flow, four different stagger configurations of (+) 1.0 C, 0 C, (−) 0.5 C and (−) 1.0 C stagger all with a 0.5 C gap were used. The tests were performed at a speed of approximately 10 m/s, resulting in a Reynolds number of around 60,000. FIG. 89 shows the position of the models with respect to the laser light sheet. The light sheet was located 0.82 chord lengths downstream from the longitudinal location in the middle between the upper and lower trailing edge. The X, Y and Z axes represent the streamwise, the spanwise and vertical directions respectively.

The time interval of the laser pulses corresponding to the local displacement of the particles was 77 µs. The size of the field of view was 15 cm×10 cm using a 1600×1200 pixel CCD array. Three angles of attack (0°, 5° and 8°) were selected for the Stereo PIV test.

FIG. 90 displays the comparison of the color contours of the vertical component of velocity (v) with an overlay of v and w component velocity vectors. The black solid line in the shape of a 'C' represents the wing-tip area of the upper and lower wing with endplates of the biplane as seen from behind. The scale of the figure is from −1.5 m/s to 1.5 m/s with 15 scales of resolution. The scale for the velocity vectors is held constant for each configuration and angle of attack. This allows for accurate back-to-back comparisons between configurations.

The vertical component of velocity for Model #2 with the (−) 1.0 C stagger and gap 0.5 C at angles of attack of 0°, 5° and 8° can be found in FIG. 90(a). In the same manner, the figures for the (−) 0.5 C stagger, no stagger and (+) 1.0 C stagger configurations can be found in FIGS. 90(b), (c) and (d). This shows upwash around the wing-tip when the endplates are connected at the upper and lower wing-tip of a biplane. The vertical component of velocity has a large variation with angle of attack. At an angle of attack of 0°, there is almost no velocity change on the upper and lower region of the wing surfaces for all models. This result is expected because a flat plate wing should generate no lift at α=0°. As angle of attack increases in all of the models, the magnitude of the vertical velocity found outboard of the endplates gradually increases. In addition, there is a large variation in the patterns of the vertical velocity component across the models. As illustrated in the figure, the biplane at angles of attack of 5° and 8° produces lift having high pressure air from the bottom of the wing escaping around the endplates to the top of the wing. This creates an upwash outboard of the endplates as well as a vortex at the trailing edge of the wing and endplates.

FIG. 91 compares the contours of the horizontal component of velocity (w) for the same configuration. The scale of the figure is from −1.5 m/s to 1.5 m/s with 15 scales of resolution. The scale for the velocity vectors is held constant across all angles of attack as was done for the stagger results.

The horizontal component of velocity for Model #4 with a negative 1.0 C stagger at angles of attack 0°, 5° and 8° can be seen in FIG. 91(a). In the same manner, the figures for the (−) 0.5 C stagger, no stagger and (+) 1.0 C stagger configurations are plotted in FIG. 91(b), (c) and (d). These show spanwise flow around the wing-tip of the biplane. This velocity component experienced in a large variation with respect to angle of attack. As the angle of attack is increased, the magnitude of the horizontal velocity on the upper surface gradually increases for all of the models. Also, large variations among the models can be seen.

The pattern of the vertical velocity component of the positive stagger model is substantially different from the others, while the other three configurations are very similar to each other as seen in FIG. 92. Because the upwash is causing the local airflow to travel along the surface of the endplates, it is suspected that the vertical velocity variation was due to the different stagger of the endplates and their associated rake angle.

Figure 93:
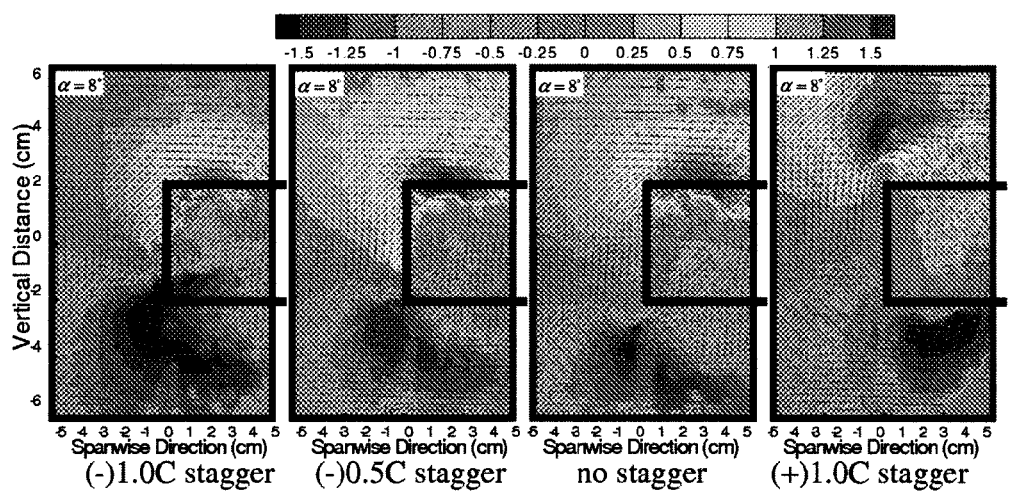
FIG. 93 shows the pattern of the horizontal velocity component of four varying stagger configurations shows a large variation at an angle of attack 8° and a Re of 60,000.

The pattern of the horizontal component of velocity (w) for the same configurations also shows a large variation as seen FIG. 93. The positive stagger model has a substantial difference from the others, while the other three configurations are very similar to each other at an angle of attack 8° and a Re of 60,000. It means that the wing-wing interaction between the upper wing and lower wing affects differently based on the stagger, although all of configuration have the same gap spacing. This wing interference effect for the flow field causes a dramatic increase in downwash angle. This is also strongly related to the higher lift force obtained from the tunnel test. Detailed velocity investigation was performed on specific linear slices along the Trefftz plane using the local velocity data as follows.

As seen in FIG. 94 three planes were used to compare the velocity components of each model along the spanwise direction from z/c=−0.25 to z/c=0.25, which were the upper horizontal line, lower horizontal line and middle vertical line. These were selected to highlight some important flow characteristics in the region surrounding the wingtip of the biplane.

FIG. 95 represents the force balance measurements explained in the earlier section. The lift coefficient was obtained at an angle of attack of 8° from the same configurations discussed above. As depicted in the figure, four configurations show considerably different lift curve characteristics. The (+) 1.0 C stagger configuration produces approximately 30% higher CL than the other configurations. This force balance measurement shows a very similar trend to the vertical and horizontal flow structure since the vertical and horizontal velocity components of (+) 1.0 C stagger configuration at an angle of attack 8° has a considerable difference from the others, while the other three configurations are very similar to each other. This means the upwash structure is directly related to the generation of greater lift.

Figure 96:
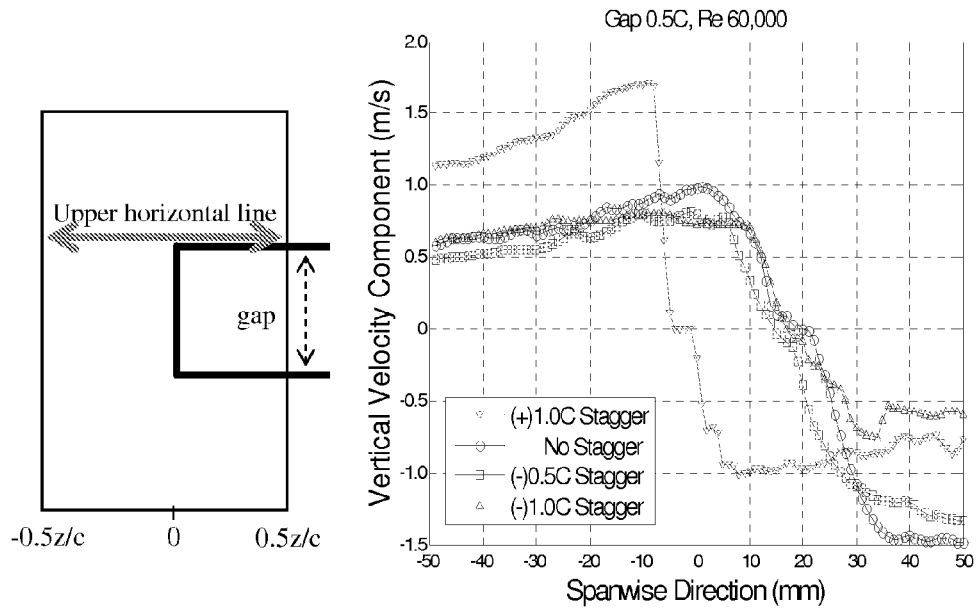
FIG. 96 shows a comparison of the vertical velocity components with four different configurations at the upper horizontal line at an angle of attack=8°, Re 60,000.

FIG. 96 shows the comparison of the vertical velocity components with four different configurations at the upper horizontal line at an angle of attack of 8° and a Re of 60,000. There is a large variation between the curves. The curve of the (+) 1.0 C stagger configuration shows a significantly different pattern than the others. The highest velocity seen with the configuration was (+) 1.75 m/s found outboard of the wing-tip and the lowest value was −1.0 m/s found inboard of the wing-tip. The asymmetry of this curve would indicate that the vortex morphology is affected by the presence of the endplates. It is obvious that the positive stagger configuration has significantly different characteristics compared to the others.

Figure 97A:
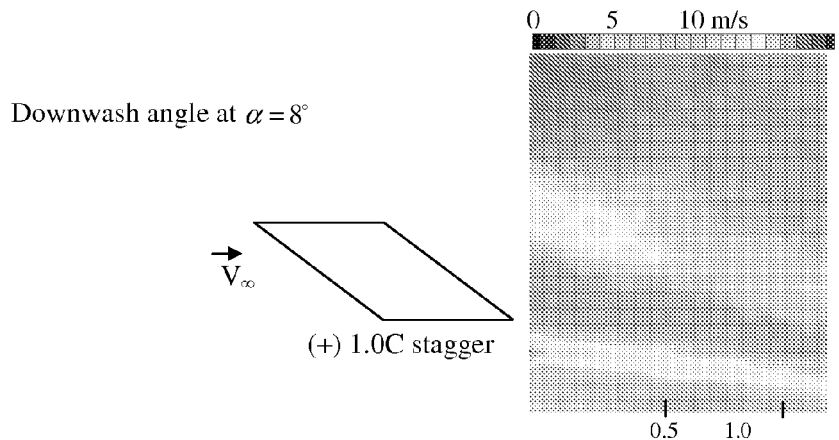
FIG. 97(A-C) show downwash angle distribution of the (+) 1.0 C stagger configuration shows a significantly different downwash characteristic than other configurations at an angle of attack 10°.
Figure 97B:
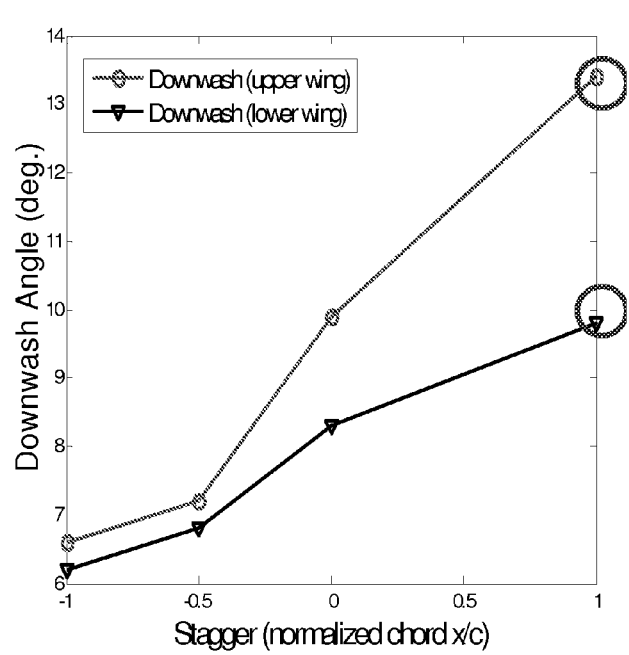
Figure 97C:
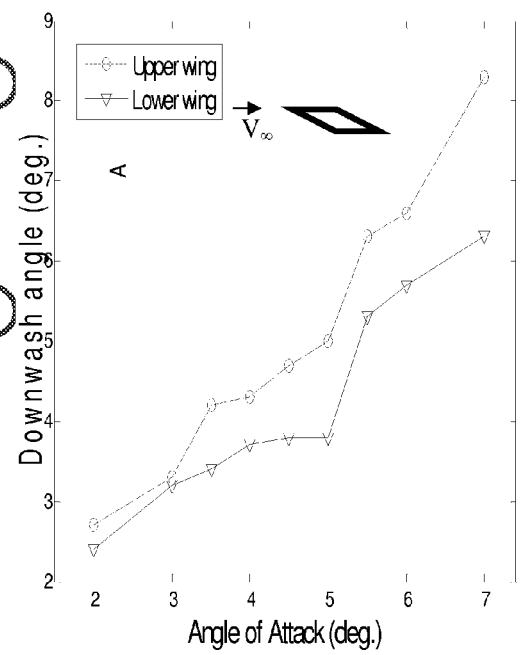

A similar pattern of aerodynamic behavior for these configurations has been observed in the downwash angle discussions evaluated by 2D PIV. As depicted in FIG. 97 the downwash angle at an angle of attack of 10° and a Re of 60,000 shows a considerably higher downwash angle than that seen with the other three configurations. This behavior is very clearly seen in FIG. 97(c) for angles of attack >5°. These force balance data and downwash angle measurements convincingly denote the flow behavior.

Figure 98:
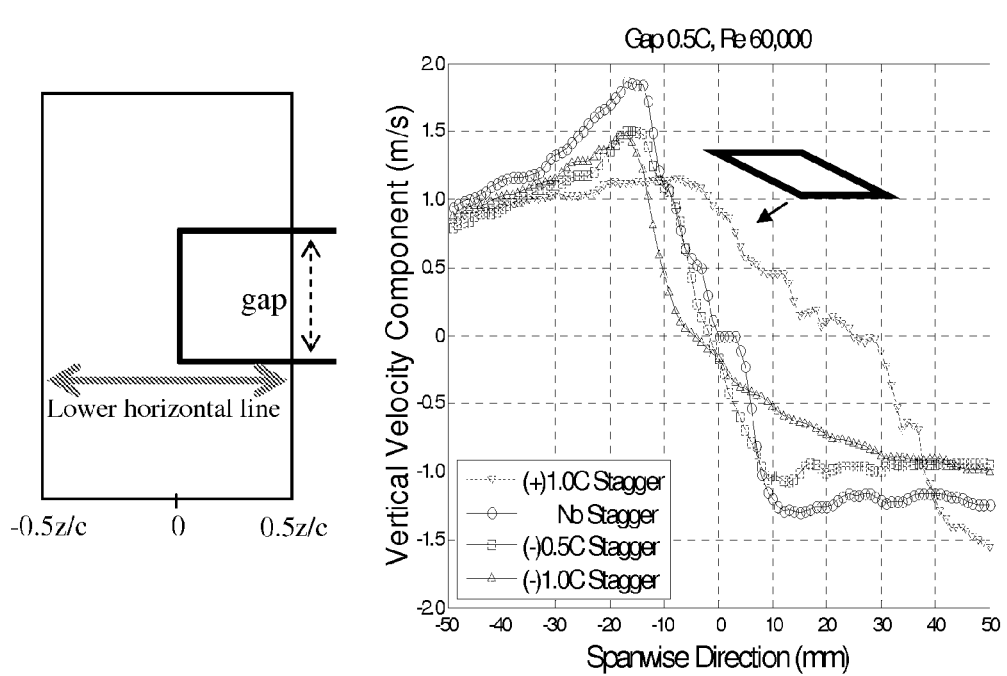
FIG. 98 shows a comparison of the vertical velocity components with four different configurations at the lower horizontal line at an angle of attack of 8° and a Re of 60,000 shows a different flow structure for the (+) 1.0 C stagger configuration than for other configurations.

FIG. 98 shows the comparison of the vertical velocity components with the same four configurations at the lower horizontal line at an angle of attack of 8°, and a Re of 60,000. The graph shows distinct patterns for each of the configurations. While three configurations (no stagger, (−) 0.5 C and (−) 1.0 C stagger model) share similar behavior to that seen in the upper horizontal line, the (+) 1.0 C stagger configuration shows significantly different behavior. This means that the positive stagger model has a different flow structure forming around the lower wing area. This behavior is opposite to the flow structure observed on the upper surface.

FIG. 99 compares the spanwise velocity components with four different configurations at the upper horizontal line at an angle of attack of 8° and a Re of 60,000. This figure also shows significant differences for the (+) 1.0 C stagger configuration. The maximum spanwise velocity for the configuration was 1.75 m/s and at 48 mm from the wingtip. The graph of the (−) 1.0 C stagger configuration shows a maximum value of 1.3 m/s at 13 mm from the wingtip. The no stagger and (−) 0.5 C stagger configurations see 1.4 m/s at 23 mm and 1.1 m/s at 27 mm for the peak values and the locations respectively. Hence, the (+) 1.0 C configuration produces greater spanwise flow at a higher location than other configurations. This implies that the endplates of the biplane configurations control spanwise flow around the wingtip in different ways. As discussed, endplates can hinder the spanwise flow and thus extend the wingtip vortices by causing a physical constraint to the flow field. Extension of the wingtip vortices can cause a reduction in induced drag.

This spanwise flow can be related to the aerodynamic efficiency based on the force balance results and downwash angle. As displayed earlier, from the force balance measurement, this positive 1.0 C stagger configuration generated a 30% higher lift coefficient than others at the same angle of attack. If the spanwise flow is formed far from the wingtip, this means that the endplates can spread out or splay the wing-tip vortices. Spreading out the wing-tip vortices could potentially cause a reduction in downwash and induced drag. Therefore, if the upper surface is stagger in a positive direction, the endplates can effectively interfere with the flow field at the wingtip to reduce the spanwise flow over the upper wing. This spanwise induced velocities from the endplates oppose and can thereby cancel those generated by the upper wing. This is strongly related to the 30% higher lift force the positive configuration obtained from the tunnel test. Therefore, spanwise flow can be largely controlled by the presence of the endplates and the stagger condition of the upper wing.

FIG. 100 shows the vorticity for the four configurations at angles of attack of 0°, 5° and 8° and a Re of 60,000. The scale of the figure is from (−) 200 rad/s to (+) 200 rad/s with 15 scales of resolution. As illustrated in the figure, the biplane at different angles of attack generates different patterns of vorticity. As expected at an angle of attack 0°, there is no observable vorticity. As angle of attack increases, the magnitude of the vorticity gradually increases for each model as would also be expected. Additionally, a large variation in the shape of the vortex between the models for a given angle of attack was found. The vortices are more ordered in the case of the (+) 1.0 C stagger configuration. As described, this configuration produces the largest spanwise velocity when compared to other configurations. The first three configurations (no stagger, (−) 0.5 C and (−) 1.0 C stagger) show several vortices separated and spread out at the lower wingtip and behind the upper wing. The wingtip vortices of the (−) 1.0 C stagger configuration are the least stable out of all four models. This causes the lowest averaged spanwise velocity and also the lowest lift coefficient from the force balance measurement at an angle of attack 8°. The first two configurations, which are (−) 0.5 C and (−) 1.0 C stagger configurations show scattered wingtip vortices near the wingtips and endplate. As described earlier, broadening of the wingtip vortices can cause a reduction in downwash and induced drag. From the drag polar force measurements, there is a visible change in CDi across stagger with increasing stagger providing decreasing CDi.

Behavior of the vortex roll-up past the positive 1.0 C stagger configuration is different to others. Different pattern of vortex roll-up came from the different pattern of spanwise and vertical velocity components of this configuration, which have visual differences compared to other configurations. This different pattern of wing-tip vorticies causes significantly different downwash angle and lift coefficient from the force balance measurements.

Planar velocity slices similar to the ones used in the previous section can be seen in FIG. 101, two planes were used to compare the vorticity components of each model along the spanwise direction from z/c=−0.25 to z/c=0.25: a horizontal line in the vortex core and a vertical line in the vortex core. These were selected to show the most remarkable flow characteristics at the wingtip.

Figure 102:
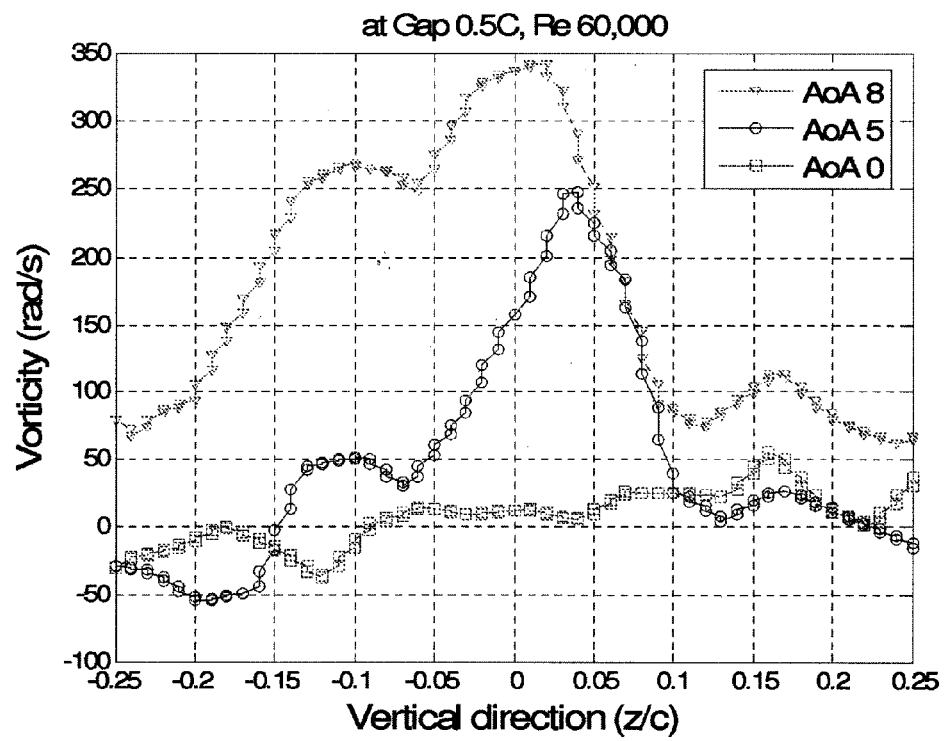
FIG. 102 shows a comparison of the vortex intensity at α=0°, 5° and 8° along a horizontal line across the vortex core with the no stagger configuration shows that the magnitude of the vorticity is directly proportional to the angle of attack.

FIG. 102 shows the comparison of the magnitude of the vorticity with respect to angle of attack at 0°, 5° and 8° at the horizontal line of the vortex core. This figure shows that the magnitude of the vorticity is directly proportional to the angle of attack.

Figure 103:
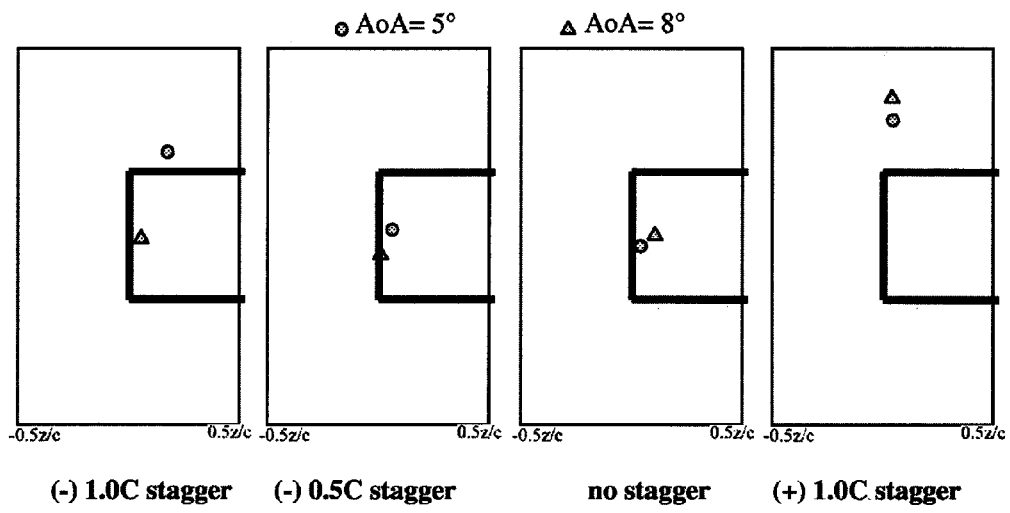
FIG. 103 shows a vortex core position selected relative to the wingtip and endplate.

FIG. 103 shows the vortex core position relative to the wingtip and endplate for the four configurations at angles of attack of 5° and 8° and a Re of 60,000. The coordinates of the vortex core are normalized by the chord length. The circle symbol on the figure represents the vortex core position at α=5° and the triangle symbol is for α=8°. The vortex core is the region of low pressure. As angle of attack increases there were small changes in the vortex core location with the exception of the (−) 1.0 C configuration, where the vortex magnitude was significantly different. Actually, it is difficult to observe the vortex core for the (−) 1.0 C and (−) 0.5 stagger configurations because of the splay of the multiple vortices. For the first three configurations, the vortex core locations were selected around the middle of the corner of the lower wing. Unlike the other configurations, the (+) 1.0 C stagger model has a fundamentally different vortex core location, farther up the upper wingtip. This roll-up behavior produces stronger vortices which causes a change in shape of the downwash distribution, which was displayed in FIG. 97. As explained, the lift force produced by the wings is equal to the downward 'push' it gives to the air that it passes through.

Investigation of the Flow Structure with Different Gap Configurations

To observe the flow structure around configurations with different gap spacing, two different configurations of 1.0 C and 0.5 C gap with no stagger were used. The tests were performed at a speed of approximately 10 m/s, resulting in a Reynolds number of approximately 60,000. FIG. 104 shows the position of the models with respect to the laser plane of illumination. The light sheet was located 0.82 chords downstream from the upper and lower wing trailing edge. The X, Y and Z axes represent the streamwise, the spanwise and vertical directions respectively.

Similarly, the time interval between the laser pulses corresponding to the local displacement of the particles was 77 µs. The size of the field of view was 15 cm×10 cm and three angles of attack (0°, 5° and 8°) were selected for the Stereo PIV test. FIG. 105 displays the comparison of the magnitude of the vertical and spanwise components of velocity (v) for Model #1 (1.0 C gap) and #2 (0.5 C gap) with no stagger. The bigger black solid line in a 'C' shape represents the wing location of the upper and lower wing of 1.0 C gap. The scale of the figure is from −1.5 m/s to 1.5 m/s with 15 scales of resolution. As seen in the Figure, the pattern of vertical velocity component is very similar between the two configurations. The highest vertical velocity component was observed near the corner area of the lower wing for both configurations. This flow pattern shows upwash moving up along the endplates when the upper and lower wingtips of a biplane are connected with an endplate. This vertical component of velocity experiences a large variation with angle of attack. At an angle of attack of 0°, there is almost no velocity change on the wing and endplate surfaces for all models as expected. As angle of attack increases, the magnitude of the vertical velocity found outboard of the endplates gradually increases up to the tip of the upper surface. There is little variation in the overall pattern of the vertical velocity components between the two models, but the scale of the flow contour was different based on the gap spacing. As illustrated in the figure, for the case of angles of attack of 5° and 8°, flow from the bottom of the wing moves around the endplates to the top of the wing. This creates an upwash outboard of the endplates as well as a vortex at the trailing edge of the wing and at the endplates. Therefore, since there is no change in stagger between the two models, the flow structures have very similar patterns except for the scale, which is a function of the gap.

FIG. 106 compares the contours of the spanwise component of velocity (w) for the same configurations. The scale of the figure is from −1.5 m/s to 1.5 m/s with 15 scales of resolution.

The spanwise component of velocity for Model #1 with a 1.0 C gap and no stagger at angles of attack 0°, 5° and 8° can be seen in FIG. 106(a). In the same manner, the figure for the 0.5 C gap and zero stagger are plotted in FIG. 106(b). This velocity component was found to have a large variation with respect to angle of attack. As the angle of attack is increased, the magnitude of the horizontal velocity on the upper surface gradually increases for both models. As with the horizontal velocity component, there is a very similar pattern of flow structure between the two models.

FIG. 107 shows the vorticity for the two configurations at angles of attack of 0°, 5° and 8° and a Re of 60,000. The scale of the figure is from (−) 200 rad/s to (+) 200 rad/s with 15 scales of resolution.

FIG. 108(a) represents the force balance measurements explained in the earlier section. The lift coefficient was obtained at and angle of attack of 8° from the two different gap configurations seen above. As depicted in the figure, the 1.0 C gap configuration produces approximately 27% higher CL than 0.5 C gap configuration. FIG. 108(b) represents the force balance measurements for the same configuration. These two curves show very similar behavior.

FIG. 109 shows the comparison of the vertical velocity components at the two different gap configurations for the upper and lower horizontal slices at an angle of attack of 8° and a Re of 60,000. The graph shows very similar characteristics across the configurations. Although there was a small variation between the curves on the upper line, gap spacing did not alter the flow structure as profoundly as stagger.

Figure 110A:
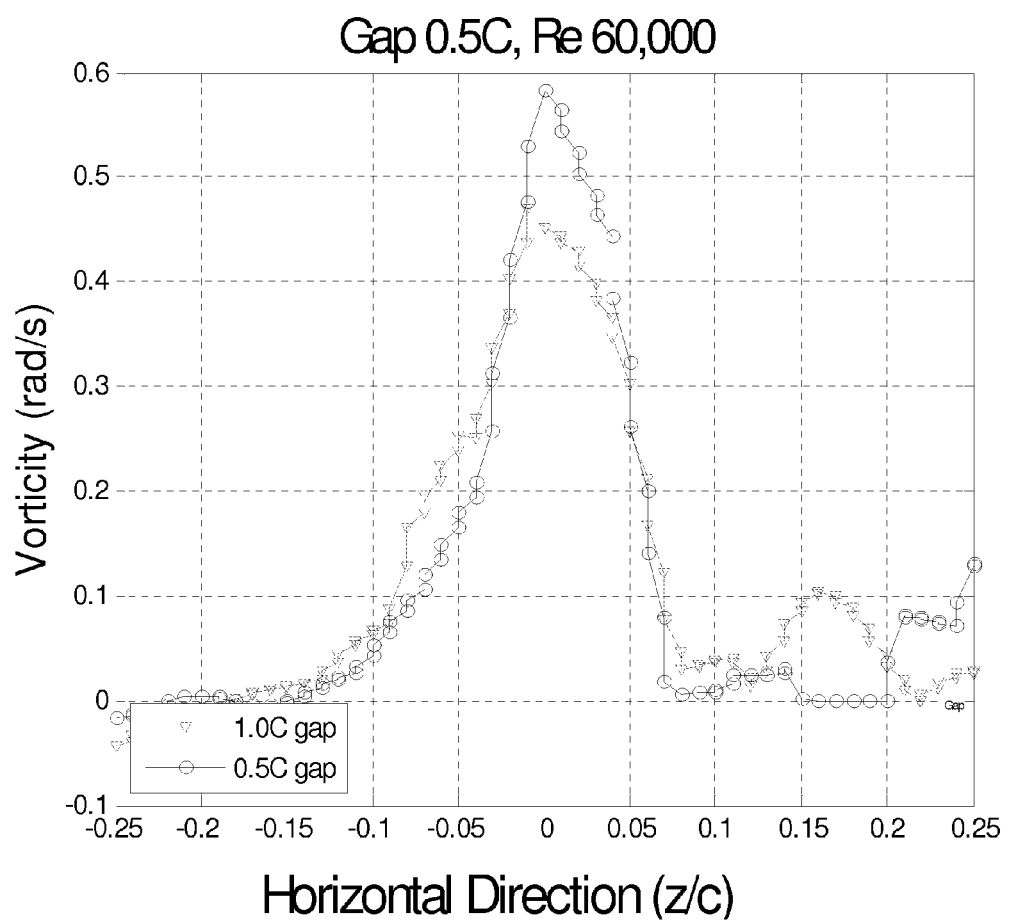
FIG. 110(A-B) show a comparison of the magnitude of the vorticity and vertical velocity components with two different gap configurations at the upper horizontal velocity and vorticity planar slices at an angle of attack of 8° and a Re of 60,000 shows similar trends in the magnitude of the vorticity.
Figure 110B:
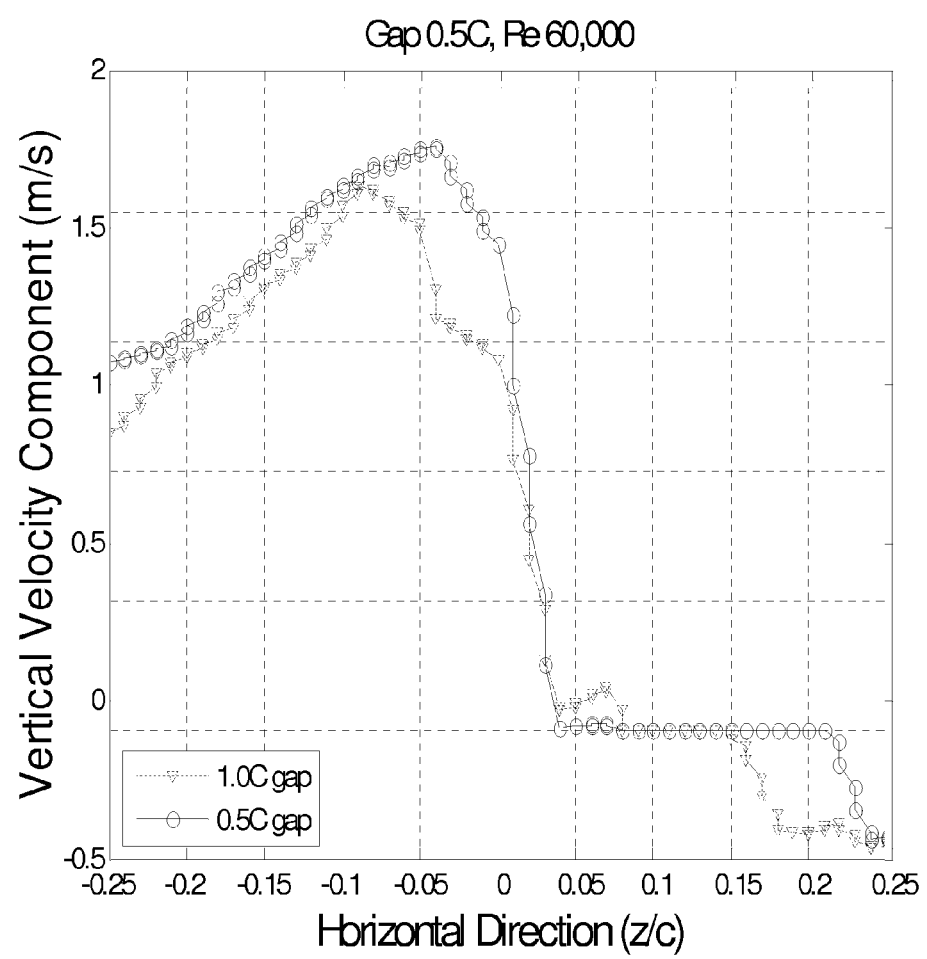

FIG. 110 compares the magnitude of the vorticity at an angle of attack of 8° at the horizontal and vertical lines across the vortex core. This figure shows similar trends in the magnitude of the vorticity as seen in the vertical and spanwise velocity components from both the horizontal and vertical vortex core lines. These two unstagger configurations, have similar flow characteristics across the two gap spacings investigated with the magnitude of the vorticity increasing with increasing gap.

Figures 111A, 111B:
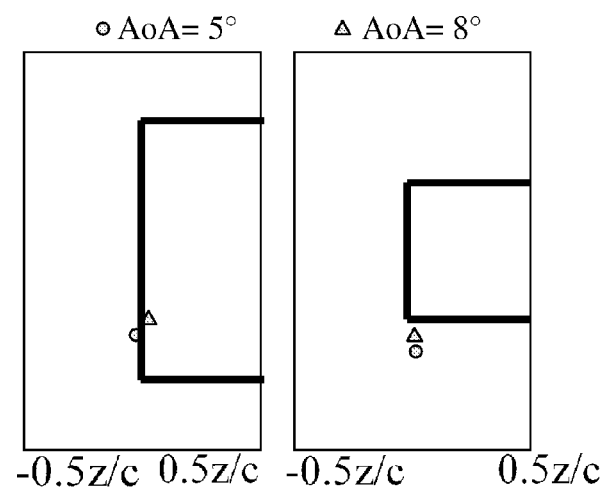
FIG. 111(A-B) show a vortex core position relative to the wing-tip and flow guide the vortex core position relative to the wingtip and endplate for the two configurations at angles of attack of 5° and 8° and a Re of 60,000

FIG. 111 shows the vortex core position relative to the wingtip and endplate for the two configurations at angles of attack of 5° and 8° and a Re of 60,000. The circular symbol in the figure represents the vortex core position at $\alpha=5°$ and the triangular shape represents $\alpha=8°$. As angle of attack increases there were small changes in the vortex core location, but the magnitude of the vorticity was significantly changed. Vortices occurred along the endplates for both models and the vortex core moves up a little as gap increases. This roll-up behavior produces vortices and therefore, this causes the higher amount of downwash, which was displayed earlier. Therefore, there is almost no variation in the patterns of the wingtip vortex between two different gaps with the same stagger, but the magnitude of the vorticity was different based on the size of the gap. The endplates play an important role to pump the airflow toward the upper side and hence, if the gap is bigger, the size of the flow contour along the endplates grows. Since the resulting momentum flux, which is generated by the upwash must be balanced; the downwash also increases as the gap of the endplates increases. The force balance measurements and the downwash angle measured support this argument.

Lift Force Calculation from Stereo PIV using Circulation Theory

Computation of the lift force is an important characteristic that can validate the Stereo PIV data generated during testing as well as correlate the integrated force results. To measure the lift force on the models at Re 60,000 with angles of attack of 0°, 5° and 8° degrees, velocity field data in the Trefftz plane were obtained using the Stereo PIV method. As discussed herein from circulation theory, lift force is a function of density, velocity and circulation.

$$\left(L = \rho_\infty V_\infty \int_c \Gamma_z \, dz\right).$$

Circulation was calculated using Stokes' theorem (equation 2.11, $$\Gamma_z = \int\int_S \omega_z \cdot ds = \int\int_S (\nabla \times V) \cdot ds,$$

where ω is the vorticity, $$\omega_z = \nabla \times V = \left(\frac{\partial v}{\partial z} - \frac{\partial w}{\partial y}\right),$$

extracted from the DPIV results and ds refers to the area of integration.

Two sets of models were used to compute and compare lift coefficients as shown in Table below. Four models consist of varying stagger of (+) 1.0 C, 0 C, (−) 0.5 C and (−) 1.0 C stagger at a constant 0.5 C gap across all models. FIG. 112 shows the comparison of the integrated force measurement to the PIV derived circulation lift for the four configurations.

The difference between the coefficients of lift obtained using a force balance and circulation theory is displayed in Table below. A potential source of error can be seen with the location of light sheet. For all of configurations, the light sheet was located 0.82 chord lengths downstream from the longitudinal location in the middle between the upper and lower trailing edge. It was observed that this distance, 0.82 chord lengths, was long enough to get fully developed wing-tip vortices because the comparison of lift coefficients for the Model #2 (no stagger, 0.5 C gap) agrees well. However, for Model #3 ((−) 0.5 C stagger, 0.5 C gap) and #4 ((−) 1.0 C stagger, 0.5 C gap), the coefficients of lift that were obtained from circulation theory have an 18.8% difference when compared to the force balance measurements at the observed angles of attack of 5° and 10°.

Table showing difference between the coefficients of lift determined by integrated force and circulation theory.

| AoA | (−) 1.0 C stagger | (−) 0.5 C stagger | No stagger | (+) 1.0 C stagger |
|---|---|---|---|---|
| 5° | 21.3% | 19.0% | 6.0% | 10.6% |
| 10° | 18.7% | 16% | 4.4% | 8.3% |

Figure 113:
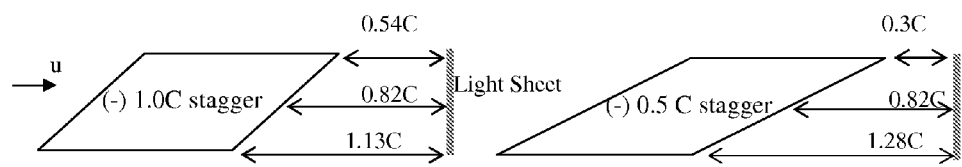
FIG. 113 shows the position of the negative stagger models relative to the laser plane of illumination FIG. 114(A-B) show shows a comparison of the coefficients of lift by a force balance and circulation theory

For the two negative stagger configurations, the light sheet was located 0.54 C and 0.3 C from the trailing edge of the upper wing respectively and therefore (see FIG. 113), this distance is likely not long enough for the wingtip vortex to roll up. This argument is supported by the fact that the lift coefficient obtained from circulation theory is lower than the force balance derived lift at the observed angles of attack.

FIG. 114 shows the integrated lift force for the 1.0 C and 0.5 C gap models without stagger. For both configurations, the light sheet was located 0.82 chord lengths downstream from the longitudinal location in the middle between the upper and lower trailing edge. The coefficient of lift that was obtained from circulation theory closely agrees with the force balance measurements at the observed angles of attack. This likely means that the wingtip vortex was completely rolled-up at the location of the light sheet.

The difference between the coefficients of lift obtained using a force balance and circulation theory is displayed in Table below. For both configurations, the agreement was higher than 94.3% on average at a Re of 60,000 and angles of attack 5° and 8°.

Table showing the difference between the coefficients of lift determined by force balance and circulation theory.

| AoA | 1.0 C Gap | 0.5 C Gap |
|---|---|---|
| 5° | 3.9% | 6.0% |
| 10° | 8.5% | 4.4% |

This PIV analysis shows how the wingtip vortex is formed at the different stagger and gap configurations of the biplane with endplates. The stagger effect shows a large variation with respect to the velocity components and the wingtip vortex structure. The negative stagger configurations show several vortices separated and spread out at the lower wingtip and behind the upper wing. When the upper wing is positively staggered, the biplane generates well-formed vortices. This creates an upwash outboard of the endplates as well as a vortex at the trailing edge of the wing and endplates.

This upwash produces the same amount of downwash from both upper and lower wing surfaces by the momentum theory of lift since the resulting momentum flux by upwash must be balanced assuming no change in the out of plane motion. From the observation of the vortex core location, the positive stagger configuration produces higher downwash and therefore, the lift force obtained was higher than that obtained with the other configurations. The combination of force balance results for lift and the downwash angle prove this flow behavior. For the gap effect, as gap increases, this wingtip vortex roll-up behavior was similar for both the 0.5 C and 1.0 C gap models but the magnitude of the vorticity for the larger gap configuration was higher. Therefore, as the gap increases for a given stagger condition a higher lift coefficient is obtained. The effect of gap did not change the vortex morphology as much as the change in stagger when viewed at the same location.

It will be appreciated that this invention has application to a number of significantly different situations where fluid drag is encountered; for example to fixed wing aircraft, rotary wing aircraft, submarines and hydrofoils. Those skilled in the art will understand that many modifications may be made to structures, materials, proportions, arrangements, components and methods described herein, without departing from the scope of the invention claimed below.

What is claimed is:

1. In a lifting foil wherein a coordinate system has its origin at the center-of-gravity of foil and employs 3-axis, X, Y, Z Cartesian coordinate designations wherein +Y is starboard, −Y is port, +X is fore, −X is aft, +Z is up and −Z is down relative to gravity and is subject to a −X freestream, the combination of (a) a lower configuration having a lower trailing course with a positive camber having a lower starboard margin and a lower port margin, said lower course extending sideward between said lower starboard margin and said lower port margin and being responsive to fluid flow in a direction −X, for generating a first fluid reaction force having a first lifting component in a direction +Z, (b) an upper configuration having an upper leading course with a positive camber having an upper starboard margin and an upper port margin, said upper course being positioned above said lower trailing course and extending sideward between said upper starboard margin and said upper port margin for generating a second fluid reaction force having a second lifting component in said direction +Z, parallel and additive to said first reaction force, (c) a starboard flow guide extending vertically between said lower starboard margin and said upper starboard margin, having a progressively adjusted camber for suppressing spanwise fluid flow in a direction +Y, perpendicular to X and Z, and (d) a port flow guide extending vertically between said lower port margin and said upper port margin, having a progressively adjusted camber for suppressing spanwise fluid flow in a direction −Y, opposite to +Y, wherein a proportionally higher downwash angle is gained in said upper leading course of said upper configuration by virtue of sufficient positive stagger relative to said lower trailing course in said lower configuration and as stagger increases between said upper leading course said lower course creates overall increased lift.

2. A lifting foil according to claim 1, wherein said flow guides are secured to said courses by smooth, continuous connections which blend into said courses at said margins.

3. A lifting foil according to claim 1 wherein said lifting foil has a vertical cross-section which is generally elliptical.

4. A lifting foil according to claim 1 wherein said fuselage is situated midway between said flow guides with a cargo compartment between said margins.

5. A lifting foil according to claim 1 wherein said fuselage is situated midway between said flow guides, said lifting foil being provided with a large starboard passage situated between said fuselage and said starboard flow guide, and a large port passage situated between said fuselage and said port flow guide.

6. A lifting foil according to claim 1 further having three surfaces comprising a first surface defining said port passage, a second surface defining said starboard passage and a third surface defining the exterior shape of said lifting foil.

7. A lifting foil according to claim 6, said fuselage being enclosed by cooperative coverage from said first, second and third surfaces.

8. A lifting foil wherein a coordinate system has its origin at the center-of-gravity of foil and employs conventional 3-axis, X, Y, Z Cartesian coordinate designations wherein +Y is starboard, −Y is port, +X is fore, −X is aft, +Z is up and −Z is down relative to gravity and is subject to a −X freestream, comprising: (a) a lower configuration having a lower trailing course with a positive camber having a lower starboard margin and a lower port margin, said lower course extending sideward between said lower starboard margin and said lower port margin for generating a first fluid reaction force having an upwardly directed lifting component, (b) an upper configuration having an upper leading course with a positive camber having an upper starboard margin and an upper port margin, said upper course being positioned above said lower course and extending sideward between said upper starboard margin and said upper port margin for generating a second fluid reaction force having an upwardly directed lifting component, (c) A starboard flow guide extending vertically between said lower starboard margin and said upper starboard margin, said starboard flow guide comprising: (i) a first upper section secured to said upper starboard margin, (ii) a first lower section secured to said lower starboard margin, and (iv) a first mid-section positioned between said first upper section and said first lower section, (d) A port flow guide extending vertically between said lower poll margin and said upper port margin, said port flow guide comprising: (i) a second upper section secured to said upper port margin, (ii) a second lower section severed to said lower port margin, and (iv) a second mid-section positioned between said second upper section and said second lower section, said starboard flow guide and said port flow guide having cambered cross-sections characterized by a camber which is substantially zero at an associated flow guide mid-point and which increases progressively to maximum values at opposite ends of associated flow guides, wherein a proportionally higher downwash angle is gained in said upper leading course by said upper configuration relative to said lower trailing course in said lower configuration as stagger increases between said upper leading course said lower course thereby creating overall increased lift.

9. A lifting foil wherein a coordinate system has its origin at the center-of-gravity of foil and employs conventional 3-axis, X, Y, Z Cartesian coordinate designations wherein +Y is starboard, −Y is port, +X is fore, −X is aft, +Z is up and −Z is down relative to gravity and is subject to a −X freestream, comprising: (a) an upper configuration having an upper leading course with a positive camber including an upper starboard end and an upper port end, (b) a lower configuration having a lower trailing course with a positive camber including a lower starboard end and a lower port end, said lower course being generally parallel to said upper course with said lower starboard end facing said upper starboard end and said lower port end facing said upper port end, (c) a starboard flow guide having an upper starboard guide section connected to said upper starboard end, a lower starboard guide section connected to said lower starboard end, and a starboard mid-section connecting said upper starboard guide section to said lower starboard guide section, and (d) a port flow guide having an upper port guide section joined to said upper port end, a lower port guide section joined to said lower port end and a port mid-section connecting said upper port guide section to said lower port guide section; said starboard flow guide having a camber which increases progressively from a minimum camber at a mid-point of said starboard flow guide to a maximum camber at said upper starboard end and also being cambered progressively from said mid-point to said lower starboard end said port flow guide having a camber which increases progressively from a minimum camber at a mid-point of said port flow guide to a maximum camber at said upper port end and also being cambered progressively from said mid-point to said lower port end, wherein a proportionally higher downwash angle is gained in said upper leading course by said upper configuration relative to said lower trailing course in said lower configuration as stagger increases between said upper leading course said lower course thereby creating overall increased lift.

* * * * *